United States Patent
Karau et al.

(10) Patent No.: US 6,473,503 B1
(45) Date of Patent: *Oct. 29, 2002

(54) SYSTEM, METHOD AND COMPUTER PROGRAM PRODUCT FOR ACHIEVING LOCAL NUMBER PORTABILITY NETWORK MANAGEMENT SUPPORT

(75) Inventors: John Karau; Greg Usiskin, both of Alpharetta; Anne Turner, Atlanta, all of GA (US); Deborah Bauer, Leesburg, VA (US)

(73) Assignee: WorldCom, Inc., Clinton, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/386,874

(22) Filed: Aug. 31, 1999

(51) Int. Cl.[7] ............................. H04M 3/42; G09G 5/00
(52) U.S. Cl. ............... 379/221.13; 345/700; 379/221.14
(58) Field of Search ................................. 345/700, 762, 345/764; 379/221.13, 201.01, 207.02

(56) References Cited

U.S. PATENT DOCUMENTS

| | | |
|---|---|---|
| 5,218,632 | 6/1993 | Cool |
| 5,325,290 | 6/1994 | Cauffman et al. |
| 5,333,183 | 7/1994 | Herbert |
| 5,384,822 | 1/1995 | Brown et al. |
| 5,546,574 | 8/1996 | Grosskopf et al. |
| 5,566,235 | 10/1996 | Hetz |
| 5,606,600 | 2/1997 | Elliot et al. |
| 5,625,681 | 4/1997 | Butler, II |
| 5,625,816 | 4/1997 | Burdick et al. |
| 5,703,939 | 12/1997 | Bushnell |
| 5,715,303 | 2/1998 | Marks et al. |
| 5,717,745 | 2/1998 | Vijay et al. |
| 5,717,749 | 2/1998 | Sneed, Jr. et al. |
| 5,734,705 | 3/1998 | Scholossman et al. |
| 5,757,895 | 5/1998 | Aridas et al. |
| 5,761,272 | 6/1998 | Williams et al. |
| 5,764,745 | 6/1998 | Chan et al. |
| 5,765,172 | 6/1998 | Fox |
| 5,774,532 | 6/1998 | Gottlieb et al. |
| 5,784,443 | 7/1998 | Chapman et al. |
| 5,787,147 | 7/1998 | Gundersen |
| 5,793,861 | 8/1998 | Haigh |

(List continued on next page.)

FOREIGN PATENT DOCUMENTS

EP          0710042 A2       5/1996

OTHER PUBLICATIONS

Newton, "Newton's Telecom Dictionary," Flatiron Publishing, Inc., 1994, p. 714.

Lane, M., Data Communication Software Design, Boyd & Fraser Publishing Company, 1985, pp 116–117.

Primary Examiner—Harry S. Hong

(57) ABSTRACT

A system, method and computer program product for achieving local number protability (LNP) costing and network management support is disclosed. The disclosure includes a LNP graphical user interface (GUI) implemented as, for example, a WEB or Internet based tool to audit related charges, and to enable users to determine ported number status on a real-time basis.

39 Claims, 51 Drawing Sheets

U.S. PATENT DOCUMENTS

| | | |
|---|---|---|
| 5,809,108 | 9/1998 | Thompson et al. |
| 5,832,068 | 11/1998 | Smith .................... 379/114.14 |
| 5,835,497 | 11/1998 | Litzenberger et al. |
| 5,835,757 | 11/1998 | Oulid-Aissa et al. |
| 5,854,834 | 12/1998 | Gottieb et al. |
| 5,883,948 | 3/1999 | Dunn |
| 5,896,440 | 4/1999 | Reed et al. |
| 5,901,215 | 5/1999 | Dezenno |
| 5,903,632 | 5/1999 | Brandon |
| 5,910,983 | 6/1999 | Dezonno et al. |
| 5,912,962 | 6/1999 | Bosco |
| 5,933,489 | 8/1999 | Sensabaugh et al. |
| 5,940,492 | 8/1999 | Galloway et al. |
| 5,949,867 | 9/1999 | Sonnenberg |
| 5,951,654 | 9/1999 | Avsan et al. |
| 5,978,464 | 11/1999 | Sonnenberg |
| 5,987,114 | 11/1999 | Sonnenberg |
| 6,047,045 | 4/2000 | Sommers et al. ........ 379/26.01 |
| 6,058,175 | 5/2000 | Schultz |
| 6,064,887 | 5/2000 | Kallioniemi et al. |
| 6,067,354 | 5/2000 | Bauer et al. |
| 6,122,362 | 9/2000 | Smith et al. |
| 6,169,793 | 1/2001 | Godwin et al. ........ 379/221.13 |

1.14. SV Screen: Query Details 1.14.1. General Tab frmMain
User SPID: 7229

Maintain SV
  Query
    Create as Gaining
    Create as Losing
    Modify
    Activate
    Cancel
    Cancel Acknowledge
    Resolve Conflict
    Disconnect
  View Notifications
  Maintain NPAC Audit
  Maintain NPA-NXX
  Maintain LRN
  Maintain SP
  Security New Window
Logoff Subscription Version Details (SOA)

| General | SV History | Additional Info | Partial Failure SP List |

— 360    — 362    — 364    — 366

Subscription Version ID: 101

Service Provider
  TN: 6132366604    Region: Western
  New SP ID: MCIT    SV Status: Sending
  Old SP ID: AT&T    Porting to Original: YES
  New SP Due Date/Time: 1999/04/15 08:49:56    Old SP Authorization: NO
  LRN: 1231231231    Old SP Due Date/Time:
  Switch CLLI:    Remarks: YES
  Ready to Activate: NO    LEC NPA-NXX: 613236

FIG. 4D 1.14.2. SV History Tab frmMain

User SPID
7229

- Maintain SV
  - Query
    - Create as Gaining
    - Create as Losing
    - Modify
    - Activate
    - Cancel
    - Cancel Acknowledge
    - Resolve Conflict
    - Disconnect
  - View Notifications
  - Maintain NPAC Audit
  - Maintain NPA-NXX
  - Maintain LRN
- Maintain SP
- Security New Window Logoff Subscription Version Details (SOA) — 362

| General | SV History | Additional Info | Partial Failure SP List |

| Date/Time — 362A | Activity — 362B |
|---|---|
| 1999/04/15 17:12:27 | Broadcast |
| 1999/04/15 17:12:27 | Modified |
| 1997/01/19 18:15:22 | New SP Creation |
| 1997/01/19 18:15:22 | New SP Cancellation |
| 1997/01/19 18:15:22 | New SP Conflict Resolution |
| 1997/01/19 18:15:22 | Old SP Authorization |
| 1997/01/19 18:15:22 | Old SP Cancellation |
| 1997/01/19 18:15:22 | Old SP Conflict Resolution |
| 1997/01/19 18:15:22 | Activation |
| 1997/01/19 18:15:22 | Conflict |
| 1997/01/19 18:15:22 | Effective Release |
| 1997/01/19 18:15:22 | Disconnect Complete |
| 1997/01/19 18:15:22 | Cancellation |
| 1997/01/19 18:15:22 | Old |
| 1997/01/19 18:15:22 | Old SP Creation |
| 1997/01/19 18:15:22 | Customer Disconnect |

1.14.3. Additional Info frmMain
User SPID: 7229

Maintain SV
  Query
  Create as Gaining
  Create as Losing
  Modify
  Activate
  Cancel
  Cancel Acknowledge
  Resolve Conflict
  Disconnect
⊞ View Notifications
⊞ Maintain SV Audit
  Maintain NPA-NXX
  Maintain LRN
⊞ Maintain SP
⊞ Security New Window
Logoff Subscription Version Details (SOA) — 364
General | SV History | Additional Info | Partial Failure SP List LNR Type: LSPP — 364A
User ID: FRANCEG1 — 364B
Pre-Cancellation Status: Conflict — 364C
Work Order: 1234 — 364D
Service Order: 4321 — 364F
Billing ID: — 364G
Reserved TN: NO — 364H SV Remarks: remark — 364E
364I Customer: name DPC: 112.221.112 — 364J
LIDB: 123.132.213 — 364L
CNAM: 121.131.212 — 364N
ISVM: 113.131.132 — 364P
SSN: 112 — 364K
123 — 364M
121 — 364O
113 — 364Q End User Location Value: — 364R
End User Location Type: — 364S 1.8. SV Screen: Maintain 1.8.1. SV Screen: Create As Gaining Tab

FIG. 4H 1.8.2. SV Screen: Create As Gaining Additional Tab

FIG. 4I 1.8.5.2. Modify as New: Additional Tab frmMain

User SPID: 7228

- Maintain SV
  - Query
  - Create as Gaining
  - Activate
- Modify
  - Cancel
  - Create as Losing
  - Disconnect
  - Cancel Acknowledge
  - Resolve Conflict
- View Notifications
- Maintain SV Audit
- Maintain NPA-NXX
- Maintain LRN
- Maintain SP
- Security New Window | Logoff

Modify Subscription Version

Specify:
- Telephone Number: 6⁻¹32366604  Through: 6605
- Subscription Version Status: Pending Or:
- Subscription Version ID: 1231231231  Region: Western ⦿ Modify as New Service Provider   ○ Modify as Old Service Provider

| Modify as New | Additional — 394 |

GTT Data — 394B, 394D, 394F, 394H
| CLASS | LIDB | CNAM | ISVM |
|---|---|---|---|
| DPC: 001.001.001 | 002.002.002 | 003.003.003 | 004.004.004 |
| SSN: 111 — 394C | 122 — 394E | 133 — 394G | 144 — 394I |

End User Location — 394J
Value: value    Type: ty — 394K

Modify  |  Clear

Lookup — 394N

FIG. 4M

1.8.5.3. Modify as Old Service Provider frmMain

User SPID
7229

⊞Maintain SV
  Query
  Create as Gaining
  Create as Losing
  Modify
  Activate
  Cancel
  Cancel Acknowledge
  Resolve Conflict
  Disconnect
⊞View Notifications
⊞Maintain SV Audit
  Maintain NPA-NXX
  Maintain LRN
⊞Maintain SP
⊞Security New Window Logoff Modify Subscription Version — 400

Specify:
Telephone Number: 613-236-6604  Through: 6605
Subscription Version Status: Sending
Or:
Subscription Version ID: 1231231231  Region: Western ○ Modify as New Service Provider
⊙ Modify as Old Service Provider — 390E — 400A
Old SP Due Date: 1999/04/09
Old SP Authorization: Yes — 400B
Customer Name: Customer
Work Order: 1234 — 400E
Service Order: 4321 — 400G
Status Change Cause: General Conflict — 400C
— 400D
— 400F
Remarks: This is a remark Modify
Clear

FIG. 4N 1.7.4. NPA-NXX Screen: Create 1.16.3. Audit Screen: Show Audit Details 1.16.3.1. Results Report Tab

FIG. 4AA 1.16.3.2. Discrepancy Report Tab

FIG. 4AB 1.16.3.3. Scope of Audit Tab

FIG. 4AC

1.15. View Notification 1.15.1. Notification Screen: Operational Information

FIG. 4AD 1.15.2. Notification Screen: Cancellation Acknowledgement frmMain

User SPID: 7229

- ⊞ Maintain SV
- ⊞ View Notifications
    - Operational Info
    - Cancel Acknowledge
    - Customer Disconnect
    - Create Request
    - Concurrence Request
    - SV Status Change
    - Final Concurrence
    - First Use of NPA-NXX
- ⊞ Maintain SV Audit
    - Maintain NPA-NXX
    - Maintain LRN
    - Maintain SP
    - Security New Window Logoff

324B

Cancellation Acknowledge Request Notification

Date/Time Range
From: 1990/04/06 12:59:56
To: 1999/04/09 12:59:56

TN Range
Start: 613-236-6604
End:

Region: Western

| Region | Notification Receipt Date/Time | Telephone Number | SV ID |
|---|---|---|---|
| Western | 1999/02/20 08:49:02 | 613-236-6604 | 1 |
| Western | 1999/02/20 08:49:02 | 613-236-6607 | 2 |

Query    Print    Clear

558

554C
558A
558B
558D
558E
558F
558G
558H
558I
558J
558K
558L
558M

FIG. 4AE 1.15.3. Notification Screen: Donor SP Customer Disconnect Date 1.15.5. Notification Screen: New SP Create

FIG. 4AG

1.15.6. Notification Screen: Old SP Concurrence frmMain

User SPID: 7229

- Maintain SV
- View Notifications
  - Operational Info
  - Cancel Acknowledge
  - Customer Disconnect
  - Create Request
  - Concurrence Request
  - SV Status Change
  - Final Concurrence
  - First Use of NPA-NXX
- Maintain SV Audit
  - Maintain NPA-NXX
  - Maintain LRN
  - Maintain SP
- Security Old SP Concurrence Request Notification Date/Time Range
From: 1998/04/13 09:52:51
To: 1999/04/16 09:52:51

TN Range
Start:
End:

Region: Multiple

| Region | Notification Receipt Date/Time | Telephone Number | SV ID | New SP ID | New SP Due Date/Time |
|---|---|---|---|---|---|
| Midatlantic | 1999/03/31 16:00:00 | 613-728-8124 | 4 | MCI | 1999/03/31 16:00:00 |
| Midwest | 1999/02/28 16:00:00 | 246-789-2233 | 3 | BELL | 1999/02/28 16:00:00 |
| Southeast | 1999/01/31 16:00:00 | 819-568-4300 | 2 | NT | 1999/01/31 16:00:00 |
| Western | 1998/12/31 16:00:00 | 613-236-6604 | 1 | MCIT | 1998/12/31 16:00:00 |

Query  Print  Clear

New Window  Logoff

FIG. 4AH 1.15.8. Notification Screen: Final Concurrence Window Expiration frmMainFrance

User SPID: 7229

- Maintain SV
- View Notifications
  - Operational Info
  - Cancel Acknowledge
  - Customer Disconnect
  - Create Request
  - Concurrence Request
  - SV Status Change
  - Final Concurrence
  - First Use of NPA-NXX
- Maintain SV Audit
- Maintain NPA-NXX
- Maintain LRN
- Maintain SP
- Security Final Concurrence Window Expiration Notification Date/Time Range
From: 1998/04/06 12:28:21
To: 1999/04/09 12:28:21

TN Range
Start:
End:

Region: Multiple

| Region | Notification Receipt Date/Time | Telephone Number | SV ID |
|---|---|---|---|
| Midwest | 1999/04/01 14:44:52 | 819-669-6736 | 55 |
| Western | 1999/03/30 16:12:37 | 613-728-8200 | 29 |
| Southeast | 1999/03/22 08:34:51 | 418-970-3355 | 74 |
| Western | 1999/03/17 11:09:21 | 613-236-9734 | 44 |
| Midatlantic | 1999/03/11 15:06:11 | 819-246-7835 | 98 |
| Western | 1999/03/02 10:22:04 | 613-236-6604 | 35 |

Query   Print   Clear

New Window   Logoff

FIG. 4AK 1.15.4. Notification Screen: First TN Port For NPA-NXX frmMain

User SPID: 7229

- Maintain SV
- View Notifications
  - Operational Info
  - Cancel Acknowledge
  - Customer Disconnect
  - Create Request
  - Concurrence Request
  - SV Status Change
  - Final Concurrence
  - First Use of NPA-NXX
- Maintain SV Audit
- Maintain NPA-NXX
- Maintain LRN
- Maintain SP
- Security New Window | Logoff First TN Port For NPA-NXX Notification Date/Time Range
From: 1990/04/06 13:03:40
To: 1999/04/09 13:03:40

Region: Multiple

| Region | Notification Receipt Date/Time | NPA-NXX | SP ID | Effective Date/Time |
|---|---|---|---|---|
| Midatlantic | 1999/04/01 00:00:00 | 444444 | SP44 | 1999/04/01 00:00:00 |
| Midwest | 1999/03/01 00:00:00 | 333333 | SP33 | 1999/03/01 00:00:00 |
| Southeast | 1999/02/01 00:00:00 | 222222 | SP22 | 1999/02/01 00:00:00 |
| Western | 1999/01/01 00:00:00 | 111111 | SP11 | 1999/01/01 00:00:00 |

Query | Print | Clear

FIG. 4AL 1.3. Security Screen: Logon

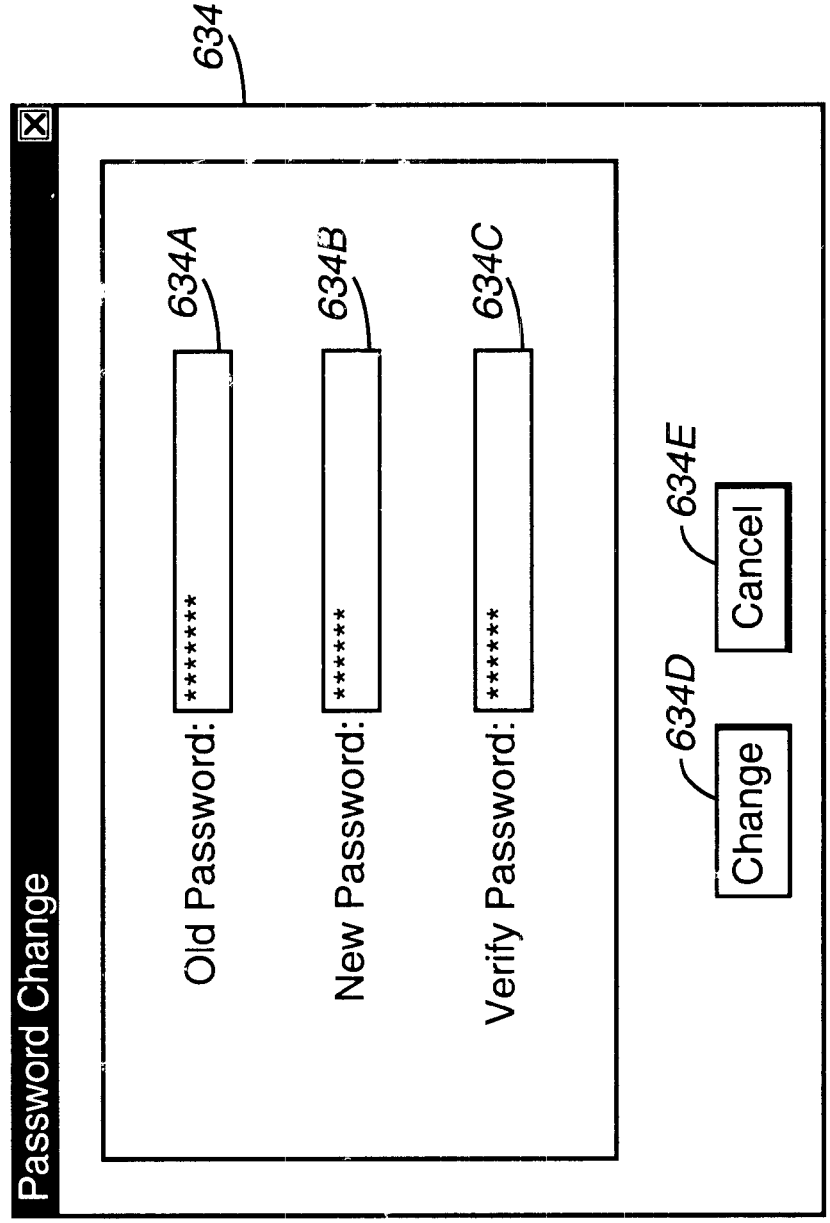

1.5. Security Screen: Create/Query/Maintain User

FIG. 4AO

SYSTEM, METHOD AND COMPUTER PROGRAM PRODUCT FOR ACHIEVING LOCAL NUMBER PORTABILITY NETWORK MANAGEMENT SUPPORT

CROSS-REFERENCES TO RELATED APPLICATIONS

This application is related to U.S. patent application Ser. No. 08/897,906, filed Jul. 21, 1997, and entitled "System and Method for Achieving Local Number Portability," U.S. patent application Ser. No. 09/167,956, filed Oct. 6, 1998, and entitled "A System and Method for Achieving Local Number Portability," U.S. patent application Ser. No. 09/169,466, filed Oct. 9, 1998, and entitled "A System and Method for Achieving Local Number Portability," now U.S. Pat. No. 6,067,354, U.S. patent application Ser. No. 09/169,491, filed Oct. 9, 1998, and entitled "A System and Method for Achieving Local Number Portability," U.S. patent application Ser. No. 09/170,636, filed Oct. 13, 1998, and entitled "A System and Method for Achieving Local Number Portability," U.S. patent application Ser. No. 09/169,081, filed Oct. 9, 1998, and entitled "A System and Method for Achieving Local Number Portability," now U.S. Pat. No. 6,047,045, and U.S. patent application Ser. No. 09/170,635, filed Oct. 13, 1998, and entitled "A System and Method for Achieving Local Number Portability," all of which are incorporated herein by reference. This application is also related to co-pending patent applications U.S. Ser. No. 09/386,595, entitled "System, Method And Computer Program Product For Achieving Local Number Portability Costing Support", and U.S. Ser. No. 09/386,594, entitled "System, Method And Computer Program Product For Achieving Local Number Portability Costing And Network Management Support", both filed concurrently herewith (Aug. 31, 1999), and both incorporated herein by reference.

BACKGROUND OF THE INVENTION

1. Field of the Invention

The present invention relates generally to the field of telecommunications and more specifically to a method, system and computer program product for local number portability network management support.

2. Discussion of the Background

Without limiting the invention, its-background is described in connection with local telephone services and providers of such services. In addition, provided herein, for convenience, at Appendix I is a glossary of terms of art and acronyms used throughout this disclosure.

In general, the telecommunications industry has evolved into a highly competitive and sophisticated network of equipment manufacturers and service providers. Since the early 1980s, the industry has seen a shift from pure analog techniques useful for transmitting signals over copper wire to digital techniques useful for transmitting signals over optical fiber. Today, customers can choose from a large array of consumer telecommunications services including local and long distance calling, 800 and 900 calling accounts, TCP/IP (i.e., the "Internet" or world wide web "WEB") and others.

Typically, a telecommunications customer obtains access to such services by establishing an account with a service provider. The service provider, in turn, will assign to the customer a telephone number for inbound calls or provide the customer with a dial-up number for outbound calls. For example, the number can be the local telephone number where the customer can be reached such as a home or business. The number can also be the local dial-in to an automated system for a switched connection to a network element such as a domain server. Other examples include, but are not limited to, a customer's facsimile machine, cell phone number or voice mail.

At the same time industry deregulation has brought about the entry of multiple service providers within single geographic regions. In addition to competition, the number and variety of telecommunications services continues to increase. Typically, a category of service is tied to a single unique number so that any one customer may require a host of numbers to accommodate a host of services. Thus, a common situation has evolved wherein a single customer will have a home number, an office number, a facsimile machine number, a cell phone number, an Internet account number and possibly others.

Today's service providers employ advanced information technology systems using sophisticated equipment such as routers, switches and digital cross-connects. At a minimum, the equipment must be configured to ensure calls reach their destination regardless of the service provider. While standards and communications protocols have been adopted by the industry, cooperation amongst service providers has been critical to implementing a reliable network. Today, a customer can place a clear noise free call from almost anywhere in the world.

The Public Switched Telephone Network (PSTN) comprises the telecommunications backbone for most voice/data traffic in the world. For most local and long distance telephone calls a local telephone company acts as a local entry point to the PSTN. Typically, a Local Routing Number (LRN) is used to route the call from a point of origination to a point of destination on the PSTN. This is true regardless of who is servicing the call at either point.

This infrastructure, however, does not always accommodate a change in the service needs of an end customer. For example, often a customer desires to switch service providers to take advantage of a more attractive rate plan. The problem lies in that the customer is not guaranteed to maintain the same local number even if the customer remains at the same location. Thus, until recently, there was no way to port a customer's number from one service provider to another within the same local region.

In short, as competition for communications services has grown so has the value attached to a customer's telephone number. At present, call routing is based on a number associated with the switch used to handle the local call. Moreover, service providers have not developed a means for reliable call routing when a switch from one provider to another is made. Previously, the only solution was to assign a new telephone number not already in use by another customer.

While long distance carriers have enacted portability solutions on a regional or even national basis for certain classes of services, such as 800 and 900 accounts, the local portability problem has not, until the present invention, been squarely addressed. Moreover, prior art efforts at local number portability have not been widespread. For example, an industry task force was formed, pursuant to the Illinois Commerce Commission Order on Customers First Plan (Docket 94-0096 dated Apr. 7, 1995), to develop a permanent number portability solution for Illinois. While the task force made progress in defining the problem and resolving certain issues related to implementing local number portability, it did not resolve the problem on a nationwide basis. Nor did the commission establish the hardware and software interfaces required to implement a nationwide portability solution.

Systems for achieving local number portability on a nationwide basis and for allowing sharing a single telephone number over different local exchange carriers are disclosed, for example, in U.S. patent application Ser. No. 08/897,906, filed Jul. 21, 1997, and entitled "System and Method for Achieving Local Number Portability," and the other cross-referenced applications indicated above as being related to the present application.

Local number portability typically requires use of an external entity, the Number Portability Subscription Manager (NPSM), to handle the porting of local telephone numbers between Competitive Local Exchange Carriers (CLECs).

However, use of the NPSM service typically requires (i) payment for transactions which are typically billed monthly, and (ii) monitoring user (e.g., telecommunications service provider) and NPSM activity to insure that the user's network traffic successfully completes. In addition, it is desirable to monitor user (e.g., telecommunications service provider), competitor and NPSM activity to insure that the user can more fully address the local number porting market opportunity. In addition, current user interfaces fail to combine full functionality, ease of use, and Year 2000 (Y2K) compliance.

SUMMARY OF THE INVENTION

Accordingly, an object of this invention is to provide a novel method, system and computer program product for providing local number portability costing and network management support.

It is a further object of this invention to provide a novel method, system and computer program product for a WEB or Internet based tool for auditing local number portability charges.

It is a further object of this invention to provide a novel method, system and computer program product for a WEB or Internet based tool for network management support.

The above and other objects are achieved according to the present invention by providing a novel process, system and computer readable medium for interfacing to a local number portability (LNP) network, including coupling a graphical user interface (GUI) to an engine interface via a communications link; transmitting data, via the engine interface, from the LNP network to the GUI via the communications link and transmitting data received from the GUI to the LNP network; providing screen displays to a user, via the GUI, for performing LNP network maintenance functions including at least one of maintaining a service provider (SP), maintaining a numbering plan area-telephone number exchange (NPA-NXX), and maintaining local routing number (LRN); and providing screen displays to a user, via the GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV.

In another aspect of the present invention, there is provided a novel process, system and computer readable medium for interfacing to a local number portability (LNP) network, including coupling a graphical user interface (GUI) to an engine interface via a communications link; transmitting, via the engine interface, data from the LNP network to the GUI via the communications link and transmitting data received from the GUI to the LNP network; providing screen displays to a user, via the GUI, for performing reconciling with a number portability administration center (NPAC) functions including at least one of initiating a NPAC audit, and querying a NPAC audit; and providing screen displays to a user, via the GUI, for performing viewing of LNP notifications functions including at least one of viewing operational information notifications, viewing cancellation acknowledge notifications, viewing customer disconnect notifications, viewing create request notifications, viewing concurrence request notifications, viewing subscription version (SV) status change notifications, viewing final concurrence notifications, and viewing a first use of numbering plan area-telephone number exchange (NPA-NXX) notifications.

In another aspect of the present invention, there is provided a novel process, system and computer readable medium for interfacing to a local number portability (LNP) network, including coupling a graphical user interface (GUI) to a engine interface via a communications link; transmitting data, via the engine interface, from the LNP network to the GUI via the communications link and transmitting data received from the GUI to the LNP network; providing screen displays to a user, via the GUI, for performing LNP network maintenance functions including at least one of maintaining a service provider (SP), maintaining a numbering plan area-telephone number exchange (NPA-NXX), and maintaining local routing number (LRN); providing screen displays to a user, via the GUI, for performing LNP subscription version (SV)maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV; providing screen displays to a user, via the GUI, for performing reconciling with a number portability administration center (NPAC) functions including at least one of initiating a NPAC audit, and querying a NPAC audit; and providing screen displays to a user, via the GUI, for performing viewing of LNP notifications functions including at least one of viewing operational information notifications, viewing cancellation acknowledge notifications, viewing customer disconnect notifications, viewing create request notifications, viewing concurrence request notifications, viewing SV status change notifications, viewing final concurrence notifications, and viewing a first use of numbering plan area-telephone number exchange (NPA-NXX) notifications.

The present invention provides a hardware and software platform to effect local number portability costing or charge auditing and network management support. The systems and subsystems of the invention are designed to communicate with a Number Portability Administration Subscription Manager (NPSM).

In addition, the systems and subsystems of the invention are designed to communicate with a Service Order Administration (SOA) engine which is later described. The above and other functions are performed by a Local Number Portability (LNP) Graphical User Interface (GUI) to upstream users (e.g., telecommunications service providers), according to the present invention.

With respect to local number portability costing support, the LNP GUI is structured as, for example, a WEB or Internet based tool to audit related charges. Users can quickly determine potential liability by accessing LNP GUI screens that detail porting activity. The information is updated on a real-time basis to insure accurate pricing and forecasting. In this way, accuracy of Number Portability Administration Center (NPAC) charges can be easily determined. The NPAC receives and stores updated customer routing information and makes it available to participating service providers. The NPAC contains a record of all ported numbers and a history file of all transactions relating to the porting of a number. The above-noted LNP GUI costing support dramatically reduces the amount of time necessary to audit invoices and simplifies the dispute process. Additionally, the LNP GUI costing support can be of use to other companies in monitoring and auditing NPAC expenses.

With respect to local number portability network management support, the LNP GUI is structured as, for example, a WEB or Internet based tool to enable, for example, the National Network Management Center (NNMC) to determine ported number status on a real-time basis. The NNMC can quickly determine potential call completion risks by accessing LNP GUI screens that detail, for example, telecommunications service providers' porting activity. The information is updated on a real-time basis to insure accurate analysis and trouble shooting. In this way, NNMC staff can easily determine call completion exposures to, for example, telecommunications service providers' customers. This dramatically reduces the amount of time necessary to perform porting network audits and simplifies the customer support resolution process. Additionally, the LNP GUI can be of use to external companies in monitoring and trouble shooting network outages associated with local number porting activities.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Throughout the following description, the terms "interface", "line", "lines", "link", "communications link", "inbound link" and/or "outbound link" can mean a channel, signal pathway, data path, circuit, or other similar mechanism whether physical, virtual or logical, which can be used for the transfer and communication of data by system applications and programs, whether external or internal. The terms "outbound link" and "inbound link" can also mean "pipes" in the context of the Oracle database structure and associated protocols, or "sockets" in the context of the UNIX operating system structure and associated protocols. The term "database" refers to a file of records having fields together with a set of operations on the records. Such conventions are well known to those skilled in the art.

Figure 1A:
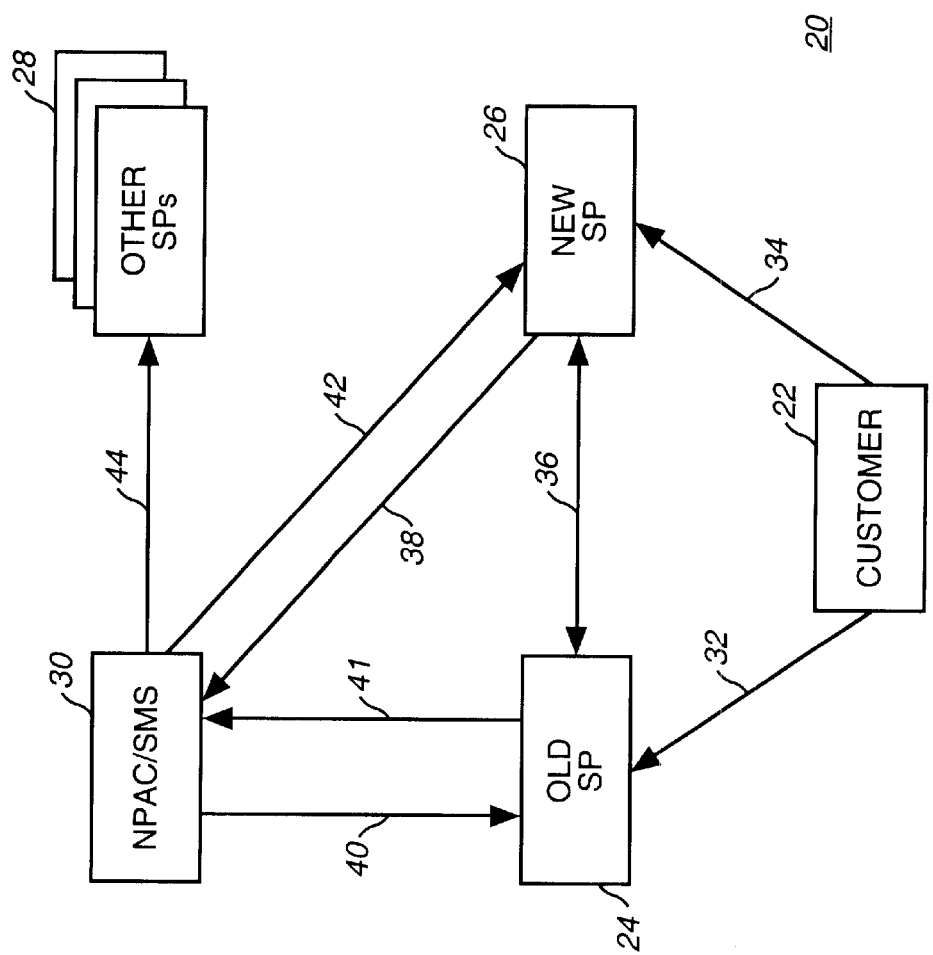
FIG. 1A is an overall process flow diagram for transferring a customer's port data from an old service provider to a new service provider.
Figure 1B:
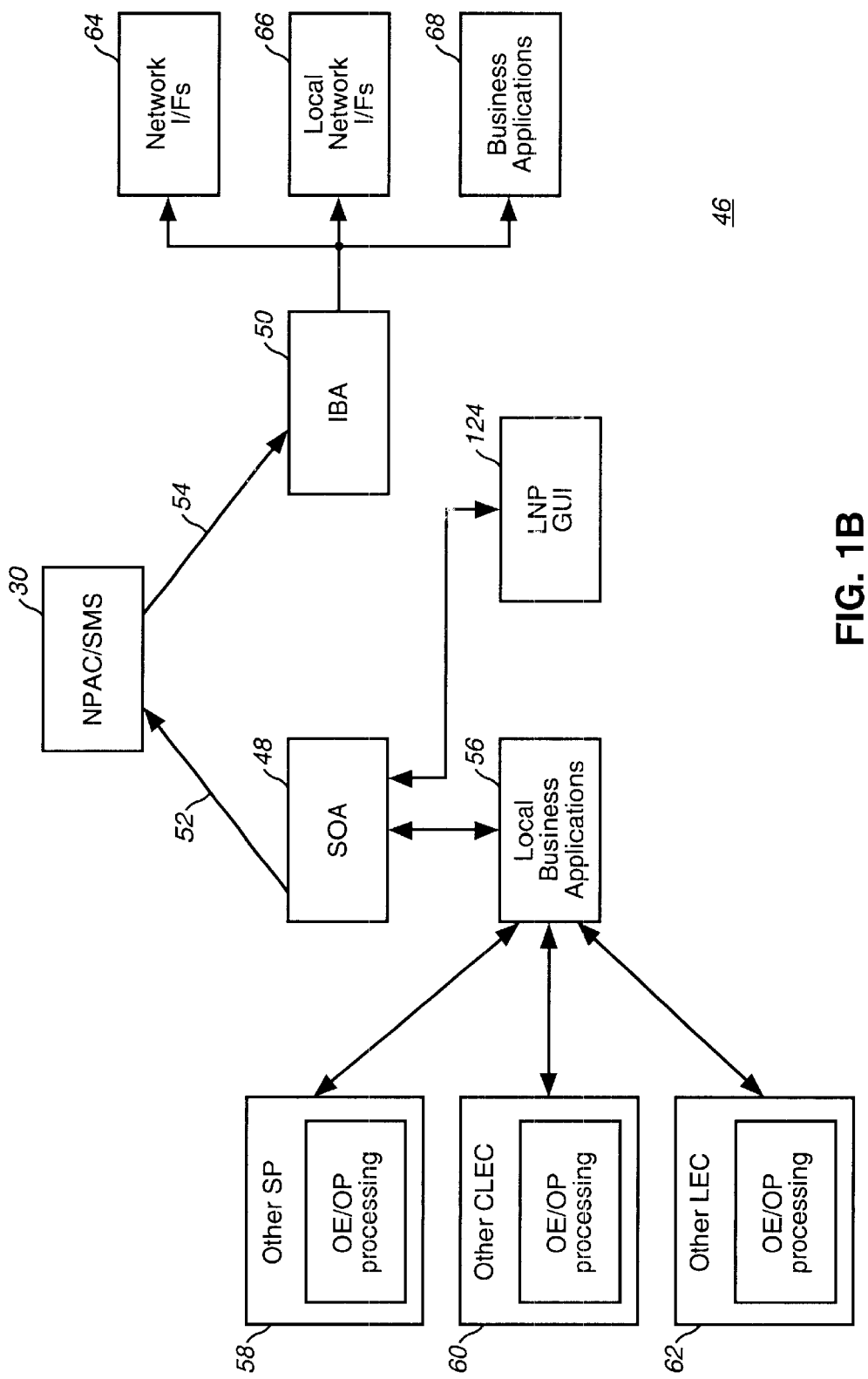
FIG. 1B is a high level block diagram for an interface between a Service Order Administration (SOA), an Interface Broadcast Agent (IBA) and a regional number portability administration center.
Figure 1C:
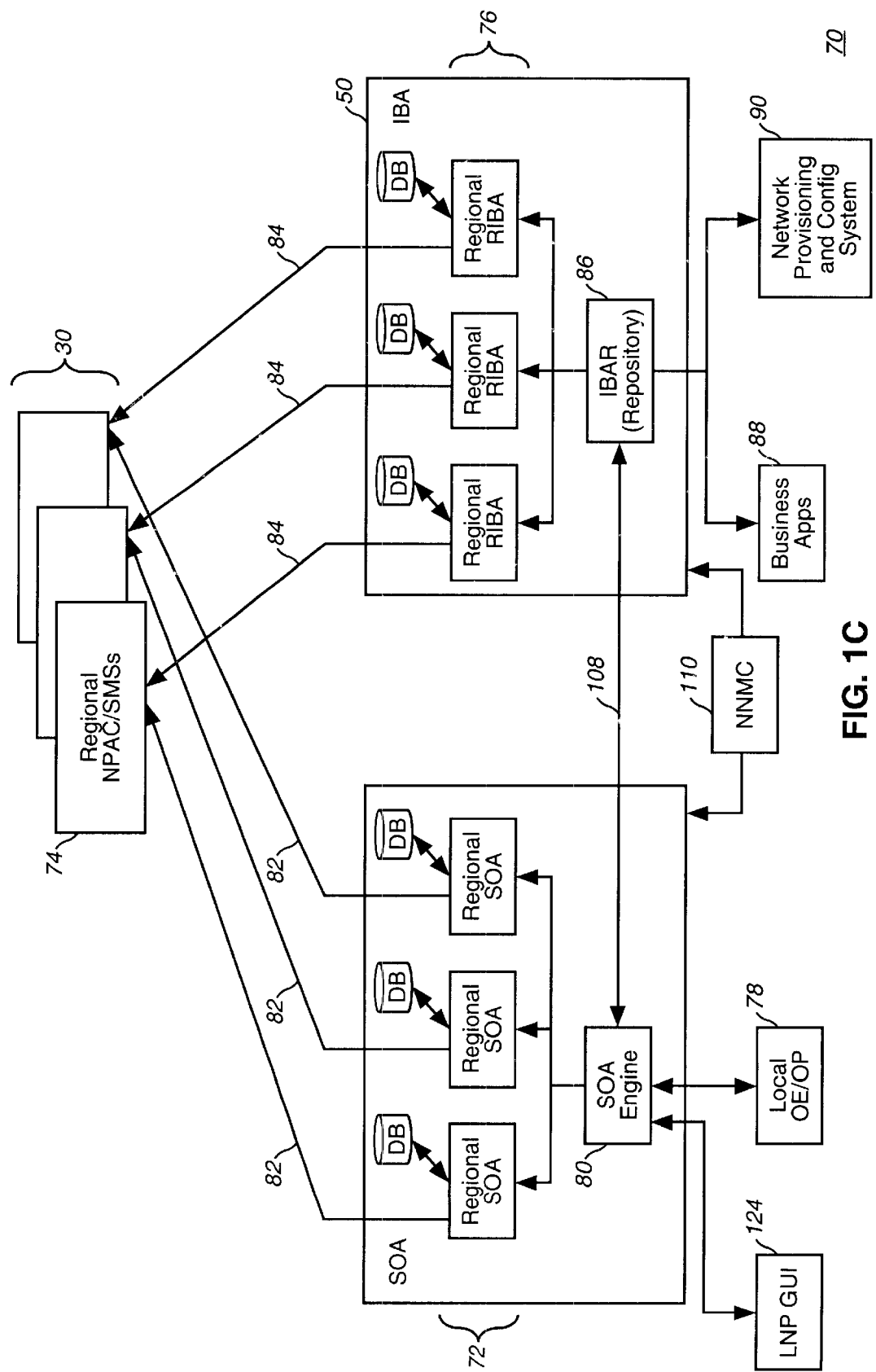
FIG. 1C is a block diagram of the novel SOA and IBA Subsystems and their interface to various business applications.

Referring now to the drawings, wherein like reference numerals designate identical or corresponding parts throughout the several views, and more particularly to FIG. 1A thereof, there is illustrated a flow diagram of a telephone number porting process, denoted generally as 20. FIGS. 1A–1C and the accompanying discussion briefly describes the overall system in which the present invention is implemented. For a detailed discussion of the overall system see, for example, U.S. patent application Ser. No. 09/170,635, filed Oct. 13, 1998, and entitled "A System and Method for Achieving Local Number Portability" and the other cross-referenced applications mentioned above.

In general, the telephone number porting process 20, which achieves Local Number Portability (LNP), is used by a customer 22 to port or transfer his or her telephone number from an old service provider 24 to a new service provider 26. The customer 22 initiates the telephone number porting process 20 by submitting a port request to either the old service provider 24 as denoted by line 32, or the new service provider 26 as denoted by line 34, to arrange the port or transfer of the customer's telephone number from the old service provider 24 to the new service provider 26. The port request may include a due date for the port transfer. Thereafter, the old service provider 24 and new service provider 26 arrange the port details for the customer's telephone number as denoted by line 36. The port details may include the due date for the port transfer.

Once the new service provider 26 obtains the customer's port request, the new service provider 26 notifies a Number Portability Administration Center and Service Management System (NPAC/SMS) 30, which maintains a centralized regional number database for all customers in a given region, of the pending port or transfer, as denoted by line 38. Alternatively, the old service provider 24 can notify the NPAC/SMS 30 of the pending port, as denoted by line 41.

When the NPAC/SMS 30 receives a notification of a pending port or transfer, it performs certain validation checks and procedures. The NPAC/SMS 30 determines if it has received a notification from both of the involved service providers. If the NPAC/SMS 30 only received a notification from one of the involved service providers, either the old service provider 24 or the new service provider 26, the NPAC/SMS 30 will notify the service provider that failed to send a notification that the NPAC/SMS 30 is expecting such a notification. If the NPAC/SMS 30 receives the missing notification and the notifications from the two service providers 24 and 26 indicate agreement, the NPAC/SMS 30 activates the port of the customer's telephone number when the new service provider due date is reached or when the new service provider 26 sends an activation notice to the NPAC/SMS 30.

The NPAC/SMS 30 activates the port of the customer's telephone number by sending the new port data to the old service provider 24, as denoted by line 40, to the new service provider 26, as denoted by line 42, and to all other service providers 28, as denoted by line 44. This ensures proper call routing to the customer because all the service providers in the region 24, 26. and 28 can update their networking equipment accordingly.

If, during the validation process described above, the old service provider 24 failed to respond to the notification of the pending port, the NPAC/SMS 30 will log the failure to respond and allow the new service provider 26 to proceed with the port when the due date is reached. On the other hand, if it was the new service provider 26 that failed to respond, the NPAC/SMS 30 will log the failure to respond, cancel the notification and notify both service providers 24 and 26 of the cancellation. If there is any disagreement among any of the service providers 24, 26 or 28 as to who will provide the new service to the customer 22, the NPAC/SMS 30 will place the notification in a "conflict" state and notify the conflicting service providers 24, 26 or 28 of the conflict status. The conflicting service providers 24, 26 or 28 will determine who will serve the customer 22 using appropriate internal conflict resolution procedures. If the conflict is resolved, the NPAC/SMS 30 will remove the notification from the "conflict" status once it is notified of the resolution after which the port process proceeds as described above. Alternatively, the new service provider 26 can cancel the port request.

Turning now to FIG. 1B, a block diagram of a system for achieving local number portability is shown and denoted generally as 46. The NPAC/SMS 30 is communicably linked to two functional subsystems, a Service Order Administration (SOA) Subsystem 48 and an Interface Broadcast Agent (IBA) Subsystem 50 via communication interfaces 52 and 54, respectively.

The SOA Subsystem 48 is the application responsible for sending the customer's port data from one service provider to another service provider. Likewise, the IBA Subsystem 50 is the application responsible for receiving, processing, storing and transmitting customer port data to the local networks. The SOA 48 and IBA 50 Subsystems work together with the NPAC/SMS 30 to send and receive customer porting data from regional call routing centers and data sources to more centralized information sources and applications. This configuration 46 provides a distributed architecture that allows the porting of data to the local applications and networking equipment maintained by service providers for appropriate call routing and processing.

The SOA Subsystem 48 is communicably linked to one or more local applications 56, which are maintained by the local service provider. Examples of the local applications 56 include, but are not limited to, residential and business lines for voice, data and fax communications. The local applications 56, in turn, are communicably linked and used by the customer Order Entry and Order Processing (OE/OP) systems of other service providers 58, other Complex Local Exchange Carriers (CLEC) 60, and other Local Exchange Carriers (LEC) 62, depending on the existing network of service providers. The SOA Subsystem 48 acts as an intermediary between the local applications 56 and the NPAC/SMS 30, thus providing a smooth non-intrusive solution for local number portability. The Local Number Portability Graphical User Interface (LNP GUI) 124, as will be later described, provides a novel user interface to the SOA Subsystem 48.

Likewise, the IBA Subsystem 50 provides the interface between the regional NPAC/SMS 30 and a plurality of other network entry systems 64, 66 and 68. The specific functionality of the network entry systems 64, 66 and 68 may vary, but in general, they form a platform for receiving, storing, and routing customer port data. Examples of services that use the port data include local and long distance networks and 800 services.

For example, business applications 68 can comprise a database of records for all provider systems needing access to the customer porting data, such as the Automatic Number Identifier (ANI) reference information system. The local network interfaces 66 can be an intelligent network architecture that supports routing queries during call processing. The network interface 64 can include the Metro Intelligent Network Architecture, which is sold by Northern Telecom, that forms a tie-in into available communications services. Such services may include an 800 or 900 service or other similar offerings that may require access to the port data through a regional toll switch network from the NPAC/SMS 30 for correct call servicing and routing.

Turning now to FIG. 1C, the interaction between the NPAC/SMS 30, the SOA Subsystem 48 and the IBA Subsystem 50 will be described. The Local Number Portability System of FIG. 1C is denoted generally as 70. Local Customer Order Entry and Order Processing (OE/OP) Systems (collectively referred to as the "Front End") 78 send and receive LNP transactions or messages to and from a local SOA Engine 80. The SOA Engine 80 is an interface that routes the LNP transactions or messages to their appropriate destinations, such as the Regional SOA Subsystems 72 located in various parts of the country. The SOA Engine 80 also routes database queries to the Regional Interface Broadcast Agent (RIBA) 76 and Interface Broadcast Agent Repository (IBAR) 86 Subsystems. The Regional SOA 72 and SOA Engine 80 Subsystems form the SOA Subsystem 48, which provides the means for submitting customer service order changes to the Regional NPAC/SMSs 74. The LNP GUI 124, as will be later described, provides a novel user interface to the SOA Engine 80.

Each Regional SOA Subsystem 72 is connected to a corresponding Regional NPAC/SMS 74 by communication interface 82, and all of the Regional NPAC/SMSs 74 form the NPAC/SMS 30. Similarly, each Regional NPAC/SMS 74 is connected to a corresponding RIBA Subsystem 76 by communication interface 84. Communication interfaces 82 and 84 conform to recognized industry standards, such as the North American Council Functional Requirements Specifications and the "NPAC/SMS Interoperable Interface Specification" by Lockheed Martin IMS Corporation. Communication interface 82 utilizes a Common Management Interface Protocol (CMIP) and communication interface 84 utilizes both CMIP and File Transfer Protocols (FTP).

Preferably some method of access control is provided to manage security issues that arise from communications between the SOA 72 and RIBA 76 Subsystems and the NPAC/SMS 74. An access control field is included in messages flowing between the SOA 72 and RIBA 76 Subsystems and the NPAC/SMS 74 and carries a digital signature.

The NPAC/SMS 30 then relays the port data in a predefined message format to the IBA Subsystem 50 through interfaces 84. Like the SOA Subsystem 48, the IBA Subsystem 50 comprises a plurality of Regional IBA Subsystems 76 that update a single IBAR Subsystem 86. As shown in FIG. 1C, the IBAR Subsystem 86 is accessible by a plurality of downstream applications, such as business applications 88, and network provisioning and configuration systems 90.

FIG. 1C also shows a National Network Management Center (NNMC) 110. The NNMC 110 is a stand-alone subsystem designed for basic querying of database information on the SOA 48 and IBA 50 Subsystems. Accordingly, the NNMC 110 is connected through communication interfaces to the various databases in the LNP System 70: the SOA Engine Subsystem 80; the SOA Subsystem 72; and the IBAR Subsystem 86.

While FIG. 1C depicts the use of three (3) Regional SOA Subsystems 72, three (3) Regional NPAC/SMSs 74, and three (3) Regional IBA Subsystems 76, each region providing local number portability, regardless of number, will have a corresponding SOA Subsystem 72, NPAC/SMS 74 and Regional IBA Subsystem 76.

Figure 1D:
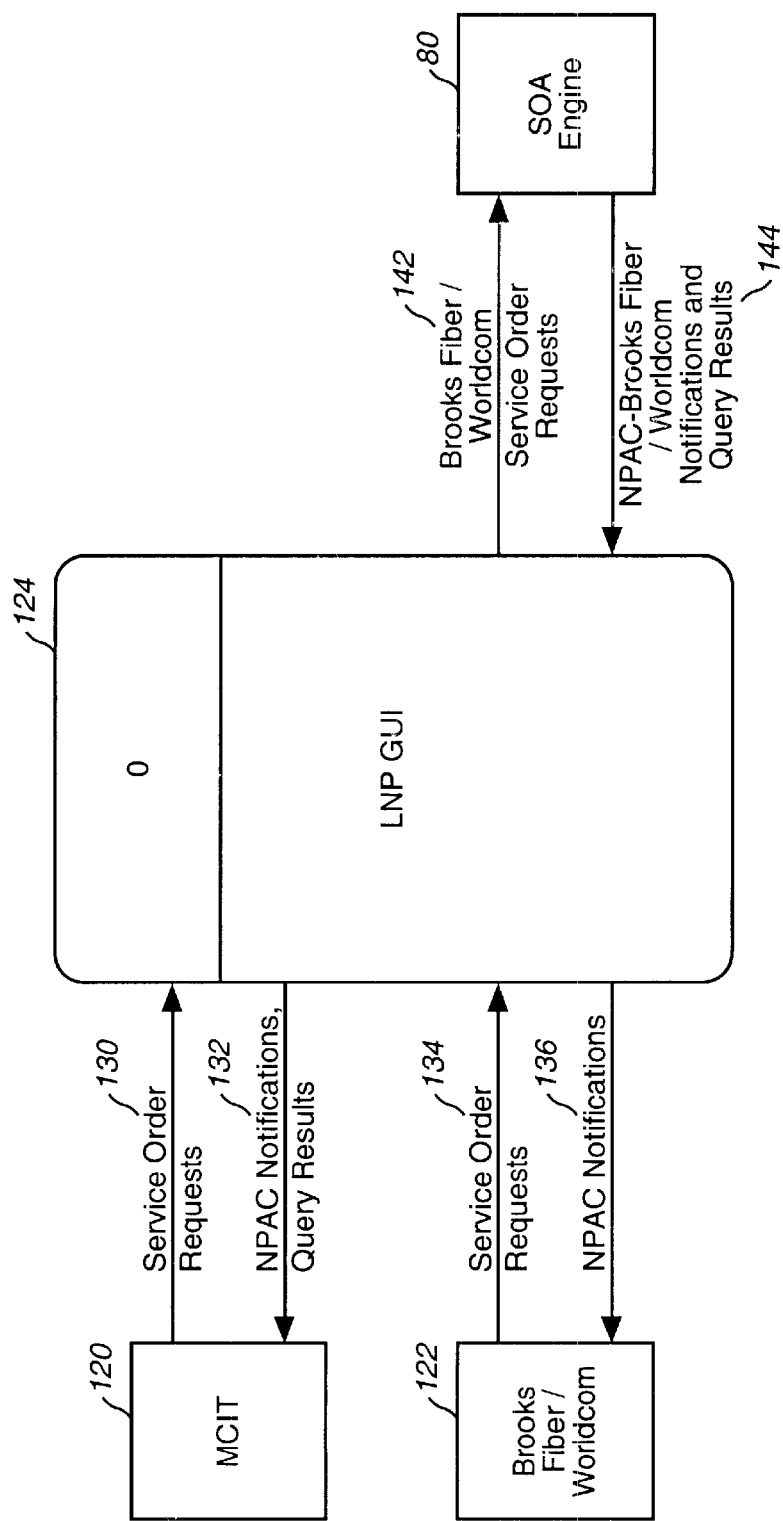
FIG. 1D is a high level external context diagram for the novel Local Number Portability Graphical User Interface (LNP GUI) between, for example, a first telecommunications service provider, and a second telecommunications service provider and a SOA engine according to the present invention.

Turning now to FIG. 1D, there is illustrated a high level external context diagram for the novel LNP GUI 124 between, for example, a first telecommunications service provider (MCIT) 120 and a second telecommunications service provider (BF/W) 122 and the SOA engine 80 according to the present invention. The LNP GUI 124 solves problems with current user interfaces into the SOA engine 80 and the IBAR 86, while combining the full functionality, ease of use, and Year 2000 compliance. The LNP GUI 124 was developed using state of the art development tools, which leverage the transportability of, for example, Java™ to create a rapid deployment, three-tier solution.

Since the architecture three-tiered, at the first tier, the user can access the LNP GUI 124 application through, for example, their favorite web browser, or bypass the web browser entirely. The middle tier, for example, comprises the application server and web server. The third tier is assumed to host, for example, an Oracle Relational Database Management System (DBMS).

The LNP GUI 124 application is, for example, an applet, which is downloaded automatically one time and cached until, for example, a new version of the LNP GUI 124 application is released. The LNP GUI 124 application implemented as, for example, a Java™ applet provides better handling of buffered database rows and navigation, without the time-consuming and annoying screen repaints typically found in HTML/CGI solutions. In addition, the LNP GUI 124 application's operational speed and rich features overshadow the applet's brief initialization delay.

Figure 4A:
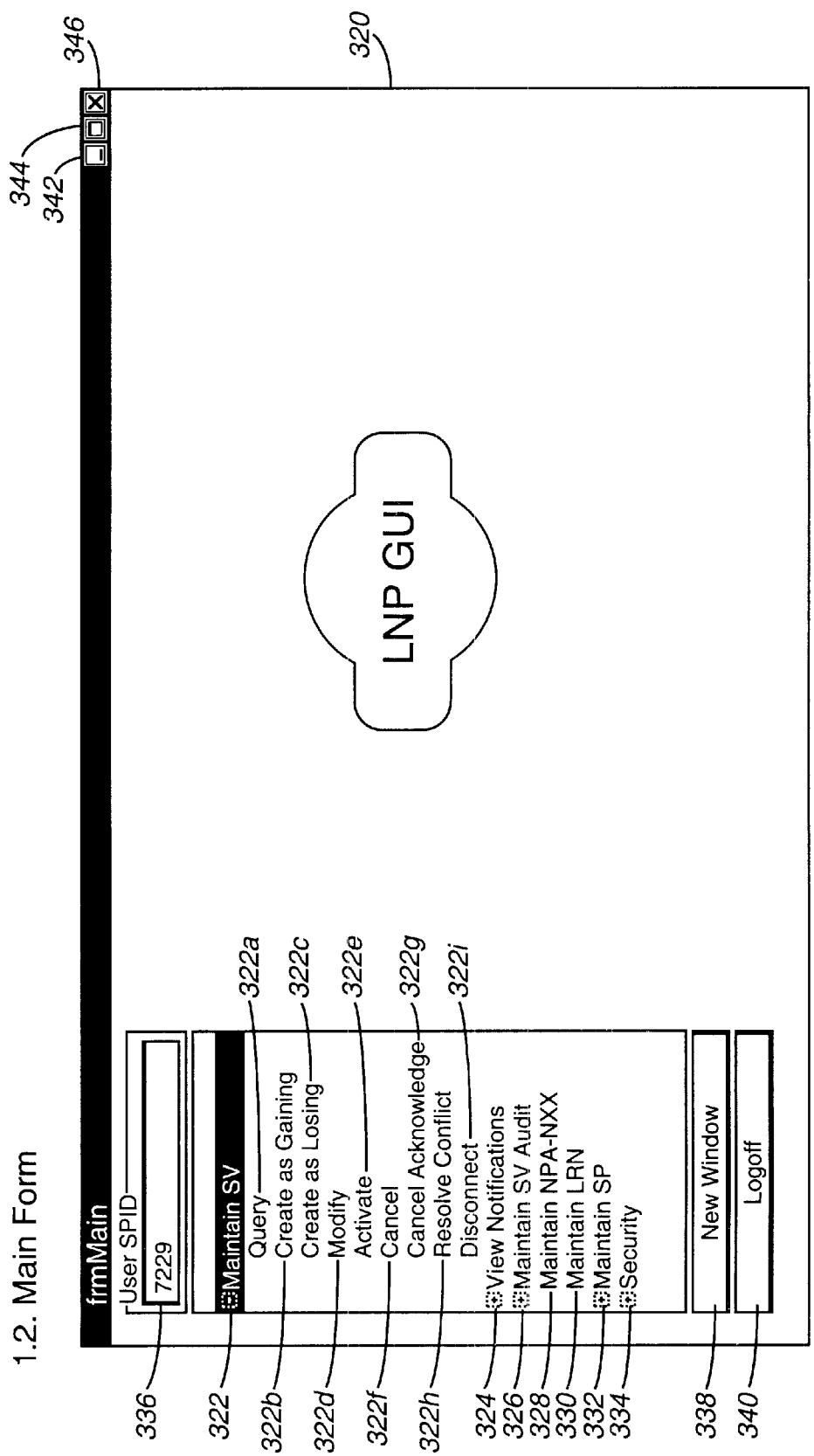
FIGS. 4A–4AQ are screen shots of the LNP GUI according to the present invention.

The middle tier logic is also written in, for example, Java™, but without the complexities of maintaining straight Java™ (or C++) code. The development tool and deployment platform is, for example, SilverStream™. Unlike a simple Java™ IDES Silverstream™ is a complete solution that address the concerns of corporate IT, including failover and load-balancing. Exemplary LNP GUI 124 screen captures are illustrated in FIGS. 4A–4AQ as will be later described.

The following discussion introduces the context of the LNP GUI 124 and describes the business functions and system participants. The external context diagram of FIG. 1D; for example, is intended to identify external relationships that are supported by the LNP GUI 124.

Each of the external entities and their relationships to the LNP GUI 124 will now be described.

The LNP GUI 124 will be used, for example, by three service providers: a first telecommunications service provider (MCIT) 120, and a second telecommunications service provider (BF/W) 122. MCIT 120 personnel will use some of the functions provided by the LNP GUI 124 to perform, for example, functions not currently available through an existing Activation Manager GUI. MCIT 120 personnel will, for example, use the Maintain SV functions of the LNP GUI 124 on an exception basis and all other functions on a regular basis. BF/W 122 personnel will, for example, use all LNP GUI 124 functions on a regular basis.

MCIT 120 Personnel

There are multiple user groups within the MCIT 120 community of users, for example: Local Initiatives (LI) Administration Operations (L1 Admin Ops), Order Coordination (OC), Order Entry (OE), Regional Operations Centers (ROCs)-Field Operations, and the Local Help Desk.

The LI Admin Ops user group is responsible for production operations support of the data in the IBA 50/SOA 48/NPSM systems. From the point at which LNP data enters the first telecommunications service provider's Order Entry (OE) group's Service Request Management System (SRMS), through the SOA 48 system to NPAC 30 to the IBA 50 system and ultimately to the first telecommunications service provider's switch network distribution point (e.g., INCP Data Access Point (DAP)), the LI Admin Ops group is responsible for providing up-to-the-minute status information for porting customer records, and for responding as required to ensure the proper flow of data through the NPAC 30 and IBA 50/SOA 48/NPSM systems.

The OC user group is responsible for the coordination of all activities involved with the installation or disconnect of service for first telecommunications service provider's customers. For LNP orders, currently this group has the ultimate responsibility for monitoring the automated flow of NPAC 30-required data through the automated NPSM feed. When this is not possible due to system outages or the current NPAC 30 restrictions of activating large Telephone Number (TN) ranges, the OC group manually enters the NPAC 30-required data through a GUI which feeds the SOA Engine 80. However, the GUI is not Year 2000 (Y2K)-compliant, hence an alternative means of manually feeding LNP data to NPAC 30 is provided by the LNP GUI 124.

The OE user group is responsible for entering LNP orders and is part of the overall order process.

The ROCs are responsible for the actual cut-over of LNP orders. The ROCs use a GUI to activate TNs in the event the orders do not process through the Local Service Activity Tracker (LSAT) automated system. Additionally, the ROC personnel use the GUI to do Create As Gainings (CAGs) and other functions, such as "modify create" or "modify activates" when necessary. They frequently use the GUI to view the order status in the system.

The Local Help Desk provides hardware and software support for all local systems. All trouble tickets and questions for LNP orders route through this group.

BF/W 122 Personnel

The BF/W 122 community of users, for example, comprises the LNP Translations user group which is responsible for passing fWCOM and fbrooks LNP orders from the legacy WCOM Activation Manager (AM) system through the SOA 48 to the NPAC 30 systems. Previously, the fbrooks orders were being entered through the a GUI to fbrooks-specific regional SOAs 72 to NPAC 74, while fWCOM orders were being entered through the ESI SOA 72 system to NPAC 74.

Currently, both systems downstream feeds flow from NPAC into an ESI LSMS system which feeds the fWCOM/Brooks switch network via a Lucent Service Management System/Service Control Point (SMS/SCP), to be integrated into the first telecommunications service provider's IBA and INCP DAP systems. The second telecommunications service provider's LNP Translations requires a manual means of transmitting LNP orders to NPAC 30 that offers equal or superior functionality to that currently offered by the ESI SOA 72 system. Current plans are to automate the flow of LNP orders from the Activation Manager (AM) to NPAC 30 via a SOA Automation Adapter (SAA), targeted for future implementation, at which point the LNP GUI 124 will become primarily a back-up manual means of data transmission to NPAC 30.

In FIG. 1D, the LNP GUI 124 receives service order requests 130 from and transmits NPAC notifications and query results 132 to, for example, the MCIT 120. In the same way, the LNP GUI 124 receives service order requests 134 from and transmits NPAC notifications and query results 136 to, for example, the BF/W 122. Similarly, the LNP GUI 124 transmits the service order requests 142 to and receives the NPAC notifications and query results 144 from, for example, the SOA engine 80. It is noted that although the preferred embodiment of the LNP GUI 124 is described in terms of providing an interface between the MCIT 120 users, the BF/W 122 users and the SOA engine 80, the LNP GUI 124 may be used as an interface between other users and systems as will be apparent to those skilled in the computer arts.

Figure 2A:
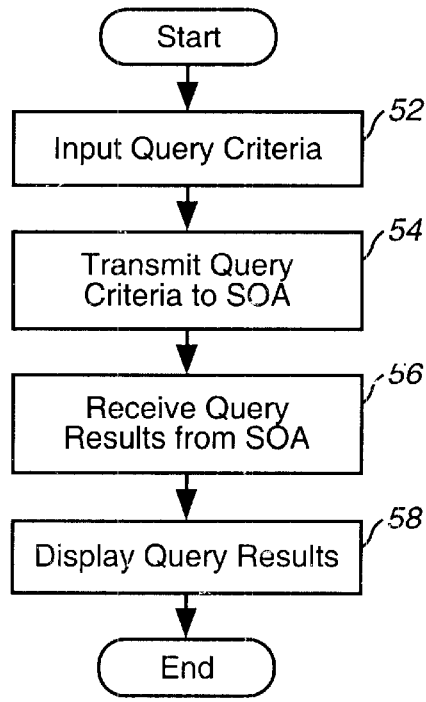
FIGS. 2A–2B are top level flow charts for various novel processes for the LNP GUI according to the present invention.

Turning now to FIG. 2A, there is illustrated a top level flow chart for various novel processes for the LNP GUI 124, such as querying Service Providers (SPs), LRNs, Numbering Plan Area-Telephone Number Exchanges (NPA-NXXs), Subscription Versions (SVs), Audit Status, etc., according to the present invention, as will be later described. In FIG. 2A, at step S2 the LNP GUI 124 inputs query criteria from the user. At step S4 the query criteria is transmitted to the SOA engine 80. The SOA engine 80 then transmits the query results which are received by the LNP GUI at step S6. At step S8 the LNP GUI 124 displays the query results completing the query operation.

Figure 2B:
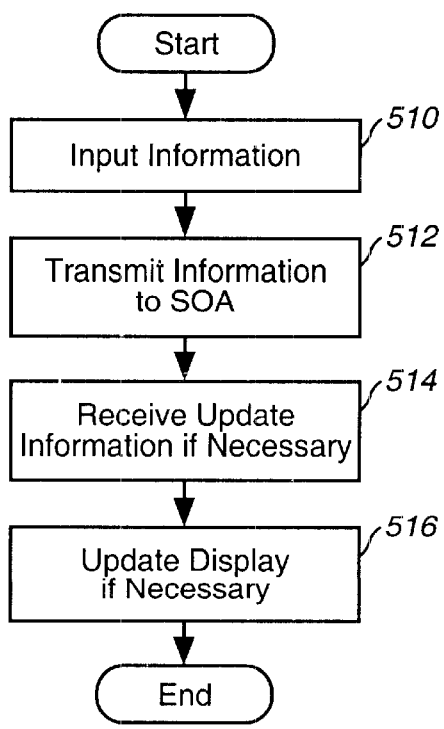

Turning now to FIG. 2B, there is illustrated a top level flow chart for various other novel processes for the LNP GUI 124, such as maintaining Service Providers, LRNs, NPA-NXXs, viewing Notifications, audit details, etc., according to the present invention, as will be later described. In FIG. 2B, at step S10 the LNP GUI 124 inputs information from the user regarding the above-noted processes. At step S12 the information is transmitted to the SOA engine 80. The SOA engine 80 then transmits the update information, such as Network information, SP information, etc., if necessary, which is received by the LNP GUI at step S14. At step S16 the LNP GUI 124 displays the update information, if necessary, completing the operation.

Figure 3:
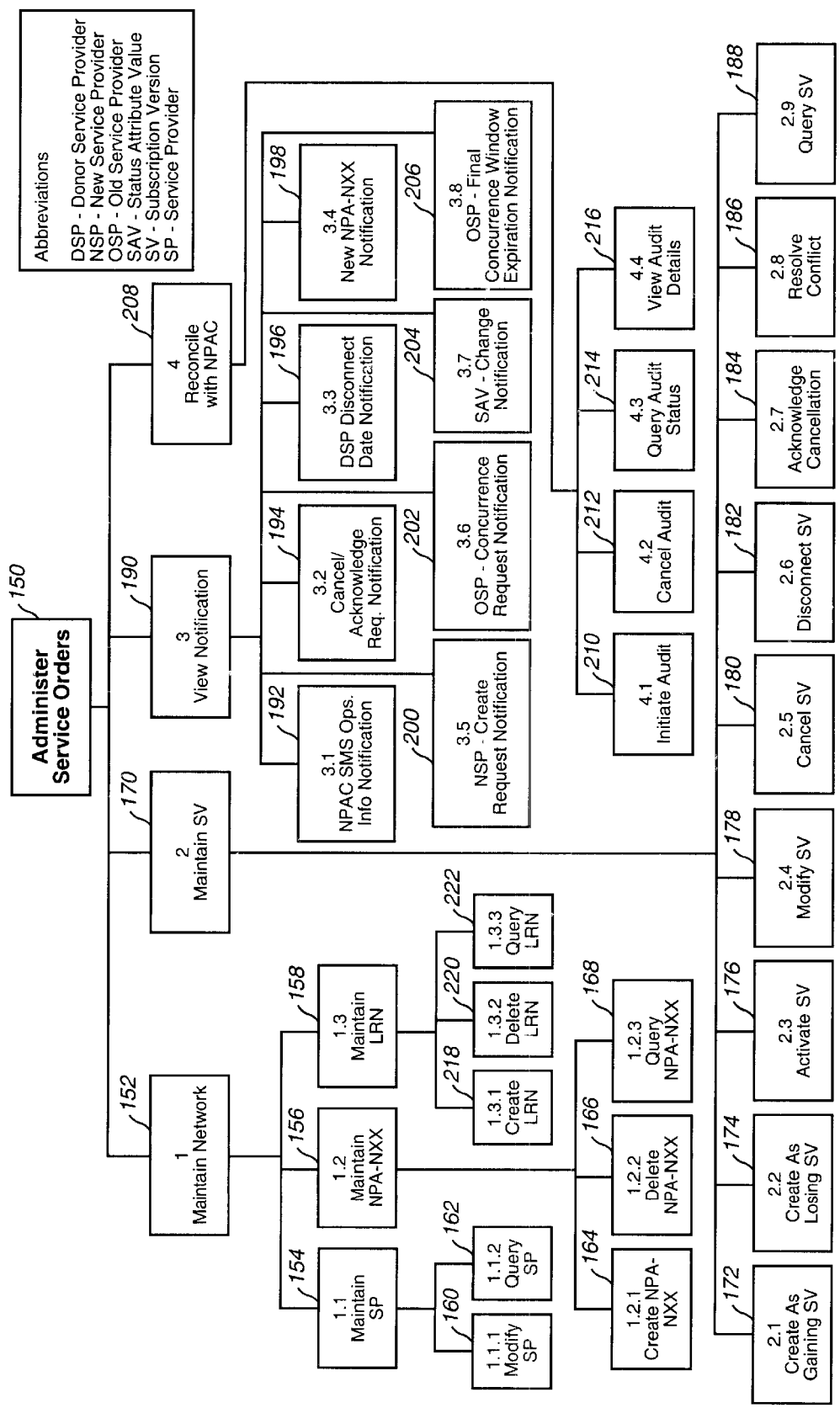
FIG. 3 is a functional decomposition diagram for business functions supported by the LNP GUI according to the present invention.

Turning now to FIG. 3, there is illustrated a functional decomposition diagram for business functions supported by the LNP GUI 124 according to the present invention. The functional decomposition diagram of FIG. 3 is intended to identify, for example. business functions that will be supported by the LNP GUI 124. Each of the functions found at the lowest level can be performed through the LNP GUI 124. FIGS. 4A–4AQ, as will be later described, are exemplary screen shots of the lowest level functions performed by the LNP GUI 124.

The functions may operate differently based upon the group or service provider with whom the user is associated. For example, for one group, information may be obtained through accessing other external systems. For another group, the user may have to enter the information. In addition, business features pertaining to data edits within the LNP GUI 124 are not necessarily to be performed by the LNP GUI 124 module itself. The edits belong in the most logical sub-system so as to ensure consistency regardless of the data source (e.g., manually entered-vs-automatic flows from LSAT).

In FIG. 3, an Administer Service Orders function 150 includes, for example, a Maintain Network function 152, a Maintain Subscription Version (SV) function 170, a View Notification function 190 and a Reconcile with NPAC function 208. The Maintain Network function 152 and the Maintain Subscription Version (SV) function 170 and their corresponding sub-functions are referred to as LNP network management support. The View Notification function 190 and the Reconcile with NPAC function 208 and their corresponding sub-functions are referred to as LNP costing support.

The Maintain Network function 152 includes, for example, a Maintain Service Provider (SP) function 154, a Maintain Number Plan Area-Telephone Number Exchange (NPA-NXX) function 156 and a Maintain LRN function 158.

The Maintain SP function 154 includes, for example, a Modify SP function 160 and a Query SP function 162. The Maintain NPA-NXX function 156 includes, for example, a Create NPA-NXX function 164, a Delete NPA-NXX function 166 and a Query NPA-NXX function 168.

The Maintain LRN function 158 includes, for example, a Create LRN function 218, a Delete LRN function 220 and a Query LRN function 222.

The Maintain SV function 170 includes, for example, a Create As Gaining SV function 172, a Create As Losing SV function 174, an Activate SV function 176, a Modify SV function 178, a Cancel SV function 180, a Disconnect SV function 182, an Acknowledge Cancellation function 184, a Resolve Conflict function 186 and a Query SV function 188.

The View Notification function 190 includes, for example, a NPAC Service Management System (SMS) Operations Information Notification function 192, a Cancel/Acknowledge Request Notification function 194, a Donor Service Provider (DSP) Disconnect Date Notification function 196, a New NPA-NXX Notification function 198, a New Service Provider (NSP) Create Request Notification function 200, and Old Service Provider (OSP) Concurrence Request Notification Request function 202, a Status Attribute Value (SAV) Change Notification function 204, and an OSP Final Concurrence Window Expiration Notification function 206.

The Reconcile with NPAC function 208 includes, for example, an Initiate Audit function 210, a Cancel Audit function 212, a Query Audit Status function 214, and a View Audit Details function 216. The lowest level of the above functions will be later described with references to the exemplary screen shots of FIGS. 4A–4AQ.

The LNP GUI 124 General GUI Features

All user interface functionality of a preferred embodiment of the LNP GUI 124 uses, for example, full Queens English (Oxford Dictionary), including appropriate help text. However, other languages may be supported as will be apparent to those skilled in the software arts.

The LNP GUI 124 User Interface Features

In the preferred embodiment, the LNP GUI 124 conforms to telecommunications service provider's RIO guidelines for user interfaces (document name/id? version, date?), such that all functions developed for the LNP GUI 124 have consistent appearances and behaviors.

The LNP GUI 124 includes, for example, the following specific user interface features: (1) Any given user has the capability to access a tunable number of independent LNP GUI 124 work areas (e.g., one session each for northeast, midwest, southeast regions and two sessions for the southwest region), (2) the LNP GUI 124 provides scrolling capability when a list of results meeting the selection criteria extends beyond the length of the window, (3) the LNP GUI 124 requires confirmation from the user before proceeding with a delete or disconnect request, (4) the LNP GUI 124 limits the re-keying of frequently used data items, such as a telephone number, when navigating between windows, (5) the LNP GUI 124 provides a record count for a multi-record output (e.g., query results with a TN range selection criteria), (6) the LNP GUI 124 provides the ability for the user to go to a specific page of the query results, (7) the LNP GUI 124 displays the date and time that a query was requested, (8) the start-up LNP GUI 124 screen display default displays text names with icons (i.e., rather than symbol icons), and (9) all screens within the LNP GUI 124 are designated with a unique name for support purposes.

The LNP GUI 124 Language Support

In the preferred embodiment, the LNP GUI 124 supports, for example, English only. However, other languages may be supported as will be apparent to those skilled in the software arts.

The LNP GUI 124 Date/Time Support

In the preferred embodiment, the LNP GUI 124, for example: (1) accepts date/time entered by the user as being local date/time and converts the date/time to Greenwich Mean Time (GMT) prior to sending it to other subsystems/external systems, (2) the LNP GUI 124 converts date/time received from other subsystems/external systems from GMT to the users' local date/time as determined by the user's PC prior to displaying to the user, (3) the LNP GUI 124 supports one standard format for displaying or printing system date and time, which appear as follows: Date: ccyy/mm/dd; Time: hh:mm:ss:mmm, (4) the LNP GUI 124 converts the user-entered date into a 14 digit time stamp format of 'ccyymmddhhmmss' where hhmmss is set to 000000 (if the user enters a date the time shall default to midnight), (5) the LNP GUI 124 handles leap years, following the quad-centennial rule "A year is a leap year if divisible by 4 but not divisible by 100, unless it is divisible by 400 (except for the year 3600)" (e.g., 1900 and 2100 are not leap years, but 2000 is).

The LNP GUI 124 User Interface Features

The user interface refers to the user-visible aspects of the LNP GUI 124.

The LNP GUI 124 Common Screen Elements

In the preferred embodiment, for example, the following elements appear on screen by displays of the LNP GUI 124: (a) user Service Provider Identification (SPID), (b) screen name, and (c) NPAC 30 region name ('Multiple', if the screen covers multiple regions). It is noted that the NPAC 30 region varies based on TN/range or Numbering Plan Area-Telephone Number Exchange (NPA-NXX) involved.

The LNP GUI 124 Look-ups

In the preferred embodiment, for example, the LNP GUI 124 includes the following look-up features: (1) where the user is required to enter the SPID, the LNP GUI 124 provides a look-up feature allowing the user to look up the SPID by Service Provider Name, and (2) the LNP GUI 124 displays the Service Provider Name upon entry of the SPID by the user (It is noted 20 that the SPID is pulled, for example, from IBAR 86 (or NPAS) for the MCIT 120 and IBAR 86 for the BF/W 122), (3) when the user belongs to MCIT 120 and is required to specify a network switch Common Language Location Identifier (CLLI), the LNP GUI 124 provides a look-up feature allowing the user to look up a CLLI by Incumbent Local Exchange Carrier (ILEC) NPA-NXX (It is noted that this feature is implemented, for example, by querying the NPAS database. Optionally, the "Homing To" DB may be used, as described in the Multiple Switch City functionality in NPSM 99.1.3 Release Requirements), (4) where the user is required to enter a date, the LNP GUI 124 allows the user the option of selecting the desired date from a monthly calendar, and (5) the NPSM 126 manages input from the LNP GUI 124 in the same manner that it currently manages similar input from the present GUI.

The LNP GUI 124 Edits

In the preferred embodiment, for example, the LNP GUI 124 includes the following edit features: (1) screen validation including (a) type checking, (b) range checking, and (c) code list look-ups (e.g., to confirm a value entered is one of a pre-defined set); (2) the LNP GUI 124 validates data and selection criteria entered by the user according to a Data Validation Table; (3) the LNP GUI 124 accepts the wildcard character, %. at the end of any the following selection criteria values (i.e., the user has partially entered a value), (a) Customer Name, (b) TN, (c) LRN and (d) SV Remarks; (4) the LNP GUI 124 ensures the start telephone number is supplied if the end telephone number is supplied; and (5) the LNP GUI 124 ensures the end telephone number is greater than the start telephone number if the end telephone number is supplied.

The LNP GUI 124 Defaults

In the preferred embodiment, for example, the LNP GUI 124 includes the following default features: (1) the LNP GUI 124 provides the user with the capability to reset fields to their default values and remove any values from all other modifiable fields (e.g., screen refresh); (2) unless otherwise specified, the LNP GUI 124 applies the following general defaults when the user does not supply a value, (a) character values are set to spaces or null as appropriate depending on the field and (b) numeric values are set to zero or null as appropriate depending on the field; and (3) when specifying telephone numbers, if the user does not supply an end value, the LNP GUI 124 defaults the end value to null (i.e., single TN is specified by entering TN start only).

The LNP GUI 124 Error Handling

In the preferred embodiment, for example, the LNP GUI 124 includes the following error handling features: (1) when an error is encountered during user input, the LNP GUI 124 displays an error message to the user; (2) an error message displayed to the user contains a textual description of the nature of the error (It is noted that an error message contains technical terminology and system language. This includes interpreting NPAC 30 messages where possible, e.g., instead of describing the error as "Z42", the error is described as "Due date mis-match"); (3) where possible, the corrective action to be taken on an error is provided; (4) after an error message is displayed to the user, the LNP GUI 124 gives the user an opportunity to correct the error where possible; (5) when the user specifies a range of TNs, the LNP GUI 124 displays/lists all the TNs (within the range) that failed an edit and indicates why each TN failed the edit; (6) during the period that the association between the local SOA 72 and any external systems is lost, the LNP GUI 124 advises the user that any dependent request issued by the user is rejected and provides the reason; and (7) the LNP GUI 124 displays English text error messages resulting from upstream systems, such as NRM, NPAS, etc. (It is noted that other languages may be supported as will be apparent to those skilled in the software arts).

The LNP GUI 124 Printing

In the preferred embodiment the LNP GUI 124, for example, supports the ability for the user to print multiple pages of output for a given print request.

The LNP GUI 124 Application Software Features

The following discussion described features of the LNP GUI 124 application software described with reference to FIGS. 3 and 4A–4AQ.

In FIGS. 4A–4AQ, there are illustrated exemplary screen shots of the lowest level functions of FIG. 3 performed by the LNP GUI 124 according to the present invention.

In FIG. 4A, an initial LNP GUI 124 screen 320 is shown and includes, for example, a Maintain SV hierarchical list 322 corresponding to the Maintain SV function 170, a View Notifications hierarchical list 324 corresponding to the View Notifications function 190, a Maintain SV audit hierarchical list 326 corresponding to the Reconcile with NPAC function 208, a Maintain NPA-NXX hierarchical list 328 corresponding to the Maintain NPA-NXX function 156 of the Maintain Network function 152, a Maintain LRN hierarchical list 330 corresponding to the Maintain LRN function 158 of the Maintain Network function 152, a Maintain SP hierarchical list 332 corresponding to the Maintain SP function 154 of the Maintain Network function 152, and a Security hierarchical list 334.

The screen 320 further includes User SPID entry 336, a New Window button 338, a Logoff button 340, a Minimize button 342, a Maximize button 344 and a Close application button 346. In addition, as shown in the screen 320, the Maintain SV hierarchical list 322 is in an expanded state as indicted by the "−" sign thereon while the remaining screen- are not in an expanded form as indicated by their respective "+" signs thereon.

Accordingly, the Maintain SV hierarchical list 322 in its expanded form further includes a Query hierarchical list item 322a corresponding to the Query SV function 188, a Create As Gaining hierarchical list item 322b corresponding to the Create As Gaining SV function 172, a Create As Losing hierarchical list item 322c corresponding to the Create As Losing SV function 174, a Modify hierarchical list item 322d corresponding to the Modify SV function 178, an Activate hierarchical list item 322e corresponding to the Activate SV function 176, a Cancel hierarchical list item 322f corresponding to the Cancel SV function 180, a Cancel Acknowledge hierarchical list item 322g corresponding to the Acknowledge Cancellation function 184, a Resolve Conflict hierarchical list item 322h corresponding to the Resolve Conflict function 186, and a Disconnect hierarchical list item 322i corresponding to the Disconnect SV function 182.

The Maintain SV Function 170

In the preferred embodiment of the LNP GUI 124, the functionality of the Maintain SV function 170 relates to maintaining (e.g., creating, activating, modifying, disconnecting) subscription versions for LNP telephone numbers.

The Query SV Function 188 Features

The following discussion describes the features of the preferred embodiment of the LNP GUI 124 Query SV function 188 for querying subscription versions of LNP telephone numbers. When a user selects the Query hierarchical list item 322a corresponding to the Query SV function 188 of the LNP GUI 124, the screen 350 as shown, for example, in FIG. 4B is generated by the LNP GUI 124.

Figure 4B:
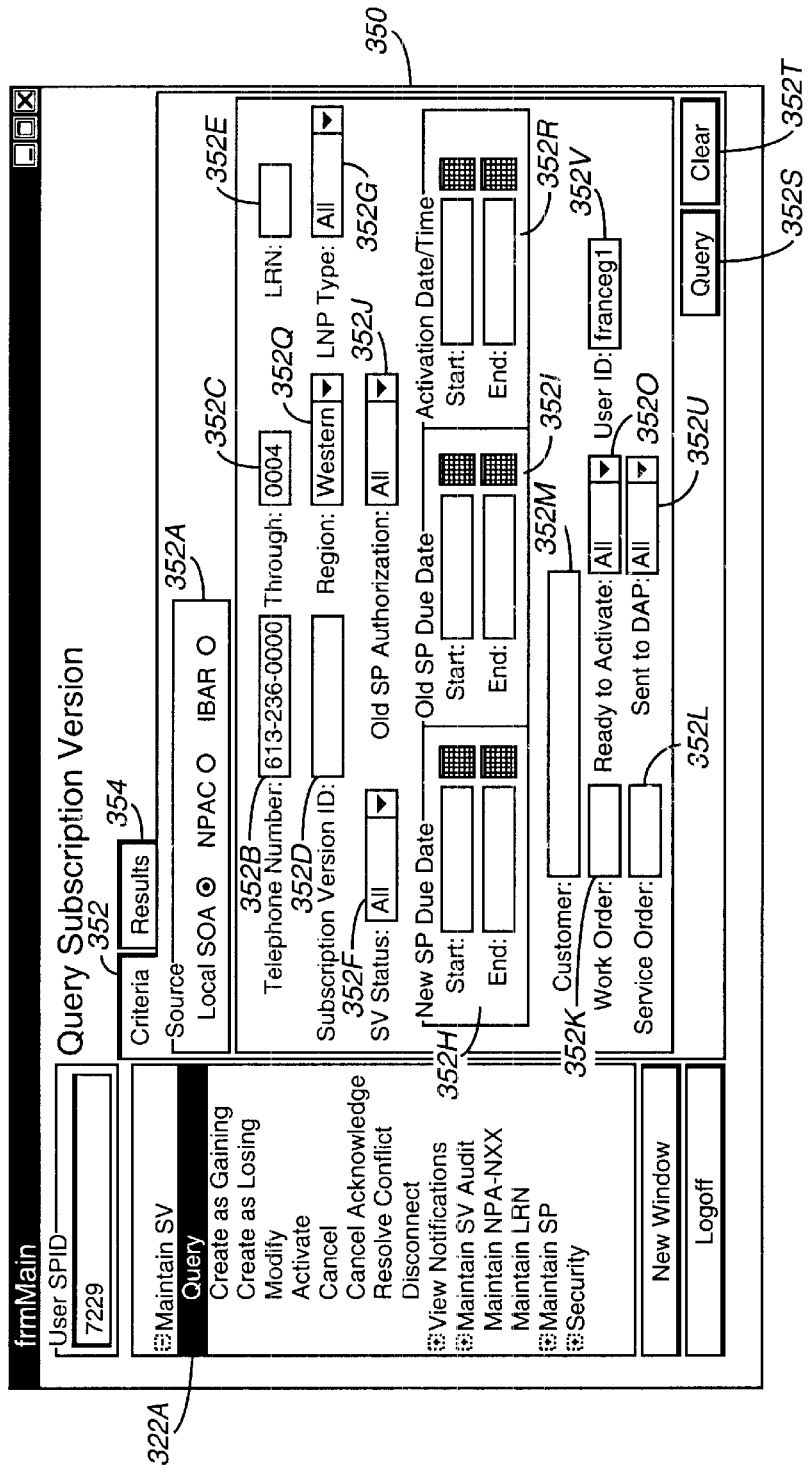

In FIG. 4B, the Query screen 350 includes, for example, a Criteria form 352 and a Results form 354. The Criteria form 352 includes, for example, various fields for entering various parameters for the query as shown in FIG. 4B. To query subscription version information, the user specifies the Source the information is to be obtained from, for example, from one of the following sources, (a) the local SOA 72, (b) the NPAC 74, and (c) the IBAR 86 via, for example, selection buttons 352A shown in FIG. 4B.

SV Query from Local SOA Features

In the preferred embodiment to query SOA 72 subscription version information, the LNP GUI 124, for example, accepts the following selection criteria from the user as shown in FIG. 4B: (a) Telephone Number Start 352B, (b) Telephone Number End 352C, (c) Subscription Version ID 352D, (d) LRN 352E, (e) Subscription Version Status drop down list 352F, (f) LNP Type drop down list 352G, (g) New Service Provider Due Date Range 352H, (h) Old Service Provider Due Date Range 352I, (i) Old SP Authorization drop down list 352J, (j) Work Order Number 352K, (k) Service Order Number 352L, (l) Full or Partial Customer Name 352M, (m) Ready to Activate indicator drop down list 352O, (n) Region Indicator drop down list 352Q, (o) Sent to DAP drop down list 352U, and (p) a User ID entry 352V. In addition, the Criteria form 352 includes, for example, a Query button 352S to initiate the query, and a Clear button 352T to clear the entered fields.

The LNP GUI 124 performs, for example, the following validations on information supplied by the user: (a) at least one selection criteria must be specified. The query return is limited to a tunable number of records, initially set to, for example, 10,000 records. The LNP GUI 124, by default, displays the data sorted by, for example, Telephone Number, then by Subscription Version ID. The LNP GUI 124 provides the capability for the user to specify the primary sort sequence from any of the selection criteria. If the user specifies a primary sort criteria, for example, TN and SV ID are used as secondary and tertiary sort, respectively (see, e.g., FIG. 4C).

Figure 4C:
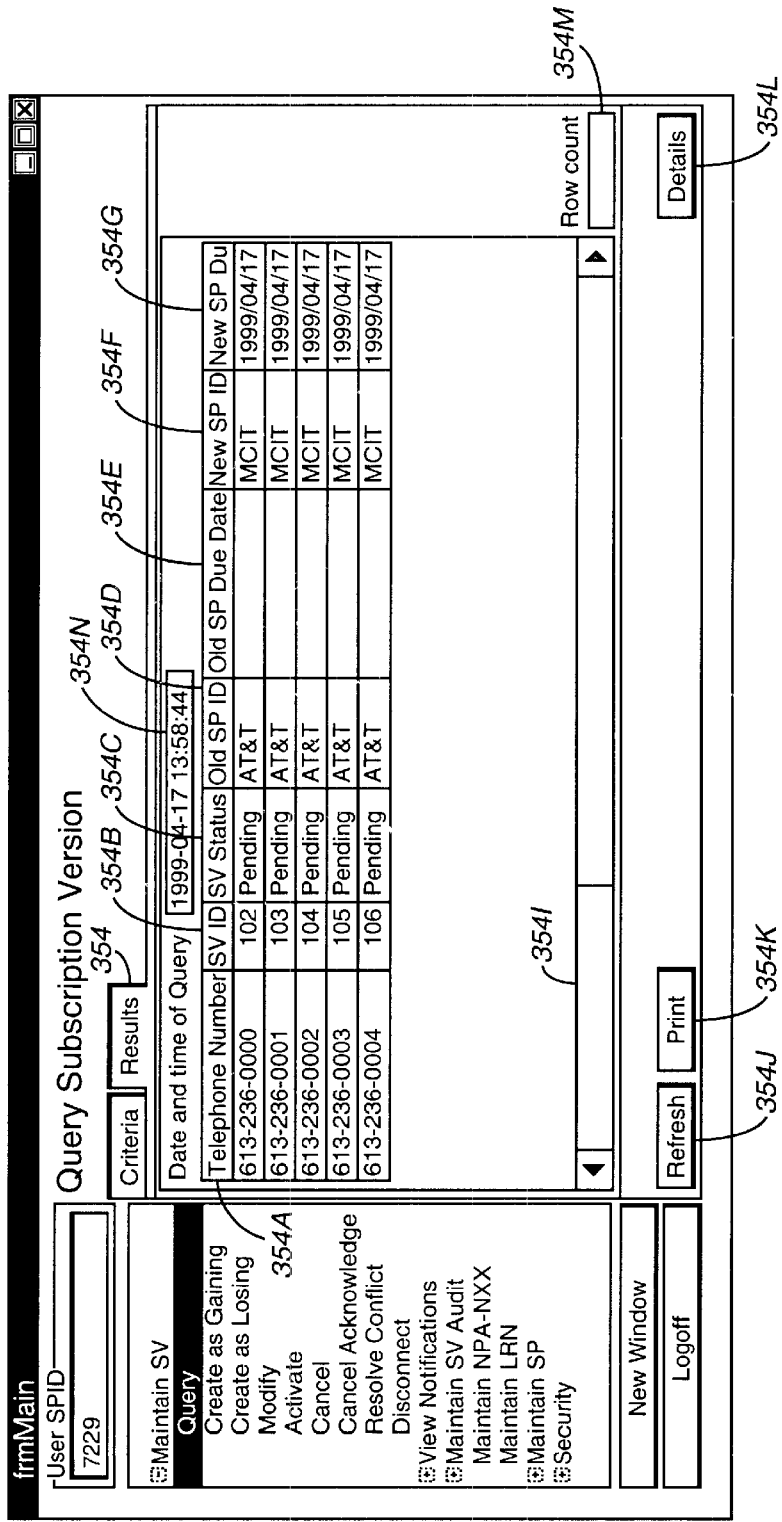

After the Query button 352S is selected, the LNP GUI 124 displays the following information for each subscription version/TN which meets the specified selection criteria as shown in, for example, FIG. 4C Results form 354: (a) TN 354A, (b) Subscription Version ID 354B, (c) Subscription Version Status 354C, (d) Old Service Provider ID 354D, (e) Old Service Provider Due Date 354E, (f) New Service Provider ID 354F, (g) New Service Provider Due Date 354G, (h) Old Service Provider Authorization (not shown), (i) Ready to Activate Indicator (not shown), and (j) Break in TN Sequence Indicator (not shown). In addition, the results screen 354 includes a horizontal scroll bar 354I, a Refresh button 354J for refreshing the query results, a Print button 354K for printing the results, a Details button 354K for viewing details of the query results, a Row count indicator 354M, and a Date and time of query indicator 354N.

Only the most current subscription version for each TN are displayed, wherein most current is defined, for example, as follows: (a) if the TN has only one SV associated with it, the LNP GUI 124 displays the most current SOA record for the TN, (b) if the TN has more than one SV associated with it, the LNP GUI 124 displays the most recent non-active SOA record for the TN, and (c) all other records associated with the TN are accessible from the displayed record's associated detail screen via Details button 354L.

The Break in TN Sequence indicator is populated, for example, only under the following conditions: (a) TN is primary sort, and (b) TN Start and TN End were selection criteria.

To display the detail information for a TN, the LNP GUI 124 allows the user to, for example, select a TN from the list of query results and show details thereof via selection of the Details button 354L of the Results form 354 of FIG. 4C. The LNP GUI 124 displays the following detail information for the selected subscription version as shown in, for example, a General form 360, a SV History form 362, an Additional Info form 364 and a Partial Failure SP List form 366 of FIGS. 4D–4G.

The General form 360 of FIG. 4D includes, for example, the following detail information: (a) LRN 360A; (b) New Service Provider ID 360B; (c) Old Service Provider ID 360C; (d) New Service Provider Due Date/Time 360D; (e) Old Service Provider Due Date/Time 360E; (f) Old Service Provider Authorization 360F; (g) Subscription Version Status 360G; (h) Switch CLLI 360H; (i) Subscription Version Remarks 360I; (j) Ready to Activate 360J; (k) Porting To Original SP 360K; (l) Region 360L; (m) Subscription Version ID 360M; (n)TN 360N; and (o) ILEC NPA-NXX 360O.

The SV History screen 362 of FIG. 4E includes, for example, the following detail information: (a) Date/Time 362A; and (b) Activity 362B. Timestamps 362A are included, for example, for the following activities 362B as shown in FIG. 4E: (a) Broadcast; (b) Modified; (c) New SP Creation; (d) New SP Cancellation; (e)New SP Conflict Resolution; (f) Old SP Authorization; (g) Old SP Cancellation; (h) Old SP Conflict Resolution; (i) Activation; (j) Conflict; (k) Effective Release Date; (l) Disconnect Complete; (m) Cancellation; (n) Old;(o) Old SP Creation; and (p) Customer Disconnect.

The Additional Info form 364 of FIG. 4F includes, for example, the following detail information: (a) LNP Type 364A; (b) User ID 364B; Pre-Cancellation Status 364C; (d) Work Order Number 364D; (e) SV Remarks 364E; (f) Service Order Number 364F; (g) Billing Id 364G; (h) Reserved TN 364H; (i) Customer Name 364I; (j) Custom Local Area Signaling Services (CLASS) Destination Point Code (DPC) 364J; (k) CLASS Subsystem Number (SSN) 364K; (l) Line Information Database (LIDB) DPC 364L; (m) LIDB SSN 364M; (n) Caller Id with Name (CNAM) DPC 364N; (o) CNAM SSN 364O; (p) Inter-Switch Voice Mail (ISVM) DPC 364P; (q) ISVM SSN 364Q; (r) End User Location Value 342R; and (s) End User Location Type 342S.

Figure 4G:
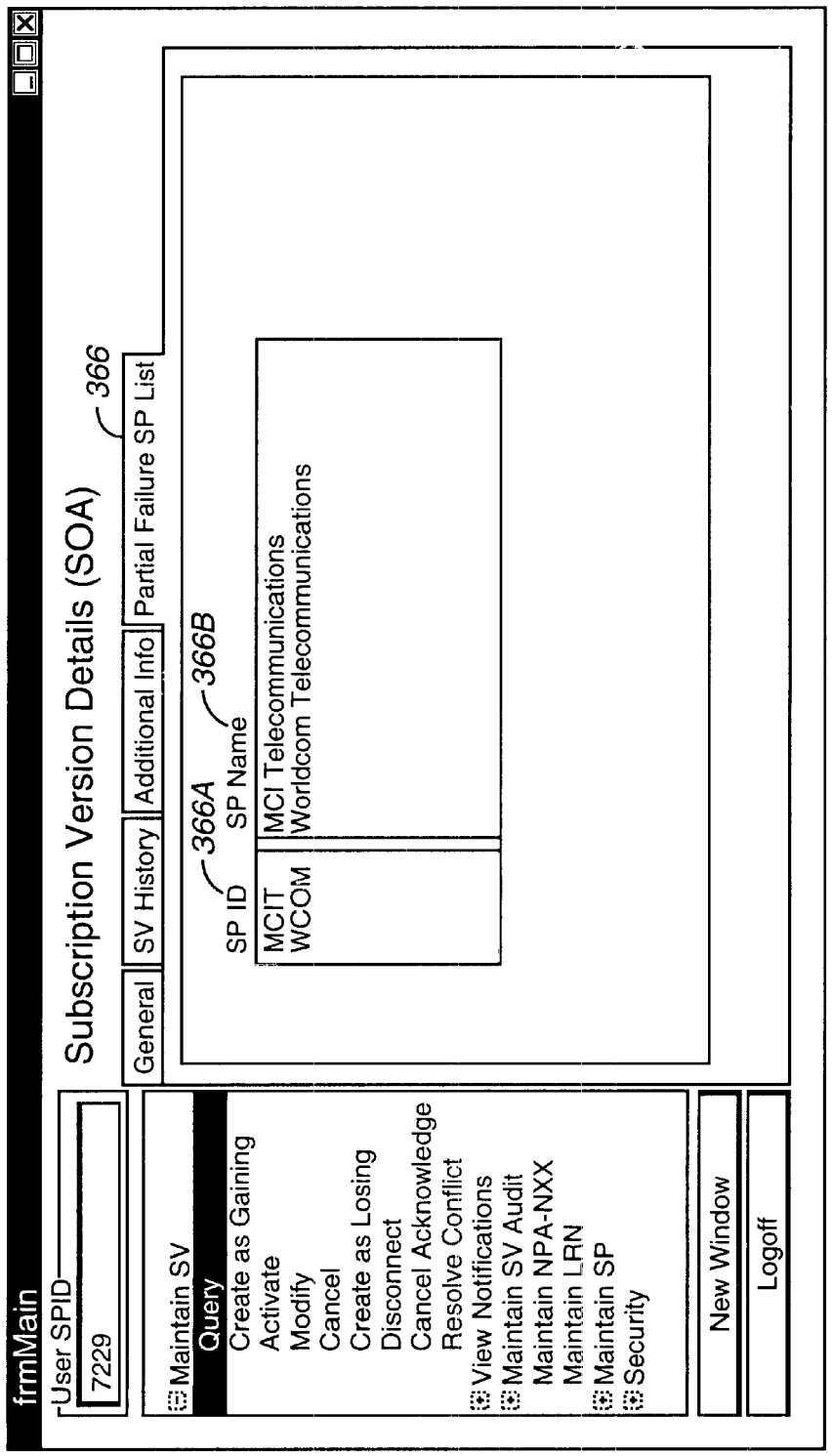

The Partial Failure SP List form 366 of FIG. 4G includes, for example, the following detail information: (a) SP ID 366A; and (b) SP Name 366B.

The user is taken directly from the Query SV function 188 to the other Maintain SV function(s) 170 for a single record. If multiple records are displayed, the user can double-click (or the like) on a record to proceed to the Maintain SV function 170 where subsequent actions can be performed as appropriate. The Partial Failure SP List form 366 is readily displayable in the LNP GUI 124 due to the noted screen arrangements. When displaying the detail information for a subscription version, for example, all query selection criteria remains visible (e.g., possibly compressed, or only non-null values displayed) while utilizing a near full-screen to display query results.

SV Query from NPAC Features

In the preferred embodiment to query NPAC 30 subscription version information via selection buttons 352A, the LNP GUI 124, for example, accepts all of the selection criteria previously described with respect to the SV Query from SOA except for: (a) the Work Order Number 352K, (b) the Service Order Number 352L, (c) the Full or Partial Customer Name 352M, (d) the Ready to Activate drop down list 352O and (o) the Sent to DAP drop down list 352U.

The LNP GUI 124 performs, for example, the following validations on information supplied by the user: (a) region indicator must be specified; and (b) at least one other selection criteria must be specified. The query return is limited to a tunable number of records, for example, initially set to 1,000. The LNP GUI 124, by default, displays the data sorted by, for example, Telephone Number, then by Subscription Version ID.

After the Query button 352S is selected, the LNP GUI 124 displays the same information for each subscription version/TN which meets the specified selection criteria as shown in, for example, FIG. 4C Results form 354 previously discussed with respect to the SV Query from SOA except: (a) the Ready to Activate indicator (not shown); and the (b) Break in TN Sequence Indicator (not shown).

Only the most current subscription version for each TN is displayed as previously discussed with respect to the SV Query from SOA. To display the detail information for a TN, the LNP GUI 124 allows the user to select a TN from the list of query results.

The LNP GUI 124 displays detail information as previously discussed with respect to the SV Query from SOA except for the following fields: (a) Work Order Number 364D; (b) Service Order Number 364F;(c) SV Remarks 364E and indicator 360I; (d) Reserved TN 364H; (e) Switch CLLI 360H; and (f) ILEC NPA-NXX 360O.

The user is taken directly from the Query SV function 188 to the Maintain SV function(s) 170 for a single record. If multiple records are displayed, the user can double-click (or the like) on a record to proceed to the Maintain SV function 170 where subsequent actions can be performed as appropriate. The Partial Failure SP List form 366 is readily displayable in the LNP GUI 124 due to the noted screen arrangements. Any NPAC 30 returned values that do not match SOA 72 values are, for example, highlighted on the corresponding subscription version maintenance screen. If the query results reflect one or more discrepancies between SOA 72 and NPAC 30, the user is prompted (i.e., given the option) to update SOA 72 to conform to NPAC 30 values for the displayed record. When displaying the detail information for a subscription version, for example, all query selection criteria remains visible (e.g., possibly compressed, or only non-null values displayed) while utilizing a near full-screen to display query results.

SV Query from IBAR Features

In the preferred embodiment to query IBAR 86 subscription version information, the LNP GUI 124, for example, accepts all of the selection criteria previously described with respect to the SV Query from SOA except for: (a) the New Service Provider Due Date Range 352H, (b) Old Service Provider Due Date Range 352I, (c) Old SP Authorization drop down list 352J, (d) Work Order Number 352K, (e) Service Order Number 352L, (f) Full or Partial Customer Name 352M, (g) Ready to Activate indicator drop down list 352O. In addition, to query IBAR 86 subscription version information, the LNP GUI 124, for example, accepts an Activation Date Range 352R and the Sent to DAP drop down list 352U of Criteria form 352 of FIG. 4B.

The LNP GUI 124 performs, for example, the following validations on information supplied by the user: (a) at least one selection criteria must be specified. The query return is limited to a tunable number of records, initially set to, for example, 100,000 records. The LNP GUI 124, by default, displays the data sorted by, for example, Telephone Number, then by Subscription Version ID. The LNP GUI 124 provides the capability for the user to specify the primary sort sequence from any of the selection criteria. If the user specifies a primary sort criteria, for example, TN and SV ID are used as secondary and tertiary sort, respectively (see, e.g., FIG. 4C).

After the Query button 352S is selected, the LNP GUI 124 displays the same information for each subscription version/ TN which meets the specified selection criteria as shown in, for example, FIG. 4C Results form 354 previously discussed with respect to the SV Query from SOA except for: (a) the Old Service Provider ID 354D, (b) the Old Service Provider Due Date 354E, (c) the New Service Provider ID 354F, (d) the New Service Provider Due Date 354G, (h) Old Service Provider Authorization (not shown), and (e) Ready to Activate Indicator (not shown). In addition, the LNP GUI 124 displays in the Results form 354 a Current Service Provider ID (not shown) and an Activation Date (not shown).

Only the most current subscription version for each TN is displayed as previously discussed with respect to the SV Query from SOA. To display the detail information for a TN, the LNP GUI 124 allows the user to select a TN from the list of query results.

The LNP GUI 124 displays detail information as previously discussed with respect to the SV Query from SOA except for the following fields: (a) the Old Service Provider 360C; (b) the New Service Provider Due Date 360D; (d) the Old Service Provider Due Date 360E; (e) the Old Service Provider Authorization 360F; (f) the Pre-Cancellation Status 364C; (g) the Partial Failure SP List form 366 consisting of the following: (i) the Service Provider ID 366A, and the (ii) Service Provider Name 366B; (h) the Ready to Activate Indicator (not shown); (i) the Work Order Number 364D; (j) the Service Order Number 364F; (k) the Customer Name 364I; (l) the Reserved TN Indicator 364H; (m) the Switch CLLI 360H; (n) the ILEC NPA-NXX 360O; (o) the SV ID 360M; (p) the TN 360N; and (q) the User ID 364B.

In addition the following Timestamps 362A for the following activities 362B as shown in FIG. 4E are not displayed: (a) New SP Cancellation; (b) New SP Conflict Resolution Timestamp; (c) Old SP Authorization; (d) Old SP Cancellation; (e) Old SP Conflict Resolution; (f) Conflict; (g) Old; and (h) Old SP Creation.

The user is taken directly from the Query SV function 188 to the Maintain SV function(s) 170 for a single record. If multiple records are displayed, the user can double-click (or the like) on a record to proceed to the Maintain SV function 170 where subsequent actions can be performed as appropriate. When displaying the detail information for a subscription version, for example, all query selection criteria remains visible (e.g., possibly compressed, or only non-null values displayed) while utilizing a near full-screen to display query results.

Create SV Functions 172 and 174 Features

In the preferred embodiment, the LNP GUI 124 includes, for example, the Create As Gaining SV function 172 and the Create As Losing SV function 174 for creating subscription versions for LNP telephone numbers. A subscription version can be created if the TN is available for porting. A subscription version created as "gaining" refers to when a service provider gains a customer. A subscription version created as "losing" refers to when a service provider loses the customer. This latter scenario is sometimes also referred to as a "release."

Create SV Functions 172 and 174 Features

In the preferred embodiment, the LNP GUI 124 includes, for example, the following features: (1) the LNP GUI 124 accepts a user request to create a subscription version (SV); (2) the user is able to specify whether this is a "Create As Gaining" or "Create As Losing" subscription version; and (3) the user is able to maintain user-defined remarks, stored locally by TN.

Create As Gaining SV Function 172

The following discussion describes the features of the preferred embodiment of the LNP GUI 124 Create As Gaining SV function 172. When a user selects the Create as Gaining hierarchical list item 322b corresponding to the Create As Gaining SV function 172 of the LNP GUI 124, the screen 370 as shown, for example, in FIG. 4H is generated by the LNP GUI 124.

In FIG. 4H, the Create As Gaining screen 370 includes, for example, a Create As Gaining form 372 and an Additional form 374. The Create As Gaining form 372 includes, for example, various fields for entering various parameters as shown in FIG. 4H.

In the preferred embodiment of the Create As Gaining SV function 172, the LNP GUI 124 accepts, for example, the following information from the user in fields as shown in the Create As Gaining screen 370 of FIG. 4H: (a) Telephone Number Start 370B;(b) Telephone Number End 370C; and (c) Region drop down list 370Q. In addition, the Create As Gaining screen 370 includes a Create button 370R to initiate creation, and a Clear button 370U to clear the entered values.

In the preferred embodiment, the LNP GUI 124 accepts, for example, the following information from the user in fields as shown in the Create As Gaining form 372: (a) Old Service Provider ID drop down list 372D; (b) Due Date 372E; (c) Port to Original drop down list 372F; (d) LRN 372A (e.g., mandatory); (e) Customer Name 372H; (f) Work Order Number 372I; (g) Service Order Number 372J; (h) Subscription Version Remarks 372K; (i) Reserved TN drop down list 372L; (j) Switch CLLI drop down list 372M; (k) Billing ID 372N; and (l) ILEC NPA-NXX 372O.

In the preferred embodiment of the Create As Gaining SV function 172, the LNP GUI 124, for example, sets/defaults the New Service Provider to the Service Provider ID associated with the User ID and sets/defaults the Old Service Provider ID drop down list 372D as follows: (a) if the TN is a current active ported TN on the IBAR 86, set to the Service Provider ID associated with the ported TN; (b) if the TN is not a current active ported TN on the IBAR 86, and the Number Plan Area (NPA) of the TN is portable, set to the Service Provider ID associated with the NPA-NXX of the TN found in the IBAR 86; (c) if the TN is not a current active ported TN on the IBAR 86, and the NPA of the TN is not portable (i.e. cannot be defaulted), the LNP GUI 124: (i) advises the user of the error, indicating that the NPA-NXX of the TN is not portable. and (ii) requires that the user specify the Old Service Provider ID; (d) if Create As Gaining is for a TN range, use the first TN in the range for the old SP lookup steps referenced above.

Figure 4I:
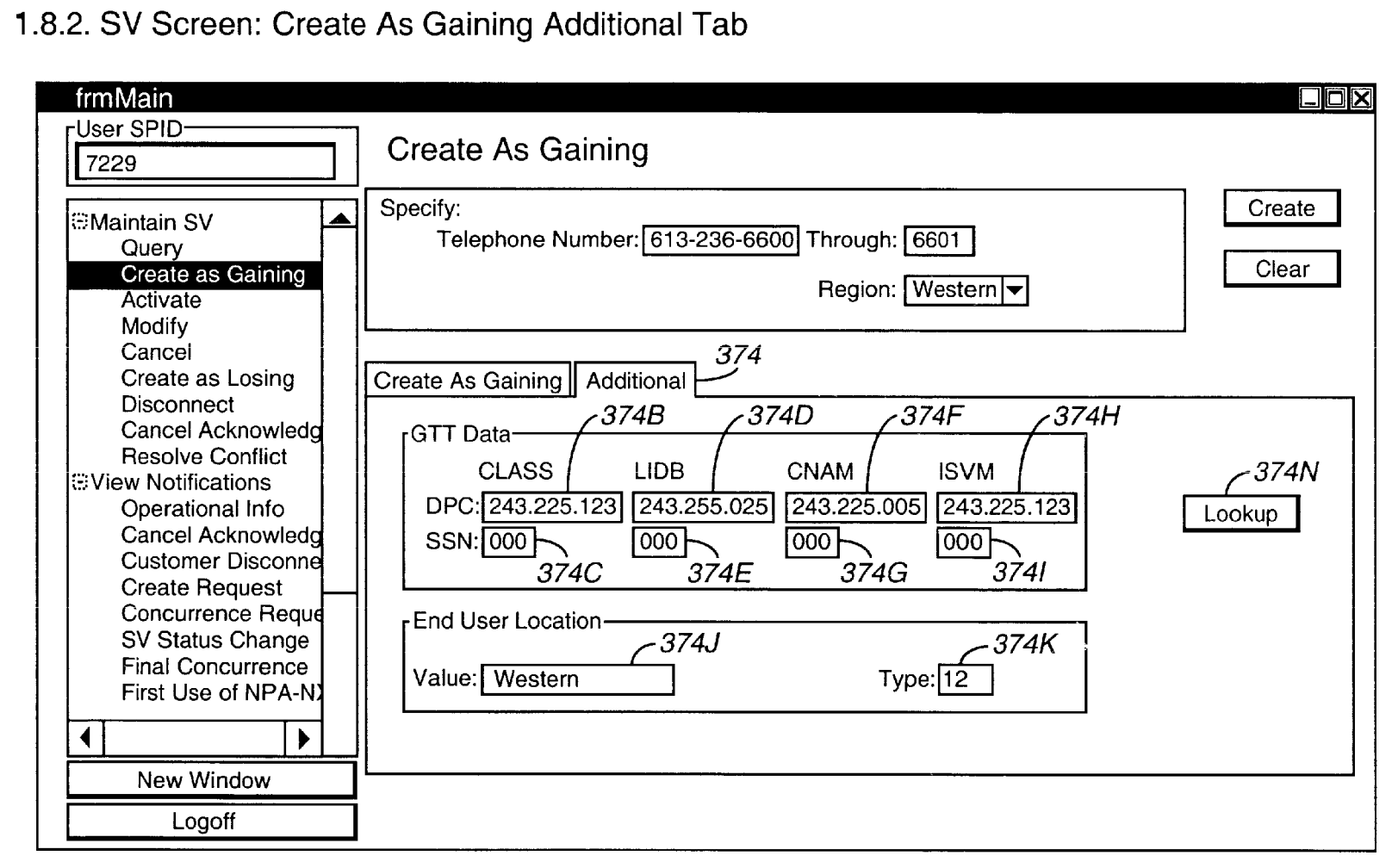

In the preferred embodiment of the Create As Gaining SV function 172, where the user has indicated that it is not a case of porting back to the original service provider via Port To Original drop down list 372F, the LNP GUI 124, for example, pre-populates the DPC and SSN fields based on the LRN 372A if it is manually entered as will be further described with respect to FIG. 4I.

In the preferred embodiment of the Create As Gaining SV function 172, where the user has indicated that it is not a case of porting back to the original service provider, the LNP GUI 124, for example, accepts the following additional information from the user via the Additional form 374 as shown in FIG. 4I: (a) CLASS DPC 374B; (b) CLASS SSN 374C; (c) LIDB DPC 374D; (d) LIDB SSN 374E; (e) CNAM DPC 374F; (i) CNAM SSN 374G; (g) ISVM DPC 374H; (h) ISVM SSN 374I; (i) End User Location Value 374J; and (j) End User Location Type 374K. Further, the Additional form 374 includes a Lookup button 374N which, for example, pre-populates the DPC and SSN fields 374B–374I based on the LRN 372A if it is manually entered.

Create As Losing SV Function 174

The following discussion describes the features of the preferred embodiment of the LNP GUI 124 Create As Losing SV function 174. When a user selects the Create As Losing hierarchical list item 322c corresponding to the Create As Losing SV function 174 of the LNP GUI 124, the screen 380 as shown, for example, in FIG. 4J is generated by the LNP GUI 124.

Figure 4J:
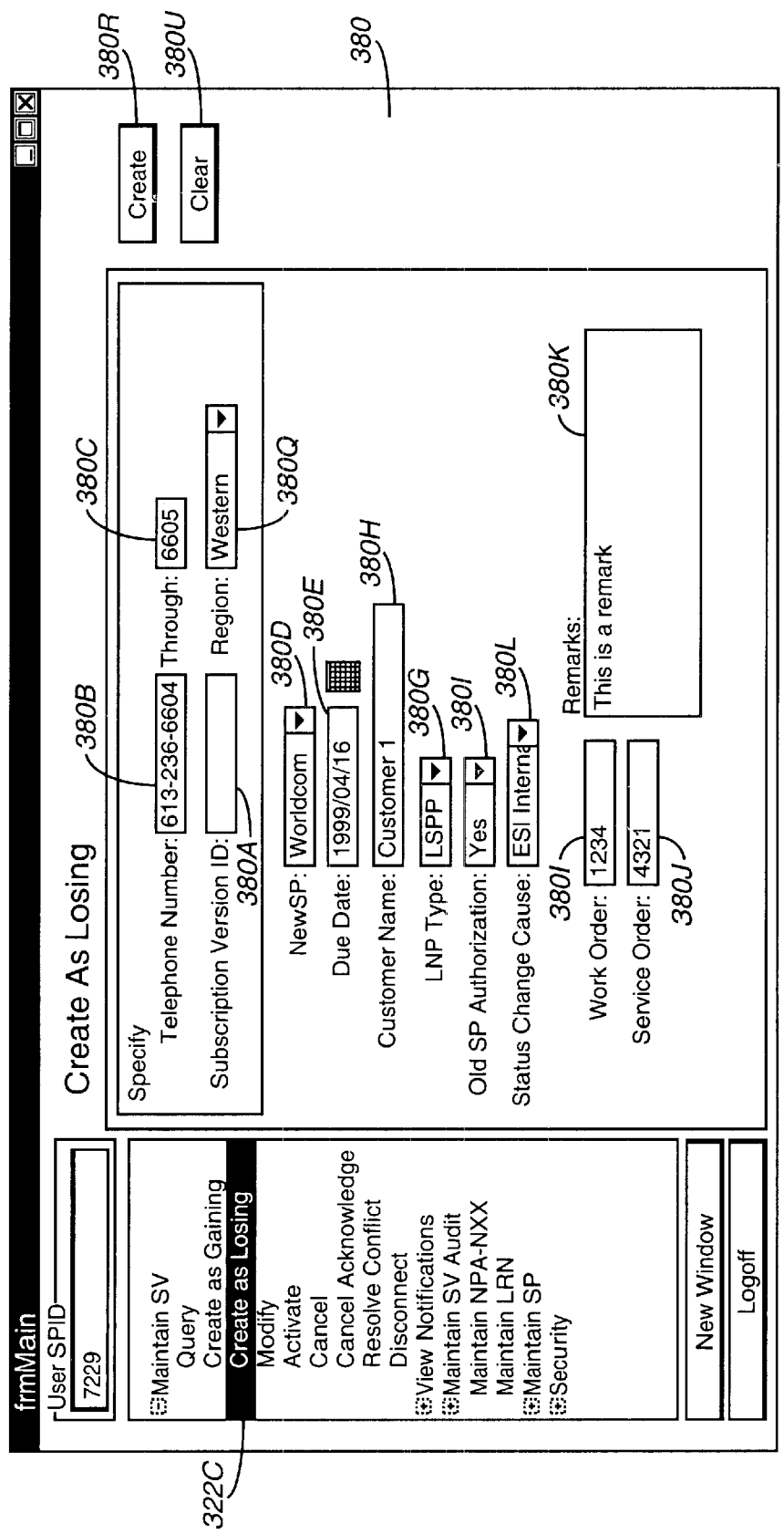

In the preferred embodiment of the Create As Losing SV function 174, the LNP GUI 124 accepts, for example, the following information from the user in fields as shown in Create As Losing screen 380 of FIG. 4J: (a) Telephone Number Start 380B;(b) Telephone Number End 380C; (c) New Service Provider ID drop down list 380D; (d) Due Date 380E; (e) Old SP Authorization Indicator 380F; (f) LNP Type drop down list 380G; (g) Customer Name 380H; (h) Work Order Number 380I; (i) Service Order Number 380J; (j) Subscription Version Remarks 380K; (k) Status Change drop down list 380L; (l) Subscription Version ID 380P; and (p) Region drop down list 380Q. In addition, the screen 380 includes a Create button 380R to initiate creation, and a Clear button 380U to clear the entered values.

In the preferred embodiment of the Create As Losing SV function 174, the LNP GUI 124, for example, sets/defaults the Old Service Provider to the Service Provider ID associated with the User ID.

Create SV Functions 172 and 174 Edits

In the preferred embodiment, the LNP GUI 124 performs, for example, the following validations on information supplied by the user: (a) for the Create As Gaining SV function 172 where the user has indicated that it is a case of porting back to the original service provider via Port To Original drop down list 372F, the following information must be supplied: (i) Telephone Number Start 370B, (ii) Old Service Provider ID 372D, (iii) Due Date 372E, and (iii) Port To Original drop down list 372F; (b) for the Create As Gaining SV function 172 where the user has indicated that it is not a case of porting back to the original service provider via indicator 372F, the following information must be supplied: (i) Telephone Number Start 370B, (ii) Old Service Provider ID 372D, (iii) Due Date 372E, (iv) Port To Original drop down list 372F 372F, and (v) LRN 372A (Note: this is an MCIT 120 feature, not an NPAC 30 feature); (c) for the Create As Losing SV function 174, the following information must be supplied: (i) Telephone Number Start 380B, (ii) New Service Provider ID 380D, (iii) Due Date 380E, (iv) Old Service Provider Authorization 380F, (v) Status Change Cause Code 380L (e.g., only if Old SP Authorization=N [0]), and (vi) LNP Type 380G; (d) Due Date 372E and 380E must be equal to or greater than current system date; (e) Due Date 372E and 380E must be equal to or greater than the effective date of the NPA-NXX for the TN (e.g., the effective date for the NPA-NXX will be checked on the IBAR 86); (f) LRN 372A must belong to the Service Provider associated with the user requesting the Create; (g) if LNP Type 380G specified is "LSPP" (i.e., inter service provider port), then the Old and New Service Providers must be different; and (h) if LNP Type 380G specified is "LISP" (i.e., intra service provider port), then old and new service providers must be the same.

MCIT 120 Specific Features for the Create As Gaining SV Function 172

In the preferred embodiment, for the Create As Gaining SV function 172 requested by an MCIT 120 user, for example, the LNP GUI 124 notifies NRM to update its status of the TN to "Created", only after confirmation of the Create has been received from the NPAC 30.

Activate SV Function 176 Features

Figure 4K:
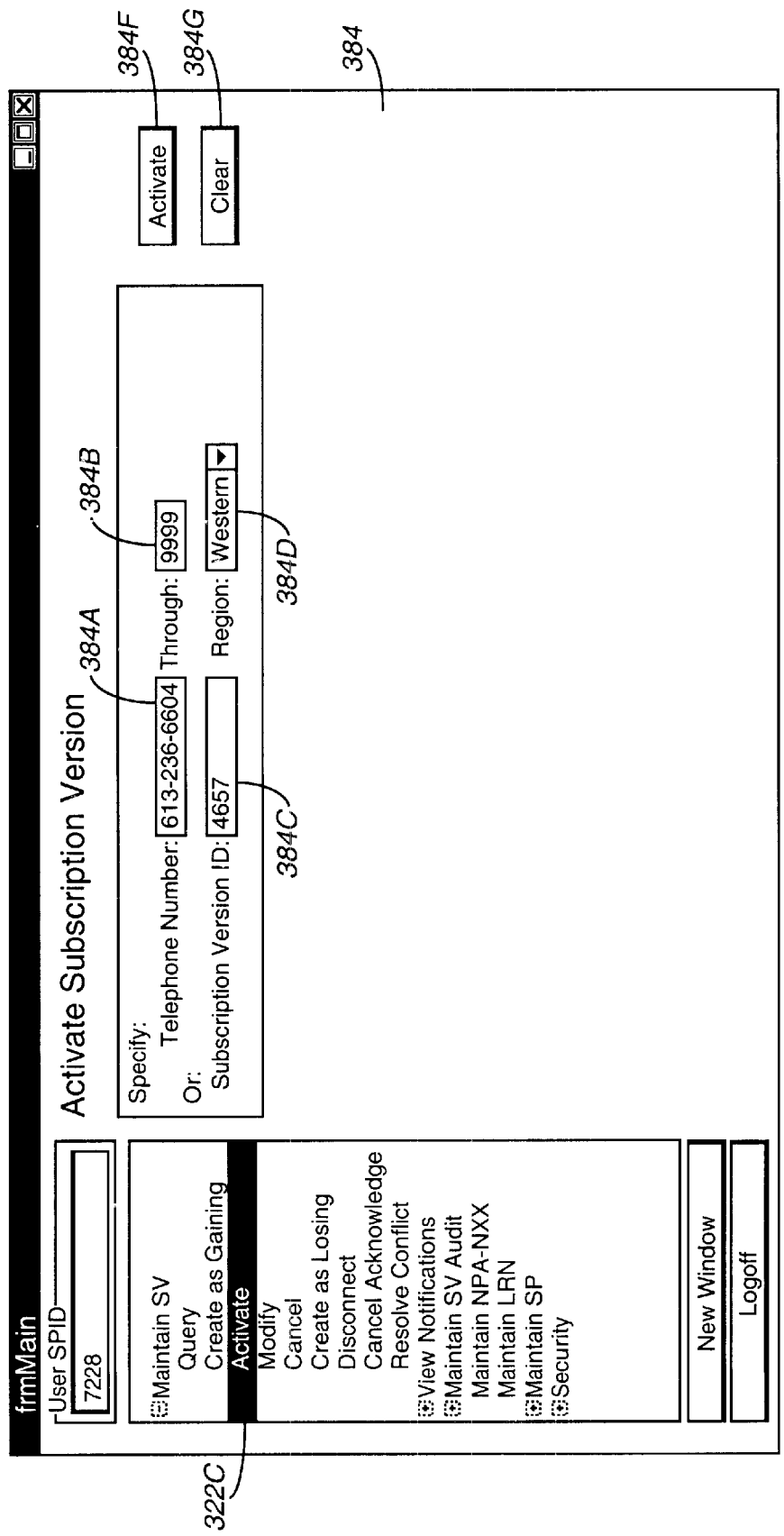

The following discussion describes the features of the preferred embodiment of the LNP GUI 124 Activate SV function 176. When a user selects the Activate hierarchical list item 322e corresponding to the Activate SV function 176 of the LNP GUI 124, the screen 384 as shown, for example, in FIG. 4K is generated by the LNP GUI 124.

In the preferred embodiment, the Activate SV function 176 performs activating subscription versions of ported telephone numbers. A subscription version can be activated once it has been created.

Activate SV Function 176 Features

In the preferred embodiment, the Activate SV function 176 of the LNP GUI 124, for example, accepts a user request to activate a subscription version. To identify a subscription version to be activated, the LNP GUI 124 allows the user to, for example: (a) select a specific TN from a list, or (b) select a contiguous block of TNs from a list, or (c) specify the following information as shown in Activate Subscription Version screen 384 of FIG. 4K: (i) Telephone Number Start 384A, (ii) Telephone Number End 384B, (iii) Subscription Version ID 384C, and (iv) Region Indicator drop down list 384D. The screen 384 further includes, for example, a Activate button 384F to initiate activation, and a Clear button 384G to clear the entered values.

In the preferred embodiment, the Activate SV function 176 of the LNP GUI 124, for example, performs the following validations on information supplied by the user: (a) Either Telephone Number Start 384A or Subscription Version ID 384C plus Region Indicator 384D must be supplied.

In the preferred embodiment, the Activate SV function 176 of the LNP GUI 124, for example, validates that the Subscription Version Status is "pending." For example, Subscription Version Status can be verified as follows: Check the local SOA 72 for existence of "Create As Gaining" subscription version having "Pending" status and either the existence of the Concurrence Notification=Y (1) or expiration of the service provider concurrence window, (a) if the above is not true, then offer the option to check NPAC 30 for the Old Service Provider Authorization flag=Y (1), (b) if the above is not true for NPAC 30, then issue an error. This edit takes into account when the SOA 72 gets out of sync with NPAC 30 (which should be rare) and when the SV was created on one system and activated through another (e.g., the second telecommunications service provider using ESI and then cutting over to MCIT 120's SOA system). When TN ranges are involved and an edit fails, the system, for example, indicates to the user that nothing was activated and advises the user to resolve the error (indicating the affected TNs) and/or split up the ranges into smaller ranges that are doable.

MCIT 120 Specific Features for the Activate SV Function 176

In the preferred embodiment, for the Activate SV function 176 requested by an MCIT 120 user, for example, the LNP GUI 124 notifies NRM to update its status of the TN/range to "Activated", only after confirmation of the Activate has been received from the NPAC 30.

Modify SV Function 178

The following discussion describes the features of the preferred embodiment of the LNP GUI 124 Modify SV function 178. When a user selects the Modify hierarchical list item 322d corresponding to the Modify SV function 178 of the LNP GUI 124, the screen 390 as shown, for example, in FIG. 4L is generated by the LNP GUI 124.

Figure 4L:
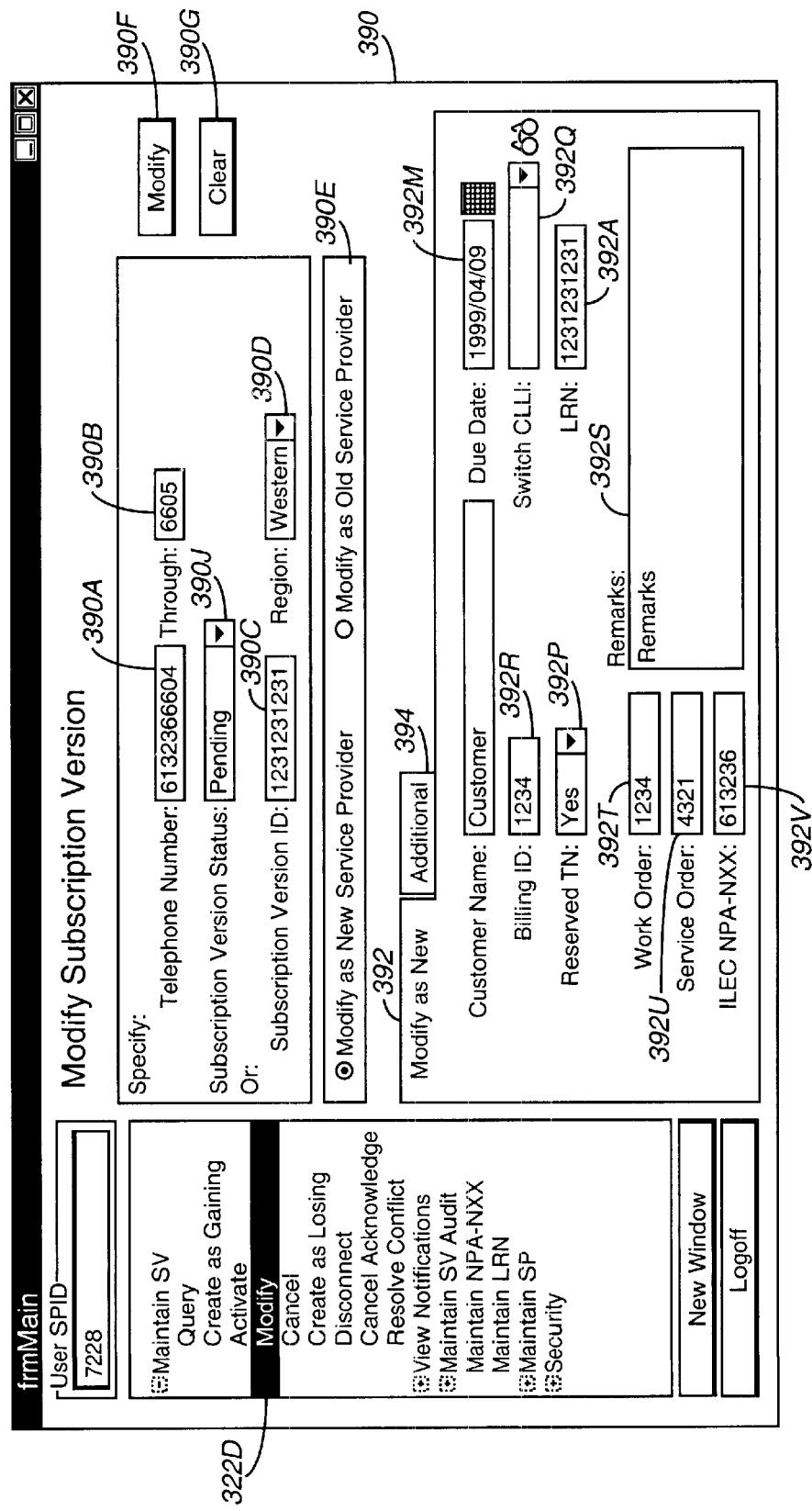

In FIG. 4L, the Modify Subscription Version screen 390 includes, for example. a Modify as New form 392 and an Additional form 394 which are generated by selecting a Modify as New Service Provider field in selection buttons 390E. The Modify as New form 392 includes, for example, various fields for entering various parameters as shown in FIG. 4L.

In the preferred embodiment, the Modify SV function 178 of the LNP GUI 124, for example, modifies Subscription Versions for ported telephone numbers. Service providers can, for example, modify attributes associated with active, pending or conflict subscription versions.

Modify SV Function 178 Features

In the preferred embodiment, the Modify SV function 178 of the LNP GUI 124, for example, accepts a user request to modify a subscription version. To identify a subscription version to be modified, the LNP GUI 124 allows the user to, for example: (a) select a specific TN from a list, or (b) select a contiguous block of TNs from a list, or (c) specify the following information as shown in Modify Subscription Version screen 390 of FIG. 4L: (i) Telephone Number Start 390A, (ii) Telephone Number End 390B, (iii) Subscription Version ID 390C, (iv) Region Indicator drop down list 390D, (v) Subscription Version Status drop down list 390J, and (vi) the Modify as New or Old Service Provider fields in selection buttons 390E. The Modify Subscription Version screen 390 further includes, for example, a Modify button 390F to initiate modification, and a Clear button 390G to clear the entered values.

In the preferred embodiment, the Modify SV function 178 of the LNP GUI 124, for example, performs the following validations on information supplied by the user: (a) one of the following combinations of information must be supplied in order to modify the subscription version: (i) Subscription Version ID 390C plus Region Indicator 390D, or (ii) Telephone Number Start 390A and Subscription Version Status 390J, or (iii) Telephone Number Start 390A, Telephone Number End 390B, and Subscription Version Status 390J.

Modify SV Function 178 by New Service Provider

In the preferred embodiment, the Modify SV function 178 of the LNP GUI 124, when a user belonging to the Subscription Version's new service provider requests to modify the Subscription Version via selection buttons 390E, accepts from the user changes to, for example, the following information in addition to the information previously discussed with respect to screen 390 as shown in the Modify as New form 392: (a) a Customer Name 392E, (b) a Due Date 392M, (c) Billing ID 352R, (d) a Switch CLLI drop down list 392Q, (e) a Reserved TN drop down list 392P, (f) a LRN 392A, (g) a Work Order number 392T, (h) Remarks 392S, (i) a Service Order number 392U, and (j) a ILEC NPA-NXX 392V.

The Additional form 394 as shown in FIG. 4M, for example, accepts the following additional information from the user: (a) CLASS DPC 394B; (b) CLASS SSN 394C; (c) LIDB DPC 394D; (d) LIDB SSN 394E; (e) CNAM DPC 394F; (f) CNAM SSN 394G; (g) ISVM DPC 394H; (h) ISVM SSN 394I; (i) End User Location Value 394J; and (j) End User Location Type 394K. Further, the Additional form 394 includes a Lookup button 394N which, for example, pre-populates the DPC and SSN fields 394B–394I based on the LRN 392A if it is manually entered.

In the preferred embodiment, the Modify SV function 178 of the LNP GUI 124, validates that the Subscription Version Status 390J is "pending", or "conflict." The status validation is performed, for example, against the local SOA 72, not the NPAC 74. There is typically no need to check the NPAC 74 since, if the SV didn't pass the edit against the local SOA 72, but would have passed the edit against the NPAC 74, then there is a discrepancy between the SOA 72 and NPAC 74 which in any case needs to be corrected.

Modify SV Function 178 by Old Service Provider

In the preferred embodiment, the Modify SV function 178 of the LNP GUI 124, when a user belonging to the Subscription Version's old service provider requests to modify the Subscription Version via selection buttons 390E, accepts from the user changes to, for example, the following information in addition to the information previously discussed with respect to screen 390 as shown in screen 400 of FIG. 4N: (a) a Old SP Due Date 400A, (b) Old SP Authorization drop down list 400B, (c) a Status Change Cause code drop down list 400C, (d) a Customer Name 400D, (e) a Work Order number 400E, (f) Remarks 400F, and (g) a Service Order number 400G.

In the preferred embodiment, the Modify SV function 178 of the LNP GUI 124, validates that the Subscription Version Status 390J is "pending", or "conflict." The status validation is performed, for example, against the local SOA 72, not the NPAC 74. There is typically no need to check the NPAC 74 since, if the SV didn't pass the edit against the local SOA 72, but would have passed the edit against the NPAC 74, then there is a discrepancy between the SOA 72 and NPAC 74 which in any case needs to be corrected.

Cancel SV Function 180

The following discussion describes the features of the preferred embodiment of the LNP GUI 124 Cancel SV function 180. When a user selects the Cancel hierarchical list item 322*f* corresponding to the Cancel SV function 180 of the LNP GUI 124, the screen 404 as shown, for example, in FIG. 4O is generated by the LNP GUI 124.

In the preferred embodiment, the Cancel SV function 180 of the LNP GUI 124, for example, cancels Subscription Versions of ported telephone numbers. A subscription version can be canceled prior to activation or when a disconnection is pending (i.e., rescind a "disconnect" action).

Cancel SV Function 180 Features

Figure 40:
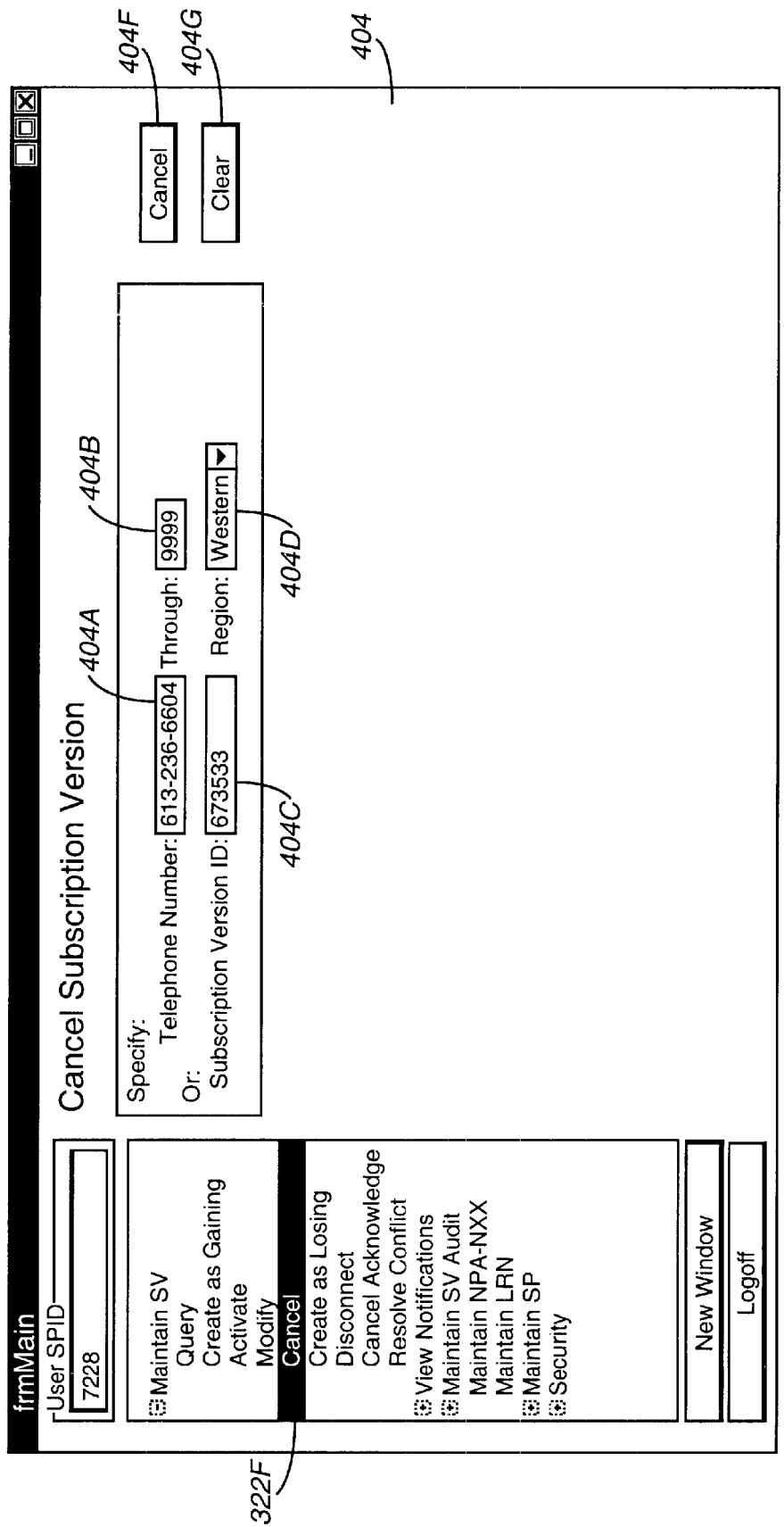

In the preferred embodiment, the Cancel SV function 180 of the LNP GUI 124, for example, accepts a user request to cancel a subscription version. To identify a subscription version to be cancelled, the LNP GUI 124 allows the user to, for example: (a) select a specific TN from a list, or (b) select a contiguous block of TNs from a list, or (c) specify the following information as shown in Cancel Subscription Version screen 404 of FIG. 40: (i) Telephone Number Start 404A, (ii) Telephone Number End 404B, (iii) Subscription Version ID 404C, and (iv) Region Indicator drop down list 404D. The screen 404 further includes, for example, a Cancel button 404F to initiate cancellation, and a Clear button 404G to clear the entered values.

In the preferred embodiment, the Cancel SV function 180 of the LNP GUI 124, for example, performs the following validations on information supplied by the user: (a) Either Telephone Number Start 404A or Subscription Version ID 404C plus Region Indicator 404D must be supplied; and (b) the LNP GUI 124 validates that the Subscription Version status is "pending", "conflict", or "disconnect-pending." The status validation is, for example, performed against the local SOA 72, not the NPAC 74.

In the preferred embodiment, the Cancel SV function 180 of the LNP GUI 124, for example, prompts the user to confirm the cancellation of the specified subscription version.

Disconnect SV Function 182

Figure 4P:
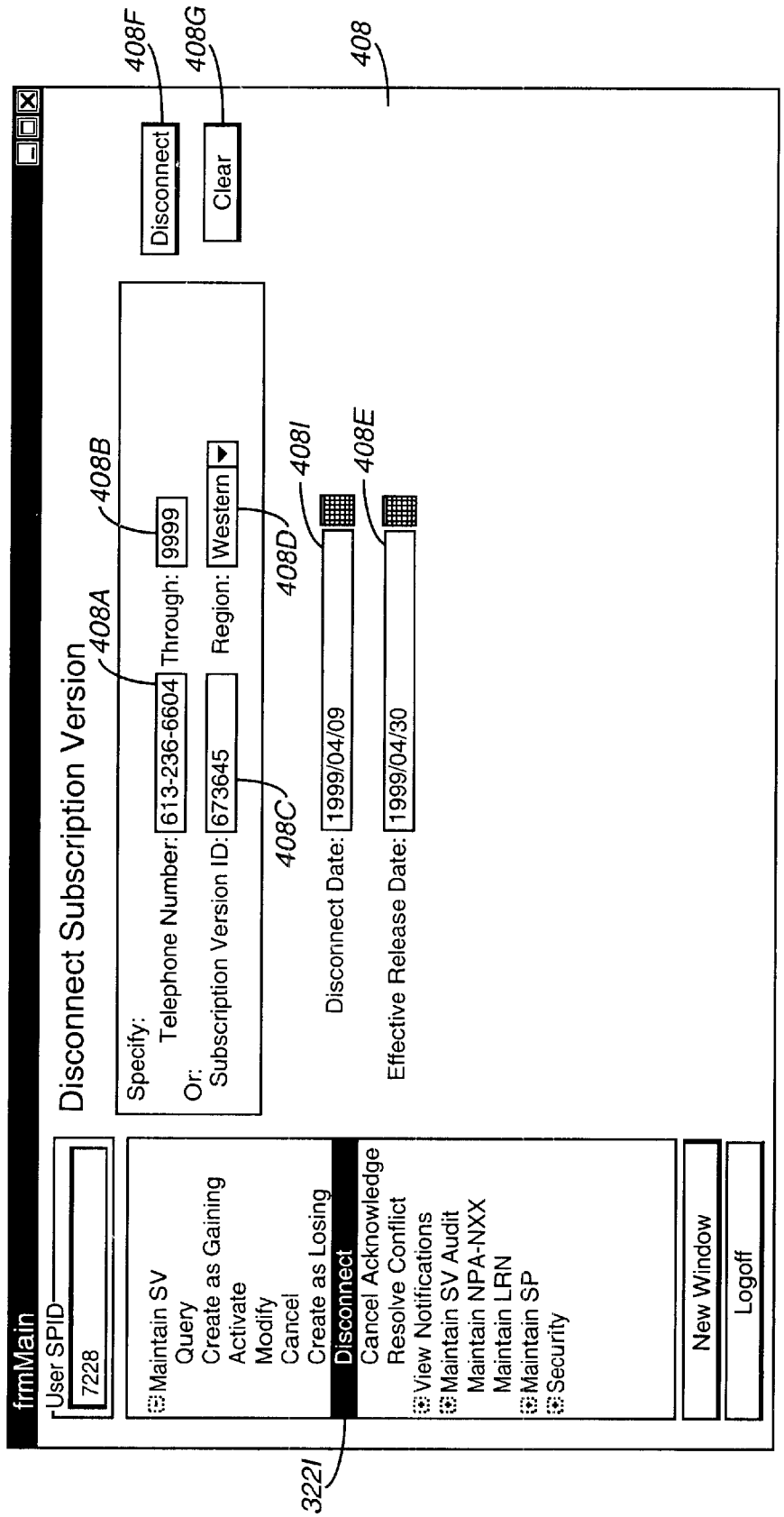

The following discussion describes the features of the preferred embodiment of the LNP GUI 124 Disconnect SV function 182. When a user selects the Disconnect hierarchical list item 322*i* corresponding to the Disconnect SV function 182 of the LNP GUI 124, the screen 408 as shown, for example, in FIG. 4P is generated by the LNP GUI 124.

In the preferred embodiment, the Disconnect SV function 182 of the LNP GUI 124, for example, disconnects Subscription Versions of ported telephone numbers. A subscription version can be disconnected once it has been activated.

Disconnect SV Function 182 Features

In the preferred embodiment, the Disconnect SV function 180 of the LNP GUI 124, for example, accepts a user request to disconnect a subscription version. To identify a subscription version to be disconnected, the LNP GUI 124 allows the user to, for example: (a) select a specific TN from a list, or (b) select a contiguous block of TNs from a list, or (c) specify the following information as shown in Disconnect Subscription Version screen 408 of FIG. 4P: (i) Telephone Number Start 408A, (ii) Telephone Number End 408B, (iii) Subscription Version ID 408C, and (iv) Region Indicator drop down list 408D. The screen 408 further includes, for example, fields for a Disconnect Date 408J, an Effective Release Date 408E, a Disconnect button 408F to initiate disconnection, and a Clear button 408G to clear the entered values.

In the preferred embodiment, the Disconnect SV function 180 of the LNP GUI 124, to disconnect a subscription version, accepts the following information from the user: (a) the Disconnect Date 408J; and (b) the Effective Release Date 408E. A Force If Not Activated Indicator, as found in a previous GUI is not included in the LNP GUI 124. This was a previous NPSM 126 kludge: if coordination of disconnect cleanup activities was not in sync, such that a user cleaned up or reset the TN record on the NRM first, then the user went into NPSM 126 to disconnect from NPAC 30, user did not want to see/hear/be stopped by a TN status error from NRM (see, e.g., NPSM User's Guide, section 3.4.3 The Force Feature, D0036-1.0).

In the preferred embodiment, the Disconnect SV function 182 of the LNP GUI 124, for example, performs the following validations on information supplied by the user: (a) Either Telephone Number Start 408A or Subscription Version ID 408C plus Region Indicator 408D must be supplied.

In the preferred embodiment, the Disconnect SV function 182 of the LNP GUI 124, for example, prompts the user to confirm the disconnect of the specified subscription version. The LNP GUI 124, for example, depends on NPAC 30 to validate that the Subscription Version status is "active." This is because if the SOA 48 indicated otherwise, and the customer is disconnecting anyway, there is little point in fixing the SOA 48.

Acknowledge Cancellation Function 184

Figure 4Q:
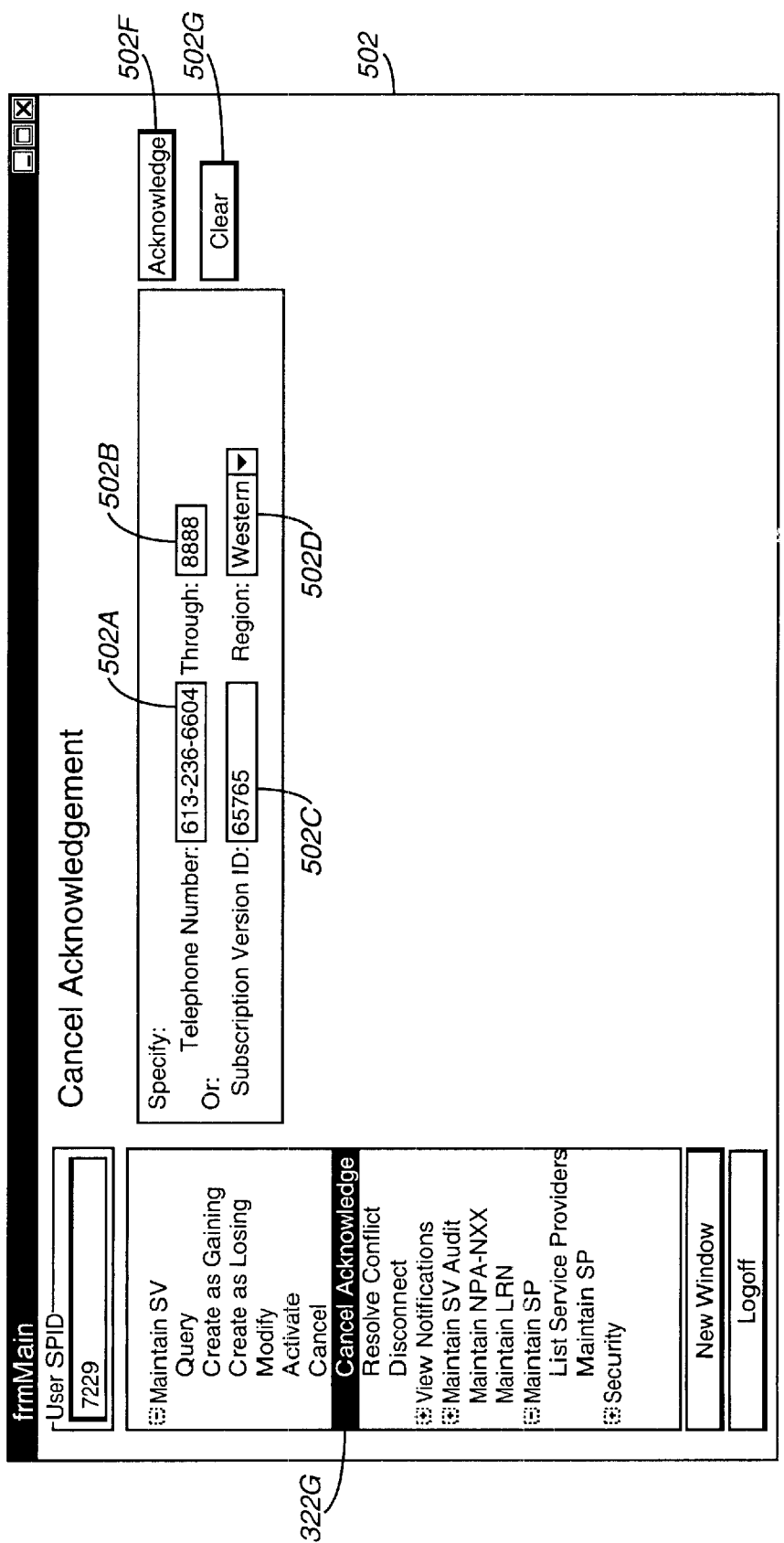

The following discussion describes the features of the preferred embodiment of the LNP GUI 124 Acknowledge Cancellation function 184. When a user selects the Cancel Acknowledge hierarchical list item 322*g* corresponding to the Acknowledge Cancellation function 184 of the LNP GUI 124, the screen 502 as shown, for example, in FIG. 4Q is generated by the LNP GUI 124.

In the preferred embodiment, the Acknowledge Cancellation function 184 of the LNP GUI 124, for example, acknowledges cancellation of a subscription version for a ported telephone number. Service providers can acknowledge cancellation of a subscription version having a status of "Cancel-Pending."

Acknowledge Cancellation Function 184 Features

In the preferred embodiment, the Acknowledge Cancellation function 184 of the LNP GUI 124, for example, accepts a user request to acknowledge the cancellation of a Subscription Version. To identify a subscription version for which to acknowledge a cancellation, the LNP GUI 124 allows the user to, for example: (a) select a specific TN from a list, or (b) select a contiguous block of TNs from a list, or (c) specify the following information as shown in Cancel Acknowledgment screen 502 of FIG. 4Q: (i) Telephone Number Start 502A, (ii) Telephone Number End 502B, (iii) Subscription Version ID 502C, and (iv) Region Indicator drop down list 502D. The screen 502 further includes, an Acknowledge button 502F to initiate acknowledgment, and a Clear button 502G to clear the entered values.

In the preferred embodiment, the Acknowledge Cancellation function 184 of the LNP GUI 124, for example, performs the following validations on information supplied by the user: (a) Either Telephone Number Start 502A or Subscription Version ID 3502C plus Region Indicator 502D must be supplied; and (b) the LNP GUI 124 validates that the Subscription Version status is "cancel-pending." The status validation is, for example, performed against the local SOA 72, not the NPAC 74.

Resolve Conflict Function 186

Figure 4R:
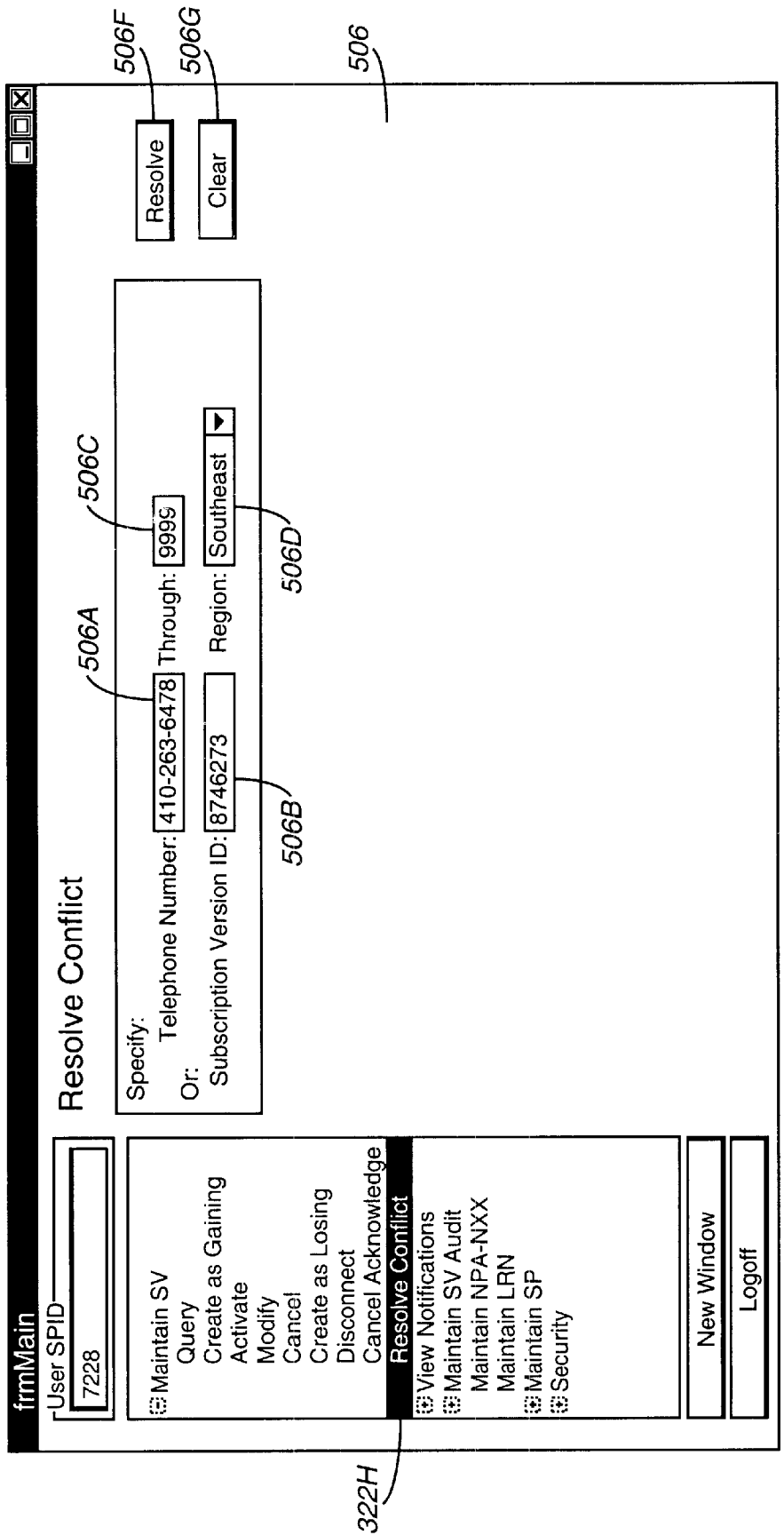

The following discussion describes the features of the preferred embodiment of the LNP GUI 124 Resolve Conflict function 186. When a user selects the Resolve Conflict hierarchical list item 322h corresponding to the Resolve Conflict function 186 of the LNP GUI 124, the screen 506 as shown, for example, in FIG. 4R is generated by the LNP GUI 124.

In the preferred embodiment, the Resolve Conflict function 186 of the LNP GUI 124, for example, removes subscription versions of ported telephone numbers from conflict. Subscription versions can be placed in conflict due to explicit non-concurrence by the old service provider, and due date mismatch between the old and new service providers.

Resolve Conflict Function 186 Features

In the preferred embodiment, the Resolve Conflict function 186 of the LNP GUI 124, for example, accepts a user request to acknowledge the cancellation of a Subscription Version. To identify a subscription version for which to acknowledge a cancellation, the LNP GUI 124 allows the user to, for example: (a) select a specific TN from a list, or (b) select a contiguous block of TNs from a list, or (c) specify the following information as shown in Resolve Conflict screen 506 of FIG. 4R: (i) Telephone Number Start 506A, (ii) Telephone Number End 506B, (iii) Subscription Version ID 506C, and (iv) Region Indicator drop down list 506D. The screen 506 further includes, for example, a Resolve button 506F to initiate resolution, and a Clear button 506G to clear the entered values.

In the preferred embodiment, the Resolve Conflict function 186 of the LNP GUI 124, for example, performs the following validations on information supplied by the user: (a) Either Telephone Number Start 506A or Subscription Version ID 506C plus Region Indicator 506D must be supplied; and (b) the LNP GUI 124 validates that the Subscription Version status is "conflict." The status validation is, for example, performed against the local SOA 72, not the NPAC 74.

Resolve Conflict by Old SP

In another embodiment, the Resolve Conflict function 186 of the LNP GUI 124, when a user belonging to the Subscription Version's old service provider requests to resolve conflict for the Subscription Version, may accept from the user changes to, for example, the following optional information: (a) Old SP Due Date (not shown), (b) Old SP Authorization (not shown), and (c) Status Change Cause Code (not shown). The Resolve Conflict function 186 of the LNP GUI 124 clears the Status Change Cause Code (not shown) if the Old SP Authorization (not shown) value is changed to Y (1).

Resolve Conflict by New SP

In another embodiment, the Resolve Conflict function 186 of the LNP GUI 124, when a user belonging to the Subscription Version's new service provider requests to resolve conflict for the Subscription Version, may accept from the user changes to, for example, the following optional information: (a) New SP Due Date (not shown).

Maintain Network Function 152 Features

Figure 4S:
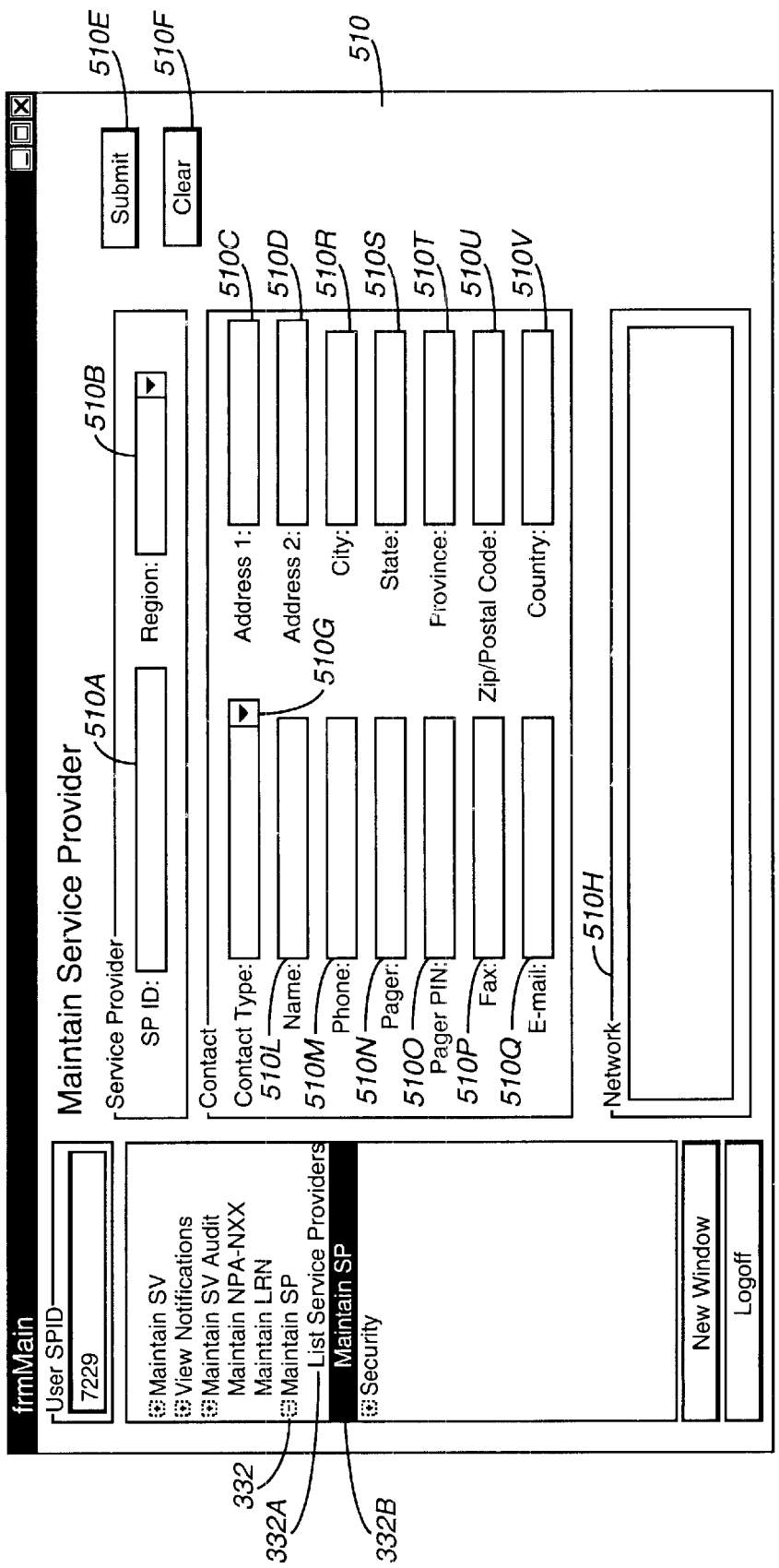

The following discussion describes the features of the preferred embodiment of the LNP GUI 124 Maintain Network function 152 for maintaining network information (e.g., service provider, NPA-NXX, and LRN data). When a user selects the Maintain SP hierarchical list 332 corresponding to the Maintain Network function 152 of the LNP GUI 124, the Maintain Service Provider screen 510 as shown, for example, in FIG. 4S is generated by the LNP GUI 124.

Maintain SP Function 154

In the preferred embodiment, the Maintain SP function 154 of the LNP GUI 124, for example, maintains service provider information via the Maintain SP hierarchical list item 332b.

Query a SP Function 162

In the preferred embodiment, the Query SP function 162 of the LNP GUI 124, for example, enables users to query the SOA 48 for detailed information for their own Service Provider. When the user initiates a Service Provider query via a Submit button 510E, the LNP GUI 124 displays, for example, the following information for the user's Service Provider in Network screen 510H: (a) Service Provider ID (not shown); (b) Service Provider Name (not shown); (c) Effective Time Stamp (not shown); (d) Creation Time Stamp (not shown); (e) System Information in another embodiment via the user selecting a System drop down list (not shown) for each of the following: (i) SOA, (ii) LSMS, and (iii) NPAC SMS; (e) Contact Information via the user selecting Contact Type drop down list 510G for each of the following: (i) Service Provider, (ii) Network, (iii) Billing, (iv) Web, (v) Repair Center, (vi) Operations, (vii) Local SMS, (viii) SOA System Interface, (ix) User Administration, (x) Conflict Resolution, and (xi) Security.

In the preferred embodiment, the Query SP function 162 of the LNP GUI 124 displays to the user, for example, the following information: (a) transport layer service access point address (TSAP) (not shown), (b) session layer service access point address (SSAP) (not shown), (c) presentation layer service access point address (PSAP) (not shown), and (d) network layer service access point (NSAP) (not shown).

In the preferred embodiment, the Query SP function 162 of the LNP GUI 124 the Contact Information displayed to the user includes. for example, the following information: (a) Contact Name 510L; (b) Contact Phone 510M; (c) Contact Pager Number 510N; (d) Contact Pager Pin 510O; (e) Contact Fax 510P; (f) Contact Email Address 510Q; (g) Contact Address 1 510C; (h) Contact Address 2 510D; (I) Contact City 510R; (j) Contact State 510S; (k) Contact Province 510T; (l) Contact Zipcode 510U; and (k) Contact Country 510V.

The service provider screen 510 also includes, for example, the Submit button 510E to initiate the operation, a Clear button 510F to clear the entered values, a Service Provider ID. 510A, and a Region ID drop down list 510B.

Modify SP Function 160

In the preferred embodiment, the Modify SP function 160 of the LNP GUI 124, for example, enables users to modify the detailed Service Provider information for their own Service Provider. When the user wishes to modify a Service Provider, in another embodiment the LNP GUI 124 accepts, for example, the following optional information from the user: (a) System Information via the user selecting System drop down list (not shown) for each of the following: (i) SOA, (ii) LSMS, and (iii) NPAC SMS; and (b) Contact Information via the user selecting Contact Type drop down list 510G for each of the following: (i) Service Provider, (ii) Network, (iii) Billing, (iv) Web, (v) Repair Center, (vi) Operations, (vii) Local SMS, (viii) SOA System Interface, (ix) User Administration, (x) Conflict Resolution, and (xi) Security.

In the another embodiment, the Modify SP function 160 of the LNP GUI 124 accepts, for example, the following System Information: (a) TSAP (not shown), (b) SSAP (not shown), (c) PSAP (not shown), and (d) NSAP (not shown).

In the preferred embodiment, the Modify SP function 160 of the LNP GUI 124 accepts, for example, the following Contact Information as shown in Maintain Service Provider screen 510 of FIG. 4S via the Maintain SP hierarchical list item 332b: (a) a Contact Name 510L; (b) a Contact Phone 510M; (c) a Contact Pager Number 510N; (d) a Contact Pager Pin 510O; (e) a Contact Fax 510P; (f) a Contact Email Address 510Q; (g) a first Contact Address 510C; (h) a second Contact Address 510D; (i) a Contact City 510R; (j) a Contact State 510S; (k) a Contact Province 510T; (k) a Contact Zip/Postal Code 510U; and (k) a Contact Country 510V. The Maintain Service Provider screen 510 also includes, for example, the Submit button 510E to initiate maintenance, and a Clear button 510F to clear the entered values.

List Service Providers

In the preferred embodiment, the Maintain SP function 154 of the LNP GUI 124, for example, produces a list of Service Providers as found within the IBAR 86 and/or thenetwork service provisioning system (NSPS) via the List Service Providers hierarchical list item 332a.

Figure 4T:
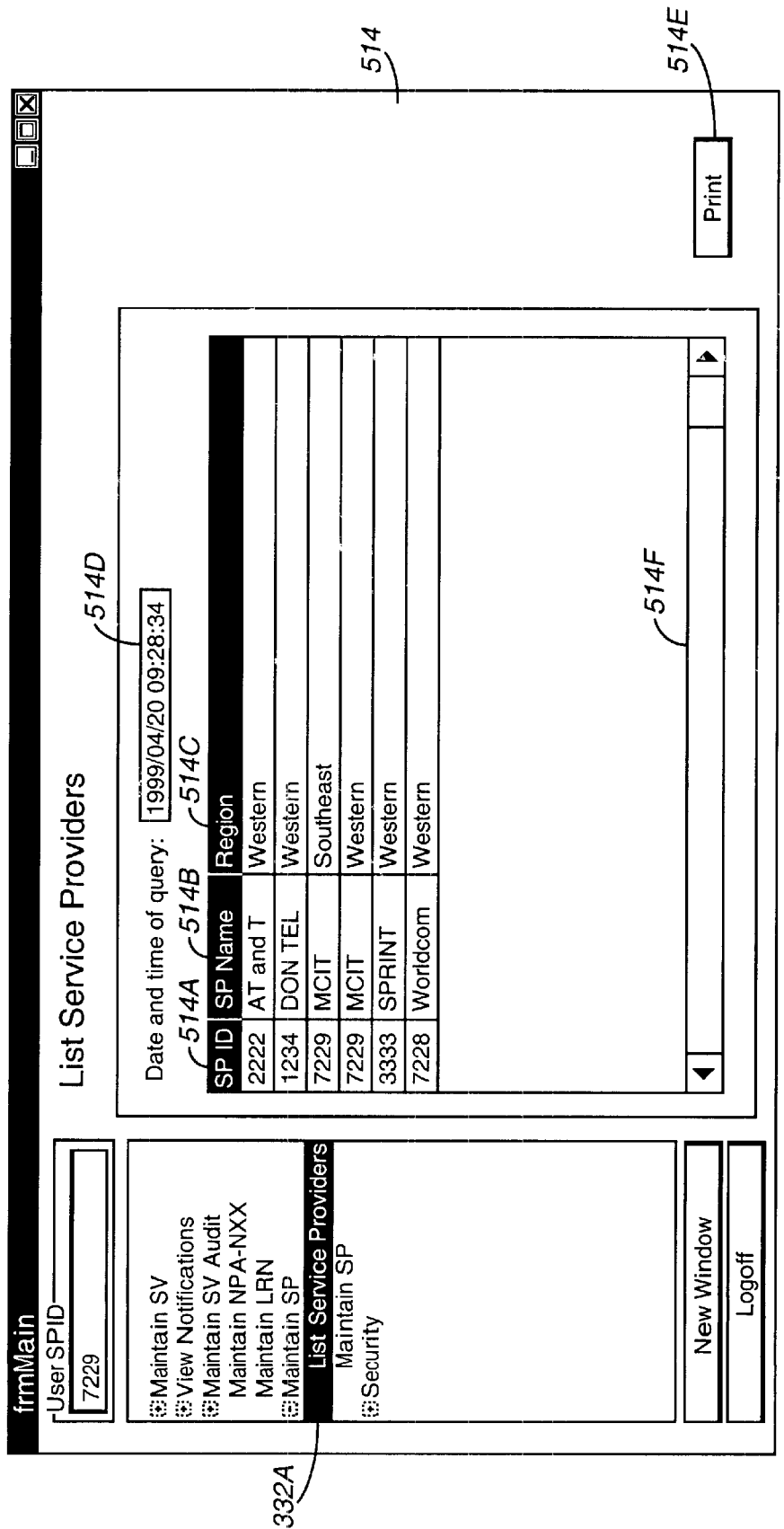

The Maintain SP function 154 of the LNP GUI 124, for example, enables the user to display a list of all Service Providers defined within the IBAR 86 via the user selecting the List Service Providers hierarchical list item 332a in the Maintain Service Provider screen 510 of FIG. 4S. The LNP GUI 124 then displays, for example, the following information for each Service Provider as shown in List Service Providers screen 514 of FIG. 4T: (a) Service Provider ID 514A; (b) Service-Provider Name 514B, (c) Region 514C, and (d) Date and time of query 514D. The List Service Providers screen 514 also includes, for example, a Print button 514E for printing the query results, and a horizontal scroll bar 514F. The LNP GUI 124 offers the user the option to, for example, sort the Service Providers in ascending alphabetical order by Service Provider Name 514B, by Service Provider ID 514A or by Region 514C and displays the Service Providers in the specified sort order. This can be accomplished, for example, by clicking on the Service Provider Name 514B, the Service Provider ID 514A or Region 514C.

Refresh SOA Service Provider Information

In the another embodiment, the Maintain SP function 154 of the LNP GUI 124, for example, enables the user to refresh all of the SOA 48 Service Provider information from the NPAC 30 via the user selecting a Refresh SOA button (not shown) in the Maintain Service Provider screen 510 of FIG. 4S. The Maintain SP function 154 of the LNP GUI 124, for example, enables the user to initiate a Service Provider refresh request to NPAC 30, to provide updated Service Provider information to the SOA 48.

Maintain NPA-NXX Function 156

The following discussion describes the features of the preferred embodiment of the LNP GUI 124 Maintain NPA-NXX function 156 for maintaining NPA-NXX network information. When a user selects the Maintain NPA-NXX hierarchical list 328 corresponding to the Maintain NPA-NXX function 156 of the LNP GUI 124, the Maintain NPA-NXX screen 520 as shown, for example, in FIG. 4U is generated by the LNP GUI 124.

Figure 4U:
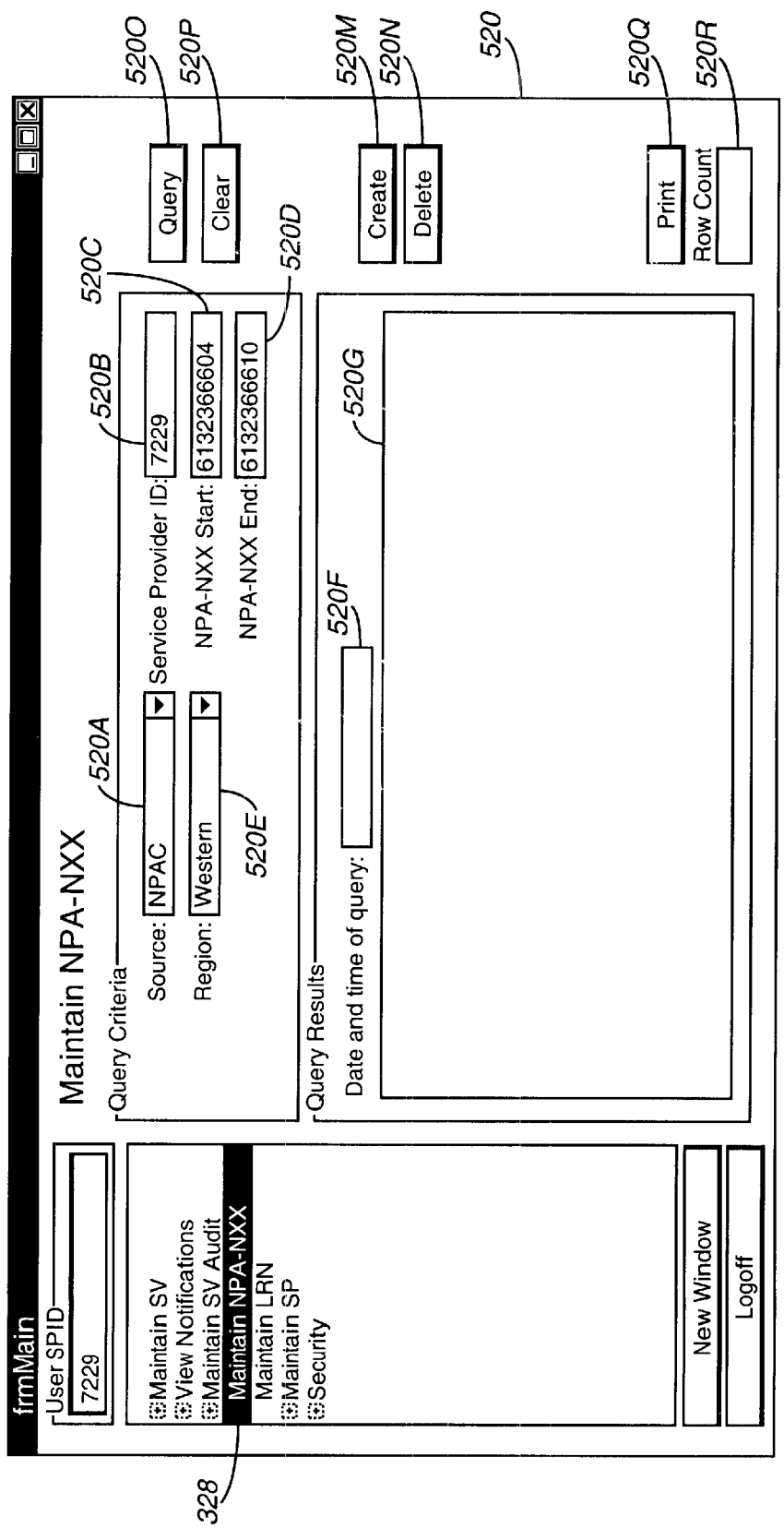

In the preferred embodiment, the Maintain NPA-NXX function 156 of the LNP GUI 124, for example, maintains portable NPA-NXXs associated with a service provider and is shown, for example, in the Maintain NPA-NXX screen 520 of FIG. 4U.

Query NPA-NXX Function 168

In the preferred embodiment, the Query NPA-NXX function 168 of the LNP GUI 124, for example, enables a user to specify that the information be obtained from one of the following sources selected by the user via Source drop down list 520A as shown, for example, in the Maintain NPA-NXX screen 520 of FIG. 4U: (a) Local SMS 74; and (b) NPAC 74. The Query NPA-NXX function 168 of the LNP GUI 124 accepts, for example, the following selection criteria from the user: (a) Service Provider ID 520B; (b) NPA-NXX Start 520C; (c) NPA-NXX End 520D; and (d) Region Indicator drop down list 520E (e.g., typically required for NPAC 74 queries only).

In the preferred embodiment, when the user initiates an NPA-NXX query via the Query button 520O, the Query NPA-NXX function 168 of the ILNP GUI 124 displays, for example, the following information for each NPA-NXX which meets the specified selection criteria in the Query Results window 520G: (a) Date and time of query 520F; (b) Service Provider Id (not shown); (c) Service Provider Name (not shown); (d) NPA-NXX (not shown); (e) NPA NXX ID (not shown); (f) Effective Time Stamp (not shown); (g) Creation Time Stamp (not shown); and (h) Creation User ID (not shown) (e.g., for local query only).

In the preferred embodiment, the Query NPA-NXX function 168 of the LNP GUI 124 displays the NPA-NXXs in, for example, ascending order by the following: (a) Service Provider ID (not shown); and (b) NPA-NXX (not shown). The Maintain NPA-NXX screen 520 further includes, for example, the Query button 520O to initiate the query, a Clear button 520P to clear the entered values, a Create button 520M, a Delete button 520N, a Print button 520Q for printing the query results and a Row Count indicator 520R to indicate the number of rows in the query results.

Create an NPA-NXX Function 164

Figure 4V:
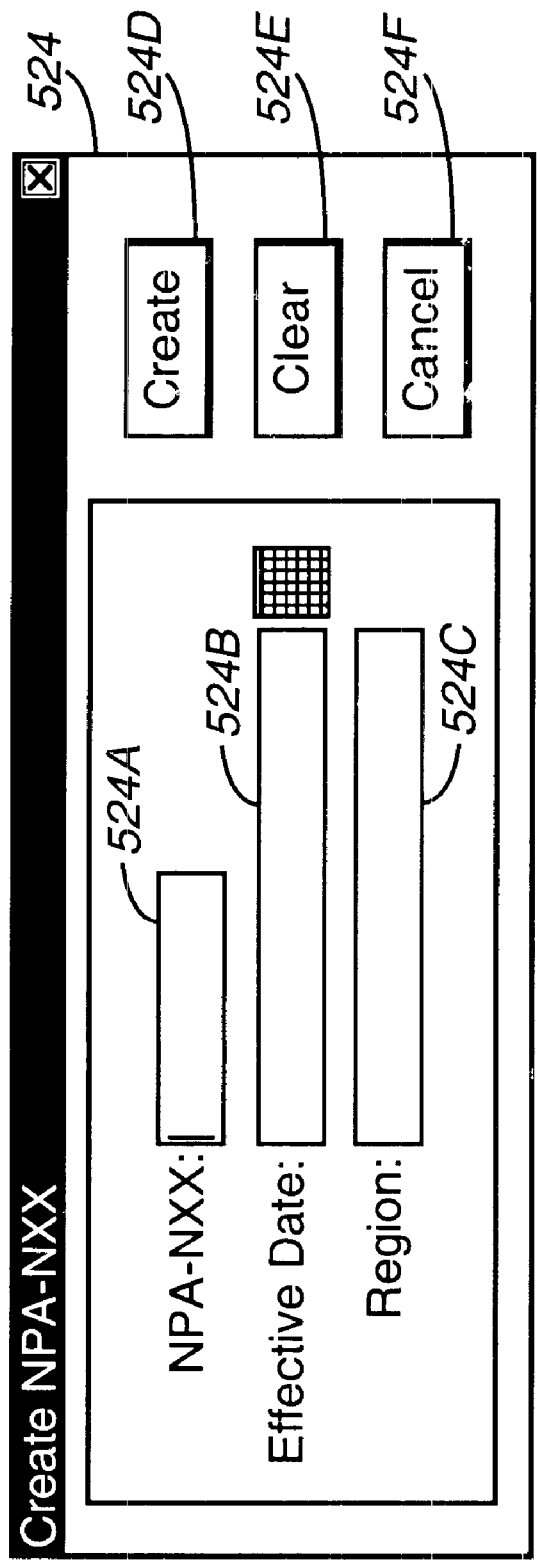

In the preferred embodiment, the Create NPA-NXX function 164 of the LNP GUI 124, to create an NPA-NXX, accepts, for example, the following information from the user as shown in Create NPA-NXX screen 524 of FIG. 4V via the user selecting the Create Button 520M: (a) NPA-NXX 524A; (b) Effective Time Stamp 524B; and (c) Region 524C. The Create NPA-NXX screen 524 further includes, for example, a Create button 524D to initiate creation, a Clear button 524E to clear the entered values, and a Cancel Button 524F to cancel creation.

Delete an NPA-NXX Function 166

In the preferred embodiment, the Delete NPA-NXX function 166 of the LNP GUI 124, to identify an NPA-NXX for deletion the user, for example, can: (a) Select a specific NPA-NXX from the Query Results window 520G, or (b) Specify the NPA-NXX. The user completes the deletion by selecting the Delete button 520N and the LNP GUI 124, for example, prompts the user via a confirmation screen (not shown) to confirm the deletion of the specified NPA-NXX. The majority of NPA-NXX deletes typically stem from NPA Splits which are performed by NPAC 30. Consequently, Delete NPA-NXX activity by a Service Provider should be minimal.

Maintain LRN Function 158

The following discussion describes the features of the preferred embodiment of the LNP GUI 124 Maintain LRN function 158 for maintaining LRN network information. When a user selects the Maintain LRN hierarchical list 330 corresponding to the Maintain LRN function 158 of the LNP GUI 124, the Maintain LRN screen 528 as shown, for example, in FIG. 4W is generated by the LNP GUI 124.

Figure 4W:
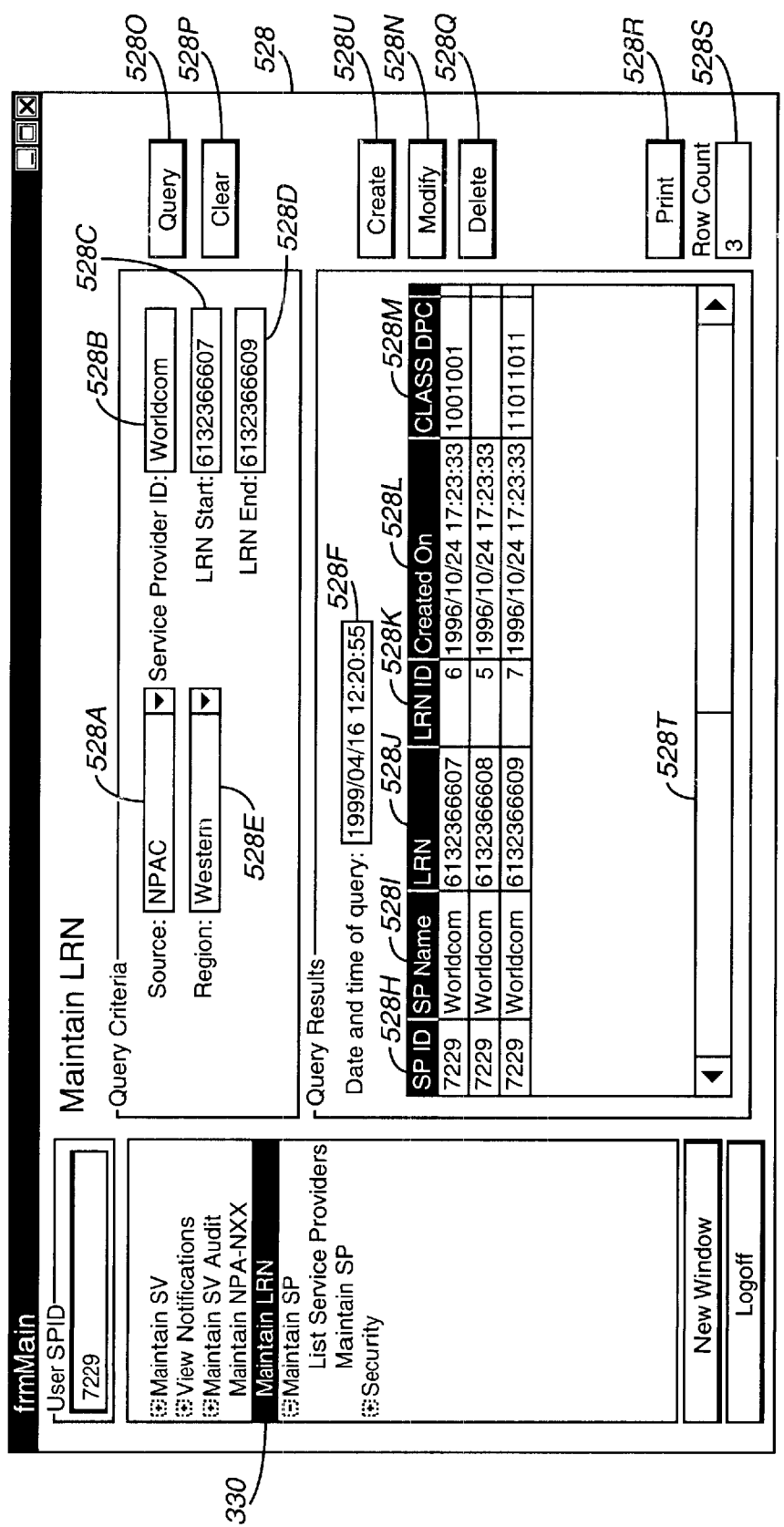

In the preferred embodiment, the Maintain LRN function 158 of the LNP GUI 124, for example, maintains portable LRNs associated with a service provider and is shown, for example, in the Maintain LRN screen 528 of FIG. 4W.

Query LRN Function 174

In the preferred embodiment, the Query LRN function 222 of the LNP GUI 124, for example, enables a user to specify that the information be obtained from one of the following sources selected by the user via Source drop down list 528A as shown, for example, in the Maintain LRN screen 528 of FIG. 4W: (a) Local SMS 74; and (b) NPAC 74. The Query LRN function 222 of the LNP GUI 124 accepts, for example, the following selection criteria from the user: (a) Service Provider ID drop down list 528B; (b) LRN Start 528C; (c) LRN End 528D; and (d) Region Indicator drop down list 528E (e.g., typically required for NPAC 74 queries only).

In the preferred embodiment, when the user initiates an LRN via a query Query button 528O, the Query LRN function 222 of the LNP GUI 124 displays, for example, the following information for each LRN which meets the specified selection criteria in the Query Results window 528G: (a) Date and time of query 528F; (b) Service Provider Id 528H; (c) Service Provider Name 528I; (d) LRN 528J; (e) LRN ID 528K; (f) Creation Time Stamp 528L; (g) Creation User ID (not shown, e.g., for local query only); (h) Class DPC 528M (e.g., for local query only); (h) Class SSN (not shown, e.g., for local query only); (i) LIDB DPC (not shown, e.g., for local query only); (j) LIDB SSN (not shown, e.g., for local query only); (k) CNAM DPC (not shown, e.g., for local query only); (l) CNAM SSN (not shown, e.g., for local query only); (m) ISVM DPC (not shown, e.g., for local query only); and (n) ISVM SSN (not shown, e.g., for local query only).

In the preferred embodiment, the Query LRN function 168 of the LNP GUI 124 displays the LRNs in, for example, ascending order by the following: (a) Service Provider ID 528H; and (b) LRN 528J. The Maintain LRN screen 528 further includes, for example, the Query button 528O to initiate the query, a Clear button 528P to clear the entered values, a Create button 528U, a Modify button 528N, a Delete button 528Q, a Print button 528R for printing the query results, a Row Count indicator 528S to indicate the number of rows in the query results, and a horizontal scroll bar button 528T.

Create LRN Function 170

Figure 4X:
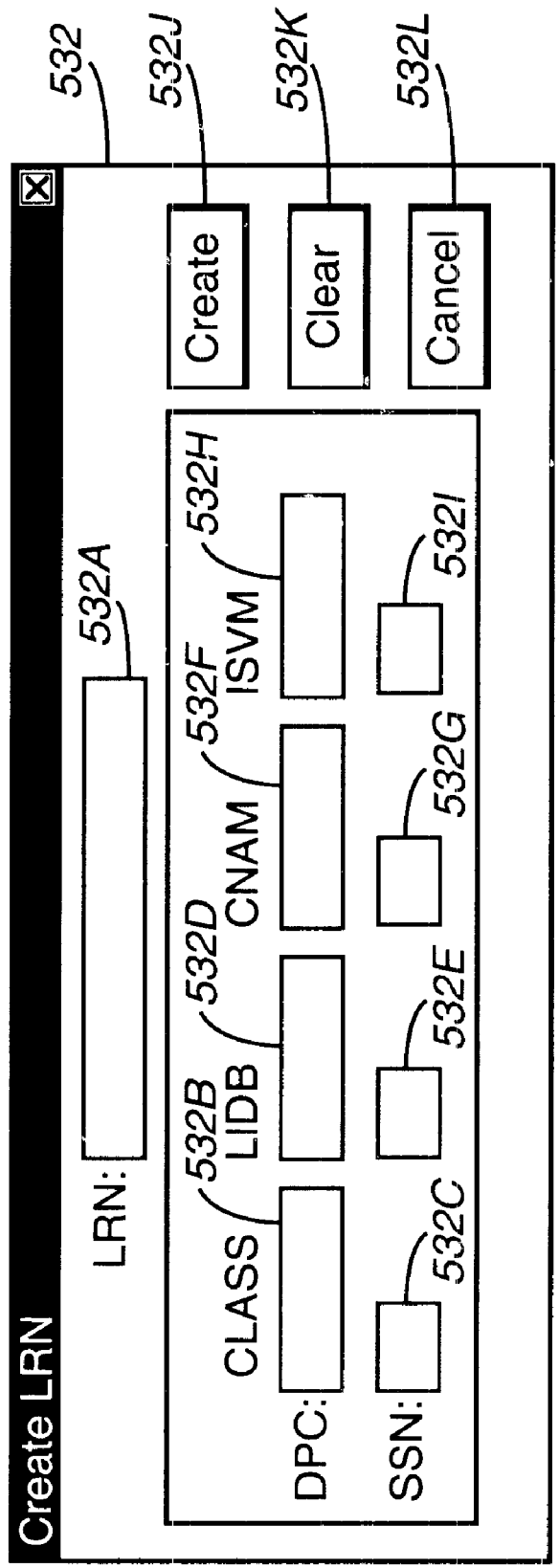

In the preferred embodiment, the Create LRN function 218 of the LNP GUI 124, to create an LRN, accepts, for example, the following information from the user as shown in Create LRN screen 532 of FIG. 4X via the user selecting the Create Button 528U: (a) LRN 532A; (b) Class DPC 532B; (c) Class SSN 532C; (d) LIDB DPC 532D; (e) LIDB SSN 532E; (f) CNAM DPC 532F; (g) CNAM SSN 532G; (h) ISVM DPC 532H; and (i) ISVM SSN 532I. In the preferred embodiment, elements (b) to (i) above are stored, for example, locally and not on the NPAC 30. The Create LRN screen 532 further includes, for example, a Create button 532J to initiate creation; a Clear button 532K to clear the entered values, and a Cancel Button 524L to cancel creation.

Delete LRN Function 220

In the preferred embodiment, the Delete LRN function 220 of the LNP GUI 124, to identify a LRN for deletion the user, for example, can: (a) Select a specific LRN from the Query Results window 528G, or (b) Specify the LRN or LRN range. The user completes the deletion by selecting a Delete button 528Q and the LNP GUI 124, for example, prompts the user via a confirmation screen (not shown) to confirm the deletion of the specified LRN.

Reconcile with NPAC Function 208

Figure 4Y:
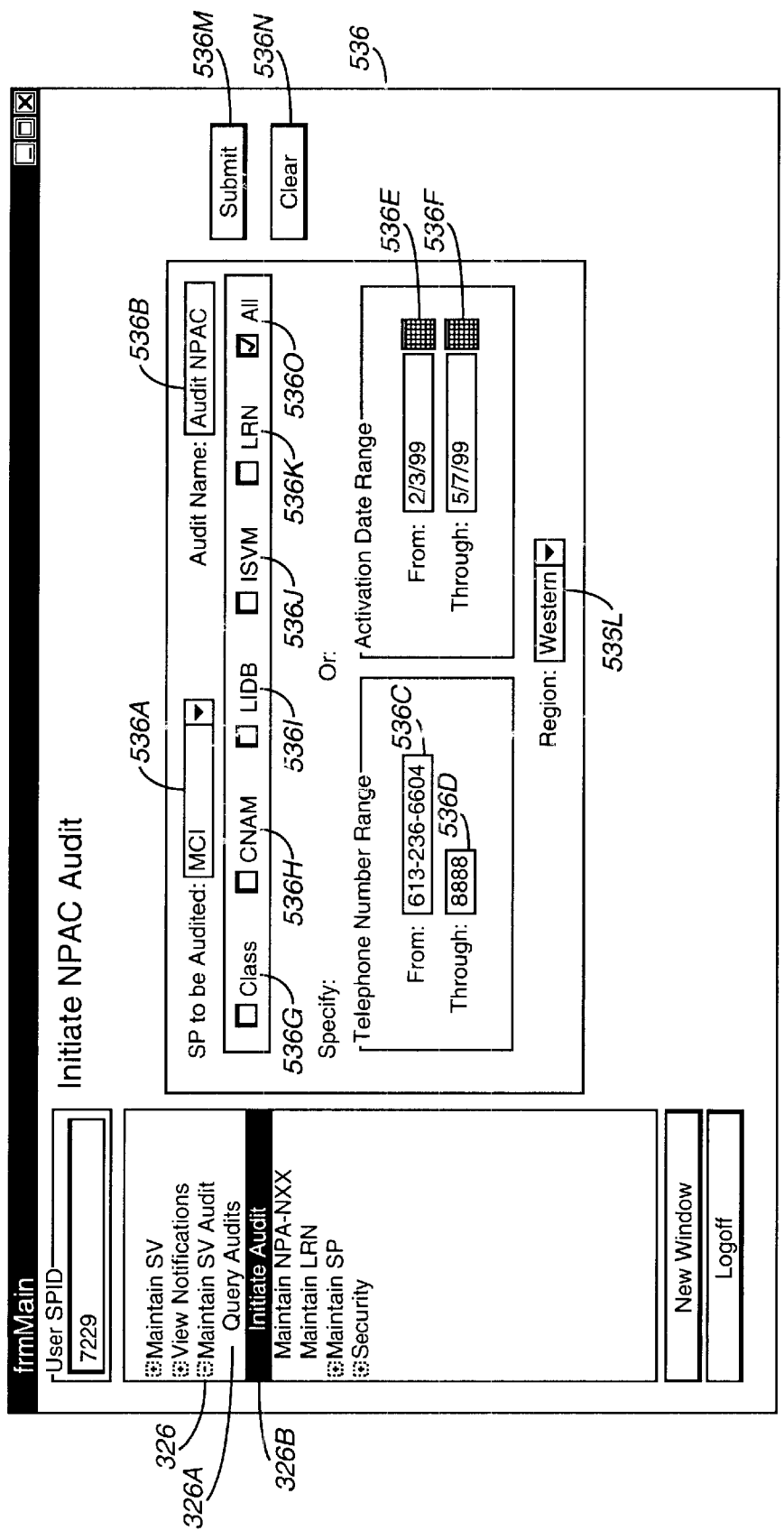

The following discussion describes the features of the preferred embodiment of the LNP GUI 124 Reconcile with NPAC function 208. When a user selects the Initiate Audit hierarchical list item 326b of the Maintain SV Audit hierarchical list 326 corresponding to the Reconcile with NPAC function 208 of the LNP GUI 124, the Initiate NPAC Audit screen 536 as shown, for example, in FIG. 4Y is generated by the LNP GUI 124.

In the preferred embodiment, the Reconcile with NPAC function 208 of the LNP GUI 124 includes, for example, the Initiate Audit function 210, the Cancel Audit function 212, the Query Audit Status function 214, and the View Audit Details function 216 and relates to initiating and canceling audit requests and displaying the audit results. An audit request is sent to the NPAC/SMS 30 to determine if there are any discrepancies between LNP data stored on the NPAC 74 and that stored on the local SMS 74. If any discrepancies are found, the NPAC 74 makes the appropriate changes on the local SMS 74.

Initiate Audit Function 210 Features

In the preferred embodiment, the Initiate Audit function 210 of the LNP GUI 124, for example, initiates and sends audit requests to the NPAC/SMS 30 via the Initiate Audit hierarchical list item 326b.

In the preferred embodiment, the Initiate Audit function 210, to initiate an audit request to the NPAC 74, accepts, for example, the following information from the user as shown in Initiate NPAC Audit screen 536 of FIG. 4Y: (a) Service Provider to be audited drop down list 536A; (b) Audit Name 536B; (c) Telephone Number Start 536C; (d) Telephone Number End 536D; (e) Activation Start Time 536E; (f) Activation End Time 536F; (g) indicators for, for example, the following in the audit: (i) Class 536G, (ii) CNAM 536H, (iii) LIDB 536I, (iv) ISVM 536J, (v) LRN 536K, and (vii) All fields selector 536O; and (h) Region Indicator drop down list 536L. The Initiate NPAC Audit screen 536 further includes, for example, a Submit button 536M for initiating the audit request for information supplied by the user and a Clear button 536N to clear the entered values.

In the preferred embodiment, the Initiate Audit function 210 of the LNP GUI 124, for example, performs the following validations on information supplied by the user: (a) Audit Name 536B must be supplied; (b) one or both of the following ranges must be supplied: (i) Telephone Number Start and End 536C, 536D, and (ii) Activation Start and End Time Stamps 536E, 536F and Region Indicator 536L.

In the preferred embodiment, for example, the audited Service Provider ID/Name 536A for the Initiate Audit function 210 must be supplied.

In the preferred embodiment, the Initiate Audit function 210, for example, sets the following defaults when the information for these fields is not supplied by the user: (a) Audit Name 536B defaults to the user's User Id concatenated with the current date; (b) Activation Start Time Stamp 536E defaults to Jan. 1, 1995; (c) Activation End Time Stamp 536F defaults to current date and time; (d) the audit will include all of the following LNP attributes if none of these has been individually specified by the user: (i) Class 536G, (ii) CNAM 536H, (iii) LIDB 536I, (iv) ISVM 536J, and (v) LRN 536K; and (e) the audited Service Provider ID/Name 536A defaults to the logged on user's configured Service Provider ID and the name associated with it.

In the preferred embodiment, the Initiate Audit function 210, for example, informs the user that the audit was successfully initiated and displays the Audit ID, and Service Provider ID and Name (not shown).

In the preferred embodiment, the Initiate Audit function 210, for example, allows the user to select the Service Provider to audit from the Service Provider ID/Name drop down list 376A that contains all Service Provider ID's and a value of "ALL" (not shown).

Query Audit Status Function 214 Features

In the preferred embodiment, the Query Audit Status function 214 of the LNP GUI 124, for example, performs a query to display a list of audit requests that have been sent to the NPAC/SMS 30 via the Query Audits hierarchical list item 326a.

Figure 4Z:
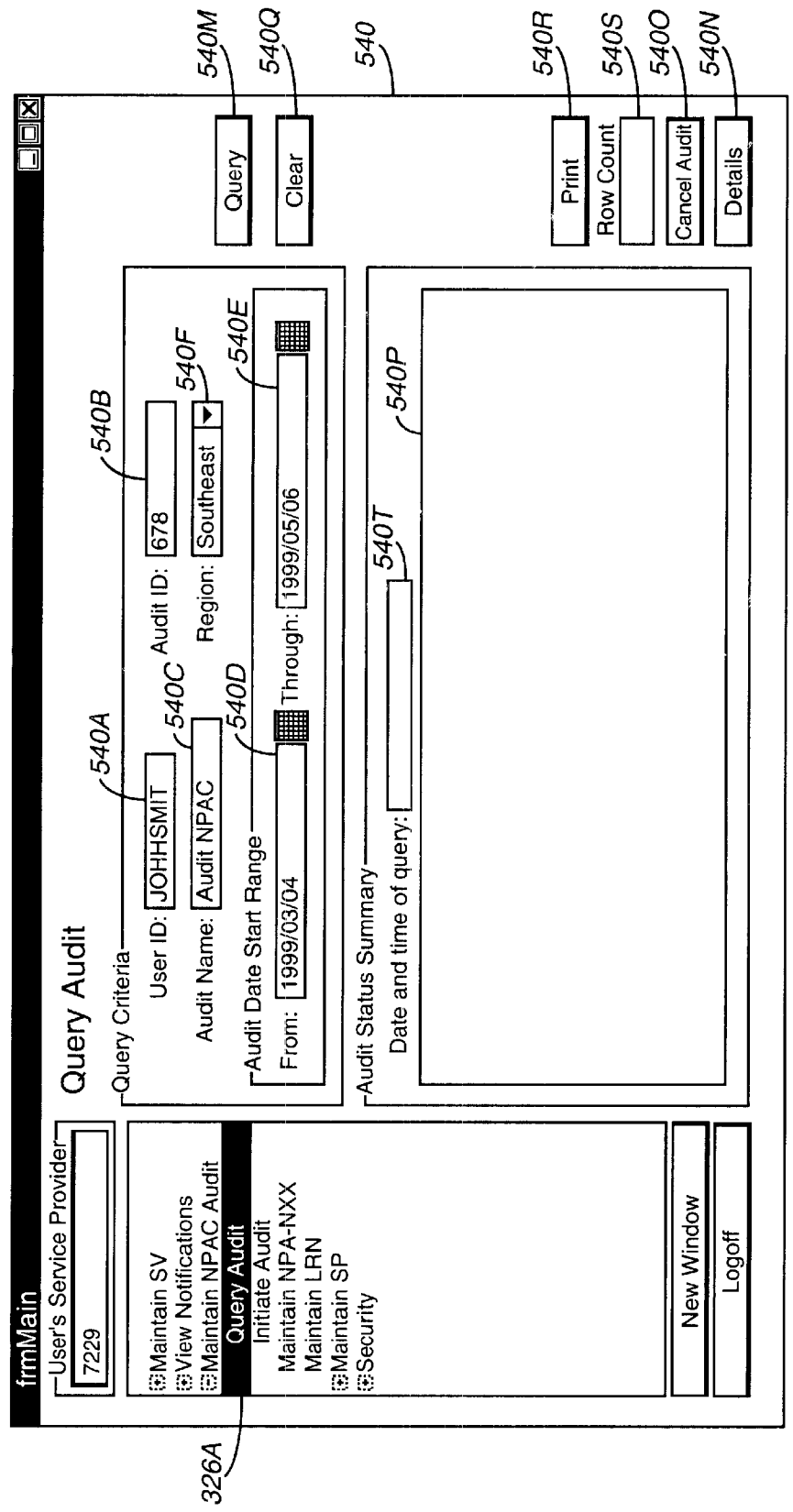
Figure 4A:
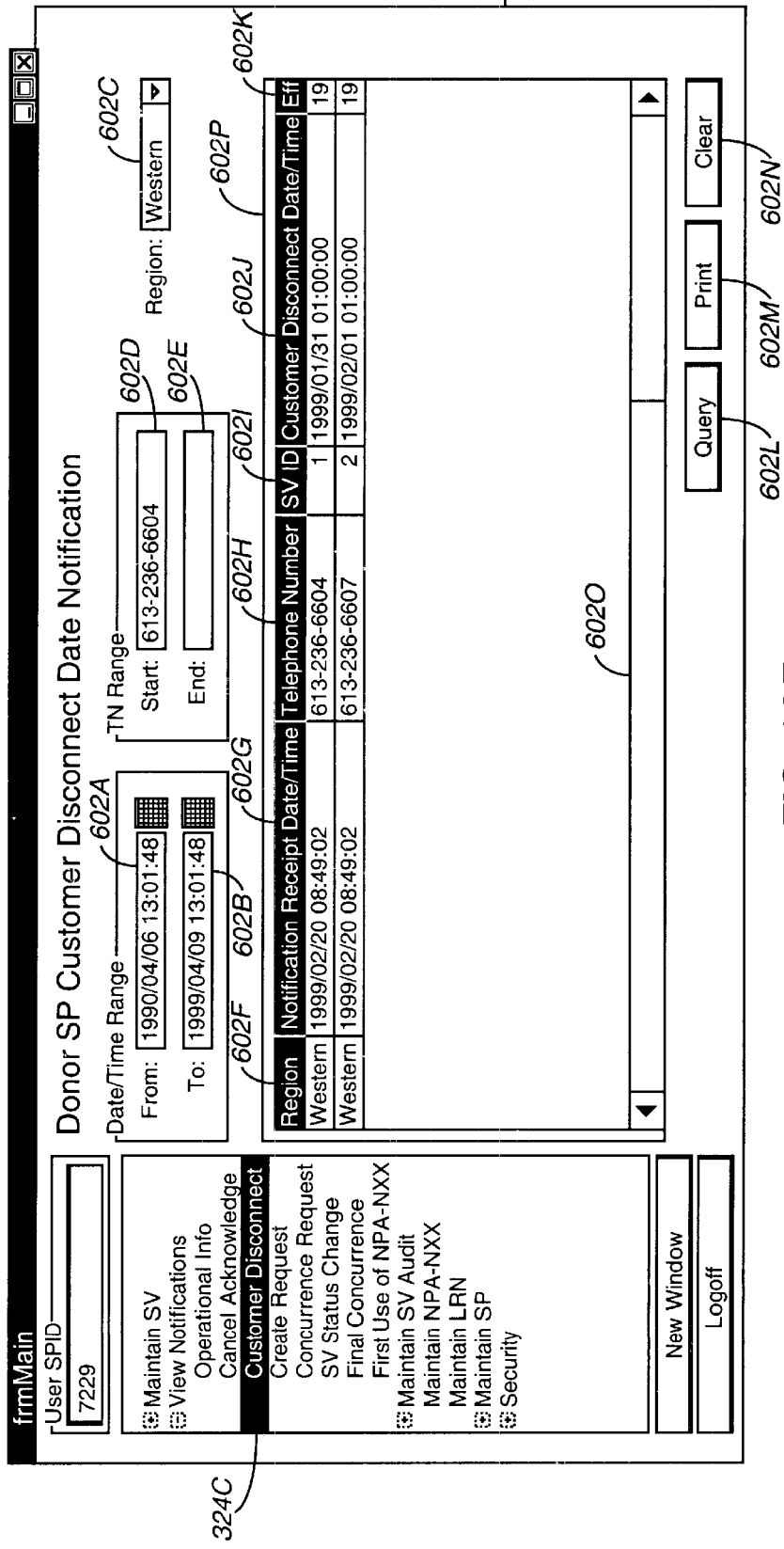
Figure 4A:
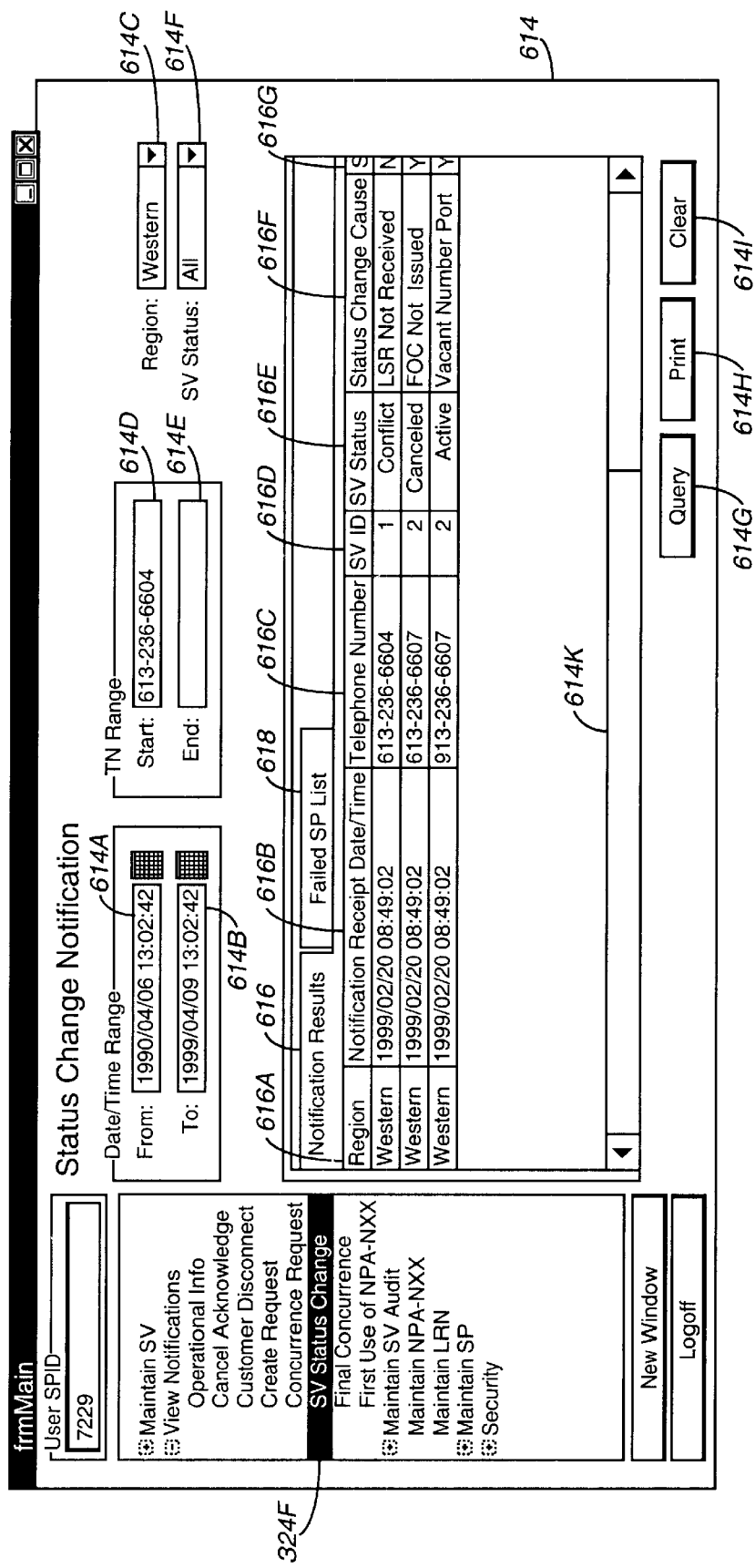
Figure 4A:
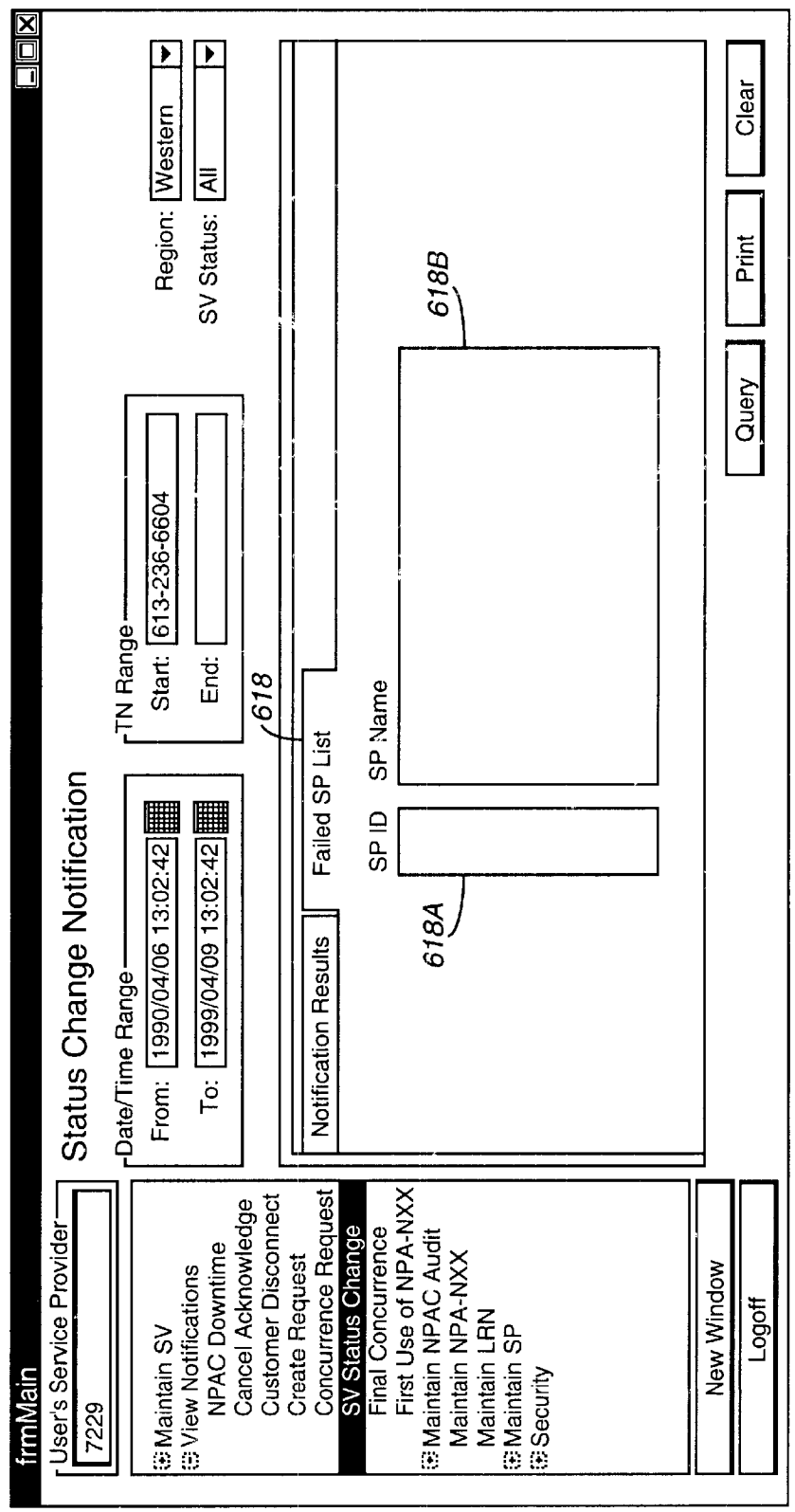
Figure 4A:
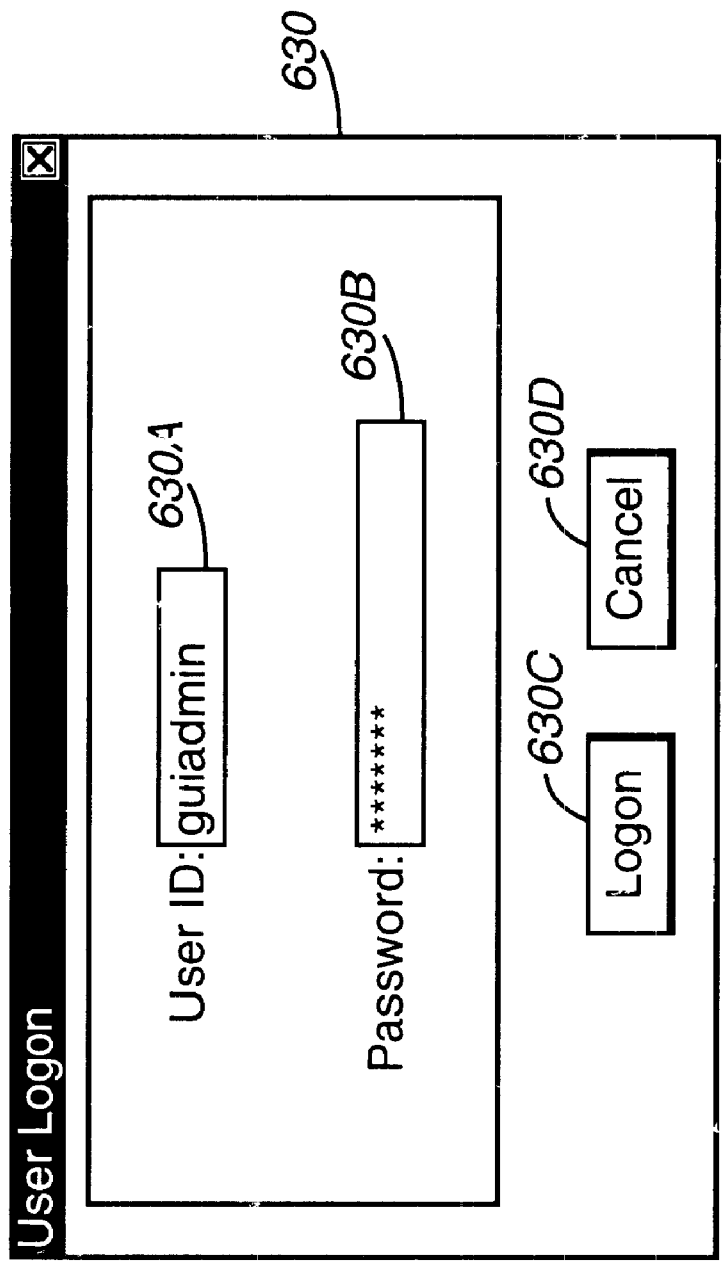
Figure 4A:
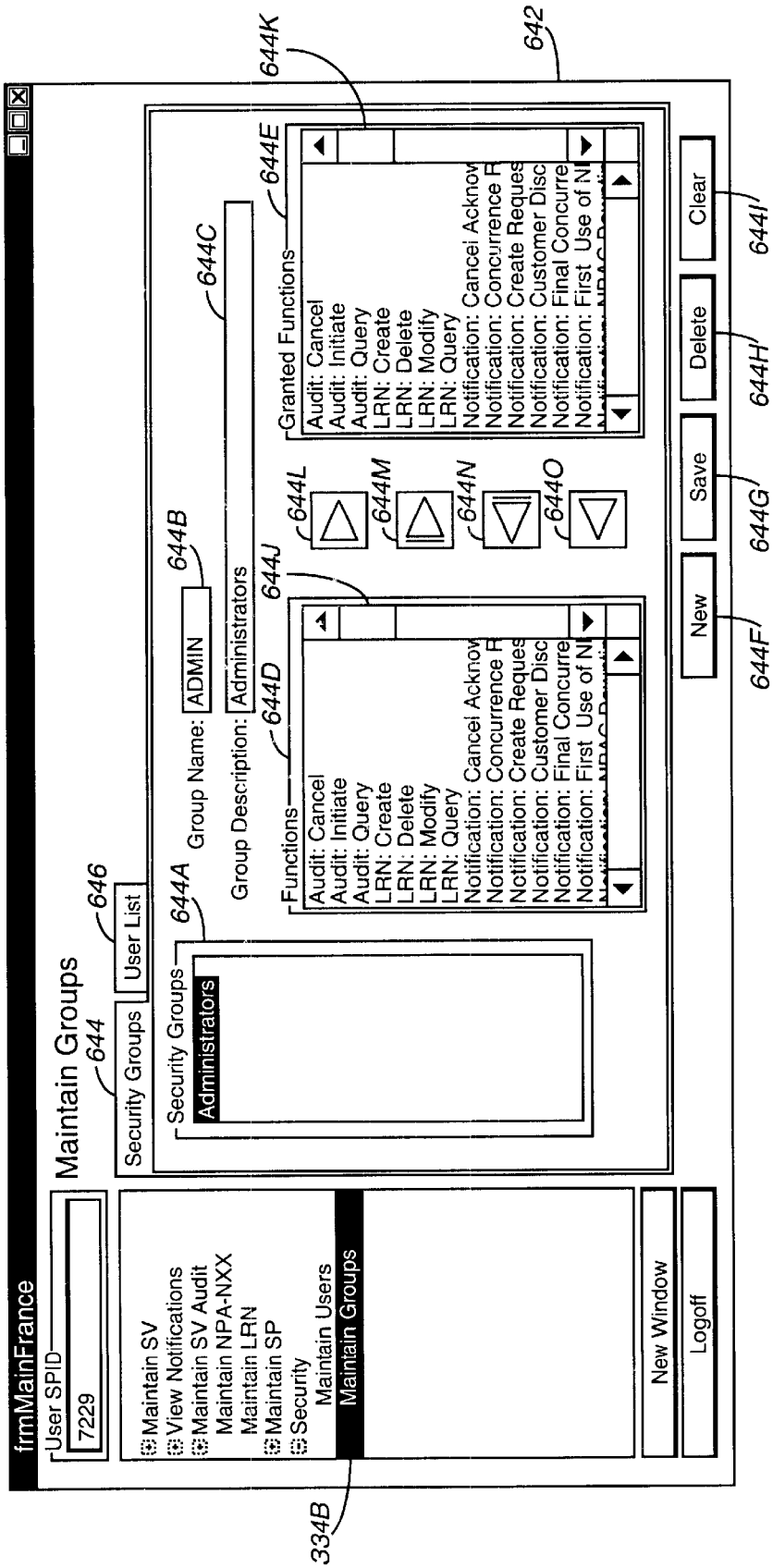
Figure 4A:
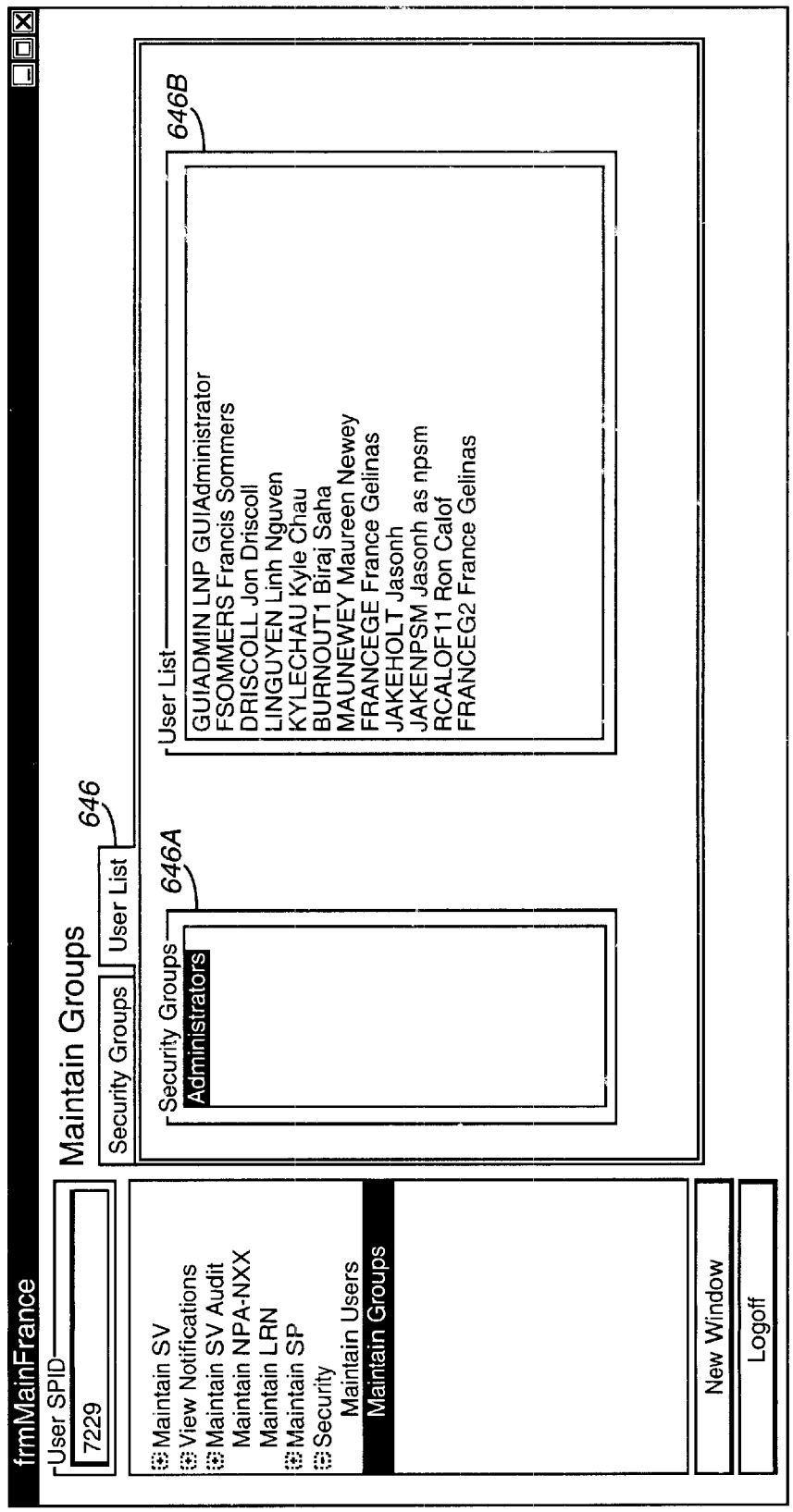

In the preferred embodiment, the Query Audit Status function 214, to request an audit status, accepts, for example, the following selection criteria from the user as shown in Query Audit screen 540 of FIG. 4Z: (a) User ID 540A; (b) Audit ID 540B; (c) Audit Name 540C; (d) Audit Start Time 540D; (e) Audit End Time 540E; and (f) Region Indicator drop down list 540F. The Query Audit screen 540 further includes, for example, a Query button 540M for initiating the query, a Details button 540N for providing audit status details, a Cancel button 540O for cancelling audit requests, a Clear button 540Q to clear the entered values, a Print button 540R for printing the query results, a Row Count indicator 540S to indicate the number of rows in the query results, an Audit Status Summary window 540P, and a Date and time of query 540T.

In the preferred embodiment, the User ID 540A in the selection criteria of the Query Audit Status function 214, will, for example, be used as a local data element only in order to track audits initiated by users.

In the preferred embodiment, when the user initiates a query via the Query button 540M, the Query Audit Status function 214, will, for example, display all audit requests meeting the selection criteria, regardless of the status of the audit.

In the preferred embodiment, the Query Audit Status function 214 will display in Audits Suspended or Audits in Progress details in the Audit Status Summary window 540P, for example, the following information for each audit request that meets the selection criteria: (a) Audit ID (not shown); (b) Audited Service Provider ID (not shown) and Name (not shown); (c) User ID (not shown) of the user who initiated the audit; (d) Audit Name (not shown); (e) Audit Status (not shown); and (f) Creation Time Stamp (not shown).

In the preferred embodiment, the Query Audit Status function 214, will, for example, only display those audits that were initiated by users associated with the same Service Provider as that associated with the user who performed the query, and designate an audit's status as "Incomplete" when the association between the SOA 48 and the NPAC 30 is lost at any time during execution of the audit.

View Audit Details Function 216 Features

In the preferred embodiment, the View Audit Details function 216 of the LNP GUI 124, for example, allows viewing of the details of an audit via selection of the Details button 540N.

In the preferred embodiment, the View Audit Details function 216, for example, allows a user to select an audit request from the query results in the Audit Status Summary window 540P in order to view the details of the results of the selected audit, via selection of the Details button 540N, and which generates the Audit Details screen 544 of FIG. 4AA.

In the preferred embodiment, the View Audit Details function 216, for example, provides the capability for the user to proceed directly from the Query Audit Status function 214 to the View Audit Details function 216 via selection of the Details button 540N.

In FIG. 4AA, the Audit Details screen 544 includes, for example, a Results Report form 546, a Discrepancy Report form 548 and a Scope of Audit form 550.

In the preferred embodiment, the Results Report form 546, for example, displays audit results information when the user selects an Audit ID and views the audit details as shown in, for example, FIG. 4AA, wherein the audit results information is, for example, as follows: (a) User ID of user who initiated the audit 546A; (b) Audit Name 546B and ID 546D; (c) Service Provider ID 546C associated with the user who initiated the audit; (d) Result Status 546E; (d) Number of discrepancies found 546F; (e) Completion time of the audit 546G; and (f) Result Time Stamp 546H.

In the preferred embodiment, the Discrepancy Report form 548 of the View Audit Details function 216, for example, displays audit discrepancies found when the user selects an audit ID and views the audit details as shown in, for example, FIG. 4AB wherein the audit discrepancy information is, for example, as follows: (a) Audit ID 548D and Name 548B; (b) Service Provider ID 548C of LSMS that was audited; (c) User ID 548A; (d) Subscription Version ID 548Q; (e) Telephone Number 548R; (f) Time Stamp of Audit 548S; (g) indicators of whether TN was missing from either NPAC 548T or LSMS 548U; and (h) Failure Reason consisting of, for example, the following: (i) LSMS LRN 548V, (ii) NPAC LRN 548W, (iii) LSMS New SPID 548X, (iv) NPAC New SPID 548Y, (v) LSMS Activation Timestamp 548Z, (vi) NPAC Activation Timestamp 548AA, (vii) LSMS CLASS DPC 548AB, (viii) NPAC CLASS DPC 548AC, (ix) LSMS CLASS SSN 548AD, (x) NPAC CLASS SSN 548AE, (xi) LSMS LIDB DPC 548AF, (xii) NPAC LIDB DPC 548AG, (xiii) LSMS LIDB SSN 548AH, (xiv) NPAC LIDB SSN 548AI, (xv) LSMS ISVM DPC 548AJ, (xvi) NPAC ISVM DPC 548AK, (xvii) LSMS ISVM SSN 548AL, (xviii) NPAC ISVM SSN 548AM, (xix) LSMS CNAM DPC 548AN, (xx) NPAC CNAM DPC 548AO, (xxi) LSMS CNAM SSN 548AP, (xxii) NPAC CNAM SSN 548AQ, (xxiii) LSMS End User Location Value 548AR, (xxiv) NPAC End User Location Value 548AS, (xxv) LSMS End User Location Type 548AT, (xxvi) NPAC End User Location Type 548AU, (xxvii) LSMS Billing ID 548AV, (xxviii) NPAC Billing ID 548AW, (xxix) LSMS LNP Type 548AX, and (xxx) NPAC LNP Type 548AY. In the preferred embodiment, the Discrepancy Report form further includes, for example, a move to first record button 548AZ, a move to last record button 548BA, a move one record forward button 548BC and a move one record backward button 548BB.

In the preferred embodiment, the Scope of Audit form 550 of the View Audit Details function 216, for example, displays the scope of the audit request when the user selects an Audit ID and views the audit details, as shown in, for example, FIG. 4AC wherein the scope information is, for example, as follows: (a) User ID of user who initiated the audit 550A; (b) Audit Name 550B and ID 540D; (c) Service Provider ID 550C associated with the user who initiated the audit; (d) Telephone Number Start 550E; (e) Telephone Number End 550F; (f) Activation Date Range start 550G; (g) Activation Date Range end 550H; (h) Region 550O and (i) indicators as to the selection of the following: (i) Class 550I, (ii) ISVM 550J, (iii) LRN 550K, (iv) LIDB 550L, (v) CNAM 550M and (vi) All fields selector 550N.

Cancel Audit Function 212 Features

In the preferred embodiment, the Cancel Audit function 212 of the LNP GUI 124, for example, allows cancelling audit requests that have been sent to the NPAC/SMS 30 via selection of the Cancel button 540O.

In the preferred embodiment, the Cancel Audit function 212, for example, allows a user to select an Audit ID from the list of query results in the Audit Status Summary window 540P in order to perform a cancel and provides the capability for the user to proceed directly from Query Audit Status function 214 to the Cancel Audit function 212 via selection of the Cancel button 540O.

In the preferred embodiment, the Cancel Audit function 212, for example, only allows cancellation of audits that are in progress or suspended, only permits cancellation of audits that were initiated by users associated with the same Service Provider as that associated with the user requesting the cancellation, and prompts the user to confirm the cancellation of the selected audit.

View Notifications Function 190 Features

The following discussion describes the features of the preferred embodiment of the LNP GUI 124 View Notifications function 190, for example, for querying notifications from the SOA 48 databases. Once queried, for example, notifications are updated to an "acknowledged" state on the SOA 48 databases, and are not retrieved again in future queries, unless specifically requested by the user. Notifications are received from the NPAC 30 on an unsolicited basis and are stored on the SOA 48 databases when they are received. When a user selects the Operational Info hierarchical list item 324a corresponding to the NPAC SMS Operations Information Notification function 192 of the View Notifications function 190 of the LNP GUI 124, a NPAC Downtime Notification screen 554 as shown, for example, in FIG. 4AD is generated by the LNP GUI 124.

In the preferred embodiment of the LNP GUI 124, the View Notifications hierarchical list 324 corresponding to the View Notifications function 190, for example, further includes Cancel Acknowledge hierarchical list item 324b corresponding to the Cancel/Acknowledge Request Notification function 194, Customer Disconnect hierarchical list item 324c corresponding to the DSP Disconnect Date Notification function 196, Create Request hierarchical list item 324d corresponding to the NSP Create Request Notification function 200, Concurrence Request hierarchical list item 324e corresponding to the OSP Concurrence Request Notification Request function 202, SV Status Change hierarchical list item 324f corresponding to the SAV Change Notification function 204, Final Concurrence hierarchical list item 324g corresponding to the OSP Final Concurrence Window Expiration Notification function 206, and First Use of NPA-NXX hierarchical list item 324h corresponding to the New NPA-NXX Notification function 198.

In the preferred embodiment, to query notifications, the View Notifications function 190 accepts, for example, the following selection criteria from the user that is generic for each type of notification: (a) Notification Receipt Timestamp Start; (b) Notification Receipt Timestamp End; (c) NPAC Region ID drop down list; (d) TN Start; and (e) TN End. In another embodiment, the View Notifications function 190 accepts, for example, the following additional selection criteria from the user that is generic for each type of notification: (f) Customer Name; (g) SV Status; and (h) indicator for Including Notifications Requiring Acknowledgment.

In the preferred embodiment, the TN Start, TN End, Customer Name, and SV Status fields are, for example, not applicable for the NPAC/SMS Operational Information Notification function 192.

In the preferred embodiment, for example, the Notification Receipt Timestamp Start defaults to current time minus 72 hours, the Notification Receipt Timestamp End defaults to current time, and the View Notifications function 190 displays notifications in reverse chronological order (i.e., starting with the most recent notification).

In the preferred embodiment, the View Notifications function 190 displays, for example, the following data for each notification that meets the selection criteria: (a) NPAC ID; (b) Notification Identifier; and (c) Notification Receipt Timestamp.

NPAC/SMS Operational Information Notification Function 192

In the preferred embodiment, the NPAC/SMS Operational Information Notification function 192 of the LNP GUI 124, for example, sends a notification to all service providers to inform them of NPAC/SMS's 30 scheduled down time and is shown, for example, in the NPAC Downtime Notification screen 554 of FIG. 4AD.

In the preferred embodiment, to query notifications, the View Notifications function 190 accepts, for example, the following query selection criteria from the user via selection of the Operational Info hierarchical list item 324a, for example, as shown in the NPAC Downtime Notification screen 554: (a) Notification Receipt Timestamp Start 554A; (b) Notification Receipt Timestamp End 554B; and (c) NPAC Region ID drop down list 554C. The NPAC Downtime Notification screen 554, for example, further includes a Query button 554J for initiating the query, a Clear button 554L to clear the entered values, a Print button 554K for printing the query results, and a horizontal scroll bar 554M.

In the preferred embodiment, the NPAC/SMS Operational Information Notification function 192 displays via the Query Button 554J, the following data to the user, for example, as shown in the NPAC Downtime Notification window 554D of screen 554: (a) Region 554E; (b) Notification Receipt Date/Time 554F; (c) NPAC Contact Phone Number 554G; (d) Downtime Start 554H; (e) Downtime End 554I; and (i) Additional Miscellaneous Downtime Information (not shown).

Cancel/Acknowledge Request Notification Function 194

In the preferred embodiment, the Cancel/Acknowledge Request Notification function 194 of the LNP GUI 124, for example, sends a notification to the new and old service providers to request a cancellation/acknowledgment for a subscription version that has a status of "cancel-pending." For example, before this notification is sent, a service provider has a tunable time frame specified by the NPAC/SMS 30, in which to send a cancellation acknowledgment for a cancel-pending subscription version. Failure to do so, for example, triggers this notification from the NPAC 30. Once this notification is sent, the service provider has, for example, a second tunable time frame in which to send the cancellation acknowledgment. Failure to do so for the second time will, for example, cause the NPAC/SMS 30 to update the status of the subscription version from "cancel-pending" to "conflict."

In the preferred embodiment, to query notifications, the Cancel/Acknowledge Request Notification function 194 accepts, for example, the following query selection criteria from the user via selection of the Cancel Acknowledge hierarchical list item 324b, for example, as shown in the Cancellation Acknowledge Request Notification screen 558 of FIG. 4AE: (a) Notification Receipt Timestamp Start 558A; (b) Notification Receipt Timestamp End 558B; (c) Telephone Number Start 558D; (d) Telephone Number End 558E; and (e) NPAC Region ID drop down list 558C. The NPAC Downtime Notification screen 558, for example, further includes a Query button 558J for initiating the query, a Clear button 558L to clear the entered values, and a Print button 558K for printing the query results.

In the preferred embodiment, the Cancel/Acknowledge Request Notification function 194 displays upon a user selecting the Cancel Acknowledge hierarchical list item 324b, for example, the following data to the user, for example, as shown in the Cancellation Acknowledge Request Notification screen 558: (a) Region 558F; (b) Notification Receipt Date/Time 558G; (c) Telephone Number 558H; and (d) Subscription Version ID 558I.

In the preferred embodiment, the Cancel/Acknowledge Request Notification function 194, for example, provides the capability for the user to proceed directly from this function to the Acknowledge Cancellation of SV function 184 via selection of the Cancel Acknowledge hierarchical list item 322g of the Maintain SV hierarchical list 322.

DSP Disconnect Date Notification Function 196

In the preferred embodiment, the Donor Service Provider (DSP) Disconnect Date Notification function 196 of the LNP GUI 124, for example, sends a notification to the donor service provider to inform the service provider that a subscription version is being disconnected.

In the preferred embodiment, to query notifications, the DSP Disconnect Date Notification function 196 accepts, for example, the following query selection criteria from the user via selection of the Customer Disconnect hierarchical list item 324c, for example, as shown in the Donor SP Customer Disconnect Date Notification screen 602 of FIG. 4AF: (a) Notification Receipt Timestamp Start 602A; (b) Notification Receipt Timestamp End 602B; (c) Telephone Number Start 602D; (d) Telephone Number End 602E; and (e) NPAC Region ID drop down list 602C. The Donor SP Customer Disconnect Date Notification screen 602, for example, further includes a Query button 602L for initiating the query, a Clear button 602N to clear the entered values, a Print button 602M for printing the query results and a horizontal scroll bar 602O.

In the preferred embodiment, the DSP Disconnect Date Notification Function 196 displays, for example, the following data to the user in the window 602P, for example, as shown in the Donor SP Customer Disconnect Date Notification screen 602: (a) Region 602F; (b) Notification Receipt Date/Time 602G; (c) Telephone Number 602H; (d) Subscription Version ID 602I; (e) Customer Disconnect Date/Time 602J; and (f) Effective Release Date 602K.

NSP Create Request Notification Function 200

In the preferred embodiment, the New Service Provider (NSP) Create Request Notification function 200 of the LNP GUI 124, for example, sends a notification to the new service provider to request a "Create As Gaining" for a subscription version for which the old service provider has already sent its "Create As Losing." For example, before this notification is sent, the new service provider has a tunable time frame specified by the NPAC/SMS 30, in which to send a create for a subscription version for which the old service provider has already submitted its own create. Failure to do so triggers this notification from the NPAC 30. Once this notification is sent, the new service provider, for example, has a second tunable time frame in which to send the create. Failure to do so for the second time will, for example, cause the NPAC/SMS 30 to update the status of the subscription version from "pending" to "canceled."

In the preferred embodiment, to query notifications, the NSP Create Request Notification function 200 accepts, for example, the following query selection criteria from the user via selection of the Create Request hierarchical list item 324d, for example, as shown in the New Service Provider Create Request Notification screen 606 of FIG. 4AG: (a) Notification Receipt Timestamp Start 606A; (b) Notification Receipt Timestamp End 606B; (c) Telephone Number Start 606D; (d) Telephone Number End 606E; and (e) NPAC Region ID drop down list 606C. The New Service Provider Create Request Notification screen 606, for example, further includes a Query button 606M for initiating the query, a Clear button 606N to clear the entered values, a Print button 606O for printing the query results and a horizontal scroll bar 606P.

In the preferred embodiment, the NSP Create Request Notification function 200 displays, for example, the following data to the user in the window 606Q, for example, as shown in the New Service Provider Create Request Notification screen 606: (a) Region 606F; (b) Notification Receipt Date/Time 606G; (c) Telephone Number 606H; (d) Subscription Version ID 606I; (e) Old Service Provider ID 606J; (f) Old Service Provider Authorization 606K; (g) Old Service Provider Authorization Date 606L; (h) Old Service Provider Due Date (not shown); and (i) Status Change Cause Code (not shown).

In the preferred embodiment, the NSP Create Request Notification function 200, for example, provides the capability for the user to proceed directly from this function to the Create As Gaining SV function 172 via selection of the Create as Gaining hierarchical list item 322b of the Maintain SV hierarchical list 322.

OSP Final Concurrence Request Notification Function 202

In the preferred embodiment, the Old Service Provider (OSP) Concurrence Request Notification function 202 of the LNP GUI 124, for example, sends a notification to old service provider to request a "Create As Losing" subscription version for which the new old service provider has already sent its "Create As Gaining." For example, before this notification is sent, the old service provider has a tunable time frame specified by the NPAC/SMS 30, in which to send a create for a subscription version for which the new service provider has already submitted its own create. Failure to do so, for example, triggers this notification from the NPAC 30. Once this notification is sent, the old service provider has, for example, a second tunable time frame in which to send the create. Because the create from the old service provider is an optional step as specified by the NPAC/SMS 30, failure to send the create after this notification has been sent, for example, will not impact the status of the subscription version. Upon expiration of the second time frame, with or without the create from the old service provider, the new service provider, for example, may proceed with activation of the subscription version. The old service provider, for example, receives the OSP Final Concurrence Window Expiration Notification when the second time frame expires.

In the preferred embodiment, to query notifications, the OSP Concurrence Request Notification function 202 accepts, for example, the following query selection criteria from the user via selection of the Concurrence Request hierarchical list item 324e, for example, as shown in the Old SP Concurrence Request Notification screen 610 of FIG. 4AH: (a) Notification Receipt Timestamp Start 610A; (b) Notification Receipt Timestamp End 610B; (c) Telephone Number Start 610D; (d) Telephone Number End 610E; and (e) NPAC Region ID drop down list 610C. The Old SP Concurrence Request Notification screen 610, for example, further includes a Query button 610M for initiating the query, a Clear button 610N to clear the entered values, a Print button 610O for printing the query results and a horizontal scroll bar 610P.

In the preferred embodiment, the OSP Concurrence Request Notification function 202 displays, for example, the following data to the user in the window 606Q, for example, as shown in the Old SP Concurrence Request Notification screen 610: (a) Region 610F; (b) Notification Receipt Date/Time 610G; (c) Telephone Number 610H; (d) Subscription Version ID 610I; (e) New Current Service Provider ID 610K; (f) New Service Provider Due Date 610L; and (g) Subscription Version Create Date (not shown).

In the preferred embodiment, the OSP Concurrence Request Notification function 202, for example, provides the capability for the user to proceed directly from this function to the Create As Losing SV function 174 via selection of the Create as Losing hierarchical list item 322c of the Maintain SV hierarchical list 322.

SAV Change Notification Function 204

In the preferred embodiment, the Status Attribute Value (SAV) Change Notification function 204 of the LNP GUI 124, for example, sends a notification to the new and old service providers to inform them of changes to the subscription version status attribute.

In the preferred embodiment, to query notifications, the SAV Change Notification Function 204 accepts, for example, the following query selection criteria from the user via selection of the SV Status Change hierarchical list item 324f, for example, as shown in the Status Change Notification screen 614 of FIG. 4AI: (a) Notification Receipt Timestamp Start 614A; (b) Notification Receipt Timestamp End 614B; (c) Telephone Number Start 614D; (d) Telephone Number End 614E; (e) NPAC Region ID drop down list 614C and (f) SV Status drop down list 614F. The Status Change Notification screen 614, for example, further includes a Query button 614G for initiating the query, a Clear button 614I to clear the entered values, a Print button 614H for printing the query results, a horizontal scroll bar 614K, Notification Results form 616 and Failed SP List form 618.

In the preferred embodiment, the SAV Change Notification Function 204 displays, for example, the following data to the user in the window 614J, for example, as shown in the Notification Results form 616: (a) Region 616A; (b) Notification Receipt Date/Time 616B; (c) Telephone Number 616C; (d) Subscription Version ID 616D; (e) Subscription Version Status 616E; (f) Status Change Cause Code 616F; and (g) Failed Service Provider indication 616G.

In the preferred embodiment, the SAV Change Notification Function 204 displays, for example, the following data to the user in the window 614J, for example, as shown in the Failed SP List form 618 of FIG. 4AJ: (a) SP ID 618A; and (b) SP Name 618B.

OSP Final Concurrence Window Expiration Notification Function 206

In the preferred embodiment, the Old Service Provider (OSP) Final Concurrence Window Expiration Notification function 206 of the LNP GUI 124, for example, sends a notification to the old service provider to inform the service provider of the expiration of the Final Concurrence Timer. For example, this timer is for the second tunable time frame in which the old service provider may send a "Create As Losing" for a subscription version for which the new service provider has already sent its "create as gaining." Prior to receiving this notification. the old service provider, for example, would have received the OSP concurrence request notification, as previously described.

In the preferred embodiment, to query notifications, the OSP Final Concurrence Window Expiration Notification function 206 accepts, for example, the following query selection criteria from the user via selection of the Final Concurrence hierarchical list item 324g, for example, as shown in the Final Concurrence Window Expiration Notification screen 622 of FIG. 4AK: (a) Notification Receipt Timestamp Start 622A; (b) Notification Receipt Timestamp End 622B; (c) Telephone Number Start 622D; (d) Telephone Number End 622E; and (e) NPAC Region ID drop down list 622C. The Final Concurrence Window Expiration Notification screen 622, for example, further includes a Query button 622J for initiating the query, a Clear button 622L to clear the entered, values, and a Print button 622K for printing the query results.

In the preferred embodiment, the OSP Final Concurrence Window Expiration Notification function 206 displays, for example, the following data to the user in the window 622M, for example, as shown in Final Concurrence Window Expiration Notification screen 622: (a) Region 622A; (b) Notification Receipt Date/Time 622B; (c) Telephone Number 622C; and (d) Subscription Version ID 622D.

New NPA-NXX Notification Function 198

In the preferred embodiment, the New NPA-NXX Notification function 198 of the LNP GUI 124, for example, sends a notification to all service providers to inform them of a pending subscription version involving a new NPA-NXX (i.e., first use of a NPA-NXX).

In the preferred embodiment, to query notifications, the New NPA-NXX Notification function 198 accepts, for example, the following query selection criteria from the user via selection of the First Use of NPA-NXX hierarchical list item 324h, for example, as shown in the First TN Port For NPA NXX Notification screen 626 of FIG. 4AL: (a) Notification Receipt Timestamp Start 626A; (b) Notification Receipt Timestamp End 626B; and (c) NPAC Region ID drop down list 626C. The First TN Port For NPA NXX Notification screen 626, for example, further includes a Query button 626K for initiating the query, a Clear button 626M to clear the entered values, and a Print button 626L for printing the query results.

In the preferred embodiment, the New NPA-NXX Notification function 198 displays, for example, the following data to the user in the window 626N, for example,. as shown in the First 20 TN Port For NPA NXX Notification screen 626: (a) Region 626F; (b) Notification Receipt Date/Time 626G; (c) NPA-NXX 626H; (d) Service Provider ID 626I; and (e) Effective Date 626J.

LNP GUI 124 System Support Functionality

The following sections describe exemplary system support and functionality features of the preferred embodiment of the LNP GUI 124.

Security

The LNP GUI 124 provides sufficient security to protect sensitive data maintained by the system. The following features describe LNP GUI 124 security at the session/network, function, and data access levels.

Session Security

In the preferred embodiment, the LNP GUI 124 restricts access to all data items to, for example, authorized personnel only. For example, the BF/W 122 personnel are not be authorized to access MCIT 120 service order 130 data.

In the preferred embodiment, the LNP GUI 124, for example, restricts access of functions and sub-functions to authorized personnel only. For example, (a) some users are restricted from executing queries of NPAC 30 data; (b) users are assigned access ability through a series of configurable user/group profiles; (c) the security system uniquely identifies all users; and (d) a user is allowed to have up to five concurrent sessions (i.e., with the same User Id) with a common logon and logoff.

In the preferred embodiment, the LNP GUI 124 ensures that in the event of failure (i.e. abnormal termination), it is impossible to restart the LNP GUI 124 without going through Logon/Logoff security.

Logon

In the preferred embodiment, for example, the following features apply when a LNP GUI 124 user signs on to the application as shown in, for example, User Logon screen 630 of FIG. 4AM: (a) authorized users are able to access the system and initiate a session; (b) a user must enter a valid User Id 630A and Password 630B to logon; (c) failure of a logon attempt generates an application log indicating the User Id and reason for failure; and (d) the user account is disabled when the maximum (e.g., tunable) allowable number of unsuccessful logon attempts is reached. The User Logon screen 630 further includes, for example, a Logon button 630C for initiating the logon, and a Cancel button 630D for cancelling the logon.

Logoff

In the preferred embodiment, for example, the following features apply to LNP GUI 124 users logging off: (a) logged on users are able to disconnect from the LNP GUI 124 system via Logoff button 340 of FIG. 4A; and (b) once initiated, the Logoff function is irreversible.

In the preferred embodiment of the LNP GUI 124, for example, no confirmation window will be displayed when logging off or closing windows except where otherwise specified.

User Id/Password

In the preferred embodiment, for example, the following features apply to LNP GUI 124 User IDs and Passwords: (a) passwords are not case sensitive; (b) passwords are never displayed or accessible to anyone on the system; (c) users are able to change their password; (d) users are required to change their passwords after a tunable number of days; (e) passwords are at least four characters in length; (f) passwords support the use of any of all the possible characters in the alphanumeric 7 bit ASCII character set; (g) passwords cannot be changed back to the three most recently used passwords; (h) when the password is entered incorrectly four times (e.g., configurable) in a row, the user account is automatically suspended; (i) the system administrator is able to reactivate suspended accounts; 0) the system administrator is able to reset a user's password; (k) a user is forced to change their password after it has been reset by the system administrator; (l) the system administrator is responsible for the administration of users and their accounts; and (m) the system administrator is assigned access ability through a series of configurable user/group profiles.

FIG. 4AN shows, for example. Password Change screen 634, generated via the Change Password hierarchical list item 334c of the Security hierarchical list 334 of FIG. 4AO, including, for example, Old Password field 634A for entering an old password, New Password field 634B for entering a new password and Verify Password field 634C for verifying the new password. The Password Change screen 634, for example, further includes a Change button 634D for initiating the password change and a Cancel button 634E for cancelling the change of password.

User Profiles and Security Groups

In the preferred embodiment of the LNP GUI 124, for example, maintenance of all user profiles and security groups is the responsibility of the system administrator and: (a) authorized users are able to create a new User; (b) authorized users are able to modify a User Profile; (c) authorized users are able to delete a User from the system (e.g., this will be a physical delete, rather than a logical delete); (d) the User Profile information includes, for example, the following information: (i) password, (ii) user name, (iii) telephone number, (iii) Security Group (e.g., one per user), (iv) User Id Status (e.g., active or suspended), and (v) Service Provider ID; (e) once a User Id has been created it cannot be modifiable; (f) authorized users are able to create a new Security Group; (g) authorized users are able to modify a Security Group; (h) authorized users are able to delete a Security Group that contains no active users; (i) a Security Group contains a list of users, modifiable by an authorized user; (j) a user can belong to at most one Security Group; and (k) authorized users are able to choose predefined functionality to be made available to a Security Group (e.g., the pre-defined functionality will be defined and maintained outside the LNP GUI 124, i.e., level of access by function, for example, view, update, delete, etc.); and (1) once identified and authenticated, users are only permitted access to those functions assigned to their Security Group.

In the preferred embodiment of the LNP GUI 124, the selection of the Maintain User hierarchical list item 334a of the Security hierarchical list 334 generates the Maintain User screen 638, as shown in, for example, FIG. 4AO. In FIG. 4AO, the Maintain User screen 638, for example, includes: (a) Users selection window 638A; (b) a User ID field 638B; (c) a Security Group drop down list 638C; (d) a User Name field 638D; (e) a Telephone Number field 638E; (o) a Service Provider ID drop down list 638F; (g) a New Password field 638G; (h) a Verify New Password field 638H; (i) an Active Status selector 638I; (j) a Suspended Status selector 638J; (k) a Time Zone drop down list 638K; (1) a Daylight Savings Time drop down list 638L; (m) a Password last changed time stamp 638M; and (n) an Invalid log counter 638N. The Maintain User screen 638 further includes, for example, a New button 638O for adding new users, a Save button 638P for saving entered data, a Delete button 638Q for deleting a user and a Clear button 638R to clear the entered values.

In the preferred embodiment of the LNP GUI 124, the selection of the Maintain Groups hierarchical list item 334b of the Security hierarchical list 334 generates the Maintain Groups screen 642, as shown in, for example, FIG. 4AP. In FIG. 4AP, the Maintain Groups screen 642, for example, includes a Security Groups form 644 and a User List form 646.

The Security Groups form 644, for example, includes: (a) a Security Groups selection window 644A; (b) a Group Name field 644B; (c) a Group description field 644C; (d) a Functions window 644D; and (e) a Granted Functions window 644E. The Security Groups form 644 further includes, for example, a New button 644F for adding new groups, a Save button 644G for saving entered data, a Delete button 644H for deleting a group, a Clear button 644I to clear the entered values, vertical scroll bars 644J and 644K, move selected item(s) to the right and left buttons 644L and 644O, and move all items to the right and left buttons 644M and 644N.

The User List form 646, for example, as shown in FIG. 4AQ includes: (a) a Security Groups selection window 646A; and (b) a User List 646B.

Data Security

In the preferred embodiment, the LNP GUI 124, for example, ensures that the integrity of the system data is maintained. To achieve this level the LNP GUI 124 provides the following features: (a) data cannot be viewed or updated other than through the appropriate security modules (e.g., a user will not be able to gain access to the database that supports the LNP GUI 124 using a third party software package).

The LNP GUI 124 System Platform Features

In the preferred embodiment, the following System Platform Features section addresses the operational functionality and performance type features for the LNP GUI 124.

Response Times for User Commands

In the preferred embodiment of the LNP GUI 124, the response time targets apply to using the LNP GUI 124, for example, via an internal LAN and not a dial up line wherein: (a) the LNP GUI 124 has logon/logoff times of 0 to 7 seconds (e.g., from entry of User Id and password it to system available for work); (b) the LNP GUI 124 response time, on average, for-execution of any user command is less than five seconds (e.g., the response time is limited to those actions performed by the LNP GUI 124 client and server processes and actions performed by other sub-systems and/or external systems, e.g., NPAC 30, are excluded from this target response time); (c) the LNP GUI 124 executes in background mode any detachable processes that do not require the user to monitor progress or provide a response (e.g., NPAC 30 or local SMS 74 audits); and (d) the LNP GUI 124 displays a system busy indicator (e.g., hour glass) whenever the LNP GUI 124 is waiting for a response from other processes that is greater than two seconds.

Consistency and Concurrency

In the preferred embodiment, for example, in order to maintain confidence in the data within the LNP GUI 124 system, there is a common approach to the entry of all data elements in order to achieve a high level of integrity for all data elements, for example, as follows: (a) the LNP GUI 124 prevents dual-entry of data (e.g., the GUI will "carry" data from one screen to another where applicable); (b) where possible the use of pick lists and field validation are used; (c) the LNP GUI 124 validation of user input is consistent with validation performed against input provided to LNP from other MCIT 120 upstream systems; (d) records which are not complete or which have erroneous data are identified (e.g., incomplete NPAC 30 or local SMS 74 audit results due to SOA 48 downtime, i.e., missed notifications); (e) transaction logging identify all changes to important data; (f) to maintain the integrity of data, the LNP GUI 124 disallows partial completion of operations due to system faults occurring during a transaction (e.g., the data repositories will be returned to the state immediately before the transaction was issued); and (g) where multiple users from different PCs request operations on the same resources or data, the LNP GUI 124 arbitrates access in a mutually exclusive manner.

Availability

In the preferred embodiment, the LNP GUI 124 will be available, for example, 99.5% of the time on a 24 hour 7 day basis.

System Software Features

This section describes software features of the preferred embodiment of the LNP GUI 124 system.

Development Environment Features

In the preferred embodiment, the LNP GUI 124 application, for example, was developed using Silverstream™ version 2.0.

Operating System Features

In the preferred embodiment, the LNP GUI 124 application servers, for example, run under Microsoft NT™ and the LNP GUI 124 is capable of, for example, using Microsoft Internet Explorer™ or NetScape™.

DBMS Features

In the preferred embodiment, the DBMS that supports the LNP GUI 124 application is consistent with, for example, the Oracle™ versions being run on other systems.

Communications

In the preferred embodiment, for example: (a) the LNP GUI 124 uses an IP based network communication protocol to communicate with non-local processes; (b) access to the LNP GUI 124 is through a telecommunications service provider's corporate intranet; and (c) the LNP GUI 124 is accessible via a telecommunications service provider's WAN and remote dial-up.

Operational Volumetrics

This section describes operational volumetrics of the preferred embodiment of the LNP GUI 124 system.

Support Users/Sessions Numbers

In the preferred embodiment, the LNP GUI 124 will support, for example, 100–200 users including up to 20–40 dial-up, with 400–800 concurrent sessions (noting that a user can have more than one concurrent session).

Subscription Version Create Volumes

In the preferred embodiment, the LNP GUI 124 supports, for example, entry of up to 150,000 Subscription Version entries per month. This is based on the following 1998 year-end volumes: (a) a first telecommunications service provider: 66,033 manual; (b) a second telecommunications service provider: 19,278 manual; and (c) a third telecommunications service provider: 2,142 manual.

User Aids Features

In the preferred embodiment, the LNP GUI 124 application, for example, supports online Help on a function by function basis.

Assumptions, Dependencies and Constraints

This section describes assumptions, dependencies and constraints of the preferred embodiment of the LNP GUI 124 system.

Assumptions

In the preferred embodiment, the LNP GUI 124 application, for example, MCIT 120 ensures secure communications to and from the LNP GUI 124.

Design Constraints

This section describes the design constraints pertaining to the LNP GUI 124 application software of the preferred embodiment of the LNP GUI 124.

Graphical User Interface

In the preferred embodiment of the LNP GUI 124, for example: (a) TN precedes SV ID in importance (therefore TN precedes SV ID in position on screens); (b) if "Create as Gaining" and "Create As Losing" are performed through the same screen, inapplicable fields are protected/hidden based on the action specified (i.e., gaining versus losing); (c) common screen templates are utilized to create a consistent look and feel throughout the application; (d) information, such as Partial Failure details, are on top in the LNP GUI 124 (i.e., minimal key strokes are required by the user to view this information); (e) the LNP GUI 124 maximizes the display of SV query results (e.g., the user specified query criteria is compressed to a few lines above the query results); (f) maintenance of pick list table information such as Service Provider-Name and NPA-NXX - CLLI are outside the scope of the LNP GUI 124 (e.g., these may be maintained using database scripts); (g) where possible, option labels are expanded to explicitly state what the option will do (e.g., instead of a button being labeled "Modify," the button is labeled "Modify an Active TN" or "Modify a Pending TN"); and (h) an indication is provided on each screen as to how to escape or return to the previous screen.

Figure 5:
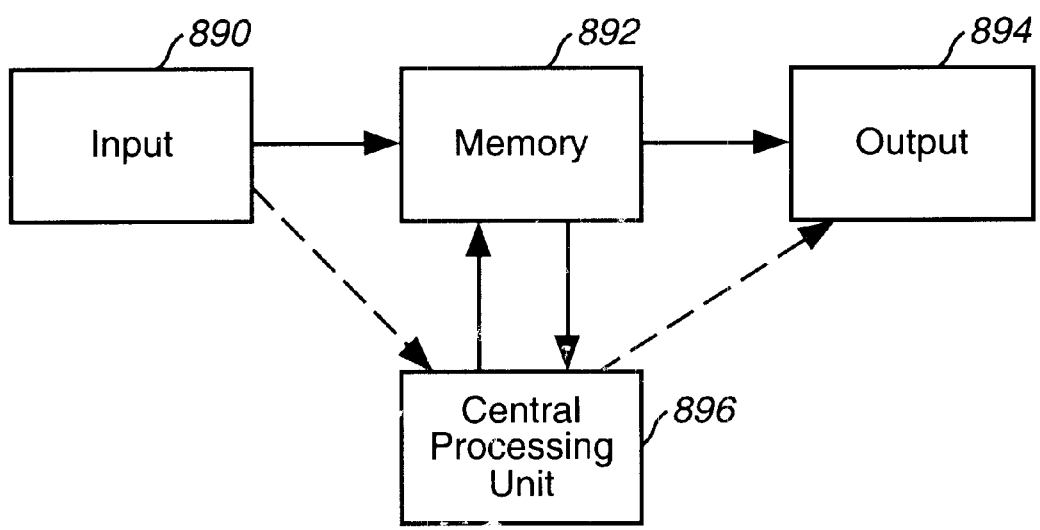
FIG. 5 illustrates an exemplary portion of a generalized computer system upon which portions of the invention may be implemented.

FIG. 5 illustrates an exemplary portion of a generalized computer system upon which portions of the invention may be implemented. In FIG. 5, An input 890 communicates with a memory 892 and a Central Processing Unit 896. The Central Processing Unit 896 communicates with the memory 892 and an output 894. The output 894 is also in communication with the memory 892. The Central Processing Unit 896 may include an arithmetic/logic unit and a control unit in the form of hardware and/or software (not shown). One or more of inputs 890 may each be in communication with one or more memories 892 and/or Central Processing Units 896. One or more Central Processing Units 896 may be in communication with one or more outputs 894 and/or memories 892 and/or inputs 890. One or more memories 892 may be in communication with one or more inputs 890 and/or Central Processing Units 896 and/or outputs 894. Clearly, a plurality of variations of computer hardware configurations may be realized in a network of computer systems upon which portions of the invention may be implemented.

Figure 6:
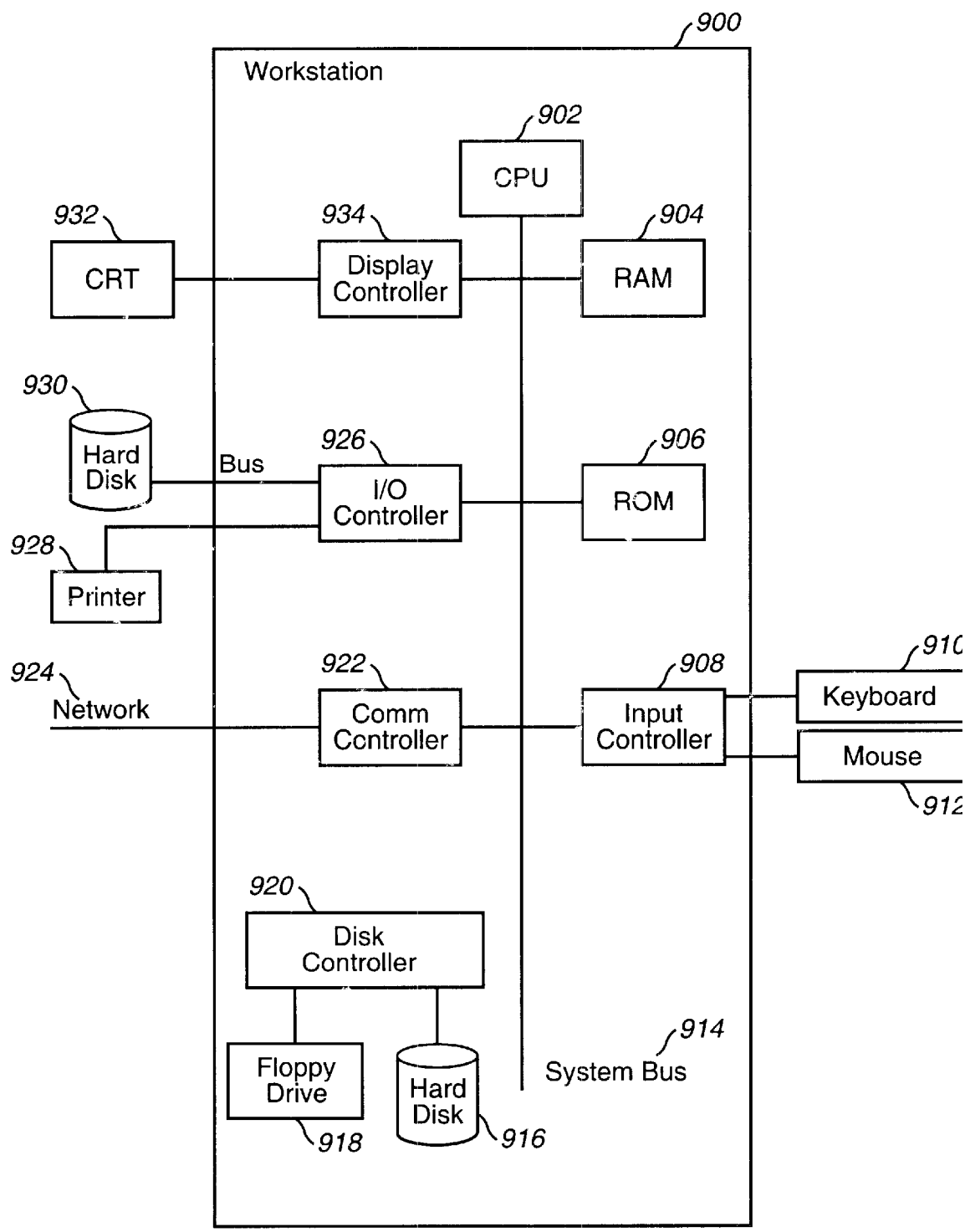
FIG. 6 illustrates an exemplary portion of a generalized hardware configuration, in the format of a workstation, upon which portions of the invention may be implemented.

FIG. 6 illustrates an exemplary portion of a hardware configuration, in the format of a workstation 900, upon which portions of the invention may be implemented. The workstation 900 has component parts a display controller 934, a central processing unit (CPU) 902, a random access memory (RAM) 904, a read only memory (ROM) 906, an input controller 908, connected to a keyboard 910 and a mouse 912, a system bus 914, a hard disk 916 and a floppy drive 918 connected to a disk controller 920, a comm controller 922 connected to a network 924, and an input/output (I/O) controller 926 connected to a hard disk 930 and a printer 928, and a cathode ray tube (CRT) 932 connected to the display controller 934. The system bus 914 connects the CPU 902, the RAM 904, the ROM 906, the input controller 908, the disk controller 920, the comm controller 922, the I/O controller 926, and the display controller 934 for transmitting data over the connection line. For example, computer code generated for execution may be loaded into the RAM 904 for execution by the CPU 902, using the system bus 914, with input files stored on the hard disk 930, with other input coming from the keyboard 910 and the mouse 912 through the input controller 908, the network 924 and comm controller 922, and from the hard disk 916 and the floppy drive 918, through the disk controller 920, onto the system bus 914. The system bus 914 interacts with the ROM 906, the network 924, and the comm controller 922.

This invention may be conveniently implemented using a network of conventional general purpose digital computers and/or microprocessors programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

APPENDIX I

| SOURCE | ACRONYM | TERM | DEFINITION/DESCRIPTION | SEE ALSO |
|---|---|---|---|---|
| definition 1 | NXX | (Telephone) Number Exchange | A code normal used as a central office code. It may also be used as an NPA code or special NPA code. The geographical territory, often a city, filed with an LEC's tariffs. | |
| definition 1 | N-1 | "N minus 1" | The next to last network involved in a particular call. In the case of an interLATA call, for example, the next to last network is the interexchange carrier network. The switching network in the call progression that may trigger a database query. On an Intra-LATA call involving 2 carriers the originating central network would trigger the query. On Inter-LATA toll calls (e.g., LEC – IXC – LEC) the IXC would trigger the query. | |
| definition 2 | | 9 1 1 SERVICE PROVIDER | The entities responsible for the ALI system data management and/or retrieval. I.E. a Telephone Company, Database or Customer Provided Equipment (CPE) vendor, PSAP or County. | |
| definition 2 | | ACCESS | (1) The point at which entry is gained into a circuit or a network. It may be switched or dedicated. (2) The ability to obtain data from a storage device or peripheral. (3) The type of connection between the CPE and the network. | |
| definition 2 | ACNA | Access Carrier Name Abbreviation | A three digit alpha code assigned by Bellcore to identify the Carrier to be billed for the service. | |
| definition 2 | | ACCESS CHARGE | A fee paid by long-distance carriers to local telephone companies for use of local facilities, and by telephone subscribers to obtain access to local networks. | |
| definition 2 | | ACCESS CODE | The term denotes a uniform five-digit code assigned by the Telephone Company to an individual CLEC. The five digit code has the form 10XXX | |
| definition 2 | AC | Access Customer | Responsible for traffic between Local Access and Transport Areas (LATA's). | |
| definition 1 | ACNA | Access Customer Name Abbreviation | The three-character code (alphabetical) used to uniquely identify each customer requesting access services. | |
| definition 2 | ACTL | Access Customer Terminal Location | A physical location, usually a building, where the Carrier system is interconnected with the LEC network. Also called a POP. | |
| definition 2 | | ACCESS LINE | A communications path between the customer's premise and the serving central office that provides connection to the local and toll network. | |
| definition 2 | AP | Access Provider | Responsible for traffic originating and terminating within jurisdictional areas as defined by regulatory agencies. | |
| definition 1 | ARMS | Access Request Management System | | |
| definition 1 | ASR | Access Service Request | The process, either mechanized or manual, which ICs use to order trunk-side destination number. | |
| definition 2 | ASR | Access Service Request | An interexchange carrier customer order for access to the local exchange company network. The nationally defined format for exchange access orders developed by the Ordering and Billing Forum. | |
| definition 2 | AT | ACCESS TANDEM | SEE ALSO: Tandem. | Tandem |
| definition 1 | AT | Access Tandem | A LEC switching system that provides traffic concentration and distribution functions for Inter-LATA traffic originating/terminating within a LATA. The access tandem provides the interexchange carrier with access too more than one end office within the LATA. Providing access to all end offices within a LATA might require more than one access tandem. | |
| definition 2 | AT | Access Tandem Switch | SEE ALSO: Tandem. | Tandem |
| definition 1 | | Access Time Standard | The access time specified by the FCC in its September 4, 1992 Order. | |
| definition 2 | A/E | Account Executive | Sales person who sold the service. | |

| SOURCE | ACRONYM | TERM | DEFINITION/DESCRIPTION | SEE ALSO |
|---|---|---|---|---|
| definition 2 | ASC | Accredited Standards Committee | Any US voluntary standards committee accredited by ANSI. | |
| definition 2 | AM | Activation Manager | A task management software application used by MCI WorldCom which provides workflow functionality required to direct, track, administer, and report service order processing. | |
| definition 1 | | Ad Hoc Report | Any report of any aspect of Per User/Per Request Charges or activity other than a standard report prepared by the NPAC SMS at the request of a user. | |
| definition 1 | ASA | Addressable Service Area | Geographic area defined by a company in which it is prepared to provide special or switched access services. Generally, an ASA is smaller than a LATA, but larger than the area covered by a single local telephone company's end office. | |
| definition 1 | AIN | Advanced Intelligent Network | Evolving, service-independent network architecture that provides important new capabilities for rapid creation of customized telecommunications services. AIN offers one way for a network element to query a central database to obtain local number portability routing information. AIN 0.1- An AIN architecture that is a first step in realizing AIN Release 1. AIN Release 0 - An AIN release defined by individual BCC's for initial deployment. AIN Release 1 - An AIN release, intended for deployment in the 1990's with a common functional architecture that would support the delivery of circuit-switched voice and circuit-switched data services to network subscribers. AIN Release 1 Logical Data Model - A logical model of persistent and administrable AIN Release 1 specific data (using Extended Entity Relationship modeling) that is of common interest to both network and operations functions. Further information modeling has been included in the network element/network system-OS interface information. AIN Release 1 Switching System - A switching system, including its remotes, that contains AIN Switch Capabilities (ASC) functionality. | |
| definition 2 | AIN | Advanced Intelligent Network | A collection of network elements that support operating company control over call processing and billing, allowing new services to be trialed and deployed faster than is typical for new switch based features. | |
| definition 2 | | ALGORITHM | A prescribed set of well defined rules or processes for the solution of a problem in a finite number of steps. | |
| definition 2 | ATB | ALL TRUNKS BUSY | A single tone interrupted at 120 impulses per minute (IPM) rate to indicate all lines or trunks in a routing group are busy. | |
| definition 2 | ATIS | Alliance for Telecommunications Industry Solutions | The entity formed to actively promote the timely resolution of national and international issues involving telecommunications standards and the development of operational guidelines; the sponsor of 13 Telecommunications Forums (including OBF and TCIF). | |
| definition 2 | ALI CODE | Alpha/Numeric Listing Identifier | An identifier assigned to each listing to uniquely identify a listing for an Account Telephone Number (ATN) from a customer. | |
| definition 1 | AMI | Alternate Mark Inversion | Bipolar coding of the T carrier line that inverts polarity of alternate bits. | |
| definition 2 | | ALTERNATE ROUTING | An alternative communications path used if the normal one is not available. There may be one or more possible alternative routing paths. This is an independent function from diverse routing capability. | |
| definition 2 | ARS | ALTERNATE ROUTING SERVICE | A subscriber service that lets subscribers set up contingency plans for call re-routing in the event of a disaster. | |
| definition 2 | AVD | Alternate Voice Data | Circuits electrically treated to handle both voice and data signals. | |
| definition 1 | AC | Alternating Current | | |
| definition 2 | ANSI | American National | The coordinator for national voluntary standards in the | |

| SOURCE | ACRONYM | TERM | DEFINITION/DESCRIPTION | SEE ALSO |
|---|---|---|---|---|
| | | Standards Institute | United States and the central body responsible for accrediting the various standards committees. | |
| definition 1 | | Analog | A transmission mode in which information is transmitted by converting it to a continuously variable electrical signal. | |
| definition 2 | | ANALOG TRANSMISSION | Technology that uses continuously changing electrical waves (instead of coded electrical pulses) to carry voice or low-speed data signals. All telephony was exclusively analog until digital signal was introduced. Physical quantities such as temperature can easily impact analog transmission. | |
| definition 1 | ARIS | ANI Reference Information System | | |
| definition 1 | ACRJ | Anonymous Caller Rejection (CLASS) | | |
| definition 2 | | ANSWER SUPERVISION | (1) An off-hook signal indicating when the called party answers; used to read calls for billing purposes. (2) A signal generated by the originating switch (hardware answer supervision) or by the switch which terminates the call (software answer supervision) when FGA or WATS is used to terminate the call. | |
| definition 2 | | AREA TRANSFER | The relocation of a segment of customers from one central office district to another without any physical move by the customer. The transfer of a wire center from one switch to another (re-home). This may be determined by geographic locations such as street addresses or by NXXs. | |
| definition 2 | AWN | Area Wide Networking | SEE ALSO: WAN. | WAN |
| definition 1 | | Associated Independent Telephone Company (Associated ITC) | A term used to describe a non-BOC or GTE telephone company that provides exchange and exchange access telecommunication services within a specified geographic area known as BOC LATA. | |
| definition 2 | ATM | Asynchronous Transfer Mode | (1) A type of multiplexing which broadband ISDN will use, where the payload is multiplexed into cells. It allows users around the world to communicate in a common transmission language at speeds from 45 Mbps (T3 level) up to gigabit speeds. ATM uses short, uniform, 53-byte cells to chop information into manageable chunks for ultrafast switching. Cells contain address headers telling the switching systems where to send information. ATM is the first packet-switched technology designed from the ground up to support-integrated voice, video and data applications. It is well suited to the high-speed, burst WAN traffic that strains the limits of today's LAN interconnection market. (2) ATM also stands for Automated Teller Machine which indicates the type of service which provides ATM functionality. | |
| definition 1 | ATM | Asynchronous Transfer Mode | A connect-type transmission system carrying information in the form of headers followed by information blocks. Recurrence on block depends on instantaneous bandwidth requirements. | |
| definition 2 | | ASYNCHRONOUS TRANSMISSION | One-way data transmission in which characters are unevenly spaced, or out of sync, when sent over circuits between modems or small computers. Usually employed in data links slower than 9 kilobits per second. | |
| definition 2 | | ATTENUATION | Decrease in magnitude of current, voltage, or power of a signal in transmission between points. Expressed in decibels. | |
| definition 2 | | AUDIO/VIDEO PROGRAMMING LINES | A type of circuit used to transmit broadcast signals. | |
| definition 1 | ARS | Audit / Reconciliation Subsystem | | |
| definition 2 | | AUTHORIZATION CODE / AUTHORIZATION | A four-digit number that allows authorized callers to override call restrictions. | |

| SOURCE | ACRONYM | TERM | DEFINITION/DESCRIPTION | SEE ALSO |
|---|---|---|---|---|
| | | NUMBER | | |
| definition 2 | ACE | Automated Circuit Engineering | Database of private line network facilities, combined with functionality to make and report assignments. | |
| definition 2 | ATP | Automated Translation and Provisioning | A vendor solution for placing MML translations into central office switches. | |
| definition 1 | ACB | Automatic Call Back (CLASS) | Allows the customer to re-dial the last outgoing call, whether it was answered or not. If the last outgoing number is busy, a voice announcement informs the caller of the fact. A special ring notifies the caller when the line becomes free. | |
| definition 1 | ACD | Automatic Call Distribution | Service which allows automated routing and reporting of calls for customers with multiple locations. A system that directs incoming calls to a group of agents. | |
| definition 2 | ACD | Automatic Call Distributor | Software controlled telecommunications package whereby inbound traffic is automatically distributed to available agents. PBX and Central Office ACD applications are available as standalone or hybrid switching systems. | |
| definition 2 | ACSR | Automatic Customer Station Rearrangement | AT&T product that allows ISDN subscribers to affect moves and changes to ISDN terminals. | |
| definition 2 | AIOD | Automatic Identified Outward Dialing | A process to include PBX calling station identification for calls terminating outside of the PBX. | |
| definition 2 | ALI | Automatic Location Information | The automatic display of the street address and/or location associated with the telephone number (ANI) which is displayed on a screen at the telecommunications position. | |
| definition 2 | AMA | Automatic Message Accounting | (1) A computer file format for recording switched network call message detail. (2) Machine readable magnetic tape that contains a customer's long distance calling and billing data. | |
| definition 1 | ANI | Automatic Number Identification | Circuitry in a switching system that automatically identifies the calling party's telephone number on a billable call. The capability of telephone switches to record automatically the number of a calling station whenever calls are placed from it. The primary use of ANI is to facilitate billing for toll or measured service. | |
| definition 2 | ANI | Automatic Number Identification | (1) The number associated with the telephone stations from which switched calls are originated or terminated. (2) A software feature associated with FGD and optional on FGB circuits. It provides the originating local telephone number of the calling party. This information is transmitted as part of the digit stream in the signaling protocol, and is included in the Call Detail Record (CDR) for billing purposes. (3) Refers to a telephone number. (4) The process by which the local telephone company passes a caller's local billing telephone number to the long-distance company when a 1+ or 10-XXX call is made. A caller's long-distance carrier knows the telephone number to bill without requiring the caller to enter any extra identifying digits. | |
| definition 1 | AR | Automatic Recall (CLASS) | | |
| definition 2 | ASAP | Automatic Service Activation Platform | An Architel application which communicates translations requests to Network Elements in their 'native' language. | |
| definition 2 | | AVAILABILITY | A measure of the degree to which a circuit, system, service or equipment is operable and not in a stage of congestion or failure. A function of how frequently a circuit fails and how long it takes to repair it. It is usually expressed in terms of a percentage over a specified period of time, e.g., 99.9% over 24 hours. | |
| definition 2 | ADP | AXE Dialog Processor | A MCI WorldCom application that is being used as a single thread connection for MML translations between the ANCM-RCAT application and the AXE-10 switch product. | |
| definition 2 | | B CHANNEL | A "bearer" channel that is a fundamental component of ISDN interfaces. It carries either voice or data at 64,000 bits (64 kilobits) per second in either direction and is circuit-switched. In addition, packet switching may be transported | |

| SOURCE | ACRONYM | TERM | DEFINITION/DESCRIPTION | SEE ALSO |
|---|---|---|---|---|
| | | | on a B channel. | |
| definition 2 | WIN | BACK | Also referred to as "Save/Disconnect" Procedures. Procedures used by Customer Service representatives to "save" a customer who is requesting a disconnect and returning to the ILEC for service. | |
| definition 2 | BN | Backbone Network | The high-density portion of a network that connects primary nodes. A central high-speed network. For example, the NSFnet connects smaller, independent networks. | |
| definition 2 | | BALANCE | The degree to which each wire in a circuit is exposed to the same amount of interference. Imbalance results in noise in the output circuit. | |
| definition 2 | IN | BAND SIGNALING | In-band, or multi-frequency(MF) signaling, occurs when signaling information is carried over the same transmission path as the voice/data circuit. | |
| definition 2 | | BANDWIDTH | A way to indicate or measure the information capacity of a communication channel, expressed in cycles per second (hertz). A narrow-band channel (voice) cannot carry as much information as a wideband or broadband channel, usually required for video or high speed data transmission. Narrowband transmits at less than 56 kilobits per second (KBPS), wideband transmits between 64 Kbps to 1.544 megabits per second (Mbps), and broadband transmits at speeds greater than 1.544 Mbps. | |
| definition 1 | | Bandwidth | The range of frequencies a communications channel is capable of carrying without excessive attenuation. | |
| definition 2 | | BASE RATE AREA | An area within a specific exchange where Tariff rates for local service apply. The local service rates applicable in this area are known as base rates. | |
| definition 2 | | BASEBAND | The original signal, before it is modulated for transmission. | |
| definition 2 | FACILITIES | BASED TELECOMMUNICATIONS CARRIERS | A telecommunications carrier that uses its own switches and transport. | |
| definition 2 | BBL | Basic Business Line | The generic MCI WorldCom product and feature set, equivalent to the industry Flat Rate Business (1FB) line, supported by IS Local Service. | |
| definition 1 | | Basic Customer Record | A Call Processing Record CPR that contains no more than a single IC and a single destination number. | |
| definition 1 | BLS | Basic Line Services | The services necessary to allow a basic telephone call to be made, including connection and dial tone services, which allow telephone calls to be made within areas which state regulatory agencies have designated as local calling services. | |
| definition 2 | BRI | Basic Rate Interface | The ISDN standard governing how a customer's desktop terminals and telephones can be connected to the ISDN switch. It specifies two "B" channels that provide simultaneous voice and data service, and one "D" channel that carries call information and customer data. One BRI standard is the "U" interface, which uses two copper wires; a second BRI standard is the "T" interface, requiring four copper wires; a third is the "Z" interface for analog services as well as additional interfaces. | |
| definition 2 | BRA | Basic Rate Interface International | International isdn basic rate interface. SEE ALSO: BRI for complete definition. | BRI |
| definition 2 | BRITE CARD | Basic Rate Interface Transmission Extension | A circuit board or plug-in unit that allows telephone companies to provide ISDN services to subscribers as far as 200 miles from an AT&T 5ESS digital switch. | |
| definition 2 | | BAUD | A unit of speed for data communications, equal to the number of times per second a signal is altered. (A modem's speed is usually expressed in baud.) Baud and bit-rate are often, but not always, the same. | |
| definition 1 | BOC | Bell Operating Company | As used by the FCC in its Sept. 4, 1991 Order, to collectively refer to the telephone companies owned by Ameritech, Bell Atlantic, BellSouth, NYNEX, Pacific | |

| SOURCE | ACRONYM | TERM | DEFINITION/DESCRIPTION | SEE ALSO |
|---|---|---|---|---|
| | | | Telesis, Southwestern Bell, and US West. | |
| definition 2 | BOC | Bell Operating Company | One of 22 Bell telephone companies whose primary business is providing local telephone service to customers. They are allowed to market, but not manufacture, new terminal equipment. Formerly part of the Bell System, divested by AT&T, which are now organized under the seven Regional Bell Operating Companies (RBOC's). | |
| definition 2 | | BELLCORE | A research and development organization primarily funded by the Regional Bell Operating Companies (RBOCs). It provides Terminating Point Master (TPM) and International Terminating Point Master (ITPM) information. This information is used to identify the vertical and horizontal coordinates and "place of call" information for rating and displaying a toll call. Examples of TPM/ITPM information sent by BELLCORE includes all dialable NPA/NXX combinations, country codes and associated rating details. | |
| definition 2 | BRIDS | Bellcore Rating Input Database System | A system that contains CO codes, NPA information, etc., and is administered under the North American Numbering Plan | |
| definition 2 | MULTI | BILL MULTI | One of many different billing arrangements provided under meet-point billing; Multi-Bill, Multi-Tariff refers to the billing option in which each LEC involved in providing access services to the interexchange carrier remits a bill at their own prevailing rates to the interexchange carrier. | |
| definition 2 | | BILLING CYCLE | A recurring period of time between traffic cutoff dates which precedes customer billing. Cycles are typically 30 days. | |
| definition 2 | BNA | Billing Name and Address | The billing name and address of the end user or telephone subscriber. | |
| definition 2 | BTN | Billing Telephone Number | The primary telephone number used for billing, regardless of the number of lines associated with the number. | |
| definition 2 | | BINARY | A two-part coding system for expressing information in digital form (similar to the Morse code using a dash and dot. For computers, it consists only of the digits 0 and 1. | |
| definition 2 | | BINDING POST | The termination point of a specific cable pair within a fixed count terminal. | |
| definition 1 | | Bipolar Coding (AMI) | The T carrier line coding system that inverts the polarity of alternate 1s bits. This is also referred to as Alternate Mark Inversion (AMI). | |
| definition 1 | B8ZS | Bipolar with 8-zero Substitution | A line-coding scheme used with T-1 Clear channel to send a string of eight zeros with a deliberate bipolar violation. The 1s bits in the bipolar violation maintain line synchronization. This is also referred to as B8ZS. | |
| definition 2 | | BISYNCHRONOUS TRANSMISSION | Two-way synchronization of a data transmission, in which data signals are clock-synchronized with each other for faster speeds in both directions during transmission. | |
| definition 2 | | BIT | The smallest unit of information in the binary system of notation. | |
| definition 1 | | Bit | A binary digit, the smallest unit of information in a computer, representat as a 0 or 1. One character is typically seven or eight bits in length. The transmission speed of sending data is referred to as "BPS" (bits per second). | |
| definition 2 | | BIT ERROR | The value of an encoded bit is changed in the transmission and interpreted incorrectly by the receiver. | |
| definition 2 | BER | BIT ERROR RATE | The ratio of received bits that are in error relative to a specific number of bits received. Usually expressed as a number referenced to a power of 10 (e.g.,1.0 X 10-9). The lower the bit error rate, the more accurate the transmission. | |
| definition 1 | BLDN | Blank Directory Number (vacant DN) | | |
| definition 2 | | BLOCK | A group of 1,000 telephone numbers with all numbers being within the same thousand count. (NXX-1000 - 1999; NXX-2000 - 2999; etc.) | |
| definition 2 | | BLOCK APPLICANT | The entity for which a thousand block is requested. | |

| SOURCE | ACRONYM | TERM | DEFINITION/DESCRIPTION | SEE ALSO |
|---|---|---|---|---|
| definition 2 | | BLOCK HOLDER | The entity to whom a 1,000 block (NXX-X) has been assigned. | |
| definition 2 | | BLOCKAGE | SEE ALSO: Blocked Dial Tone | Blocked Dial Tone |
| definition 2 | | BLOCKED CALLS | All attempted calls that are not connected. The two most common reasons for non-connections are that all lines to the central offices are in use or all connecting paths through the PBX/switch are in use. | |
| definition 2 | | BLOCKED DIAL TONE | When an overload condition exists in the switch, causing the switch difficulty in supplying dial tone. | |
| definition 2 | BFR | Bona Fide Request | The FCC term used to describe the process by which CLEC's may request the ILEC unbundling of network elements not already specifically defined within published FCC rulings on the 1996 Telecommunications Act. | |
| definition 2 | | BRIDGE LIFTER | A piece of auxiliary equipment that improves transmission on multi-party lines. | |
| definition 2 | | BRIDGED LINE | A line from a station or other terminal to the point of connection with another line, known as the bridging point. | |
| definition 2 | | BROADBAND | In digital systems, a transmission rate of about 45 million bits (45 megabits) per second or more. This is the equivalent of the North American network's DS-3 rate (44.736 Mbps), common in US lightwave systems. Sometimes called "wideband." | |
| definition 2 | | BROADCAST | One-way dissemination of voice, data, or image signals from one sender to numerous receivers at the same time. | |
| definition 2 | | BROWSER | An application that will allow a user to open a GUI screen to access information in multiple applications. | |
| definition 2 | | BULLETIN BOARD | An electronic message center accessible through computer-aided communication lines. | |
| definition 2 | BLSA | Business Lines Service Activation | The original MFS term used to describe the project, now incorporated within the IS Local Service Stage ASAP Entry, to deploy ASAP in support of BBL's. | |
| definition 2 | | BUSY HOUR | (1) The peak 60 minutes during a business day when the largest volume of communications traffic is handled. (2) When phone lines are most in demand and/or most used. The 'busy hour' is perhaps the most important concept of traffic or switching engineering - the science of figuring what telephone switching and transmission capacities one needs. | |
| definition 2 | | BUSY STUDY | A study whereby peg count or call count versus usage is used to make capacity determinations. | |
| definition 2 | | BYTE | In telephony use, a digital signaling or transmission package of eight bits. | |
| definition 2 | | CABLE | An assembly of one or more conductors within an enveloping protective sheath, so constructed as to permit the use of conductors separately or in groups. | |
| definition 2 | | CABLE COUNT | The range of cable pairs that is identified by a beginning pair number and an ending pair number within a specific number. Beginning pair number must be greater than 0 and ending pair number depends on the type of cable, the general maximum is 3,600. | |
| definition 2 | | CABLE RANGE | The range of primary feeder cable plant available within a specific central office (e.g., ABC Central Office, cable range is 100 to 199). | |
| definition 2 | | CALL BY CALL | Bearer Capability Routing - Allows different call type to share the same access span. Currently inbound/outbound are available. (No 2-way) future options are 800, DID VNET or FX. | |
| definition 2 | CCAS | Call Completion and Analysis System | A software package that provides general call management statistics (e.g., call attempts, completions, etc.) that can be attached to an individual or a group of inward or outward line circuits. | |
| definition 2 | CDR | Call Detail Recording | The ability of a switch (which includes CO and PBX) to | |

| SOURCE | ACRONYM | TERM | DEFINITION/DESCRIPTION | SEE ALSO |
|---|---|---|---|---|
| | | | provide more complete individual call details. Variations of CDR include Advanced Station Detail Recording (ASDR), Advanced Station Message Detail Recording (ASMDR), and Station Message Detail Recording (SMDR). An accounting record, produced by the switches, that tracks call type, time, duration, facilities used, originator, destination, and so forth. CDRs are used for customer billing, rate determination, network monitoring, and facility capacity planning. CDRs represent unrated calls that are to be processed by rating. Contrast with toll, or rated calls. | |
| definition 1 | CFW | Call Forwarding | | |
| definition 1 | CFDA | Call Forwarding, No answer | | |
| definition 2 | | CALL STATION IDENTIFICATION | Identifies the extension making the outbound call. | |
| definition 1 | CW / CWT | Call Waiting | | |
| definition 1 | CNAM | Caller ID with Name | Caller name | |
| definition 1 | CADB | Calling Area Database | | |
| definition 1 | CLID | Calling Line ID | Signaling parameter that identifies the telephone number of the party placing a call. | |
| definition 1 | CNAD | Calling Name Delivery | Enhances the Calling Number Delivery by adding the customer's name to the called party's display set. When combined, name and number delivery are called Calling Name and Number Delivery (CNND). | |
| definition 1 | CND | Calling Number Delivery | Allows the customer to view the directory number of an incoming call before answering. After the first ring, the switch sends the 10-digit DN and the current month, day, hour, and minute. | |
| definition 1 | CNDB | Calling Number Delivery Blocking | | |
| definition 2 | CPN | Calling Party Number | Identifies the individual telephone number of the party or device that originated the call. This may differ from the billing number of the calling party. | |
| definition 1 | CRTC | Canadian Radio-Television and Telecommunications Commission | Supervises and regulates Canada's broadcasting and telecommunications systems. | |
| definition 1 | CCW | Cancel Call Waiting | | |
| definition 2 | | CANNED REPORTS | Reports designed and developed by software development teams with little or no ability for users to control the content or presentation of the report. | |
| definition 2 | HI | CAP | A high capacity channel for the transmission of serial digital data rates of 1.544, 3.152, 6.302, 44.736, or 274.176 Mbps. Equal to 24 voice grade level circuits (at the DS1 rate) dedicated to one point. | |
| definition 2 | CIS | CARE Interface Systems | The MCI WorldCom system that receives and sends orders to the LEC and maintains a database of ANI and LEC information. | |
| definition 2 | | CARRIER | (1) A continuous frequency capable of being modulated, or impressed with a second signal. (2) An organization which transports and provides telecommunications services (e.g., local, interexchange, cellular, mobile, etc.), and is considered by Regulatory agencies to be a "certified" common carrier. | |
| definition 2 | CAB | Carrier Access Billing | SEE ALSO: CABS | CABS |
| definition 2 | CABS | Carrier Access Billing System | The means by which customers are billed for access services to long distance, local exchange, and cellular carriers. | |
| definition 2 | CCL | Carrier Common Line | A per minute charge paid by long-distance companies to local telephone companies for the use of local public switched networks at either or both ends of a long distance call. | |
| definition 2 | CIC | Carrier Identification Code | Currently, a four digit code assigned to each IXC or re-seller. (1) The four-digit number that uniquely identifies a | |

| SOURCE | ACRONYM | TERM | DEFINITION/DESCRIPTION | SEE ALSO |
|---|---|---|---|---|
| | | | carrier. The CIC is indicated by XXXX in the Carrier Access Code (CAC). The same code applies to an individual carrier throughout the area served by the North American numbering plan. (2) A four digit number used with FGB and FGD to access a particular interexchange carrier's (IXC's) switched services from a local exchange line. One control or more CIC codes are assigned to each carrier; there may be multiple CICs per Access Carrier Name Abbreviation (ACNA). | |
| definition 1 | CIC | Carrier Identification Code | The 3 or 4-digit number that uniquely identifies a carrier. The Carrier Identification Code is indicated by XXX in the Carrier Access Code dialed by customer in the form of 10XXX. The same code applies to an individual carrier throughout the area served by the North American Numbering Plan. | |
| definition 2 | CIP | Carrier Identification Parameter | An SS7 message that delivers the (CIC) or the access code (10XXX or 101XXXX) as a part of the Initial Address Message (IAM). | |
| definition 1 | | Carrier Portability Code or | | |
| definition 2 | CSI | Carrier Selection Indicator | Identifies whether a call originated from a pre-subscribed line. If the line is pre-subscribed, the CSI indicates whether the end user dialed 10XXX, did not dial 10XXX, or if no dialing indication was available. | |
| definition 2 | CSMA/CD | Carrier Sense Multiple Access/Collision Detection | (1) A process in which all nodes attached to the network contend for access and listen for transmissions in progress (carrier sense) before starting to transmit (multiple access). If two or more nodes transmit at the same time, a collision occurs (collision detection) and re-transmission occurs randomly. (2) The network-access method used by Apple's LocalTalk networks, among others. In a CSMA/CA environment, a primary workstation attempting to transmit data sends a request-to-transmit signal to a secondary workstation. When the sending workstation receives a clear-to-send signal from the receiving node, it begins to transmit data. | |
| definition 2 | | CARRIER STATUS | For co-carrier status to exist, six conditions must be met: non-discriminatory assignment of number resource, meet-point billing and tandem subtending arrangements for IXC traffic, shared platform arrangements for 911, local number portability, unbundled links and reciprocal exchange. | |
| definition 2 | | CARRIER SYSTEM | A means of obtaining a number of channels over a single path by modulating each channel on a different frequency and demodulating at the receiving point to restore the signals to their original form. | |
| definition 2 | | CELL | A geographic region within which mobile calls are expected to be served by a particular cell site. | |
| definition 2 | | CELL SITE | A location containing the radio and other equipment necessary to establish a talking path between a cellular mobile radio unit and the Mobile Telephone Switching Office (MTSO). | |
| definition 2 | | CELLULAR ACCESS NUMBER | A number provided by the Cellular Company and associated with a specific cellular mobile radio unit to enable use of the cellular system. | |
| definition 2 | CGSA | Cellular Geographic Service Area | The geographic area within which the Cellular Company has been authorized by the FCC to provide service. | |
| definition 2 | | CELLULAR MOBILE RADIO UNIT | Radio telephone equipment (comprising a control unit, transceiver, microprocessor, and antenna) capable of being moved from location to location. The unit must be technically and operationally compatible with the cellular system when assigned an Access Number and having been made operational with respect to the cellular system. | |
| definition 2 | | CELLULAR SYSTEM | A telecommunications system that comprises a MTSO, cell | |

| SOURCE | ACRONYM | TERM | DEFINITION/DESCRIPTION | SEE ALSO |
|---|---|---|---|---|
| | | | sites, and dedicated interconnecting facilities to provide service. | |
| definition 2 | CCMI | Center for Communications Management Information | A vendor provided tape that IXPlus reads to obtain rating information such as V & H Coordinates to rate long distance calls. | |
| definition 1 | CO | Central Office | The switching centers, serving wire centers or tandem switch facilities of a local telephone company. A switching center that determines and interconnects lines and trunks from user. | |
| definition 2 | CO | CENTRAL OFFICE | The telephone company facility or building where local loops or other transmission media connect end users to the telephone network. The CO provides switching and other functions for local telecommunications and interstate access services for a specific geographic area, which is identified by the first three digits of the 7-digit local telephone number. Also referred to as a serving wire center (SWC) or end office (EO). | |
| definition 2 | COC | Central Office Code | SEE ALSO: NXX | NXX |
| definition 2 | COD | Central Office District | The geographic territory served by a central office or by a group of central offices. | |
| definition 2 | COP | Central Office LooP | Two wire special access facility from end office to customer premise. | |
| definition 2 | | CENTRAL OFFICE PREFIX | A local Telephone Company switching system where Telephone Exchange Service customer station loops are terminated for purposes of interconnection to each other and to trunks. | |
| definition 1 | CPU | Central Processing Unit | The control logic element used to execute instructions in a computer. | |
| definition 2 | CAROT | CENTRALIZED AUTOMATIC REPORTING ON TRUNKS (CAROT) TESTING | A type of testing which includes the capacity for measuring operational and transmission parameters. | |
| definition 1 | | Centrex | A class of central office service that provides the equivalent of PBX service from a telephone company switching system. | |
| definition 2 | | CENTREX | A business switching service provided exclusively by local operating companies using CO switching equipment. Provides capabilities similar to those in a PBX using equipment located in a CO. Services generally include internal dialing (ex: 4 or 5 digit dialing of internal calls), operator's desk, direct access to the public switched network, and transfer of calls. It also may include other, more advanced features. It is used by many small and medium sized businesses that do not wish to buy and maintain a PBX. | |
| definition 2 | CMN | Centrex Managed Number | An ANI which resides within an existing block of numbers which MCI WorldCom is leasing. | |
| definition 1 | CPAS | Centrex Provisioning Activation System | | |
| definition 2 | | CERTIFICATION | Approval by a Public Utilities Commission to provide telephone services in a specific state. | |
| definition 1 | CCB | Change Control Board | | |
| definition 1 | CR | Change Request | | |
| definition 2 | | CHANNEL BANK | (1) A part of the carrier system that performs the first step of modulation. (2) A mulitplexer that demodulates a group of channels into a higher frequency band and, conversely, demultiplexes the higher frequency band into individual channels. It can break a signal into the equivalent of 24 analog voice grade and/or 56 Kbps digital channels. | |
| definition 1 | | Channel Bank | Apparatus that converts multiple voice frequency signals of PBX service from a telephone company switching system. | |
| definition 2 | CSU | CHANNEL SERVICE | Equipment which performs one or more of the following | DSU |

| SOURCE | ACRONYM | TERM | DEFINITION/DESCRIPTION | SEE ALSO |
|---|---|---|---|---|
| | | UNIT | functions: termination of a digital facility, regeneration of digital signals, detection and/or correction of signal format errors, or remote loop back. SEE ALSO: DSU | |
| definition 1 | CSU | Channel Service Unit | Apparatus that interfaces DTE to a line connecting to a data port channel unit to enable digital communications without a modem. Used with DSU when DTE lacks complete digital line interface capability. | |
| definition 2 | | CHANNEL(S) | An electrical or photonic, in the case of fiber optic based transmission systems, communications path between two or more points of termination. The smallest subdivision of a circuit. A one way communications path that provides a single type of service (e.g., a voice channel or a data channel). | |
| definition 2 | | CHANNELIZE | The process of multiplexing-demmultiplexing wider bandwidth or high speed channels into narrower bandwidth or lower speed channels. | |
| definition 1 | | Circuit | A transmission path between two points in a telecommunications system. | |
| definition 2 | | CIRCUIT | (1) A pair of complementary channels, providing bi-directional communication, with associated equipment terminating in two exchanges. 'Complementary channels' tend to indicate an analog or 2-wire thought, whereas only one digital bisynchronous or 4-wire channel is necessary to form a circuit. (2) A network of circuit elements (resistances, reactance, and semiconductors) which perform specific functions. (3) An electrical schematic diagram. | |
| definition 2 | | CIRCUIT BOARD | A package of electronic components designed to be plugged into communication equipment to perform special tasks. Also called "circuit pack" or "plug-in board." | |
| definition 2 | CMTS | Circuit Maintenance Testing System | A computer-based system containing Special Service Circuit details and providing an automatic method of testing these circuits for correct electrical continuity and transmission characteristics. Access for testing circuits maintained by this system is via electronically activated gateways along the transmission path at designated COs. | |
| definition 2 | | CIRCUIT SWITCHING | A technique of switching voice or data calls by dedicating an entire circuit (in analog switches) or a specific selection of time slots (in digital switches) to a given call, as opposed to packet switching. Switched 56 Kbps is a common form of circuit switching. | |
| definition 2 | CSZ | City, State, Country Zip | The city, state and country zip of the end user or telephone subscriber. | |
| definition 2 | | CLASS | Custom calling features associated with call routing and switching such as voice mail, Caller ID, etc. | |
| definition 2 | CLSV | Class of Service | SEE ALSO: COS | COS |
| definition 2 | COS | Class of Service | Identifies the basic attributes of a customer's service. For example: service type (individual or party) (message or flat) (rotary or touch). Equipment owned by customer or leased (residential/business) by the local exchange service provider. | |
| definition 2 | | CLASS OF SERVICE | A description of the collection of privileges and features associated with a line | |
| definition 2 | | CLEAR CHANNEL | A digital DS0 transmission rate at the full 64kbps, where all overhead signaling data (8kbps) normally existing as the lead byte of a DS0 transmission is instead passed external to the channel. | |
| definition 2 | | CNN DOMAIN SERVER - Common NPA-NXX | A MCI WorldCom system scheduled for future deployment that will become the corporate repository of information and business rules pertaining to NPA-NXX's. | |
| definition 2 | | CO BRIDGE | Used only on multi-party service. This is when a party line shares the same line link or line equipment in the central office. | |
| definition 2 | | COAXIAL CABLE | A high-capacity transmission cable capable of transmitting | |

| SOURCE | ACRONYM | TERM | DEFINITION/DESCRIPTION | SEE ALSO |
|---|---|---|---|---|
| | | | voice, data, or video signals in analog or digital form on single electrical conductors made of copper. | |
| definition 1 | | Coaxial Cable | A single-wire conductor surrounded by an insulating medium and metallic shield, which is sued for carrying a telecommunications signal. | |
| definition 2 | | CO-CARRIER | An authorized local telecommunications service provider providing service in the same geographic area as an incumbent LEC (ILEC). For co-carrier status to exist, six conditions must be met: non-discriminatory assignment of number resource, meet-point billing and tandem subtending arrangements for IXC traffic, shared platform arrangements, local number portability, unbundled links and reciprocal traffic exchange. | |
| definition 2 | | CODE HOLDER | The assignee of a full NXX (10,000 numbers), prior to the creation and establishment of number pooling. | |
| definition 2 | CODEC | Coder | A circuit (usually a microchip) that changes an analog signal to a digital signal, and vice versa. An ISDN voice telephone uses a CODEC to convert the analog voice tones to digital pulses for transmission, and to convert incoming digital pulses to analog tones that enable you to understand the other party. | |
| definition 2 | COPTS | Coin Operated Private Telephone Service | SEE ALSO: COCOT | COCOT |
| definition 2 | | COIN STATION | A location where Telephone Company equipment is provided in a public or semipublic place where customers can originate telephonic communications and pay the applicable charges by inserting coins into the equipment. SEE ALSO: Pay Telephone. | Pay Telephone |
| definition 2 | CA | Collision Avoidance | SEE ALSO: CSMA | CSMA |
| definition 2 | CD | Collision Detection | SEE ALSO: CSMA | CSMA |
| definition 2 | | COLLOCATED INTERCONNECTION | A connection at the Telephone Company service wire center between certain Telephone Company provided CLEC services and interconnector-provided optical or microwave facilities and equipment located in the serving wire center. | |
| definition 2 | | COLLOCATION (local) | Incumbent telephone companies lease space in central offices to other companies for the purpose of installing their own transmission equipment. There are two types: (1) Physical: MCI WorldCom occupies space within the ILEC CO to place and maintain its equipment. (2) Virtual: The ILEC places within its COs and maintains equipment for the use of MCI WorldCom. Also referred to as Expanded Interconnection. | |
| definition 1 | | Command Interpreter | A program that reads textual commands from the user or forms a file and executes them. | |
| definition 2 | CIR | Committed Information Rate | In a frame relay network, each permanent virtual circuit (PVC) is assigned a CIR, measured in bits per second (BPS). The CIR is the average capacity that the port connection should allocate to the PVC. This rate is proportional to the expected average traffic volume between the two sites that the PVC connects. The CIR assigned to a PVC cannot exceed the speed of either port connection. | |
| definition 2 | | COMMON CARRIER | A company or organization authorized to provide public communication services within a local access and transport area (LATA) or over a long distance (interexchange) network, subject to regulation by federal and state regulatory commissions. | |
| definition 2 | CCIS | Common Channel Interoffice Signaling | (1) An out-of-band signaling system, which uses a network separate from the talking path to transmit all signaling information related to a call or data transaction. It tells the network where a call should be routed. (2) A network signaling standard, incorporating information from databases to offer advanced network services. | |
| definition 1 | CCS | Common Channel | A network signaling technology in which all signaling | |

| SOURCE | ACRONYM | TERM | DEFINITION/DESCRIPTION | SEE ALSO |
|---|---|---|---|---|
| | | Signaling | information between two or more nodes is transmitted over high-speed data links, rather than over the voice circuit. In the context of 800 Data Base Service, CCS refers to that network signaling technology which utilizes the Signaling System 7 (SS7) protocol [See Signaling System 7] as opposed to any other common channel signaling protocol (e.g., Common Channel Interoffice Signaling 6) used by other CBS applications]. | |
| definition 2 | CCSN | Common Channel Signaling Network | The portion of the public network that contains the packet signaling links. It allows call control messages to be transported on a dedicated high-speed data network separate from the voice/data communications path. This diverse signaling network transmits at speeds much faster than in-band technology. | |
| definition 2 | CCS7 | COMMON CONTROL SWITCHING 7 | (1) A digital communications channel dedicated for the processing of signaling and call setup information between processors in the switched network. (2) An international standard for network signaling via data links operating at 56kbps. SEE ALSO: SS7 | SS7 |
| definition 2 | CLCI | Common Language Circuit Identification | Industry standard method of assigning circuit identifications of serial numbers or telephone numbers to customers or official services. Identification distinguishes a basic electrical transmission path for telecommunications services. For example, 36/LGFS/12345 and FXNT/703/841/6000 are typical CLCI formats. | |
| definition 2 | CLFI | Common Language Facility Identification | The industry standard method of assigning facility identification. The code set varies by the facility's attributes (analog vs. digital, copper vs. fiber), but commonly provide the facility frame stencil 'name', bandwidth and the originating and terminating facility CLLIs in low-alphanumeric, high-alphanumeric order. (example: 101/T1/DNVRCOMA/LTTNCOMADS0) | |
| definition 2 | CLLI | Common Language Location Identifier | An industry standard procedure for assigning unique 8 or 11 digit coding to a physical location, either Telco (Central Office), customer premises, or common equipment instead of listing physical addresses. A CLLI code is also used to identify a carrier's point of presence (POP). A CLLI code set is composed of 4, 2, 2, and 3 alphanumeric characters where the characters indicate city(abbreviated), state(standard abbreviation), building designator, and network element identifier (i.e. DNVRCOMA03T). | |
| definition 1 | CLLI | Common Language Location Identifier | | |
| definition 2 | | COMMON LINE | A line, trunk, pay telephone line or other facility provided under the local exchange service tariffs or the Telephone Company, terminated on a CO switch. A common line-residence is a line or trunk provided under the residence regulations of the local exchange service tariffs. A common line-business is a line provided under the business regulations of the local exchange service tariffs. | |
| definition 1 | | Common Management Information | | |
| definition 1 | CMIP | Common Management Information Protocol | | |
| definition 2 | CMIP | Common Management Interface/Information Protocol | A protocol, formally adopted by the International Standards Organization (ISO), used for exchanging network management information between applications. CMIP provides the protocol that network management systems use to request actions and report events. Other specification standards define the actions that can be requested or the events reported. | |
| definition 2 | | COMMUNICATIONS SYSTEMS | Channels and other facilities which are capable, when not connected to exchange and message toll telecommunications service, of 2-way communications between subscriber- | |

| SOURCE | ACRONYM | TERM | DEFINITION/DESCRIPTION | SEE ALSO |
|---|---|---|---|---|
| | | | provided terminal equipment or Telephone Corporate stations. | |
| definition 2 | Company ID | COMPANY IDENTIFIER | A NENA approved 3 - 5 character identity chosen by the Local Service Provider that distinguishes the entity providing the dial tone to the end user. The Company Identifier is maintained by NENA in a nationally accessible data base, and is an entry item in NENA 02-001, NENA Recommended Formats for Data Exchange. | |
| definition 2 | CAP | Competitive Access Provider | A company other than a local exchange carrier (LEC) or regional Bell operating company (RBOC) that is authorized to provide access service. | |
| definition 1 | CAP | Competitive Access Provider | Company that provides local transport of dedicated line services and special access telecommunications services in competition with the local exchange carrier. | |
| definition 1 | CLEC | Competitive Local Exchange Carrier | Considered to be a new entrant into a market where there is already an incumbent LEC providing local phone service. | |
| definition 2 | CLEC | Competitive/Certified Local Exchange Carrier | A company that has been authorized by the appropriate regulatory agencies to provide local exchange telephone service. | |
| definition 1 | | Complex Customer Record | A CPR that contains multiple service providers and/or multiple destination numbers | |
| definition 2 | CBX | Computerized Branch Exchange | Trademarked name owned by ROLM Corporation. A CBX is similar to a Private Branch Exchange (PBX). SEE ALSO: PBX | PBX |
| definition 2 | | CONCENTRATION RATIO | The relationship between the number of lines in an office and the number of paths available for simultaneous usage. Assumptions range from 5 - 10 percent. | |
| definition 2 | | CONCENTRATOR | a telecommunications device which allows a number of circuits to be connected to a smaller number of lines for transmission under the assumption that not all of the larger group shall be used at the same time. | |
| definition 1 | CM | Configuration Management | | |
| definition 2 | | CONNECTING COMPANY | A corporation, association, firm or individual other than an associated Local Telephone Company owning and operating one or more COs and interchanging traffic directly or indirectly with the local exchange company. | |
| definition 2 | CNAR | Connecting Network Access Record | This is a new access record which is generated for the purpose of billing Local Number Portability (LNP) database queries performed by an Exchange Carrier on behalf of another carrier. The existing AMA structure Code 625 is generated with a new (CNA) Call Code 720. Generation of the new CNAR is controlled by provisioning options against incoming trunk groups. A new CNAR option is added to table AMATKOPT. The CNAR option contains fields LCNAR and BILLNO. Service providers may wish to generate this new record only if they had to perform a query on behalf of the originating switch. This 'limited recording' of the CNAR can be achieved by setting the LCNAR field to 'Y' (Yes) on the AMATKOPT Table. The BILLNO from the AMATKOPT shall be used to provide a billing reference when the automatic Number Identification (ANI) is not passed in the incoming switch record | |
| definition 2 | CFA | Connecting/Carrier Facility Assignment | Represent the higher level carrier system where the particular circuit resides. Can be either a DS1, DS3, or SONET time slot. | |
| definition 2 | CCI | Consolidated Communications Incorporated | (1) An independent company that provides the provisioning, ordering, and billing system used to support switched services. (2) Database used by MCI WorldCom in order processing, provisioning, and translation to provide billing information. | |
| definition 2 | | CONTAMINATED BLOCKS | Blocks assigned with less than 100%, but more than 90% available. | |

| SOURCE | ACRONYM | TERM | DEFINITION/DESCRIPTION | SEE ALSO |
|---|---|---|---|---|
| definition 2 | | CROSSTALK | When electricity passes through a conductor, a magnetic field is created around the conductor. As the current in the conductor varies, the strength of the magnetic field varies also. If the magnetic field crosses another conductor, it causes an opposite current flow in that conductor. This is inductance, the basic principle behind all electrical transformers. Crosstalk occurs when one cable pair induces a current in another pair, resulting in the super imposition of one circuit - or phone conversation - onto another. | |
| definition 2 | CCF | Custom Calling Features | Optional telephone service features providing the customer with additional capabilities such as call forwarding, call waiting, three-way calling, and speed dialing. | |
| definition 2 | CD | CUSTOM DIALING | An Area Wide Networking format that uses number patterns designed by the subscriber. | |
| definition 1 | CLASS | Custom Local Area Signaling Services | Premium local service features, such as call forwarding or automatic callback. | |
| definition 2 | | CUSTOMER | The final end user, or authorized agent of, for telecommunication service(s) provided by MCI WorldCom. A customer may or may not be the actual individual or entity responsible for the initial and ongoing financial maintenance of the service and account with MCI WorldCom. A customer may be in internal or external entity to MCI WorldCom. | |
| definition 2 | CALC | Customer Access Line Charge | The monthly recurring charge for access to the Toll network, mandated by the FCC. | |
| definition 2 | CARE | Customer Accounts Records Exchange | (1) Information used to record PIC selections. (2) The process by which the modification of customer Primary INTER/INTRAexchange Carrier (PIC) choice is recorded and activated. | |
| definition 2 | CCNA | Customer Carrier Name Abbreviation | A three digit alpha code that Bellcore assigns to identify the carrier who is either placing the order or owns the facility. | |
| definition 2 | CDD | Customer Desired Due Date | A date in which the subscriber or end user has requested the service/feature to be available for use. | |
| definition 2 | CICS | Customer Information Control System | An IBM software facility that enables central processing of remote terminal transactions. | |
| definition 1 | CIS | Customer Information System | | |
| definition 2 | | CUSTOMER INQUIRY | The processes associated with fulfilling requirements for the pre-service order provisioning or assisting the customer in resolving generic type telecommunications or MCI WorldCom related questions or concerns. | |
| definition 2 | CLAR | CUSTOMER LOCATION ALTERNATE ROUTING | A disaster recovery service that allows a subscriber to preprogram forwarding destinations in the event of a problem at the customer's location. | |
| definition 1 | COT | Customer Originated Trace (CLASS) | | |
| definition 2 | COAM | Customer Owned And Maintained Equipment | Devices, apparatus and associated wiring and communications systems provided by a customer that may be interconnected to the local or toll exchange networks of the telephone network. | |
| definition 2 | COCOT | Customer Owned Coin Operated Telephone | A public telephone which is privately owned and is connected to the local exchange network. Coin revenues collected belong to the owner of the instrument. | |
| definition 1 | CPC | Customer Portability Code | One of several local number portability deployment models. Developed by a multi-vendor task force spearheaded by MCI, the CPC solution utilizes unique 3-digit codes to identify service providers in the network. | |
| definition 2 | CPE | Customer Premise Equipment | All telecom equipment and wiring located at a customer's premise (except pay phones). SEE ALSO: COAM. | COAM |
| definition 2 | CPNI | Customer Proprietary Network Information | Customer confidential information which is not to be shared outside of the service provider - customer relationship of telecommunication service. Service providers are legally bound (both state and federal) to restrict access of this data | |

| SOURCE | ACRONYM | TERM | DEFINITION/DESCRIPTION | SEE ALSO |
|---|---|---|---|---|
|  |  |  | to the customer and those company personnel with a 'need to know'. |  |
| definition 2 | CRIS | Customer Records Information System | A telephone company system used to record customer information and bill local exchange service. |  |
| definition 2 | CSR | Customer Service Record | A detailed listing of a subscriber's TN's as well as equipment and service charges. |  |
| definition 2 | CSTS | Customer Service Technical Support Center | A MCI WorldCom service center in Omaha, Nebraska that takes trouble calls from customers for facilities based local service and coordinates trouble resolution and referrals to the ILEC and/or Operations. |  |
| definition 2 | CSL | Customer Software Launcher | A set of browser applications utilized to provide GUI connectivity to multiple independent applications. Normally used for internet/intranet like connection that provide for a point and click functionality. |  |
| definition 2 | CTI | Customer Type Indicator | Identifies the type of end user appearing in the Access Provider (AP) billing records. |  |
| definition 2 |  | CUSTOMIZED RINGING | Customized ringing is when more than one directory number is assigned to one access line. The customer can determine the number that is being dialed by the ringing tone. |  |
| definition 2 | HOT | CUT | Virtually instantaneous movement of circuits from switch to switch or from one location to another (also referred to as coordinated conversion). |  |
| definition 1 |  | Cutover | The time at which a transition from one communications system to another takes place. |  |
| definition 2 |  | D CHANNEL | The "delta" channel of an ISDN interface, used to carry control signals and customer call data in a packet-switched mode. In the BRI, the "D" channel operates at 16,000 bits or 16 kilobits per second(Kbps); in the PRI, the "D" channel is used at 64 Kbps. |  |
| definition 2 |  | DACS | Digital Access and Cross Connect System |  |
| definition 2 | DOC | Dallas Order Center | The MCI WorldCom customer service center in Dallas responsible for entering service order information into the appropriate system. |  |
| definition 1 | DAP | Data Access Point |  |  |
| definition 1 | DB | Data Base |  |  |
| definition 2 | DCE | Data Circuit Terminating Equipment | The devices and connections placed at the interface to the network by the network provider. The user's DTE is connected to this equipment. |  |
| definition 1 | DDF | Data Distribution Facility |  |  |
| definition 1 | DDS | Data Distribution System |  |  |
| definition 2 | DISA | Data Interchange Standards Association | The ASC X12 Secretariat, responsible for communicating with ANSI and the public, managing the standards database, publishing standards, and other administrative activities on behalf of the committee. |  |
| definition 2 |  | DATA SWITCHING | The switching of data (non-voice) messages by the interchange, controlling and routing of data messages between two or more stations, via communications facilities, wherein the information content of the message remains unaltered. |  |
| definition 2 | DTE | Data Terminal Equipment | Equipment that converts user information into data signals for transmission, or vice versa. This equipment includes logic, buffer, and one or more input or output devices or computers. It can also contain error control, synchronization, and station identification capability. |  |
| definition 1 | DTE | Data Terminal Equipment |  |  |
| definition 1 |  | Data Terminal Equipment | Any form of computer, peripheral, or terminal that can be used for originating or receiving data over a communication channel. |  |
| definition 1 | DUF | Data Update Facility |  |  |
| definition 1 | DBA | Database Administration |  |  |
| definition 1 | DBMS | Database Management System |  |  |

| SOURCE | ACRONYM | TERM | DEFINITION/DESCRIPTION | SEE ALSO |
|---|---|---|---|---|
| definition 1 | DIPS | Database Query | Query by a local switching office or toll switching office to a remote database. | |
| definition 2 | DOW/TOD | DAY OF WEEK/TIME OF DAY | A PrimeNumber feature that allows call routing decisions to be made depending on the day of week and the time of day. | |
| definition 2 | DOY/TOD | DAY OF YEAR/TIME OF DAY | A PrimeNumber feature that allows call routing decisions to be made depending on the day of the year and the time of day. | |
| definition 2 | dB | DECIBEL | A unit used to express relative difference in power, usually between acoustic or electric signals, equal to ten (10) times the common logarithm or the ratio of two signal powers. | |
| definition 2 | | DECODING | Restoring a coded signal to its original format. For example, changing a digital voice signal to an analog voice signal so the listener can understand it. | |
| definition 2 | DAL | Dedicated Access Line | Two way communications path from the customer premises to the switch. An analog or digital tie line between a customer and local phone company or long-distance company. The line is not switched at the central office, but connects the customer directly to his or her long-distance carrier. (Since there are no switched access charges, cost per call can be lower, given enough traffic.) | |
| definition 2 | DIP | Dedicated Inside Plant | A term for CO facilities when jumpers are left in place from the LEN to the cable pair. | |
| definition 2 | DOP | Dedicated Outside Plant | The facilities from the Central Office to the customer premises. | |
| definition 2 | | DEDICATED TRANSMISSION FACILITIES | Those facilities that are used solely by one customer. | |
| definition 2 | | DELIVERY SYSTEM | An event driven flow-through control engine for real-time provisioning processing. It has open interfaces defined for inventory updates (including TN's) upon completion. | |
| definition 2 | | DEMARC or DEMARCATION POINT | Interconnection point between the LEC's facilities and the customer premise equipment. | |
| definition 2 | DNP2 | Denial for Non-Payment (two way) | Service has been denied due to customer's not paying the outstanding balance due. The customer may not receive or originate calls. However, E911 access to the network is still allowed, per individual regulatory agency requirements. | |
| definition 2 | DAK | Deny All Knowledge | A call dispute type which may require investigation. | |
| definition 2 | DNP1 | Deny for Non-Payment (one way) | Service has been denied due to customer's not paying the outstanding balance due. The customer may receive calls only, no outgoing calls are allowed. | |
| definition 2 | DFP | Deny For Protection | Service has been temporarily disconnected two ways due to a customer request. | |
| definition 2 | | DEREGULATION | A 1983 Federal Communications Committee ruling which freed interexchange carriers from the need to file rate changes or seek authority from FCC to expand. AT&T was not deregulated because of its economic power and market dominance. | |
| definition 2 | DLR | Design Layout Record | (1) A technical description of the facilities and auxiliary equipment used by a local exchange company to provide an access service to an interexchange carrier. (2) A standard report from a circuit engineering system that states the circuit ID's of the end-to-end circuit and those of its component circuits, and the precise terminal locations where these circuit components cross-connect and terminate. | |
| definition 1 | DPC | Destination Point Code | The part of a routing label that identifies where the CCS/SS7 signaling message should be sent. | |
| definition 2 | | DFMS | Digital Facilities Management System | |
| definition 2 | | DIAL ACCESS | (1) Connection through the public switched telephone network. (2) A means of providing a terminal switched access to a service, network, or computer. | |
| definition 2 | DP | Dial Pulse | A current interruption in the direct current (DC) loop of calling telephone produced by the breaking and making of contacts when a digit is dialed. | |

| SOURCE | ACRONYM | TERM | DEFINITION/DESCRIPTION | SEE ALSO |
|---|---|---|---|---|
| definition 2 | | DIAL TONE | The audible tone originating from the Central Office, or subscriber PBX, switching equipment to a customer indicating that the equipment is ready to receive telephone number digits. The sound you hear when you pick up the phone. | |
| definition 2 | | DIAL TONE SPEED | The measure of dial tone delay. The specific time that transpires between a subscriber going off hook and the receipt of dial tone from a servicing telephone central office. | |
| definition 2 | | DIAL TRANSFER | The transfer of office equipment from one type to another (i.e., DMS to AXE), in the same central office. (re-home) | |
| definition 1 | | Digital | A mode of transmission in which information is coded in binary form for transmission on a network. | |
| definition 2 | | DIGITAL | A method of representing information by separate, coded pulses. Example: Morse code's dots and dashes. In ISDN, digital signals can be either electrical or photonic and are coded by Pulse-Code Modulation (PCM). | |
| definition 2 | DACS | Digital Access Cross | The AT&T proprietary name for their Digital Cross-connect Switch/System. | |
| definition 2 | DCS | Digital Cross | A multiplexing system that provides a digital interface between a Telephone Company designated Hub wire center and a customer or other service provider designated telecommunications services. | |
| definition 2 | DCCS | Digital Cross Connect System | A device that allows facility cross connects, e.g., F1 to F2 connections, to be established, updated and deleted electronically either locally or remotely. | |
| definition 2 | DDS | Digital Data Service | Transmission speeds at 2.4 Kbps, 4.8 Kbps, 9.6 Kbps, 56 Kbps (a.k.a. - Low Speed Digital Services). DDS services are used for a wide variety of low speed data communications, such as communications between distant workstations to a host computer. | |
| definition 1 | DEC | Digital Exchange Carrier | | |
| definition 2 | DXF | Digital Exchange Format | A data format defined by Autodesk originally for the transfer of data between CAD systems. Due to its simplicity, it is now widely used in the transfer of data between GIS, despite a number of limitations. | |
| definition 2 | DFMS | Digital Facilities Maintenance System | A monitoring, alarm, testing and management system dedicated primarily to digital high capacity carrier, e.g., T-1, T-3, systems. | |
| definition 2 | DISC*S | Digital Intelligent Subscriber Carrier System | RELTEC's IDLC-RT (Remote Terminal) Product. | |
| definition 2 | DS | Digital Service | Type of digital service typically designated by a number. For example a DS1 is a T-1 Carrier (1.544 Mbps), a DS3 is 45 Mbps Fiber, (actual bandwidth - 44.736 Mbps). | |
| definition 2 | DSU | Digital Service Unit | (1) A network interface device between the channel service unit (CSU) and the customer's data terminal equipment (DTE). Usually associated with a CSU, the DSU has a V.35, RS232, RS449, or other interface to the customer equipment. The DSU is also a multiplexer for FT1 circuits. (2) A PC-like terminal for local area networks (LANs), without disk drives, that boots its operating system from the server and processes client tasks in a client/server network environment. SEE ALSO: CSU | CSU |
| definition 2 | DS0 | DIGITAL SIGNAL LEVEL 0 | The term for a digital telecommunications signal transmitted at 64 kilobits per second. The 64Kbps is made up of 56Kbps(industry standard) plus 8Kbps(the leading byte) which is reserved for signaling data. Also known as voice grade or lowest level of service. | |
| definition 2 | DS1 | DIGITAL SIGNAL LEVEL 1 | The term for a digital telecommunications signal transmitted at 1.54 megabits per second and carried on a T1 facility. T1 lines are used to transmit large amounts of voice or data communication. For example, in a point to point application, a bank might use a T1 line to connect two transaction processing computers together, and many large | |

| SOURCE | ACRONYM | TERM | DEFINITION/DESCRIPTION | SEE ALSO |
|---|---|---|---|---|
| | | | businesses use T1 lines as the "backbone" of their private networks. IXC's also use T1 lines to obtain traffic from and deliver traffic to LEC facilities, and to transport traffic within their networks. DS1 = 24 DS0's. | |
| definition 2 | DS3 | DIGITAL SIGNAL LEVEL 3 | The equivalent of 28 T1 channels, DS-3 is communications access or transmission operating at 44.736 megabits per second. This service level is used primarily by IXCs to carry concentrated traffic volumes into and out of their networks and along major traffic routes. However, some very large users also use DS-3 facilities along extremely high volume paths in their own networks. DS3 = 28 DS1's or 672 DS0's. | |
| definition 2 | DS4 | DIGITAL SIGNAL LEVEL 4 | One 375.176 Mbps channel, equivalent to 4,032 voice grade lines, each with 64 Kbps capacity. Typically used in interoffice transmissions. | |
| definition 2 | DSL | Digital Subscriber Line | A three-channel digital line that links the ISDN customer's terminal to the telephone company switch with four ordinary copper telephone wires. Operated at the Basic Rate Interface (with two 64-kilobit per second circuit-switched coded by Pulse-Code Modulation (PCM) channels and one 16-kilobit packet-switched channel), the DSL can carry both voice and data signals at the same time, in both directions, as well as the signaling data used for call information and customer data. With the introduction of the AT&T 5ESS generic, up to eight different users can be served by a single Digital Subscriber Line. | |
| definition 2 | DTS | Digital Termination System | A proposed Federal Communications Commission (FCC) system that integrates cellular radio for local access and microwave/satellite for long distance. | |
| definition 2 | | DIGITAL TRANSMISSION | A method of sending and receiving information coded with on-and-off pulses of electricity or light. | |
| definition 2 | | DIRECT ANSWER VOICE MAIL | A number that rings directly into a voice mail box. | |
| definition 2 | DDD | Direct Distance Dialing | Occurs when the customer dials the called number directly (NXX+Line or 1+NPA-NXX-Line). | |
| definition 2 | | DIRECT ELECTRICAL CONNECTION | A physical connection of the electrical conductors in the communications path. | |
| definition 2 | DID | Direct Inward Dialing | A feature of PBXs and CENTREX systems which allows callers to dial from the public network straight to a wanted extension on a Private Automatic Branch Exchange without intervention by an operator. | |
| definition 2 | DOD | Direct Outward Dialing | A feature of PBXs and CENTREX systems that allows callers to dial out from a Private Automatic Branch Exchange. | |
| definition 2 | DA | Directory Assistance | An information service wherein operators help callers by providing the callers with those telephone numbers requested. This service may result in a charge to the customer. Previously known as Information. | |
| definition 2 | DL | DIRECTORY LISTING | Customer specific information that is listed in a telephone book. Usually contains name/address and phone number of a business or residence. | |
| definition 1 | DN | Directory Number | | |
| definition 2 | | DIRECTORY NUMBER | A four digit number within an NXX that identifies a subscriber's circuit to the switch. It is also called a telephone number. | |
| definition 2 | DSCR | Directory Service Caption Request | The information on how to display a listing with captions. | |
| definition 2 | | DISASTER RECOVERY | The procedures put in place to cause service continuance during an abnormal outage. | |
| definition 2 | D ORDER | Disconnect order | An order written to terminate a customer's service, features, products, and/or entire account. | |
| definition 1 | DRCW | Distinctive Ringing Call Waiting (CLASS) | | |

| SOURCE | ACRONYM | TERM | DEFINITION/DESCRIPTION | SEE ALSO |
|---|---|---|---|---|
| definition 1 | DSG | Distributed System Generator | | |
| definition 2 | | DISTRIBUTION CABLE | That portion of the local loop service provisioning that interconnects the feeder facilities, F1, to the customer premise terminal access point, e.g., F2...F9. | |
| definition 2 | | DIVERSE ROUTING | The method of service provisioning whereby telecommunications service are physically routed separately. | |
| definition 1 | | Domain | The name of a computer or network on the Internet, specifically the characters to the right of the "@" sign, indicating the organization and the type of organization that operates the physical location for the computer. | |
| definition 1 | | Donor | Switch/office/exchange. Refers to the switch from which a subscriber was served, prior to changing service providers. | |
| definition 2 | | DOUBLE ASSIGNMENT | The act of assigning the same piece of equipment to more than one unrelated circuit. | |
| definition 2 | DIOA | Downstream Integration with Order Administration | A MCI WorldCom system that manages replication of OA data to and from other applications. | |
| definition 1 | DIS | Downstream Interface Subsystem | | |
| definition 2 | DTMF | Dual Tone Multifrequency | A signaling method that uses specific pairs of frequencies within the voiceband for signals. One tone in each pair is chosen from a group of four low frequencies, and the other tone is selected from a group of four higher frequencies. The eight frequencies are 697, 770, 852, 941, 1209, 1336, 1477, and 1633 Hz. Synonym: touch tone. | |
| definition 1 | DTMF | Dual Tone Multi-Frequency | A means of address signaling that uses a simultaneous combination of one of a lower group of frequencies and on of higher group of frequencies to represent each digit or character. It is a signaling method used by modem Touchtone telephone sets. | |
| definition 2 | | E & M | Signaling arrangement where "E" ear and "M" mouth wire leads are used for specific signals. | |
| definition 2 | | ECHO | When transmission facilities are mismatched, some energy is reflected back along the original transmission path. This reflection not only causes echo in the circuit, it also means that not all of the transmit power travels across the interface or network. This problem can be solved by adjusting the impedance matching capabilities of the transmission facility network. | |
| definition 1 | | Echo Canceler | An electronic device that processes the echo signals and cancels it out to prevent annoyance to the talker. Normally used for Inter-LATA circuit paths over 500 miles. | |
| definition 2 | EDI | Electronic Data Interchange | An industry standard (ANSI X12, X.400) for direct computer-to-computer information exchange. | |
| definition 2 | ESS | Electronic Switching System | A switching system whose major components utilize semiconductor devices. (Ex: #5ESS, #1ESS, etc.) (1) A station instrument on a private branch exchange (PBX). (2) Bell System term for electronic exchange switching equipment. (3) A system using computer-like operations to switch telephone calls. | |
| definition 2 | EMA/RO CODES | Emergency Area Codes | Routing codes, i.e., EMA is used for local lines; RO is used for T-1s. | |
| definition 1 | EMU | Emulator | | |
| definition 2 | EO | End Office | A CO that serves a carrier's end users, connecting them with one another and serving as a gateway to connect end users to the rest of the telecommunications network. It is where the first point of switching occurs. SEE ALSO: Central Office (CO) | Central Office (CO) |
| definition 1 | EO | End Office | The switching centers of a local telephone company; sometimes also known as central offices in the LEC's network that directly serves subscriber lines. | |
| definition 1 | | End Office | The local exchange office (single switch) to which | |

| SOURCE | ACRONYM | TERM | DEFINITION/DESCRIPTION | SEE ALSO |
|---|---|---|---|---|
| | | | subscriber lines are connected and where incoming calls are switched to their called lines; sometimes called a Class 5 office. | |
| definition 2 | EOI | End Office Interconnection | A form of interconnection for the purpose of integrating the end office and/or tandem switches of CLECs to the LEC's public switched network for the completion of intralata switched traffic. | |
| definition 2 | | END OFFICE SWITCH | 1) A local Telephone Company switching system where Telephone Exchange Service customer station loops are terminated for purposes of interconnection to each other and to trunks. Included are Remote Switching Modules (RSM) and Remote Switching Systems (RSS) served by a host office in a different wire center. 2) A central office to which a telephone subscriber is connected. Frequently referred to an a Class 5 office. The last central office before the subscriber's phone equipment. The central office which actually delivers dial tone to the subscriber. | |
| definition 2 | | END USER | The customer of the Local Service Provider. | |
| definition 2 | EUB | End User Billing | A generic term used to identify the processing systems which MCI WorldCom uses to bill telephone customer subscribers. (residential and business) MCI WorldCom has several End User Billing Systems. Examples are: IXPlus, Consolidated Communications Incorporated (CCI), and Associated Computing System (ACS). | |
| definition 2 | E911 | Enhanced 911 | An emergency service becomes enhanced 911 emergency reporting service when there is a minimum of two special features tied to it. E911 provides ANI (Automatic Number Identification) and ALI (Automatic Location Information) to the 911 bureau operator. The request for emergency services (e.g.; fire, ambulance, police, etc.) comes to the bureau when a person dials 911. E911 service request information updates includes customer name, address, location, and telephone number. | |
| definition 1 | ESP | Enhanced Service Provider | Provides enhanced network services. | |
| definition 1 | ERD | Entity Relationship Diagram | | |
| definition 1 | EA | Equal Access | | |
| definition 1 | | Equal Access | The obligation of local telephone companies to provide interLATA carriers non-discriminatory access to their networks, with that access equal in price and quality of facilities, and available to the public under a uniform dialing plan. | |
| definition 2 | | EQUAL ACCESS | Term used to describe the process of providing all end users with ease of access to the long-distance network using the carrier of their choice. Equal Access allows 1+ dialing. | |
| definition 2 | EA&P | Equal Access & Presubscription | Equal Access: Under the terms of Divestiture, all long distance common carriers must be accessible by dialing 1 and not a string of long dialing codes. Telephone subscribers choose their primary carrier who they will reach by dialing 1 before their long distance number. All other carriers can be reached by dialing a five digit code (10XXX), thus providing Equal Access for all carriers. Not all long distance companies will opt for full equal access since this involves considerable expense to the local phone companies. Presubscription: The process in which a customer chooses a long distance carrier and then is able to access that carrier by dialing 1+. Other carriers are accessed by 1-0-XXX calling. | |
| definition 2 | EN | Equipment Number | This is also known as the originating equipment number (OE) or line equipment number (LEN). | |
| definition 2 | EFS | Error Free Seconds | A measure of the quality of the signal being transmitted. EFS is a percentage representing the total amount of time over a 24-hour period that the signal contained bit errors. It | |

| SOURCE | ACRONYM | TERM | DEFINITION/DESCRIPTION | SEE ALSO |
|---|---|---|---|---|
| | | | is calculated using a test pattern defined in Consultant Committee on International Telephone and Telegraph (CCITT) Recommendation 0.151. | |
| definition 1 | | Exchange | A geographic area, usually including a city or a town, for organizing telephone service in a specified region. An exchange is always part of a LATA and normally consists of one or more local telephone offices that serve specific NXXs (see Local Access and Transport Area). | |
| definition 1 | | Exchange Access | The provision of local network facilities by exchange carriers for the purpose of or terminating interLATA telecommunications. | |
| definition 2 | | EXCHANGE AREA | A unit generally smaller than a LATA, established by the local telephone company for the administration of communications service in a specified area which usually embraces a city, town, or village and its environs. It consists of one or more central offices together with the associated facilities used in furnishing communications service within that area. One or more designated exchanges comprise a given LATA. | |
| definition 2 | EC | Exchange Carrier | Also referred to as the local telephone company or Access Provider (AP). Responsible for traffic originating and terminating within jurisdictional areas as defined by regulatory agencies. SEE ALSO: LEC | LEC |
| definition 1 | ECO | Exchange Carrier, Original Provider | The exchange carrier that has the NPA assigned as default. This would usually be the donor switch for the ported number. In an instance when a subscriber changes from a ported to a non-ported status the ECO would be a recipient switch. | |
| definition 2 | | EXCHANGE SERVICE | A service permitting interconnection of any two customers' stations within the same exchange through the use of the switching system. | |
| definition 2 | EAS | Extended Area Service | Extended base rate calling area, toll free exchanges. | |
| definition 2 | ED | EXTENSION DIALING | An Area Wide Networking format that uses sequential digits from the seven digit phone number being called. | |
| definition 1 | ED | External Design | | |
| definition 1 | | Facility | Any set of transmission paths that can transport voice or data. Facilities can range from a cable to a carrier system or a microwave radio system. | |
| definition 2 | | FACILITY | A communication path used to connect telecommunications devices to a switching system. Sometimes referred to as a line. | |
| definition 2 | FDR | Facility Design Request | An engineering process whereby the facilities (not necessarily the cable and pairs) between point A (Origination) and point Z (Termination) are reviewed to determine electrical capabilities to support the type of service characteristic required. | |
| definition 2 | | FACILITY REQUEST | A pre-provisioning request directed to Engineering, Construction and Regulatory to determine facility availability and rates for non-standard services, e.g., Foreign Exchange, Digital Facility Services, (T-1, T-3, DDS), etc. | |
| definition 2 | FAX | FACSIMILE | A system for the transmission of images. The image is scanned at the transmitter, reconstructed at the receiving station and duplicated on some form of paper. | |
| definition 2 | FGA | FEATURE GROUP A | FGA is line side connection to the public switched network achieved by dialing a 7 digit local telephone number. It is infrequently used now that FGB and FGD are widely available, but provides a means of accessing an IXC's network in non equal access areas. There are three different kinds of Feature Group A. (1)MTS-Like is a seven digit number which the subscriber dials an assigned number and gets another dial tone from the IC location then dials the desired location telephone number. (2) Foreign Exchange (FX) service provides the ability to draw dial tone on some | |

| SOURCE | ACRONYM | TERM | DEFINITION/DESCRIPTION | SEE ALSO |
|---|---|---|---|---|
| | | | other telephone number than what your local exchange normally would be. (Off-Network Access Line (ONAL) is generally used to allow a private network to receive a dial tone connection to the LEC. | |
| definition 2 | FGB | FEATURE GROUP B | FGB provides a trunk side connection accessible by dialing 950-10XX access code. It is used by many IXCs in non equal access areas to obtain LATA wide access, and as an alternative to 10XXX access for calling card calls. | |
| definition 2 | FGC | FEATURE GROUP C | FGC is a trunk side connection with no access code. It allows an end user to make a long distance call from a non-equal access end office by dialing 1+ a seven or ten digit telephone number. When an end office has converted to equal access, FGC service must be converted to FGD service. With the continued cutover of end offices to equal access, FGC service will be eliminated. It refers to the access provided to AT&T. | |
| definition 2 | FGD | FEATURE GROUP D | FGD service provides a trunk-side connection into a LEC's switched network. FGD is known as the equal access feature group and allows an end user to make a long distance call from an equal access end office by dialing 1+ a seven or ten digit telephone number. An end user may reach a distant telephone number by one of two methods on FGD: (1) Through a presubscribed carrier by dialing 1+ a seven or ten digit number; or (2) Through casual calling by dialing 10+ any carrier's 3 digit CIC, then 1 or 0 plus a seven or ten digit number. | |
| definition 2 | | FEATURE GROUPS | The different types and qualities of switched access arrangements offered by local telephone companies to long distance companies. Individual Feature Groups differ in availability, pricing and features. | |
| definition 1 | FCC | Federal Communications Commission | The Agency of the Federal Government, established under the Communications Act of 1934, that regulates all interstate radio and wire communications in the U.S. | |
| definition 2 | FCC | Federal Communications Commission | A federal body established by the Communications Act of 1934 regulating interstate communications. The FCC does not regulate intrastate communications (see PUC). The FCC approves rate (or accepts for filing) tariffs filed by carriers, licenses common carriers and sets standards for communications equipment. Members are appointed by the US president. | |
| definition 2 | FDDI | Fiber Distributed Data Interface | An American National Standards Institute (ANSI) -defined standard for high-speed (100 Mbps) local area network (LAN) communication using fiber-optic cable. It uses a dual ring or dual ring-of-trees topology and a token-passing media access method. It is compatible with the standards for the physical layer and the media access control (MAC) portion of the data link layer of the open system interconnection (OSI) model. Up to 1000 stations can be connected, with up to 3 kilometers between stations. Fiber-distributed data interface (FDDI) is a fault-tolerant dual counter-rotating-ring design. | |
| definition 2 | FOT | Fiber Optic Terminal | The physical equipment that terminates fiber in a central office. | |
| definition 1 | | Fiber Optics | A medium for transferring electronic signals over a pathway of fibers made of transparent material such as glass or plastic. | |
| definition 1 | FTP | File Transfer Protocol | FTP is an efficient application that only performs the most basic of file manipulations commands. This application is at the seventh layer of the OSI model. | |
| definition 2 | FOC | Firm Order Commitment/Confirmation | A document sent by local exchange carriers (LECs) to confirm or deny that the service requested by an access service request (ASR) will be provided by the date originally requested. | |

| SOURCE | ACRONYM | TERM | DEFINITION/DESCRIPTION | SEE ALSO |
|---|---|---|---|---|
| definition 1 | FOC | Firm Order Confirmation | | |
| definition 2 | 1FR | Flat rate Residence | A 'line' USOC used to describe a residential telephone service paid for by a recurring but non-varying monthly fee (flat rate). MCI WorldCom has chosen to provision its IS Local Service BBL service in the switches as 1FR services, versus 1FB (Flat rate Business) due to the fact that BBL's are themselves provisioned as single lines, whereas 1FB's are commonly provisioned in hunt groups or other business configurations. | |
| definition 1 | FLEX DID | Flexible Direct Inward Dialing | An LNP deployment model generally viewed as an interim solution. When a customer changes his/her local telephone company and wants to keep his/her phone number, all incoming calls continue to be routed to the old service provider's switch prior to being routed to the new service provider's switch via a private line. | |
| definition 2 | FX | Foreign Exchange | Switched access service providing dial tone from a CO other than the normal serving CO for an address. SEE ALSO: Foreign Exchange Service. | Foreign Exchange Service |
| definition 2 | | FOREIGN EXCHANGE SERVICE | Telephone exchange service furnished to a customer through a CO of an exchange other than the exchange in which the customer is physically located. This type of service will be billed as FGA. SEE ALSO: FX. | FX |
| definition 2 | FWP | Four | Four wire special access facility from end office to end user. | |
| definition 2 | | FOUR WIRE CIRCUIT | A transmission path in which four conductors (wires) are utilized over the circuit path. Two conductors are used for each direction of transmission. The transmit and receive paths should be in non adjacent binder groups, or isolated. | |
| definition 1 | | Four Wire Circuit | A circuit that uses separate paths for each direction of transmission. | |
| definition 2 | | FRAME | A rectangular steel bar of framework having horizontals and verticals which are used to place semi permanent wire connections to permanent equipment. | |
| definition 1 | FR | Frame Relay | | |
| definition 2 | | FULL DUPLEX | Two-way transmission of information over a circuit. | |
| definition 1 | FRS | Functional Requirement Specifications | | |
| definition 1 | FRAM | Functional Requirements Allocation Matrix | | |
| definition 2 | | GATEWAY | Tandem switch used to interconnect the telephone companies of different countries when their networks are incompatible. | |
| definition 2 | | GAUGE | The individual measurement of the diameter of the wire. Commonly used to specify cable size, e.g., 19ga, 26ga, etc. | |
| definition 2 | | GENERIC | In telephony, a software package that is designed to give specific performance features to an electronic switch. | |
| definition 1 | | Geographic Portability | The ability to change the physical terminating location without changing the telephone numbers. | |
| definition 2 | | GEOGRAPHIC PROTABILITY | The subscriber maintains their 10 digit directory number when changing locations (ie: out of the rate center). | |
| definition 1 | GLR | Global Location Routing | | |
| definition 2 | GPS | Global Positioning Systems | A position-finding system which uses radio receivers to pick up signals from four or more special satellites (there are 24 in orbit) and compute WGS coordinates for the receiver. Accuracy depends on the sophistication of processing and the time available for reception. Real-time navigation using GPS on aircraft and ships can be accurate to better than 100m. Processed data from several hours observation can provide relative positions accurate to a few centimeters. | |
| definition 1 | GTT | Global Title Translation | | |
| definition 2 | | GOLD NUMBERS | A type of vanity telephone number. A phone number that is easy for customers to remember. | |
| definition 1 | GUI | Graphical User Interface | A program with a GUI runs under some windowing system displaying certain icons, buttons, dialogue boxes, etc. in its | |

| SOURCE | ACRONYM | TERM | DEFINITION/DESCRIPTION | SEE ALSO |
|---|---|---|---|---|
| | | | windows on the screen and the user controls it mainly by moving a pointer on the screen (typically controlled by a mouse). | |
| definition 2 | GUI | Graphical User Interface | A method of interaction with a computer which uses pictorial buttons (icons) and command lists controlled by a mouse. It is generally regarded as simpler and easier to learn than command line interfaces, where commands have to be typed. Examples include MS WINDOWS for PCs, Open Look or MOTIF for workstations and System 7 for Macintosh. | |
| definition 1 | GMT | Greenwich Mean Time | | |
| definition 2 | | GRID | An MFS term used to identify the manual (FoxPro, Excel, or blue-line) or mechanized (TCOMS) records developed by Switch Provisioning which relate the physical office equipment (LEN) to the telephone number and service/features provided to a customer. | |
| definition 2 | | GRID MAPS | A subdivision of the geographic area composed of square or rectangle cells of equal size arranged in columns and rows. We use 8 by 10 mile grids to subdivide the MFS network areas. | |
| definition 2 | | GROUND | An electrical connection to earth or to a common conductor connected to earth. The earth is used as a common return for many types of electrical circuits. | |
| definition 2 | | GROUND START | A signaling option that changes the method of generating dial tone. The standard method is loop start. The service order indicates when ground start is required. | |
| definition 1 | | Guideline for the Definitions of | | |
| definition 1 | H/W | Hardware | | |
| definition 1 | HP | Hewlett Packard | | |
| definition 2 | HC | Horizontal Coordinate | Grid points used to determine straight line mileage between locations. Used for mileage-sensitive product pricing. | |
| definition 2 | | HOST OFFICE | An electronic switching system which provides call processing capabilities for one or more Remote Switching Modules or Optical Remote modules. | |
| definition 1 | | Hub | A system of multiple headend equipment in a CATV system consisting of master and satellite headends that relay signals to a local distribution area. Also in a LAN< a device that interconnects workstations at a central location in a star configuration. | |
| definition 2 | | HUB | (1) A group of circuits connected at one point on a network. Hubs enable traffic concentration and economies of scale. Hubs are located in larger cities throughout a network for concentration and routing of calls from cities with lower traffic demands. Nonrecurring See multiport repeater. (2) The center of a star topology network or cabling system. File servers often act as the hub of a LAN. They house the network software and direct communications within the network. They also may act as the gateway to another LAN. | |
| definition 2 | | HUBBING | The receiving, switching, routing and delivery of Signaling System 7 (SS7) messages from one network to another is called hubbing. | |
| definition 1 | HMI | Human Machine Interface | | |
| definition 2 | CCS | Hundred Calling Seconds | The US unit of telephone traffic. Europe and the rest of the world uses the Erlang, one circuit continuously occupied for one hour, so there are 36 CCS to 1 Erlang. 1 CCS equals 100 seconds. | |
| definition 2 | | HUNT GROUP | A group of numbers that can be accessed by dialing one seven-digit telephone number. If the number is busy, the call will be routed to the next available number. Hunt groups can be arranged in circular, or random order. | |
| definition 2 | | HUNTING | (1) Automatic routing of calls to an idle circuit in a prearranged group when the circuit called is busy. (2) The | |

| SOURCE | ACRONYM | TERM | DEFINITION/DESCRIPTION | SEE ALSO |
|---|---|---|---|---|
| | | | movement of a call as it progresses through a group of lines. (Typically, the call will try to be connected on the first line of the group; if that line is busy it will try the second, then the third, etc.) | |
| definition 2 | HTTP | Hypertext Transmission Protocol | The protocol for moving hypertext files across the Internet. The protocol requires a HTTP client program on one end, and an HTTP server program on the other end. HTTP is an important protocol used in the World Wide Web. | |
| definition 1 | IQP | IBAR Queue Processor | | |
| definition 1 | ICC | Illinois Commerce Commission | | |
| definition 2 | | IMPEDANCE | The total opposition (resistance and capacitance) of a circuit to the flow of an alternating current. | |
| definition 2 | IMTS | Improved Mobile Telephone Service | Allows mobile direct distance calling, operator assistance not required. | |
| definition 1 | ICM | Incoming Memory | Used by some CLASS services, such as Return Call to store that last directory number that called a particular subscriber. | |
| definition 1 | ILEC | Incumbent Local Exchange Carrier | Typically, the RBOC or independent who services all local subscribers (prior to a market opening up to local competition.) | |
| definition 2 | ILEC | Incumbent Local Exchange Carrier | Typically, the RBOC or independent who services all local subscribers (prior to a market opening up to local competition). | |
| definition 1 | | Independent Telephone Company | A telephone company not affiliated with one of the former "Bell" telephone companies divested from AT&T or with GTE; sometimes called an independent exchange carrier. There are more than 1,400 independent telephone companies in the US. | |
| definition 2 | IDP | Individual Dialing Plan | A CENTREX feature (translations) that defines customer specific dialing patterns, e.g., star feature to activate Call Forwarding Variable, star feature to activate Automatic Call Back Calling, etc. | |
| definition 1 | INC | Industry Numbering Committee | An industry group of service providers, vendors and other interested parties who focus on public network numbering plan issues. | |
| definition 1 | IAM | Initial Address Message | A CCS/SS7 signaling message that contains the address and routing information required to establish a point-to-point telephone connection. | |
| definition 2 | | INITIAL BLOCK | The first geographic NXX-X block assigned at a unique switching location. | |
| definition 2 | | INSIDE MOVE | A term used to describe the activity of provisioning services associated with the move of the physical termination of services within a building. | |
| definition 2 | IDLC | Integrated Digital Loop Carrier | A device that is used to provide local dial tone service to customers at remote locations (locations other than MCI WorldCom's dial tone switch site). An IDLC is placed at a LEC CO under collocation or at MCI WorldCom's various node sites or customer locations and converts MCI WorldCom's high capacity (typically T1 or DS3) connection to a dial tone for each separate customer line. The use of IDLCs enables MCI WorldCom to efficiently provide dial tone services to multiple customer sites, both directly (on-net) and through the use of LEC unbundled loops (off-net). One IDLC can provide 28 DS1s or 672 customers. | |
| definition 2 | ISUP | INTEGRATED SERVICE DIGITAL NETWORK USER PART | Used for circuit- (trunk) related communication, Integrated Service Digital Network (ISDN) D-channel Signaling Trunk setup, and support for ISDN services. | |
| definition 2 | ISCN | INTEGRATED SERVICES CHANNEL NUMBER | The line equipment associated with the packet handler; also known as Packet Office Equipment (POE). | |
| definition 2 | ISDN | Integrated Services Digital Network | A switched network providing end to end digital transparency where voice and data services are provided over the same transmission and switching facilities. Digital | |

| SOURCE | ACRONYM | TERM | DEFINITION/DESCRIPTION | SEE ALSO |
|---|---|---|---|---|
| | | | communication circuit standard. | |
| definition 1 | ISDN | Integrated Switched Digital Network | A set of CCITT (Consultative Committee on International Telephone and Telegraph) standards that provides for an integrated set of voice and data services over end-to-end digital medium. | |
| definition 1 | ITP | Integration Test Plan | | |
| definition 2 | | INTELETREX (CENTREX) | A business telephone service offered by MCI WorldCom as a local telephone company from a local CO. A single line telephone service delivered to individual desks with features. | |
| definition 1 | IN | Intelligent Network | Hardware and software platform used to provide enhanced voice, video and data services. IN offers one way for a network element to query a central database to obtain local number portability routing information. | |
| definition 2 | IMT | Inter Machine Trunk | Utilized to carry traffic from one MCI WorldCom switch to another. | |
| definition 1 | IVR | Interactive Voice Response | | |
| definition 1 | VRU / IVR | Interactive Voice Response Unit | A unit that responds to signals from a caller's telephone with recorded prompts and messages. | |
| definition 2 | | INTERCEPT | This system maintains messages associated to a specific phone number and makes announcements when the number is used. For instance, a number that is no longer working results in the message announcement stating the number is disconnected or no longer in service. Additionally, if a customer moves, they may require the broadcast message to say the number has changed and a new number is given. | |
| definition 2 | IC | Interexchange Carrier | SEE ALSO: IXC, IEC | IXC, IEC |
| definition 2 | IEC | Interexchange Carrier | SEE ALSO: IC, IXC | IC, IXC |
| definition 2 | IXC | Interexchange Carrier | 1) A common carrier that provides services to the public between local exchanges on an intra or interLATA basis in complicance with local or Federal regulatory requirements and that is not an end user of services provided. 2) Any individual, partnership, association, joint-stock company, trust, or corporation engaged for hire in interstate or foreign communication by wire or radio between two or more exchanges. Any telecommunications service provider permitted to offer intrastate and/or interstate long distance services. In many states IXCs are permitted to carry intralata toll calls as well. SEE ALSO: IC, IEC | IC, IEC |
| definition 1 | IC | Interexchange Carrier | Any common carrier authorized by the FCC and/or state Public Utility Commission to provide Interexchange telecommunications. | |
| definition 1 | IXC / IC | Inter-exchange Carrier | A common carrier that provides long distance between LATAs, between serving areas, and between LATAs and serving areas where the calling or called customer is located in the United States. | |
| definition 2 | ICSC | Interexchange Customer Service Center | A separate group within each telephone company that is organized to handle service orders and customer inquiries for Access Services. | |
| definition 2 | IP | INTEREXCHANGE PROVIDER | Responsible for traffic between Local Access and Transport Areas (LATA's). | |
| definition 1 | IBA | Interface Broadcast Agent | | |
| definition 1 | IBAR | Interface Broadcast Agent Repository | | |
| definition 2 | | INTERFACE DEVICE | A protective device used to facilitate connection between a subscriber loop and the customer provided telephone terminal equipment, often referred to as a Protector. | |
| definition 2 | INP | Interim Number Portability | FCC acceptable interim solution to LNP, commonly provided via Remote Call Forwarding. | |
| definition 2 | | INTERLATA | A term that means between LATA's, thus crossing LATA boundaries. | |
| definition 2 | IDDD | International Direct | The dialing or keying of calls by the subscriber between |

| SOURCE | ACRONYM | TERM | DEFINITION/DESCRIPTION | SEE ALSO |
|---|---|---|---|---|
| | | Distance Dialing | countries. (Also known as IDD.) | |
| definition 1 | ISO | International Organization of Standardization | | |
| definition 2 | IP | Internet Protocol | Defines the unit of information passed between systems providing a basis packet delivery service within the transmission control protocol/Internet protocol (TCP/IP). IP is used in gateways to link networks at an open system interconnection (OSI) network Level 3 and above. IP is a standard that describes how packets of data are transported across the Internet and recognized as an incoming message. | |
| definition 1 | IP | Internet Protocol data field | | |
| definition 2 | | INTER-OFFICE | Term used to describe between two offices, switches, locations, such as between two Central Offices. | |
| definition 1 | | Interoperability Test Plan or | | |
| definition 1 | IIS | Inter-operable Interface Specification | | |
| definition 1 | IPC | Inter-Process Communication | | |
| definition 1 | ISVM | Inter-Switch Voice Mail | | |
| definition 2 | | INTRADA | EDS system that handles service orders. | |
| definition 2 | | INTRALATA | A term that means staying within a LATA. Service or circuit originates and terminates within a single LATA. | |
| definition 1 | ISUP | ISDN User Part | The part of a CCS/SS7 signaling node that is used to develop and format signaling messages. | |
| definition 2 | | IXPlus | MCI WorldCom's commercial customer order administration end-customer billing system. | |
| definition 2 | | JEOPARDY NPA | A condition which describes the forecasted exhaust interval, prior to relief for an NPA. | |
| definition 2 | | JOB STEP | Next screen or process within the service order fulfillment life cycle. | |
| fMCI | KEK | Key Encryption Key | | |
| definition 2 | | KEY SYSTEM | A telecommunications system with multi-button telephone sets on which more than one outside line terminates, allowing several people to answer or use more than one line. (All hardware is typically located on subscriber premises.) | |
| definition 2 | KBPS | Kilobits per second | Thousands of bits per second, a standard unit for designating transmission speed over data lines. Also commonly abbreviated to kbs as in 64kbs. | |
| definition 2 | LSSGR | Lata Switching System Generic Requirement | Bellcore format specification for AMA recording. Most widely used AMA switch format. | |
| definition 2 | | LEASED LINE | Any communication channel leased for exclusive use from a common carrier. SEE ALSO: Private Line | Private Line |
| definition 1 | | Leased Line | A private line leased from a common carrier between two or more points. | |
| definition 2 | LOA | Letter of Authorization | (1) A document that authorizes changing the service provider. (2) A letter giving a common carrier the authority to conduct business with a telephone company on behalf of a customer. For example, an LOA would be used or order circuits or 800 numbers for the customer. | |
| definition 1 | LARG | LIDB Access Routing Guide | | |
| definition 2 | | LINE | The physical and/or logical sets of equipment connections to serve dial tone from a switch location. Line connections could include, but would not be limited to, O.E., IDLC, VRT, Ports, SLC and physical wire connections. | |
| definition 2 | LCEN | Line Card Equipment Number | ISDN eight character numeric assignment that identifies the originating CO equipment assigned to a telephone number, e.g., switch module location, GRID, switch levels, etc. | |
| definition 2 | LCC | Line Class Code | An industry standard term used in translations processing to | |

| SOURCE | ACRONYM | TERM | DEFINITION/DESCRIPTION | SEE ALSO |
|---|---|---|---|---|
| | | | group similar customer services/features together based on their similar switching characteristics. | |
| definition 2 | LEN | Line Equipment Number | (1) Central Office origination equipment providing dial tone. (2) The physical or logical line connections point to a switch. | |
| definition 2 | LIDB | Line Information Database | Database used for line verification for toll service and third party billed services. The Common Channel signaling system process of validation queries to determine the existence of data. Services include validation of calling card numbers, determination of billed lines that automatically reject or accept verification of certain calls billed as collect or bill-to-third party, determine if pay phones are public or semi-public, and determine the status of Central Office codes as active or vacant. | |
| definition 1 | LIDB | Line Information Database | | |
| definition 2 | LOBOM | Line of Business Order Management | Any requirement necessary to manage or maintain orders from a Line of Business perspective. | |
| definition 2 | | LINE SIDE CONNECTION | A line side connection is a facility connecting a telephone set to a switching machine (example: an end-user's telephone and an end office). The line side of a LEC's network is designed to carry local traffic within a given local calling area. | |
| definition 2 | LSI | Line Side Inventory | That portion of MCI WorldCom's Local Service which deals with the mechanization of network element inventory administration. | |
| definition 2 | LTG | Line Treatment Group | A DMS (NorTel) switch-specific code set which permits predefined sets of call blocking to be provisioned. Equivalent to the Call Blocking Access (CBA) code utilized by the Ericsson AXE switch. | |
| definition 2 | | LIT | Transmission via light: the term LIT refers to the connection of the SONET ring via T1 or fiber optics. | |
| definition 2 | LUDM | Living Unit Data Manager | A vendor solution for MSAG E-911 address validation | |
| definition 2 | | LK1 | (1) A product set for local service with Internet utilizing a T1 with digital trunks. (2) A facilities based local T-1 with long distance and local service having both voice and data lines. | |
| definition 2 | | LOAD | A device, or the resistance of a device, to which power is delivered. To raise the power demand of a circuit as by adding resistance. | |
| definition 2 | | LOAD BALANCE | The spread of data over a network in order to cause the routing to be faster, more efficient and more reliable. | |
| definition 2 | | LOAD COIL | Device placed on cable facilities to counteract the capacitance so that high frequencies will travel a greater distance. Reduces line loss to within prescribed ranges. | |
| definition 2 | | LOAD DATA | The capacity data pulled from the mechanized switch port assignment, from the busy hour, loaded via tape into the mechanized switch port assignment database. | |
| definition 2 | | LOAD FACTOR | The load number derived by computing network capacity for the busy hour, figuring the norm, then applying standard deviations to derive numbers to determine load for switch port assignment. | |
| definition 2 | | LOAD GROUP | SEE ALSO: Concentrator | Concentrator |
| definition 2 | | LOADED PAIR | The loading of feeder or distribution plant indicate an electrical condition of amplifying the individual cable pairs. This information is useful for general voice transmission only. | |
| definition 2 | | LOC OFF-NET | The customer is located in an MCI WorldCom unlit building. AN IDLC is installed on the customer premise. This access is not normally shared with other customers within that building. | |

| SOURCE | ACRONYM | TERM | DEFINITION/DESCRIPTION | SEE ALSO |
|---|---|---|---|---|
| definition 2 | | LOC ON-NET | The customer is located in MCI WorldCom fiber lit building. An IDLC is installed in and MCI WorldCom POP and provides local dial tone to all end users within the building. | |
| definition 1 | LATA | Local Access and Transport Area | The geographic regions within which a local telephone company can offer exchange, toll and exchange access. | |
| definition 2 | LATA | Local Access and Transport Areas | (1) A geographical area established for the provision and administration of communications service. Telephone companies cannot provide services across LATA boundaries, only carriers. The company responsible for providing telephone exchange service (local service) and exchange access to long distance carriers. It encompasses the BOC's, GTE, and about 1500 smaller independent telephone companies. (2) Defined under divestiture rules as an area equal to a Metropolitan Statistical Area known as an MSA. | |
| definition 2 | LAN | Local Area Network | A small network, usually contained within a building or a campus, that connects personal computers, printers and other data-communications equipment. | |
| definition 1 | LAN | Local Area Network | A short range, high speed local network using one of the non-switch multiple access technologies. | |
| definition 2 | LASS | Local Area Signaling Services | Software to introduce new features through the 5ESS; the next generation of Custom Calling Features (CCF) such as Call return - last call display, Automatic Redial - auto last dial, Customer Oriented Trace - activate a code to trace caller's number, and Call ID - incoming party identification by display. | |
| definition 2 | | LOCAL CALL | A local call may include any of the following: local within rate center, Expanded Metro, Expanded Local, Corridor calling, Intralata Toll, Intralata directory assistance. | |
| definition 2 | | LOCAL CALLING AREA | The area, consisting of one or more central office districts, in which a subscriber may make telephone calls without a toll charge. | |
| definition 1 | LE | Local Exchange | Geographic region determined by the appropriate state regulatory authority in which calls generally are transmitted without toll charges to the calling or called party. Several local exchanges may exist within a LATA. The area in which a local telephone company can offer regional toll an access services. | |
| definition 1 | LEC | Local Exchange Carrier | The company—most often a local Bell Company—that provides local telephone service and exchange services. The delivery of locally switched services to end-users. LECs also include independent local telephone companies. | |
| definition 2 | LEC | Local Exchange Carrier | A communications-industry term for a telephone company which provides customer access to the public telecommunications network. The company responsible for providing telephone exchange service (local service) and exchange access to long distance carriers, typically given a local franchise authority by state utility regulators. They are responsible for all services within the boundaries or their LATA. The term encompasses the BOC's (Bell Operating Companies), GTE, and about 1500 smaller independent telephone companies. | |
| definition 2 | LEC | LOCAL EXCHANGE COMPANY | SEE ALSO: EC | EC |
| definition 1 | LERG | Local Exchange Routing Guide | Documents end offices and their relationship to Tandem (Class 4 Toll) Offices. Produced by Bellcore Traffic Routing Admin (TRA). | |
| definition 2 | LERG | Local Exchange Routing Guide | A document that defines the end offices (EOs) and their relationship to tandem offices. The LERG is produced by Bellcore traffic routing administration (TRA) and is updated monthly. It contains NPA/NXX routing information as well as effective dates of new NPA/NXX's. It provides an | |

| SOURCE | ACRONYM | TERM | DEFINITION/DESCRIPTION | SEE ALSO |
|---|---|---|---|---|
| | | | overview of the local exchange network. It is typically used for the routing and rating of long distance calls. | |
| definition 2 | | LOCAL EXCHANGE SERVICE | The service offered to customers located in MCI WorldCom buildings. The access method may vary determined by customer requirements and the MCI WorldCom network. | |
| definition 1 | LI | Local Initiatives | | |
| definition 1 | LISP | Local Intra-Service Provider Portability | Movement of end-user TN from one switch to another, but within the same Service Provider's Network. | |
| definition 2 | | LOCAL LOOP | In telephone networks, the lines or channel that connect user premises equipment to the switching system in the central office. The most common form of a loop, a pair of wires, is also referred to as a line. | |
| definition 2 | LMS | Local Measured Service | A time sensitive measured billing service for local completed calls for business customers. | |
| definition 2 | LMU | Local Measured Unit | A time sensitive measured billing service for local completed calls. | |
| definition 1 | LNP | Local Network Portability | The customers ability to retain his/her telephone number when switching to a competing local telephone service provider. | |
| definition 2 | LNP | Local Number Portability | The FCC ordered switch-based capability for a customer to retain their telephone number when moving between local service providers (Service Provider Number Portability or SPNP) or eventually when moving physically | |
| definition 1 | LOSSD | Local Operations Support Systems Development | | |
| definition 2 | LPIC | Local Primary IntraLATA Carrier | The industry term used to describe the equivalent of PIC when applied to IntraLATA service (i.e.: designation of the carrier which will carry a customer's IntraLATA traffic.) | |
| definition 2 | LRN | Local Routing Number | (1) The FCC accepted technological solution to provide LNP, by which every switch will be provided with a number identifier, much like the current NPA/NXX, which will be used in the case of routing a ported number. For purposes of routing, the LRN will replace the dialed number until the far-end switch is reached, at which time the LRN will be re-replaced by the original dialed number for local call completion. (2) A ten digit number which identifies the customers recipient switch (for call routing) and the customers rate center (for billing). | |
| definition 1 | LSAT | Local Service Activity Tracker | | |
| definition 2 | LSMS | Local Service Management System | Industry term for the manual or mechanized number administration and assignment process necessary to support LNP within a service providers' company. | |
| definition 1 | LSMS | Local Service Management System | | |
| definition 2 | LSOG | Local Service Ordering Guidelines | A set of guidelines, forms, instructions and specifications for requesting local telecommunications services; issued by OBF on recommendation of its membership committees. | |
| definition 2 | LSP | LOCAL SERVICE PROVIDER | A term intended to encompass all companies providing dial tone to end users, including but not limited to Incumbent Local Exchange Carriers (ILEC), Alternative Local Exchange Carriers (ALEC) and PBX providers. | |
| definition 1 | LSP | Local Service Provider | The company that provides basic local telephone service. | |
| definition 2 | LSP | Local Service Provider | A term used to indicate the identity of an end user's local provider. | |
| definition 1 | LSPP | Local Service Provider Portability | Movement of end-user TN from one Service Provider to another Service Provider. | |
| definition 1 | LSR | Local Service Request | | |
| definition 2 | LSIG | Local Services Implementation Group | See section 3 for an explanation of the different responsibilities of this MFS work group. | |
| definition 2 | LSO | Local Serving Office | The Central Office in which a customer's loop is terminated. | |
| definition 1 | LSI | Local System Integration | | |
| definition 1 | LRN | Location Routing | A proposed implementation solution for providing LNP | |

| SOURCE | ACRONYM | TERM | DEFINITION/DESCRIPTION | SEE ALSO |
|---|---|---|---|---|
| | | Number | which utilizes AIN triggers, SS7 signaling, and unique 10-digit code for switch identification. The Illinois LNP Task Force and major network telecommunications vendors as an optimum long-term implementation solution have endorsed LRN for Local Number Portability. A routing number in the same form as a TN used to identify the TN's serving switch when the TN is a ported number. | |
| definition 1 | LD | Long Distance | | |
| definition 2 | LAC | Loop Assignment Center | A plant organization that administers and controls outside local cable/pair assignments. | |
| definition 2 | | LOSS | Reduction in signal strength, expressed in decibels, or power dissipated in a circuit. Also called attenuation. The opposite of gain. Generally, the higher the loss, the lower the transmission quality, although a certain amount of loss may be desirable. | |
| definition 2 | | LT1 | (1) A product set for local service and long distance utilizing a T1 with digital trunks. (2) A facilities based local T-1 with long distance and local service having only voice lines. | |
| definition 2 | | LUP | This is the Service Order designation for off net Local Unbundled Loop Exchange Service. A type of order in the CCI system which uses unbundled copper loops leased from the incumbent local exchange carrier to connect ports on the MCI WorldCom IDLC in an ILEC collocation to the customer premise. | |
| definition 2 | | MAC | Mechanized Assignment & Control | |
| definition 1 | MAPI | Mail Application Program Interface | | |
| definition 2 | MDF | Main Distribution Frame | Sometimes referred to as Main Distributing or Distribution Frame. The structure for terminating permanent wires of a telephone Central Office, PBX, or private exchange and for permitting the easy change of connections between them by means of cross-connecting wires. | |
| definition 2 | MML | Man | The code used to instruct a 'smart' network element (i.e. switch). The MML varies depending on the network element vendor. | |
| definition 1 | GDMO | Managed Objects | | |
| definition 2 | MIB | Management Information Base | A database of network management information used by the open system interconnection (OSI) common management information protocol (CMIP) and the transmission control protocol/Internet protocol (TCP/IP) simple network management protocol (SNMP) standard. | |
| definition 1 | MIS | Management Information System | | |
| definition 1 | MAN | Master Account Number | | |
| definition 2 | MSAG | Master Street Address Guide | A guide used for E 911 service. | |
| definition 1 | MINA | MCI Local Intelligent Network Architecture | | |
| definition 1 | NNMC | MCI National Network Management Center | | |
| definition 1 | SHL | MCI Systemhouse | | |
| definition 1 | | MCI Systemhouse | | |
| definition 1 | MCIT | MCI Telecommunications | | |
| definition 2 | MTTR | Mean | The average amount of time required to repair a system or component that has developed a "trouble." | |
| definition 2 | MTBF | Mean Time Between Failures | The average length of time during which a system or component operates without fault. | |
| definition 2 | MTTR | MEAN TIME TO REPAIR | When a system, or a component of the system, develops a fault, this is the average time taken to correct the fault. | |
| definition 2 | MAC | Media | (1) The lower sublayer of the data link layer in the open system interconnection (OSI) model. MAC is responsible for scheduling, gaining access, and transmitting and receiving data on the network media. (2) A generic term for | |

| SOURCE | ACRONYM | TERM | DEFINITION/DESCRIPTION | SEE ALSO |
|---|---|---|---|---|
| | | | the way in which workstations gain access to transmission media. The term is most widely used in reference to local area networks (LANs). | |
| definition 1 | MAC | Media Access Controller | | |
| definition 2 | MPB | Meet Point Billing | An arrangement where MCI WorldCom and a LEC jointly provide the transport of switched access service to one of the LEC's end office switches which connects to the IXC. Under this arrangement, both MCI WorldCom and the LEC share the transport revenues defined by the access tariff. | |
| definition 2 | MBPS | Megabits per second | One million bits per second, a standard measurement unit of digital transmission speed in T-1 and lightwave (or fiber optic) systems. Also commonly abbreviated to mbs as in 1.54mbs. | |
| definition 1 | MD5 | Message Digest (Version 5) | | |
| definition 1 | MTP | Message Transfer Part | The functional part of a common channel signaling system that transfers signaling messages as required by all the users, and that performs the necessary subsidiary functions, for example, error control and signaling security (Levels 1, 2, and 3 of SS7). | |
| definition 2 | MTP | MESSAGE TRANSFER PART | This SS7 protocol consists of three levels: physical, link, and network. | |
| definition 2 | | MESSAGE TRUNK | A telecommunications path between two telephone company switching systems. Message trunks are used for the completion of calls within the network. | |
| definition 2 | MB | Metered Business | Refers to a Business class of service billed a fixed monthly access line rate plus local measured service charges. | |
| definition 2 | MR | Metered Residence | A type of local monthly residential service that allows a certain number of local monthly calls for a certain monthly rate (lower than "flat rate" service). Each additional call is charged at a set rate. | |
| definition 2 | | METERED SERVICE | A local exchange option that allows customers to include a maximum number of local calls with the monthly access line charge. This offers a reduced monthly rate from the unlimited service. Calls exceeding the allowable plan are charged on a per call (not duration) basis. | |
| definition 1 | | Metro Intelligent Network Architecture | | |
| definition 2 | MAN | Metropolitan Area Network | A local area network (LAN) interconnected within roughly a 50 mile radius. MANs typically use fiber-optic cable to connect various wire LANs. Transmission speeds may vary from 2 to 100 Mbps. The Institute of Electrical and Electronic Engineers (IEEE) 802.6 standard specifies the protocols and cabling for a MAN. However they could not be superseded by asynchronous transfer mode (ATM) protocols. | |
| definition 2 | | MICROWAVE | In communications, a way of sending voice, data, or video signals through the air as high-frequency radio waves, to obtain high transmission capacities at lower cost than copper cable systems. Microwave systems carry analog or digital signals on a line of sight between antennas or on satellite uplinks and downlinks. | |
| definition 2 | | MILESTONE | A significant service order event within the MCI WorldCom provisioning process. An informative message generated upon the updating of a task in AM. | |
| definition 2 | MTSO | Mobile Telephone Switching Office | The telephone switching equipment associated with mobile or cellular type call processing. | |
| definition 2 | | MODEM | A contraction of a modulator and demodulator. The term may be used when the modulator and demodulator are associated with one telecommunications device used for basic data transmission. | |
| definition 1 | | Modem Pool | A centralized pool of modems accessed through a PBX to provide off-net data transmission from modemless terminals. | |

| SOURCE | ACRONYM | TERM | DEFINITION/DESCRIPTION | SEE ALSO |
|---|---|---|---|---|
| definition 2 | MFJ | Modified Final Judgment | The agreement between the U.S. Department of Justice and AT&T governing the breakup of the pre-divestiture Bell systems into AT&T and 22 Bell Operating Companies (BOC's) and other entities. On August 26, 1982, U.S. District Court Judge Harold Greene accepted, with modifications, an AT&T/Justice Department settlement terminating the government's 1974 antitrust suit against AT&T. Judge Greene's decree eliminated the provisions of the 1956 consent decree that had kept AT&T out of competitive, unregulated ventures. The MFJ settled the 1974 antitrust suit and specified the divestiture of AT&T. The MFJ created the seven regional holding companies (Baby Bells), BOC's, local access transport areas (LATA's), equal access, and so forth. AT&T retained long-distance service and its manufacturing business. The restriction that barred AT&T from entering the computer business was lifted. | |
| definition 1 | MF | Multi-Frequency | Refers to inband, analog trunk signaling. | |
| definition 2 | MF | MULTIFREQUENCY SIGNALING | The traditional telephone signaling system in which the call set-up information (telling the network where to route the call) is transmitted on the same pathway that carries the call itself. | |
| definition 2 | | MULTIPLE DID/DN'S | Allows the customer to install multiple inbound trunks with one billing number. | |
| definition 2 | | MULTIPLE SPANS | Several PRI's grouped together in the same trunk group. Calls flow from PRI to PRI when busy. PRI's can be at different locations. Maximum of seven overflows within one switch. (MCI WORLDCOM version is Direct Termination Overflow-within same switch) | |
| definition 2 | MAU | Multistation Access Unit | A concentrator used in token-ring networks to connect multiple stations. The token-ring MAU and an arrangement of internal relays function as bypass switches and connect stations to form a complete electrical ring. MAUs can be connected to create larger rings. | |
| definition 2 | | MYNAH | A Bellcore scripting tool designed to process flows for testing purposes or as an adjunct to system application support. MYNAH is planned to be used to support the update of telephone numbers in CNUM based on Activation Manager (AM) completion's. | |
| definition 2 | | N ORDER | A service order written to establish a new customer account or an individual service of an existing account. | |
| definition 2 | | NAILED UP NETWORK | A permanently established connection between two interfaces. | |
| definition 2 | NENA | National Emergency Number Association | A not for profit association furthering the goal of one nation one number, that number being 911. | |
| definition 2 | NECA | National Exchange Carrier Association | An online database system that allows MCI WorldCom to inquire and update Vertical and Horizontal Coordinates (point of presence) and Billing Percentages. NECA administers the FCC Tariff No. 4. | |
| definition 2 | NSC | National Service Center | A MCI WorldCom service center in Omaha, Nebraska which answers all inbound calls from customers and addresses all non-technical troubles. Technical troubles are referred to the CSTS. | |
| definition 2 | | NETWORK | The physical configuration of hardware and software necessary to enable communication. SEE ALSO: Switched Network. | Switched Network |
| definition 2 | NC | Network Channel | Industry standard codes that define the type of service provided at each end of a circuit. | |
| definition 2 | NCTE | Network Channel Terminating Equipment | The general name for equipment that links the network to a customer's premises. | |
| definition 1 | NCC | Network Control Center | | |
| definition 2 | | NETWORK CONTROL SIGNALING | The transmission of signals which perform functions such as supervision (control, status, and charge signals), address | |

| SOURCE | ACRONYM | TERM | DEFINITION/DESCRIPTION | SEE ALSO |
|---|---|---|---|---|
| | | | signaling (e.g., dialing), calling and called number identification, rate of flow, service selection error and audible tone signals (call progress signals indicating re-order or busy conditions, alerting, coin denominations, coin collect and coin return tones) to control the operation of the telecommunications system. | |
| definition 1 | NCS | Network Control System | | |
| definition 2 | NDM | Network Data Mover | A file transmission protocol software. | |
| definition 2 | NE | Network Element | An industry term generically applied to any piece of physical or logical equipment or facility necessary to support a service. NE can either be smart or non-smart. A smart NE can be remotely addressed and/or provisioned whereas a non-smart NE cannot. | |
| definition 2 | NECC | Network Element Control Center | Handles provisioning and maintenance of unbundled services. Establishes coordinated intervals and schedules to enable provisioning of unbundled services. The center also coordinates work activities between various work groups. | |
| definition 2 | NEP | Network Element Processor | The NE-facing portion of the Architel ASAP application which physically performs communication with the NE. | |
| definition 1 | NFS | Network File System | | |
| definition 2 | | NETWORK INTERCONNECTION | SEE ALSO: EOI | EOI |
| definition 2 | NIC | Network Interface Card | SEE ALSO: NID | NID |
| definition 2 | NID | Network Interface Device | The demarcation point between the unbundled loop and the customer's inside wiring. The NID is installed at the customer location, typically in the basement of the building or in the telephone closet in close proximity to the customer. | |
| definition 1 | NSAP | Network Layer Service Access Point (OSI) | | |
| definition 2 | NMC | Network Management Center | The MCI WorldCom Network Management Center (NMC) in Dallas provides 24 x 7 hour management of the data network including any CPE and central data switches. The metropolitan fiber networks will be managed from Oakbrook, Chicago. | |
| definition 1 | | Network Management Control | The capabilities of an exchange or Interexchange carrier to monitor and control the technical performance of its telephone network to ensure quality service. | |
| definition 2 | NMS | Network Management System | Generic title for OSS (Operational Support Systems) that interface with the telecommunications networks such as: | |
| definition 2 | NMP | Network Mediation Platform | An intermediate process between the source creation of call detail records for local and long distance traffic and the end processes of fraud investigation, access billing, and end user customer billing systems. NMP polls records from switches or receives records as transmissions from external sources (i.e., Clearing House, ILECS). NMP edits, controls, audits, reports, reformats, and routes the call records to the appropriate systems. | |
| definition 2 | NOS | Network Operating System | The software program that provides the local area network (LAN) user an interface and control of the user network interface. The NOS communicates with the LAN hardware and the computer operating system. Network operating systems are usually in two parts; server and client/requester. The requester puts the workstation onto the network and re-routes data over the network when necessary. The server software runs on the server machine and makes disks, software, ports, and other facilities available to a node on request. Each device's services requested by a PC are accessed by the requester software. | |
| definition 1 | NOF | Network Operations Forum | Non-Portable Number: those that have not been designated as ported exchanges or portable capabilities. | |
| definition 2 | NP | Network Provisioning | That portion of the MCI WorldCom's IS Local Service which deals with mechanized NE provisioning of service. | |
| definition 1 | NSPS | Network Service | | |

| SOURCE | ACRONYM | TERM | DEFINITION/DESCRIPTION | SEE ALSO |
|---|---|---|---|---|
| | | Provisioning System | | |
| definition 2 | NSAR | Network Switch Alternate Routing | A disaster recovery service that allows the subscriber to reroute calls if their primary Control Office Switch fails. | |
| definition 2 | | NEUTRALIZING TRANSFORMER | A device installed on telecommunications facilities at power station locations to protect the public network plant against excessive voltages impressed on lines at the time of a power system fault or a lightning surge on the power lines. | |
| definition 2 | | NEW DIAL TONE PROVIDER | This is the service provider who is providing the switch dial tone for the customer after the port. | |
| definition 1 | NSP | New Service Provider | Subscribers selection of exchange carrier that will be providing dial tone. This will usually be the exchange carrier that is not the default provider for the NPA. This would be the recipient switch for the porting of a number when the subscriber is being ported. When the subscriber is changing from ported to non-ported the NSP would be the donor switch. | |
| definition 2 | | NEW SERVICE PROVIDER | This is the new service provider through which the customer is arranging to port their local service. The New Service Provider could be either the ILEC, some other LEC, a CLEC, or a Reseller. | |
| definition 1 | | Node | The switching system or computer that provides access to the network and serves as the concentration point for trunks. | |
| definition 2 | | NODE | A concentration point in a network where numerous trunks come together at the same switch. | |
| definition 2 | | NOISE | Unwanted electrical signals present on the telephone circuit. Sources of noise include; power line induction, cross talk from other telephone circuits (unbalance), internal noise from telephone amplification, switching, etc. Noise is measured in dBrnC. | |
| definition 2 | NRC | Nonrecurring Charge | Any one-time charge, as for line installation, on a subscriber's bill. | |
| definition 2 | NWH | NORMAL WORKING HOURS | Monday - Friday, 8am - 5pm; when most basic installation and maintenance activities are performed. | |
| definition 2 | NNAG | North American Numbering Assignment Group | The BellCore Group responsible for the administration and assignment of NPA and NXX combinations that are processed through the BellCore Clearing House and are published as monthly updates on the LERG. | |
| definition 2 | NANC | North American Numbering Council | FCC appointed/charged body responsible for making decisions concerning the North American Numbering Plan, particularly as the NANP is effected by the introduction of Local Number Portibility. | |
| definition 1 | NANC | North American Numbering Council | | |
| definition 2 | NANP | North American Numbering Plan | A system developed by the Bell System and now administered by Bellcore. It provides for the assignment of area codes and prefixes; numbering plan area (NPA) area codes, NXX Exchanges and XXXX line numbers. NANP is the numbering scheme used for the public switched telecommunications networks within North America and the Caribbean. | |
| definition 1 | NANP | North American Numbering Plan | The system for assigning 10-digit telephone numbers in North America where the first three numbers represent an area code, the second three a local telephone exchange within that area, and the final four digits a particular subscriber's line within the exchange. | |
| definition 2 | NPA-NXX | NPA-NXX | The first six (6) digits in the ten (10) digit North American Numbering Plan (NANP) in which the NPA (Numbering Plan Area) is the area code and the NXX is the prefix (or exchange) which handles that traffic. | |
| definition 1 | NSS | NPA-NXX Split Subsystem | | |
| definition 2 | | NUMBER ADMINISTRATOR | Responsible for managing numbering resources within MCI WorldCom, reserving numbers for special customer orders, | |

| SOURCE | ACRONYM | TERM | DEFINITION/DESCRIPTION | SEE ALSO |
|---|---|---|---|---|
| | | | enforcing a rate center compliance. | |
| definition 1 | | Number Portability | A process where the end-user can move from one switch to another while retaining their original DN. | |
| definition 2 | | NUMBER PORTABILITY | (1) Service Provider Portability: the ability of an end user to retain the same geographic or non-geographic (NANP) numbers as that end user changes from one service provider to another. (2) Location Portability: the ability of an end user to retain the same geographic or non-geographic (NANP) numbers as that end user moves from one permanent location to another. | |
| definition 1 | NPAC | Number Portability Administration Center | | |
| definition 1 | NPAC SMS | Number Portability Administration Center and Service Management System | | |
| definition 2 | NPAC SMS | Number Portability Administration Center Service Management System | A hardware and software platform which contains the database of information required to effect the porting of telephone numbers. | |
| definition 2 | NPC | Number Portability Center | The MCI WorldCom operations group responsible for managing lnp porting subscriptions and npac network activations. | |
| definition 2 | NRSA | Number Retention Service - Assumed | A number which resides outside the common block being leased by MCI WorldCom for that switch, but the LEC allows the ANI to be part of the common block | |
| definition 2 | NRSF | Number Retention Service - Forwarded | A number which resides outside the common block, but the LEC will not allow the number to be assumed into the block leased by MCI WorldCom | |
| definition 1 | NPA | Numbering Plan Area | In the US., the three digits in positions 1,2 and 3 in a 10 digit telephone number: NPA-NXX-XXXX. | |
| definition 2 | NPA | Numbering Plan Area | The first three digits of a North American Dialing Plan number, also known as area code, of which there are over 200 in the United States, Canada, Bermuda, the Caribbean and Northwestern Mexico. Within any of these area codes, no two telephone lines may have the same seven digit number. | |
| definition 2 | | NXX | Code that designates a specific central office or exchange. In a seven digit local phone number, the first three digits identify the specific telephone company central office which serves that number. These digits are referred to as the NXX where "N" is any number from 2 to 9. "X" is any number from 0 to 9. The format looks like NPA-NXX-LINE. A North American Central Office Code. | |
| definition 2 | | OFF-HOOK | The active condition of Switched Access or a Telephone Exchange Service line. When a telephone handset is removed from its switchook, the loop is closed and the line is in the "Off Hook" condition. | |
| definition 1 | OCT | Office Code Trigger | An AIN trigger that is accessed based on dialed digits, particularly for a Local Number Portability application, although it can also be used by other applications as well. | |
| definition 2 | ODP | Office Dialing Plan | Traffic Engineering switch translations that establish Central Office dialing plans, e.g. 1+ routes calls to a customers PIC, 911 routes customers to the 911 Center, etc. | |
| definition 2 | | OLD LOOP PROVIDER | This is the service provider who is providing the physical loop facilities for the customer prior to the port. | |
| definition 2 | | OLD SERVICE PROVIDER | This is the local service provider through which the customer has local service before the port. The Old Service Provider could be either the ILEC, some other LEC, a CLEC, or a Reseller. | |
| definition 2 | | ON-HOOK | The idle condition of Switched Access or a Telephone Exchange Service line. The telephone handset is resting on the switchook. | |

| SOURCE | ACRONYM | TERM | DEFINITION/DESCRIPTION | SEE ALSO |
|---|---|---|---|---|
| definition 1 | OLTP | Online Transaction Processing | | |
| definition 2 | | OPEN | A break in the continuity of a transmission path or circuit. | |
| definition 1 | ODBC | Open Database Connectivity | | |
| definition 2 | ONA | Open Network Architecture | The structural design of a communications network that permits all types of terminals and users to have access to any network capability without compatibility restrictions. | |
| definition 2 | OSI | Open System Interconnection | International standard describing seven layers of communications protocols--physical, data link, network, transport, session, presentation, application--which allow many dissimilar information systems (including computers, workstations, PBXs, etc.) to be interconnected. | |
| definition 1 | OSI | Open Systems Interconnect | A seven-layer data communications protocol model that specifies standard interfaces that all vendors can adapt to their own designs. | |
| definition 1 | OCN | Operating Company Number | | |
| definition 2 | OCN | Operating Company Number | A four digit number used to identify the local exchange carrier (LEC) for each automatic number identification (ANI). OCN is used with switch update processing systems (SUPSs) and CIS. | |
| definition 1 | OPGUI | Operational Graphical User Interface | | |
| definition 2 | OSS | Operational Support Systems | An information system that directly supports the operation of the network-based business, including provisioning, repair, maintenance, customer service, billing, and network surveillance. SEE ALSO: NMS Network Management Systems. | NMS |
| definition 2 | OSS OM | Operational Support Systems Order Management | Any requirement necessary to activate an IS Local Service Line Order in the OSS. | |
| definition 1 | OPH | Operations Handling | | |
| definition 1 | OAM | Operations, Administration and Maintenance | ...involved in maintaining a telecommunications network. | |
| definition 2 | ONI | Operator Number Identification | Operator dependence for toll number identification. | |
| definition 1 | OSP | Operator Service Provider | | |
| definition 2 | OPS | Operator Services | SEE ALSO: OS | OS |
| definition 2 | OS | Operator Services | Any of a variety of telephone services which need the assistance of an operator or an automated "operator" (i.e. using interactive voice response technology and speech recognition). Such services include collect calls, third party billed calls and person-to-person calls. | |
| definition 2 | FIBER | OPTIC SYSTEMS | A generic term in the telephone industry for a transmission system based on glass fibers. | |
| definition 2 | OC | Optical Carrier | Transport levels defined for synchronous optical networks (SONET). The current levels are: OC - 1, 3, 9, 12, 18, 24, 36, 48, 96, 192. Each OC1 is the optical equivalent of a DS1 level digital signal as far as bandwidth, although the actual electronic equivalent of an OC1 is termed an STS1(Synchronous Transport Signal). | |
| definition 2 | ORM | Optical Remote Module | Remotely controlled electronic end office switch which is connected to the host by optical fiber. SEE ALSO: RSM. | RSM |
| definition 2 | OCP | Optional Calling Plan | A special billing arrangement of toll messages offered to customers at their option. Typically involves a fixed charge in exchange for reduced rates on individual calls that qualify under each plan's particular criteria. | |
| definition 2 | | ORDER ENTRY | A MCI WorldCom service center where service orders are initiated and administered. | |
| definition 2 | | ORDER EXPEDITE | A service order that requires accelerated handling to meet internal or customer requirements. There may or may not be | |

| SOURCE | ACRONYM | TERM | DEFINITION/DESCRIPTION | SEE ALSO |
|---|---|---|---|---|
| | | | additional charges to process an expedited request. | |
| definition 1 | OP | Order Processing | | |
| definition 1 | OE | Order/Entry | | |
| definition 2 | OBF | Ordering and Billing Forum | A forum of the Carrier Liaison Committee (CLC). The OBF provides a forum for customers and providers in the telecommunications industry to identify, discuss and resolve national issues which affect ordering, billing, provisioning and exchange of information about access services, other connectivity, and related matters. | |
| definition 1 | OPC | Originating Point Code | The part of a routing label that identifies which CCS/SS7 signaling point sent a signaling message. | |
| definition 2 | OCC | Other Charges and Credits (not to be confused with "Other Common Carriers") | The prorating of recurring charges necessary to start up or end monthly service billing, and non-recurring charges. | |
| definition 1 | OGDC | Ottawa Global Development Centre | | |
| definition 2 | OOS | Out of Service | Condition where telecommunication service has been made unavailable to a user. | |
| definition 2 | PORTED | OUT TELEPHONE NUMBER | A Local Service Provider's term for the end user's telephone number migrated to a different Local Service Provider. | |
| definition 1 | O-ASR | Outbound Access Service Request | | |
| definition 1 | OCM | Outgoing Call Memory | Used by some CLASS services, such as Repeat Call, to store the last directory number that was called by a subscriber. | |
| definition 2 | OUT | OUT-OF-BAND SIGNALING | Signaling System 7 allows you to send signaling information on a circuit separate from the voice/data circuit. | |
| definition 2 | | OUTSIDE MOVE | A term used to describe the activity of provisioning services associated with the move of services from one End User location to another. | |
| definition 2 | | OVERFLOW | (1) Switching equipment which operates when the traffic load exceeds the capacity of the regular equipment. (2) Traffic which is handled on overflow equipment. (3) Traffic which exceeds switching capacity and is lost. (4) The carry digit in a digital computer. (5) Intermediate message storage which serves as an extension of in-transit storage to preclude system saturation (ie: magnetic tape). | |
| definition 2 | | PACKET | A unit of digital data with a set number of bits, including some bits that serve as destination or "address" code. The unit, or packet, can be separated from the rest of its message components and sent through a specially switched communications network to its destination, where it can be reunited with the other message components, regardless of which paths they took enroute. | |
| definition 2 | PAD | Packet Assemblers/Disassemblers | Provides necessary interface and protocol conversion to allow terminals to utilize the packet switch network. | |
| definition 2 | POE | Packet Office Equipment | ISDN D Channel signaling assignment. | |
| definition 2 | PSDN | Packet Switched Data Network | Switching and transmission facilities utilizing packet switching data transport to deliver blocks of data (packets) through the network. | |
| definition 2 | | PACKET SWITCHING | A transmission technique that cuts cost and maximizes use of digital transmission facilities by transmitting packets of digital data from many customers simultaneously on a single communications channel. Special digital switches are required. Packet switching can serve both local area networks (LANs) and wide area networks (WANs). | |
| definition 2 | | PAIR GAIN SYSTEMS | Pair gain systems are also called carrier systems. The term pair gain implies the carrier system creates the appearance of more pairs than physically exist in the network. This allows multiple calling paths on a single copper pair. | |
| definition 2 | | PAY TELEPHONE | Telephone Company provided instruments and related facilities that are available to the general public for public | Coin Station |

| SOURCE | ACRONYM | TERM | DEFINITION/DESCRIPTION | SEE ALSO |
|---|---|---|---|---|
| | | | convenience and necessity, including public and semipublic telephones, and coinless telephones. SEE ALSO: Coin Station | |
| definition 2 | PIU | Percent Interstate Usage | The percentage of time that a facility or circuit is used for interstate transmissions. PIU is used to allocate access services between state and federal jurisdictions for pricing purposes. | |
| definition 1 | PVC | Permanent Virtual Circuit | A virtual circuit that provides the equivalent of dedicated private line service over a packet switching network. | |
| definition 1 | PDP | Permissive Dialing Period | | |
| definition 2 | PCN | Personal Communications Networks | SEE ALSO: PCS | PCS |
| definition 1 | PCS | Personal Communications System (or Service) | Provides for low-power, lower cost wireless service. | |
| definition 2 | PCS | Personal Communications Systems | Although there is some debate as to what a PCN or PCS actually is, certain essential ingredients are agreed upon. A PCN or PCS is a telephone system in which the copper subscriber loop is replaced by a low-power digital radio link, which gives the user increased mobility. | |
| definition 1 | PIN | Personal Identification Number | | |
| definition 2 | PIN | Personal Identification Number | A unique number permitting a customer to exercise a function. | |
| definition 2 | | PHOTONICS | The use of fundamental particles of light called "photons" to form coded light pulses that convey information in digital form. Photons are to optical fibers what electrons are to copper wires. | |
| definition 2 | PCO | PIC Change Order | The CIS process to notify the LEC, on behalf of a customer, to direct all long distance calls from the customer's telephone number to MCI WorldCom. | |
| definition 2 | POTS | Plain Old Telephone Service | Basic Telephone Service Access that provides analog switching. | |
| definition 1 | POTS | Plain Old Telephone Service | The collection of interconnected systems operated by the various telephone companies and administrations (PTTs) around the world. | |
| definition 2 | PRD | Plant Ready Date | The date that engineering is required to complete facility designs and circuit layouts on service work orders. The Plant Ready Date is always prior to an Order Due Date. | |
| definition 2 | PTD | Plant Test Date | This is the date that the circuit is to be wired by the frames and tested end to end to ensure continuity and that it meets design specifications. | |
| definition 2 | | POINT CODES | There are two types of point codes: (1) Site Point Codes - represent the physical network address of the STP (signaling transfer point) and (2) Alias Point Codes - 'Pseudo' codes used in database type services. | |
| definition 1 | POC | Point of Contact | | |
| definition 2 | POI | Point of Interconnection | The physical location at which carrier networks interface. In the instance of an IXC/LEC POI, the interconnection allows for the origination and termination of long distance calls. LEC/LEC POI allows for the origination and termination of local and toll calls to and from end users subscribing to the other different LEC local service. | |
| definition 2 | POP | Point of Presence | 1) The physical location of an interexchange carrier to which the LEC delivers local access facilities. 2) a physical location within a LATA at which an access customer establishes itself for the purpose of obtaining LATA access and to which the LEC provides access services. | |
| definition 2 | POT | Point Of Termination | The point of demarcation at which the Telephone Company's responsibility for the provision of service ends. The company's designated point of termination for CLEC traffic terminated to the Company shall be the Pot Bay of a collocated interconnection node at the terminating end user's designated serving tandem. CLEC's purchasing | |

| SOURCE | ACRONYM | TERM | DEFINITION/DESCRIPTION | SEE ALSO |
|---|---|---|---|---|
| | | | services out of the tariff must reciprocally make available to the Company at least one designated POT for each NPA in each LATA which it has customers. | |
| definition 2 | PPP | Point to Point Protocol | The Internet standard method for transmitting Internet protocol (IP) packets over serial point-to-point links. PPP supports asynchronous and synchronous lines. PPP has a number of advantages over serial line Internet protocol (SLIP): it is designed to operate both over asynchronous connections and bit-oriented synchronous systems; it can configure connections to a remote network dynamically, and test that the link is usable. | |
| definition 1 | POP | Point-Of-Presence | A physical location within a distant entity (for example, LATA). (1) The physical point at which an LEC interfaces with its customer. (2) The physical point at which an IXC interconnects with a LEC or CAP. | |
| definition 2 | | POINT-TO-MULTIPOINT | A circuit that connects point 'A' with points 'B', 'C', 'D', etc. | |
| definition 2 | | POINT-TO-POINT | A direct communications circuit between two terminations. (EX: point 'A' to point 'B') | |
| definition 1 | PPP | Point-To-Point Protocol | | |
| definition 1 | | Portability | The ability of the user to change local telephone companies, location and/or service without changing the telephone number. | |
| definition 2 | | PORTABLE NUMBER | The NPA-NXX of the number has been specified as portable. However, the number may or may not have been ported away from the owner. | |
| definition 1 | | Portable Number | those numbers within an exchange that have portable capabilities and are assigned to a designated portable exchange. These are the numbers that are assigned to the designated default switch and have not been ported to another LSP. These numbers are commonly identified as working on the "Donor" switch. | |
| definition 1 | | Portable numbers are all numbers in a NXX where portability is allowed. Numbers will be declared portable on an NXX basis. | | |
| definition 1 | | Ported Number | are those that have been assigned to other LSPs providing recipient switch access for Portable exchanges. This is commonly termed as the numbers assigned to the "Recipient" switches. The "Recipient" switch is not the default switch in the SCP. Ported numbers are the subset of portable numbers that have actually been moved from the LERG based switch (donor) to another switch (recipient). | |
| definition 1 | PORTED TN | Ported Telephone Number | A TN ported to a switch that is not the NANP-assigned switch. | |
| definition 2 | | PORTED-IN TELEPHONE NUMBER | A telephone number from another local service provider that is ported-into a MCI WorldCom switch when a customer changes their local service from another Local Service Provider to MCI WorldCom. | |
| definition 2 | | PRA | Primary rate interface for International ISDN. See PRI for definition of Primary Rate Interface. | |
| definition 2 | | PREMISES | The space occupied by a customer, or authorized or joint user in a building or buildings on continuous property, not separated by a public highway. Railroad rights-of-ways, and so forth are not included in this description. | |
| definition 2 | PRE-OP | Pre-Operational | The state equipment would have prior to being made ready for assignment. In system administration terms, making the equipment ready for assignment. | |
| definition 1 | PSAP | Presentation Layer Service Access Point Address (OSI) | | |

| SOURCE | ACRONYM | TERM | DEFINITION/DESCRIPTION | SEE ALSO |
|---|---|---|---|---|
| definition 2 | | PRESUBSCRIPTION | A service that permits each customer served from an equal access switching system to route, without the use of access codes, the customer's interlata traffic to the one interexchange carrier (IC) the customer has chosen. The customer may use other IC networks by dialing the appropriate carrier-access code, 10XXXX. A customer may utilize a separate carrier for intra-lata calls. | |
| definition 2 | PANS | Pretty Advanced New Stuff | Allows new technology switching capabilities for both voice and data. Telephone services beyond basic telephone access. | |
| definition 2 | PIC | Primary Interexchange Carrier | Customers' elected or assigned long distance carrier. | |
| definition 1 | PIC | Primary Inter-exchange Carrier | The IXC that a subscriber has chosen to provide long distance service. | |
| definition 2 | PRI | Primary Rate Interface | In ISDN, the specification for the interface at each end of high-volume trunks linking PBX and central office facilities, or connecting network switches to each other. It consists of 23 "B" or "bearer" channels operated at 64 kilobits per second, and a "D" or "data" channel also functioning at 64 kilobits per second. The combined signal-carrying capacity is 1.544 megabits per second—equivalent to a digital signal hierarchy level of DS-1. | |
| definition 2 | PN | PrimeNumber | A subscriber service that lets businesses with multiple locations advertise a single telephone number. | |
| definition 2 | PBX | Private Branch Exchange | A private telephone switching system generally located on a customer's premises. Many businesses and government agencies use PBX's to provide internal switching and access to the public switched network for voice and data communications. PBX's may also provide least call routing selection, individual station message detail recording, voice mail, etc. Both PBX and hybrid PBX systems provide pooled access to a group of access lines typically by dialing "9" from an internal station set. | |
| definition 1 | PBX | Private Branch Exchange | System typically installed in a business that serves as the central telephone system for that business and which might provide certain enhanced services for that business. Private Automatic Branch Exchange or PABX is a term often used synonymously with PBX. | |
| definition 2 | | PRIVATE LINE | A dedicated, non switched circuit leased by a telephone customer for its exclusive use. Depending on their capacity and other technical characteristics, private lines may be used for transmission of voice, data, telegraph, or video and may be preferable to switched service for reasons of cost, security, quality, or reliability. | |
| definition 1 | PR | Problem Report | | |
| definition 1 | PRS | Problem Reporting System | | |
| definition 1 | PMS | Process Monitor/Server | | |
| definition 1 | PMO | Project Management Office | | |
| definition 2 | PH | Protocol Handler | A 6-digit numeric that assigns the D channel Integrated Services Channel Number. | |
| definition 2 | PAWS | Provisioning Analyst Work Station | An exception management system (bellcore product) for the provisioning assignment functions. | |
| definition 1 | RTE7 | Provisions Voice Network | | |
| definition 2 | PAS | Public Announcement Service | Consists of service and facilities whereby telephone users may, by calling a particular central office designation and number, obtain information of general interest by means of a recording. | |
| definition 1 | PKCS | Public Key Crypto System | | |
| definition 1 | PODP | Public Office Dial Plan | An AIN trigger that is accessed based on dialed digits. | |

| SOURCE | ACRONYM | TERM | DEFINITION/DESCRIPTION | SEE ALSO |
|---|---|---|---|---|
| definition 2 | PPSN | Public Packet Switched Network (PSDNS | Utilizes packet technology to provide economical common user switched data transport for traffic of X.25 protocol. The network service interconnection meets the transport requirements of a broad variety of data customers such as information and service providers, high speed terminal users and providers of access concentrators. | |
| definition 2 | PSAP | Public Safety Answering Position | The contact a 911 caller will reach. PSAPs are usually segmented as primary, secondary, etc. The primary PSAP is the first contact a 911 caller will get. The PSAP operator verifies or obtains the caller's whereabouts (called location info.), determines the nature of the emergency and decides which emergency response teams should be notified. In some instances, the primary PSAP may dispatch aid. In most cases, the caller is conferenced or transferred to a secondary PSAP from which help will be dispatched. Secondary PSAPs may be located at fire dispatch areas, municipal police force headquarters or ambulance dispatch centers. Often the primary PSAP will answer for an entire region. | |
| definition 2 | PSC | Public Service Commission | The State regulatory body that presides over intrastate regulated communications services. | |
| definition 1 | PSN | Public Switched Network | | |
| definition 2 | PSN | Public Switched Network | Standard industry name used to generically describe that portion of the telephone network which supports 'universal service'. | |
| definition 2 | PUC | Public Utilities Commission | SEE ALSO: PSC | PSC |
| definition 1 | PUC, PSC | Public Utility or Service Commission | In the US., the government agency in a state responsible for regulating all telecommunications that originate and terminate within its boundaries; also known by other names in some states, such as a Public Service Commission (PSC). | |
| definition 2 | PCM | Pulse Code Modulation | A form of modulation in which information signals are sampled at regular intervals, and a series of pulses, coded to represent the amplitude of the information signal at the time of the sampling, are transmitted. | |
| definition 1 | QA | Quality Assurance | | |
| definition 1 | QPS | Queries Per Second | The number of database transactions that can be handled in a second. | |
| definition 1 | | Queuing | The holding of calls in queue when a trunk group is busy and completing them in turn when an idle circuit is available. | |
| definition 2 | | RANGE EXTENDER | Hardware in the central office that is used to boost transmission. | |
| definition 2 | BIT | RATE | The speed at which bits are transmitted, usually expressed in thousands (kilobits) or millions (megabits) per second. | |
| definition 2 | | RATE CENTER | A geographic area for which a wire center (Central Office or routing switch) or a group of wire centers provides telephone service. Calls made within the Rate Center Area are considered local and rates are determined by local exchange tariffs. Some times Rate Centers are subdivided into zones which charge different rates based on mileage and distance considerations. | |
| definition 2 | | RATE KEY | A key used in the rating process to assign the correct rating parameters to a local call. The Rate Key consists of a two byte State Code, three byte Location Code and a one byte Zone Code. | |
| definition 2 | | RATING | The process (or computer system) used to determine the customer charge for each billable call. Rates are based on time and duration and on customer contract terms and conditions. | |
| definition 2 | | RECEIVER | The part of the telephone that receives the electrical signals from the distant end. The electrical signals are converted to voice signals by the transducer in the receiver. | |

| SOURCE | ACRONYM | TERM | DEFINITION/DESCRIPTION | SEE ALSO |
|---|---|---|---|---|
| definition 2 | RCV | Recent Change & Verification | An organization within most LEC's that inputs line side translations into the switches for service installations and modifications. | |
| definition 2 | RCMAC | Recent Change Memory Administration Center | The LEC Center responsible for inputting line transactions into the switch. | |
| definition 2 | | RECIPROCAL COMPENSATION | (1) The arrangement in which the LEC and CLEC pay each other on a minute of use basis to terminate calls to each others' networks. (2) Billing for terminating access to a Local Exchange Carrier (LEC) by MCI WorldCom for traffic that originates and terminates within the same LATA. This traffic may be local or intraLATA toll. This determination is based on a grouping of exchanges in a local calling area (NXX to NXX), mileage between two exchanges or end offices, or a billing arrangement which applies a percentage of local (PLU) factor to local exchange traffic | |
| definition 1 | | Redundancy | The provision of more than one circuit element to assume call processing when the primary elements fail. | |
| definition 1 | RNI | Redundant Network Interface | | |
| definition 1 | RBOC | Regional Bell Operating Company | | |
| definition 2 | RBOC | Regional Bell Operating Company | The term for the seven regional holding companies created by the 1984 AT&T break-up. The RBOC's are Ameritech, Bell Atlantic, BellSouth, NYNEX, Pacific Telesis, Southwestern Bell, and U S WEST. | |
| definition 1 | RIBA | Regional Interface Broadcast Agent | | |
| definition 2 | RSMS | Regional Service Management System | The manual or mechanized number administration functionality necessary to support LNP at a regional level when multiple service providers support number portability. | |
| definition 2 | | RE-HOME | The activity required to move traffic from a congested switch to another switch with additional capacity. This activity could also include movement of traffic between an IDLC that is congested to an IDLC with available capacity. This activity can be performed at the DS1 level or the DS0 level. The preferred method is the DS1 level. | |
| definition 1 | RDBMS | Relational Database Management System | | |
| definition 2 | | RELOCK | The recipient company will secure the record when the migration transaction replaces the customer details and Company ID of the donor company. Also allows the donor company to secure a telephone number record that has been unlocked pending a migration to a different Local Service Provider. (See Unlock) | |
| definition 2 | RCF | Remote Call Forwarding | (1) This feature permits automatic forwarding of all incoming calls dialed to the RCF number to another pre-determined telephone number. RCF assignments are a telephone number and LEN. There is no cable and pair assignment. (2) Allows a customer to have a local telephone number in a distant city. Every time someone calls that number, the call is forwarded to the actual location of that customer. This is the process used for interim number portability. | |
| definition 1 | RCF | Remote Call Forwarding | LNP deployment model generally viewed as an interim solution. For customers changing their local telephone company and wanting to keep their phone number, routes all incoming calls to the old company switch first. Then the calls are forwarded to anew phone number assigned by their new service provider. | |
| definition 2 | RSM AND/OR RSS | Remote Switching Module and/or Remote Switching System | Small, remotely controlled electronic end office switches which obtain their call processing capability from an ESS type Host Office. The RSM/RSS cannot accommodate | |

| SOURCE | ACRONYM | TERM | DEFINITION/DESCRIPTION | SEE ALSO |
|---|---|---|---|---|
| | | | direct trunks to a Customer. | |
| definition 2 | | REPEATER | (1) A device whereby currents received over one circuit are automatically repeated in another circuit or circuits, generally in an amplified and/or reshaped form. (2) A device used to restore signals, which have been distorted because of attenuation, to their original shape and transmission level. (3) A subsequent repair request regarding an individual customers' service that occurs within 30 days of the previous report. | |
| definition 1 | | Repeater | An electronic device that reshapes pulses or adds gain or amplification to a circuit. | |
| definition 2 | RFI | Request For Information | A request to potential vendors asking for input as to their interest and/or capabilities in providing a certain function or fulfilling a certain buyer's requirement. Usually an RFI is used as a 'hunting trip' to identify those vendors which would be likely candidates for an RFP. | |
| definition 1 | RFP | Request for Proposal | | |
| definition 2 | RFP | Request for Proposals | A request to interested vendors, sent after an RFI, asking for a price scheme that meets with the potential buyer's requirements. | |
| definition 1 | PVCS | Requisite PRO Laboratory Test Matrix | | |
| definition 2 | | RESELLER | An interexchange carrier (IXC) that does not own a network. Resellers lease bulk capacity and resell portions at a higher rate. | |
| definition 1 | RSP | Resynch Subscription Version Process | | |
| definition 2 | RAO | Revenue Accounting Office | A three digit code that identifies the local exchange company for guiding toll usage. | |
| definition 2 | | REVISED COMMIT DATE | An updated completion or in-service date in regards to an outstanding service order. | |
| definition 1 | IAL | RIBA Action Logger | | |
| definition 1 | IAG | RIBA CMIP Agent | | |
| definition 1 | ILU | RIBA Logging Utilities | | |
| definition 1 | IMH | RIBA Message Handler | | |
| definition 1 | INL | RIBA Notification Logger | | |
| definition 1 | IRC | RIBA Recovery Logger | | |
| definition 1 | RII | RIBA to IBAR interface | | |
| definition 2 | | RING | The second conductor of a pair of wires. On a simple telephone circuit, this lead is to the battery supply in the central office. | |
| definition 2 | | RING GROUND | A fault to a ground potential on the RING conductor of a telephone line. It may put the line out of service but is always service affecting. A ground hum usually is heard when the line is grounded. | |
| definition 2 | | RING TRIP | A DC detector within the telephone set that stops the ringing generator from operating once a called party answers the inbound call, the Central Office notices a loop closure and de-activates the ringing relay. When a grounded ring occurs, the customer will get short burst of ringing only. Grounded ring trip problems occur because the ring generator and the tip side of the line are not connected to opposite polarities. | |
| definition 1 | RSA | Rivest, Shamir, and Adelman | A popular encryption algorithm whose name is derived from the initials of the inventors. | |
| definition 2 | | ROAMER | Name given to a mobile customer who wants temporary cellular service in an area served by a carrier other that his regular carrier. | |
| definition 2 | RDBS & BRIDS | Routing Database System & Bellcore Rating Information Database System | The primary database for the routing and rating information. The Number Administration group will have automatic and manual capabilities to update this information on Bellcore's mainframe system through scripting. | |

| SOURCE | ACRONYM | TERM | DEFINITION/DESCRIPTION | SEE ALSO |
|---|---|---|---|---|
| definition 1 | SLE | Screening List Editing | | |
| definition 2 | | SECUREID | A system that provides access to the network for anyone holding a 'secureID' card. The user dials into the server, and the server prompts for login, secureID, and PIN before allowing access to the system. | |
| definition 1 | SCA | Selective Call Acceptance (Class) | | |
| definition 1 | SCRJ | Selective Call Rejection (Class) | | |
| definition 1 | | Server | A computer in a local area network that offers its resources, such as a disk, files, and printers, to workstations. | |
| definition 2 | S&E | Service and Equipment | A list of equipment billed to customer by type, quantity, monthly charge, location and billing dates. | |
| definition 1 | SCM | Service Confirmation and Management | | |
| definition 1 | | Service Control Manager or | | |
| definition 2 | SCP | SERVICE CONTROL POINT | The AIN element that provides instructions (software and data) for how an SSP should process and route and AIN call. | |
| definition 1 | | Service Control Point (SCP) Owner/Operator | Entities that own and operate SCPs for the purposes of number portability. | |
| definition 1 | SCP | Service Control Points | The real-time data Base systems in the network that contain instructions on how subscribers wish their calls to be routed, or otherwise processed. | |
| definition 2 | SCE | SERVICE CREATION ENVIRONMENT | A platform used to design, develop, test, and deploy new AIN applications. | |
| definition 1 | CMISE | Service Element | | |
| definition 1 | SMS | Service Management System | Computer facility permitting access to records contained in the number portability database. | |
| definition 2 | SMS | SERVICE MANAGEMENT SYSTEM | A computer system used by telecommunications carriers to manage AIN services directly for their subscribers. | |
| definition 1 | MINA SMS | Service Management System | | |
| definition 2 | SO | SERVICE ORDER | (1) A standard form which includes all pertinent billing, customer service, technical, and other descriptive information which enables communications services as required. (2) A grouping of information or data elements used to describe the information necessary for connection of line side services. The information contained in the service order is that necessary for the proper installation, billing and inventory of equipment and services unique to a discrete customer | |
| definition 1 | SOA | Service Order Administration (Activation) | | |
| definition 2 | SOAC | Service Order Analysis and Control | A system which controls the flow of service order activity from front end systems through the assignment process to downstream systems. | |
| definition 2 | SOI | Service Order Interface | A system that scans all service orders for specific items such as USOC (Universal Service Order Code), state name, NPA, etc., and passes that order into the format required by the destination system for that order. | |
| definition 1 | | Service Portability | The ability of the customer to change their type of service (e.g., POTS to ISDN) without changing telephone numbers. | |
| definition 2 | | SERVICE PORTABILITY | The subscriber maintains their 10 digit directory number when changing service (ie: POTS to ISDN). | |
| definition 1 | SP | Service Provider | The company that provides a given telephone service. Generally refers to a facilities-based user of the NPAC SMS. Specifically includes companies that are directly involved in porting numbers. This includes ILECs, CLECs and Automation Services providers involved in the porting process. | |

| SOURCE | ACRONYM | TERM | DEFINITION/DESCRIPTION | SEE ALSO |
|---|---|---|---|---|
| definition 2 | | SERVICE PROVIDER | Any entity authorized to provide communications services to the public. | |
| definition 1 | SPID | Service Provider ID | | |
| definition 2 | SPLNP | SERVICE PROVIDER LOCAL NUMBER PORTABILITY | Allows the end user to retain their telephone number, providing they remain within the same rate area or rate district (where established), when changing from one service provider to another. | |
| definition 2 | SPNP | Service Provider Number Portability | An arrangement which allows local exchange service customers to retain their existing telephone numbers if they change local exchange service providers, while remaining at their current location. | |
| definition 2 | SR | SERVICE REQUEST | A customer initiated, or approved authorization for the installation, maintenance, or modification of telecommunications related services, products, or features. A service order is routed to the appropriate systems and departments to complete tasks required to fulfill customer service requests. SEE ALSO: Service Order | SO |
| definition 1 | SRMS (F) | Service Request Management System Facilities | | |
| definition 2 | SRP | Service Request Processor | The customer-facing portion of the Architel ASAP application which translates incoming data into NE 'native language'. This piece of the overall application is customer (MCI WorldCom) configurable for ease of interface with OSS's. | |
| definition 2 | SSP | SERVICE SWITCHING POINT | An AIN (Advanced Intelligent Network) switching system that recognizes AIN triggers, sends queries to an SCP (Service Control Point), and processes responses from the SCP that controls how the SSP should proceed with an AIN call. | |
| definition 1 | SSP | Service Switching Point | Service switch point with the function of transferring signaling messages from one signaling link to another and considered exclusively from the viewpoint of the transfer. | |
| definition 2 | SWO | SERVICE WORK ORDER | The authorization for the installation of products or services for customers. It is routed to appropriate departments to complete tasks required for customer service requests. | |
| definition 1 | SMI | ServiceBuilder System Management Interface | | |
| definition 2 | | SERVING CENTRAL OFFICE | The central office from which local service is furnished. | |
| definition 2 | | SERVING LINK | Line connection between a Central Office and a customer premise. | |
| definition 2 | SWC | SERVING WIRE CENTER | The wire center from which the customer designated premises would normally obtain dial tone from the Telephone Company. This central office serving the carrier's end users is where the first point of switching will occur. SEE ALSO: Wire Center | Wire Center |
| definition 1 | SSAP | Session Layer Service Access Point Address (OSI) | | |
| definition 2 | | SHORT | An accidentally established low-resistance connection between two points on a transmission path. On occasion the low-resistance connection will be intentional to conduct circuit tests. | |
| definition 2 | | SHORT JUMPER | The shortest distance between the switch port equipment and the outside plant termination. | |
| definition 2 | STP | Signal Transfer Point | Processors which serve as packet switches for SS7 traffic. An STP may act as a gateway between a LEC's SS7 network and an ILEC's signaling network. Each received signaling message is examined by the STP to determine its destination and routes the message to the appropriate outgoing link. | |
| definition 1 | STP | Signal Transfer Point | The packet switches in a common channel signaling network used to route signaling information between SCPs and other | |

| SOURCE | ACRONYM | TERM | DEFINITION/DESCRIPTION | SEE ALSO |
|---|---|---|---|---|
| | | | network nodes in processing a call (see Common Channel Signaling). | |
| definition 1 | | Signaling | The process of transmitting status or control information between automatic equipment in a telephone network. | |
| definition 2 | | SIGNALING | The generation, transmission, reception, and application of conditions needed to control the set up, administration, and disconnection of voice/data circuits. The communication of control information between elements in a communications network via a prescribed protocol. There are five basic types of signals: (1) Supervisory - Off-hook, connection release, (2) Information - Dial tone, audible ring, line busy, (3) Address - Dialed digits, access codes, service codes, charge codes, (4) Control - Coin collect/return, start dial signals in interoffice trunking, and (5) Alerting - Ringing, receiver off hook. | |
| definition 1 | SCCP | Signaling Connection Control Point | The part provides additional functions to be MTP to cater for both connectionless as well as connection-oriented network services and to achieve and OSI-compatible network service. | |
| definition 2 | SCP | SIGNALING CONTROL POINT | A database that is used to provide services such as LIDB (Line Information Data Base) Query response and 800 Database. | |
| definition 2 | SP | SIGNALING POINT | All switches in the network that have CCS (Common Channel Signaling) capabilities are considered Signaling Points, such as end offices, access tandems, and operator services systems. | |
| definition 2 | SSP | SIGNALING SWITCHING POINTS | A specialized Signaling Point that has the ability to halt call progress on particular calls, query database for instructions, and act on the response. End offices, access tandems, and operator services systems can be equipped as SSPs. | |
| definition 2 | SS7 | Signaling System 7: | Also called the 'intelligent network'. SS7 is an addressing protocol that speeds up call processing because it operates out-of-band. A separate circuit carries a call's processing and routing information. SS7 enhancements include fraud detection, caller identification, call store-and-forward, call ring-back and concurrent data transaction. SEE ALSO: CCIS. | CCIS |
| definition 1 | SS7 | Signaling System No. 7 | A protocol or set of communications procedures, used in common channel signaling for passing routing information between switches and other network nodes (see Common Channel Signaling). | |
| definition 2 | SNMP | Simple Network Management Protocol | A network management tool that is used to manage customer network equipment and processes. It usually has graphic interfaces on an X Windows display. SNMP is widely used in transmission control protocol/Internet protocol (TCP/IP) networks, but actual transport independence means it is not limited to TCP/IP. SNMP has been implemented over Ethernet and open system interconnection (OSI) transports. SNMP uses three basic request primitives: Set, Get, and Get-Next for configuration and performance information, and one asynchronous notification: Trap for alarm and status information. SNMP was originally designed for TCP/IP. The most popular SNMP software are SunNet Manager, HP Open View and IBM NetView/6000. | |
| definition 2 | | SINGLE NUMBER MARKET COVERAGE | The previous name for PrimeNumber. | |
| definition 2 | SPOC | Single Point of Contact | The Operations person who is the primary contact point for coordinated conversion of local service. | |
| definition 1 | SS | Single Selection List | | |
| definition 2 | | SLT | Subscriber Line Testing | |
| definition 1 | SMG | SOA CMIP Manager | | |
| definition 1 | SMH | SOA Message Handler | | |

| SOURCE | ACRONYM | TERM | DEFINITION/DESCRIPTION | SEE ALSO |
|---|---|---|---|---|
| definition 1 | S/W | Software | | |
| definition 1 | S/W | Software | | |
| definition 1 | SCCS | Source Code Control System | A UNIX based version control system. | |
| definition 2 | | SP1 | Software controlled, electromechanical switch (hybrid). First attempt at electronic switch. | |
| definition 2 | | SPECIAL ACCESS | Private lines that connect an end user to an IXC. Also called dedicated access, these lines may be used as part of an end-to-end private line or in order to access a virtual private network. | |
| definition 2 | | SPECIAL ASSEMBLY | A service that is provided by the LEC that requires special approval, individual cost analysis, and unique billing and provisioning arrangements. Special assemblies are not offered directly out of intrastate or interstate tariffs, but are required to be filed with the commission prior to the in-service date. | |
| definition 2 | | SPECIAL SERVICES | (1) A LEC organization responsible for the installation and maintenance of sophisticated telecommunications services such as private lines, data links, ISDN, Video, Fiber Optics systems, etc. (2) The generic RBOC term used to describe designed services. The use of the design process in providing these services will often be reflected in higher costs and longer provisioning intervals. | |
| definition 2 | | SPECIFICATIONS (Office Specs) | The document, the original of which is usually retained by the switching or traffic engineer, which holds the office nomenclature and any other particulars pertaining to the office. | |
| definition 1 | | Spool | In a LAN, a spool is a hardware or software device that buffers data before sending it to a printer. | |
| definition 2 | SIC | STANDARD INDUSTRIAL CLASSIFICATION | U.S. government code that categorizes commercial enterprises. (The first two digits place an organization in one of the 13 major groupings; two additional digits show the primary line of business and size.) | |
| definition 2 | SMDR | Station Message Detail Recording | A feature associated with PBXs and CENTREX service which provides a detailed call message statement by individual station number. | |
| definition 2 | SI | Status Indicator | An indicator unique to each Transaction Code (TC), and provide specific details associated with the TC. Status Indicators can identify the reason why any order is rejected, the origin of an order that is processed, etc. | |
| definition 2 | SPC | Stored Program Control | A technique that programs the memory of a common controlled switching unit to provide processing instructions relating to class marks, code conversions, routing, and trouble analysis. | |
| definition 1 | SQL | Structured Query Language | | |
| definition 2 | SQL | Structured Query Language | A language developed by IBM in the 1970s for defining and manipulating relational databases. It has since become the industry standard, and is often used to enable GIS toolkits to access the data held in existing corporate databases. | |
| definition 2 | | SUBSCRIBER | Anyone who makes arrangements with a telecommunications carrier (TC) to purchase subscriber services such as AWN, AR, PrimeNumber, etc. The customer of the TC. | |
| definition 2 | SDLC | Subscriber Digital Loop(Line) Carrier | (1) The industry generic term used to reference any of the family of loop multiplex equipment which permits multiple voice paths over one loop pair. (2) An IBM communications protocol for the transfer of data between stations in a point-to-point, multipoint, or loop arrangement, using synchronous data transmission techniques. Data Link Control Frame Format Standard; similar to X.25 and HDLC. | |
| definition 2 | SLC | Subscriber Line Concentrator (or Carrier) | Similar to RSM and uses T1 carrier facilities to provide local access connections. | |

| SOURCE | ACRONYM | TERM | DEFINITION/DESCRIPTION | SEE ALSO |
|---|---|---|---|---|
| definition 2 | | SUBSCRIBER LOOP | The physical circuit used to connect a local telephone exchange switch to a subscriber premise. Traditionally, a subscriber loop has consisted of individual cable pairs within a cable. As technology has progressed it has become common for portions of the subscriber loop to be in the form of carrier channels or other electronically forms. | |
| definition 2 | | SUBSCRIPTION | The data that indicates how local number portability should operate to meet the customer's (subscriber's) needs. | |
| definition 1 | SV | Subscription Version | | |
| definition 1 | SSN | Subsystem Number | An identification of a specific user function within a certain Signaling Point, e.g., the ISDN User Part, SCCP Management, etc. | |
| definition 2 | | SUPER TRUNK GROUP | (1) FGD utilized for originating local in addition to IXC traffic. (2) Supergroup is also defined as: 60 circuits processed as a unit in a carrier system, occupying adjacent bands in the spectrum, for simultaneous modulation or demodulation. | |
| definition 2 | | SUPERCEEDURED | Refers to a block of numbers outside the existing Centrex range that are assumed into the Centrex block. (NRSA For An Entire Block Of Numbers) | |
| definition 2 | | SWITCH AND IDLC PORT EQUIPMENT | Equipment in, or a location remote to the central office which is used to serve one or more phone lines. | |
| definition 2 | | SWITCH PORT ADMINISTRATION | The science of balancing switch port equipment over a network. | |
| definition 2 | | SWITCH PORT ADMINISTRATOR | The person responsible for adding switching equipment to the inventory, assigning service classifications to the equipment, performing load balancing of switch port equipment, and assuring an assignable inventory is available for customers orders. | |
| definition 2 | | SWITCH PORT EQUIPMENT | Equipment in a central office which is there to serve one phone line. It comes into play when the switching system detects an off hook condition. | |
| definition 2 | SWP | Switch Provider | The company responsible for switching both originating and terminating traffic. | |
| definition 2 | | SWITCH ROOM | The building or area where the switching equipment is housed. (Central Office) | |
| definition 2 | | SWITCH TRANSLATION | The database maintained in the central office switch that contains the information as to how all calls will be completed for that local calling plan. | |
| definition 1 | SA | Switched Access | Process of interconnecting circuits to form a transmission path between users. Switched access allows telecommunications traffic to go from one point to any other point on a shared basis. Generally, it involves switching traffic from a local telephone company's end office to a long-distance company's POP. | |
| definition 2 | | SWITCHED ACCESS | A two-point transmission path provided between a CO serving an end user and an IC within the same LATA. It is billed on both a usage sensitive basis and a flat rated basis. This service is available in four arrangements, known as Feature Group A, B, C, and D. | |
| definition 2 | SMDS | Switched Multimegabit Data Service | (1) A broadband communications standard for the public network that does not require predefinition of a specific path. (2) A fast packet-switching service using uniform-sized cells to transmit information. SMDS operates at speeds of 1.544 Mbps to 45 Mbps. SMDS is designed to take advantage of evolving MAN standards and technology that telephone companies can deploy to provide cross-premises communications services. | |
| definition 2 | | SWITCHED NETWORK | A public network providing switched communication services (i.e., the network is shared among many users, any of whom establish communication between desired points when required). | |
| definition 2 | | SWITCHED SERVICES | Any number of pay-by-the-minute long-distance services, | |

| SOURCE | ACRONYM | TERM | DEFINITION/DESCRIPTION | SEE ALSO |
|---|---|---|---|---|
| | | | including conventional residential long-distance and WATS. Requires the use of switches in the network to route calls. | |
| definition 2 | SVGALS | Switched Voice Grade Analog Link Services | NYNEX's term for an unbundled loop. | |
| definition 2 | | SWITCHING ENTITY | An electromechanical or electronic switching system used to originating and terminate calls | |
| definition 2 | | SWITCHING EQUIPMENT | The complete set of equipment which performs the function of establishing and releasing connections on a per line basis, between two or more circuits, services, or communications systems | |
| definition 2 | | SWITCHING MACHINE | The hardware used to house parameters for Mechanized switching inter and intraoffice calls. | |
| definition 2 | | SWITCHING SYSTEM | A system used in telecommunications to control routing of transmission signals; e.g., on Customer Premises, a PBX system functions as a private switch that joins various phone extensions to each other and to the outside world. | |
| definition 1 | | Synchronous | A method of transmitting data over a network wherein the sending and receiving terminals are kept in synchronism with each other by clock signal embedded in the data. | |
| definition 2 | SONET | Synchronous Optical Network | A standard for optical transport that defines optical carrier levels and their electrically equivalent synchronous transport signals. It allows for a multi-vendor environment, positions the network for transport of new services, such as synchronous networking. | |
| definition 1 | SONET | Synchronous Optical Network | A new suite of fiber optic transmission speeds that will eventually replace the present DS signal levels. | |
| definition 2 | | SYNCHRONOUS TRANSMISSION | A kind of data transmission in which timing signals are exchanged constantly to ensure that the transmitter and receiver are precisely in step with each other, or synchronized. A form of transmission in which there is a direct timing relationship between two signals. The transmitter and receiver are synchronized and signals are sent at a fixed rate. Information is transmitted in packets of more than one character. Faster than asynchronous because there are no start and stop bits between each character. Used in mainframe-to-mainframe communications. | |
| definition 1 | SCR | System Change Request | | |
| definition 1 | SDE | System Development Environment | | |
| definition 1 | ST | System Test | | |
| definition 1 | SNA | Systems Network Architecture | An IBM data communications architecture that includes: structure, formats, protocols, and operating sequences. | |
| definition 2 | SNA | Systems Network Architecture | The proprietary architecture developed by IBM for mini and mainframe computers. SNA can by viewed as three distinct byte-related entities: a specification, a plan for constructing a network, and a set of products. SNA is a specification governing the design of products for an SNA network. It is called an architecture because it specifies the operating relationships of those products. SNA provides a structure that allows users to establish and manage their networks and, in response to new requirements and technologies, to change or expand them. SNA can be viewed as a set of products: hardware and programs designed to the SNA specifications. | |
| definition 2 | | T-1 | (1) DS-1 Digital System. (2) A digital transmission path which can provide up to 24 voice grade circuits. (3) A standard digital transmission link, also called DS1, which transmits at a digital speed of 1.544 Mbps. It is comparable to 24 DS0s. | |
| definition 1 | | T-1 | A multiplexed 24-channel line capable of carrying voice data signals at a total data rate of 1.544 mb/s. | |
| definition 1 | | T-1 Multiplexer | An intelligent device that divides a 1.544 mb/s facility into multiple voice and data channels. | |

| SOURCE | ACRONYM | TERM | DEFINITION/DESCRIPTION | SEE ALSO |
|---|---|---|---|---|
| definition 2 | | T3 | T3 operates at 45 Mbps and is comparable to 28 T1 channels plus overhead. Also called DS3. | |
| definition 2 | | T9X | RELTEC Drop Side Test Unit: test set that tests subscriber drops. | |
| definition 2 | | TANDEM | A local exchange switch that processes traffic from two or more subtending (lower class offices) Central Offices. A tandem switch may be capable of processing toll grade communications. Tandem switches consolidate traffic, reduce trunk group requirements, and switch interoffice traffic. They allow LECs and carriers to manage their networks more economically. A tandem can serve many different end offices. Also called Access Tandems. | |
| definition 1 | | Tandem Switch | A switching system that interconnects local or toll trunks to other switching systems. | |
| definition 2 | | TARIFF | A legal document filed with and approved by a Regulatory agency by the LEC (or a Carrier) which defines services offered, establishes rates Customers will pay, and states general obligations of the LEC or the Carrier and the Customer. | |
| definition 1 | | Tariff | A published document that specifies the rates, terms, and conditions of a particular telecommunications service; the FCC approves interstate tariffs, intrastate tariffs by PUCS. | |
| definition 2 | | TELCO | A generic term for a telecommunications company, usually meaning a LEC or local telephone company. | |
| definition 2 | TC | TELECOMMUNICATIONS CARRIER | A provider of telecommunications services to end users, or subscribers. | |
| definition 2 | TDD | Telecommunications Device for the Deaf | Specialized equipment permitting two-way communication for the hearing impaired. | |
| definition 2 | TCIF | Telecommunications Industry Forum | An ATIS sponsored forum for purchasers, manufacturers, and suppliers of telecommunications equipment, products, and services to address issues relating to industry standards. Associated with the provision, procurement, and use of such equipment, products, and services; and, to promote understanding and implementation of global standards, guidelines and emerging technologies involving electronic data interchange, electronic commerce and bar coding. | |
| definition 1 | TN | Telephone Number | | |
| definition 2 | TN | Telephone Number | A 10-digit number that specifies the location of a particular telephone and consists of a 3-digit area code, 3-digit central office code, and 4-digit station number. | |
| definition 1 | | Telnet | A method of connecting from one host computer system to another via the Internet. | |
| definition 1 | | Terminal | Any desktop devises capable of sending or receiving information over a communications channel; generally refers to a personal computer or an executive workstation. | |
| definition 2 | TA | Termination Agreement | An agreement or tariff provision between the customer and serving company outlining the customer's financial obligations if a provided service is disconnected prior to a specified date. | |
| definition 1 | TCS | Test Case Servers | | |
| definition 1 | TP | Test Plan | | |
| definition 1 | TPM | Test Program Manager | | |
| definition 1 | TA | Testing Authority | | |
| definition 1 | TWC | Three Way Calling | | |
| definition 2 | | TIE LINE | A non-switched special service circuit interconnecting two or more switchboards or dial systems. | |
| definition 2 | | TIE PAIRS | Used on frames to connect auxiliary equipment on a distributing frame to a feeder cable pair and equipment number on the MDF. | |
| definition 2 | TDM | Time | Method of combining a number of calls by interleaving excerpts of digital signals to create a high-speed signal stream. Each call is assigned a time slot, which designates its relative time-position in the combined, or multiplexed, | |

| SOURCE | ACRONYM | TERM | DEFINITION/DESCRIPTION | SEE ALSO |
|---|---|---|---|---|
| | | | signal. | |
| definition 2 | TSI | Time Slot Interchange | The functionality of the originating/terminating equipment, especially when speaking about certain Digital Loop Carrier equipment. TSI permits the transport of more circuits than would otherwise be possible due to bandwidth constraints. SEE ALSO: TDM for transport facility reference. | TDM |
| definition 2 | | TIP | The first conductor of a pair of wires in a transmission path. On a simple telephone circuit, this leads connects to ground in the Central Office. | |
| definition 2 | | TIP GROUND | A fault to a ground potential on the Tip conductor of a line. It should not put the line out of service, but may cause enough noise to put the line out of service. A ground is usually heard when the line is grounded. | |
| definition 2 | | TIRKS | Trunk Integrated Record Keeping System | |
| definition 1 | TBD | To Be Determined | | |
| definition 1 | | Token Ring | An IBM LAN-based LAN protocol that uses a ring-shaped network topology. Token Ring has speeds of 4Mbps and 16Mbps. A distinguishing packet is transferred from machine to machine and only the machine that is in control of the token is able to transmit. | |
| definition 1 | | Toll Call | A telephone call whose destination is outside the local exchange area, and which is charged at toll rates. | |
| definition 2 | | TOLL CENTER | Basic toll switching entity; a central office where channels and toll message circuits terminate. While this is usually one particular central office in a given metropolitan area or city, larger cities may have several central offices where toll message circuits terminate. A class 4 or higher (lower number) office, also called toll office and toll point. | |
| definition 2 | TCT | Toll Connecting Trunk | A trunk that links to a local central office (class 5) to the direct-distance dialing network. | |
| definition 2 | | TOLL RESTRICTION | Arrangement by which some telephone lines are denied access to long distance circuits. | |
| definition 2 | OLD DIAL | TONE PROVIDER | This is the service provider who is providing the switch dial-tone for the customer prior to the port. | |
| definition 2 | TCOMS | Total Circuit Order Management System | A system which maintains information associated with the order of non-switched local-loop dedicated circuits. TCOMS suite of integrated applications consist of order entry, commissions, sales, and revenue reporting and sales force automation. It also contains an ASR Receive interface. | |
| definition 2 | | TR1188 | An event in call processing, described in technical document 'Class feature: Calling name delivery generic requirement'. | |
| definition 1 | | Traffic | Telephone calls sent and received over a communications channel; a quantitative measurement of telephone use, and usually by number of calls and their length, over a specified period. | |
| definition 1 | TCAP | Transaction Capabilities Application Part | Element of the signaling protocol that is used for messages between end offices and remote databases. The application layer of the Transaction Capabilities protocol. | |
| definition 2 | TCAP | Transaction Capability Applications Part | The actual protocol date unit covered between the SSP ( Signaling Switching Point) and the SCP (Signaling Control Point). A TCAP message has two (2) sublayers: (1) the transaction sublayer and (2) the component sublayer. | |
| definition 2 | TCAP | TRANSACTION CAPABLE APPLICATION PART | Non call-related messages associated with databases, such as Line Information Database (LIDB) and 800, or special features, such as class. | |
| definition 2 | TC | Transaction Code | A code describing the nature or purpose of the data being exchanged. As an example, it can identify general lists of end users, orders processed, orders rejected, etc. | |
| definition 2 | TCSI | Transaction Code Status Indicator | A four digit code provided by the LEC in the CARE record which provides the status of an ANI. SEE ALSO: TC and SI definitions. | TC and SI definitions |
| definition 1 | TPS | Transactions Per Second | | |

| SOURCE | ACRONYM | TERM | DEFINITION/DESCRIPTION | SEE ALSO |
|---|---|---|---|---|
| definition 2 | | TRANSIT TRAFFIC ROUTING | Traffic that is local but not generated by the incumbent LEC (e.g. an independent telephone company). | |
| definition 2 | TCNI | Translated Called Number Indicator | A parameter in the SS7 message protocol that indicates whether an LNP query has been performed. | |
| definition 1 | | Translation | The process of analyzing dialed digits and using them to select a route or equipment feature based on information contained in the system's database. | |
| definition 1 | TPS | Translation Provisioning System | | |
| definition 1 | TT | Translation Type | | |
| definition 2 | | TRANSLATIONS | Changes or conversions made by a network to a dialed number that permit the call to progress through the network; for example, the conversion of the area and office codes of a telephone number into routing instructions. | |
| definition 2 | TE | Translations Engineer | The MCI WorldCom title for those personnel responsible to perform switch translations - Located in Dallas. | |
| definition 2 | | TRANSMISSION | The passage of voice, data or control signaling information over a telephone circuit. | |
| definition 2 | TCP/IP | Transmission Control Protocol/Internet Protocol | SEE ALSO: IP | IP |
| definition 1 | TCP/IP | Transmission Control Protocol/Internet Protocol | | |
| definition 2 | | TRANSMISSION LOSS | Gradual weakening of energy as a signal moves from a transmitter to a receiver. Loss is measured in decibels (dBs) and is corrected when necessary by repeaters in analog systems or regenerative repeaters digital systems. | |
| definition 2 | | TRANSMITTER | The part of the telephone that converts voice signals to electrical signals for transmission to the switched network. | |
| definition 1 | TSAP | Transport Layer Service Access Point Address | | |
| definition 2 | | TRIGGER | An indication to the AIN (Advanced Intelligent Network) switch that it must suspend normal call processing and send a query to the Service Control Point. | |
| definition 2 | | TROUBLE RESOLUTION REQUEST | A customer initiated, or approved authorization for the clearance of a telecommunications related problem or concern. A trouble report is routed to the appropriate systems and departments to complete tasks required to fulfill customer trouble resolution request. | |
| definition 2 | | TROUBLE TICKET | A report taken by an NECC (Network Element Control Center) technician which is generated when a customer reports a repair or service problem to the NECC. | |
| definition 2 | | TRUNK | Transmission media between switching systems. A single or multi-channel telephone circuit connecting two switching centers, where channels can be tested, rerouted, dropped out or switched to another circuit. Also referred to as Message Trunks. | |
| definition 1 | | Trunk | A telephone circuit linking two switching systems. | |
| definition 1 | | Trunk Group | A group of trunks of a similar type. | |
| definition 2 | | TRUNK SIDE CONNECTION | A facility connecting two switching machines. | |
| definition 1 | | Twisted pair Wire | Standard telephone cable composed of wires precisely twisted around one another to prevent crosstalk. | |
| definition 2 | | TWISTED PAIRS | A composite of conductors in a protective sheath arranged so the individual conductors can be used as pairs, each being twisted around each other to form an electrical barrier to interference. | |
| definition 2 | | TWO WIRE CIRCUIT | A transmission path utilizing one pair of conductors (wires). It may either transmit or receive, but not both simultaneously. | |
| definition 2 | UHF | Ultra High Frequency | The band of frequencies between 300 Mhz and 3 GHz. | |
| definition 2 | | UNBALANCE | When the sheathing or wire insulation is worn or broken in a certain spot, a ground condition may develop. This condition can cause increased impulse noise, AC hum or | |

| SOURCE | ACRONYM | TERM | DEFINITION/DESCRIPTION | SEE ALSO |
|---|---|---|---|---|
| | | | other unwanted circuit noise. | |
| definition 2 | | UNBUNDLED DEDICATED INTER-OFFICE TRANSPORT | A facility connecting two wire centers (central office buildings) via transmission equipment. Each wire center is cross-connected to your transmission equipment (physically or virtually) collocated in each wire center, thus making the unbundled transport part of your network. | |
| definition 2 | | UNBUNDLED ENTRANCE FACILITY | A facility connecting a carrier's transmission equipment in its wire center with transmission equipment in your wire center for the purpose of transmitting telecommunications services. Its wire center is cross-connected to your own transmission equipment (physically or virtually) collocated in the wire center. | |
| definition 2 | | UNBUNDLED LOOP | Cable pair connecting incumbent LEC facilities to MFS CO IDLC. | |
| definition 2 | | UNBUNDLED LOOP TIE | Cable pair connecting incumbent LEC facilities to MFS' IDLC in the Central Office. | |
| definition 2 | | UNBUNDLED LOOP TRIAL | The procedural test of ordering, provisioning, maintaining and billing of unbundled loops. | |
| definition 2 | | UNBUNDLED SHARED INTER-OFFICE TRANSPORT | Transport facilities shared by two or more requesting carriers between wire centers (central office building) and another requesting carriers wire center. Shared facilities, as with the dedicated facilities, are used to provide telecommunications services. | |
| definition 1 | | Unbundling | A regulatory requirement providing competitive local service providers the ability to separately purchase discrete functional components of the incumbent (LECs) local telephone company's networks to provide service. | |
| definition 1 | UCD | Uniform Call Distribution | A standard feature of many PBXs that distributes incoming calls to an available agent. If no agent is available, the UCD plays an announcement and puts the caller on hold. | |
| definition 1 | UPS | Uninterruptable Power Supply | A power unit that furnishes AC power to a device even when the commercial power sources fails. | |
| definition 2 | USOC | Universal Service Order Code | Three or five character alpha-numeric code used to identify telecommunications products, features, services, or packages. | |
| definition 2 | | UNLOCK | The action required by a 911 Service Provider upon notification from a donor company that makes the end user's telephone number record available for the recipient company to replace the customer details and Company ID. | |
| definition 2 | UTP | Unshielded Twisted Pair | Twisted pair cabling without a protective covering. For example, datagrade twisted pair (DTP) and distributed inside wire (DIW). | |
| definition 1 | UEH | Unsolicited Event Handler | | |
| definition 1 | UMH | Upstream Message Handler | | |
| definition 1 | UML | Upstream Message Listener | | |
| definition 2 | | USER LOG-IN | Unique set of data, identifiable to one unique user, that is required from the user before access to a system is granted. | |
| definition 1 | UT | Utilities Subsystem | | |
| definition 1 | | Vendor/Software Vendor | Vendors who write and market software for Service Providers for the purpose of porting phone numbers, but are not an active party tot he porting process. | |
| definition 1 | | Version | Time-Sensitive or status-sensitive instance of a subscription. | |
| definition 2 | VC | VERTICAL COORDINATE | Grid points used to determine straight-line mileage between locations. Used for mileage-sensitive product pricing. | |
| definition 2 | VHF | Very High Frequency | (1) The frequencies between 30 Mhz and 300 MHZ. (2) The television channels between 2 and 13. | |
| definition 1 | | Virtual Circuit | A circuit established between two terminals by assigning a logical path over which data can flow. A virtual circuit can be permanent, where terminals are assigned a permanent path, or switched, where the circuit is reestablished each | |

| SOURCE | ACRONYM | TERM | DEFINITION/DESCRIPTION | SEE ALSO |
|---|---|---|---|---|
| | | | time that data is sent. | |
| definition 1 | | Virtual Data | Data connections established between two or more computing devices via a switching system in lieu of dedicated data lines. | |
| definition 2 | | VIRTUAL FACILITY GROUPS | Bearer Capability Routing - Voice, video or data calls are automatically handed to the correct network. The customer doesn't have to designate which channels will support voice and which will support switched data. (MCI WORLDCOM is not using the Virtual Facility Group this is a deferred option for PRI). | |
| definition 2 | | VOICE BAND | A bandwidth of about 4000 cycles per second (or Hertz), which carries enough information to satisfactorily reproduce the human voice at the end of the circuit. Voiceband is a basic transmission unit in telephony. | |
| definition 2 | | VOICE GRADE | Private lines suitable for transmitting a voice signal (300 Hz to 3400 Hz). There are several classes of voice grade lines with varying technical characteristics. Voice grade channels may be used to send analog or digital data or facsimile. | |
| definition 2 | | VOICE MAIL | Services include Individual, Group, Bulletin, and "Tree" Mailbox. The individual mailbox simply takes up to ten messages of one minute duration. The group mailbox can take and send up to twenty messages up to three minutes each to other mailboxes; group mailbox also has such features as caller greeting and the ability to create send-to lists. Bulletin board provides announcements and cannot take messages. The Tree mailbox is a hierarchical structure of group mailboxes, such that a caller first reaches the main mailbox, and, based upon entries to touch phone prompts, is directed to lower level mailboxes. | |
| definition 1 | VMS | Voice Message Service | | |
| definition 1 | | Voice Response Unit or | | |
| definition 2 | WAN | Wide Area Network | An integrated private voice/data network that links local area networks (LANs) across state and/or Local Access and Transport Areas (LATA's). It is based on the use of private line facilities over very large territories. | |
| definition 1 | WAN | Wide Area Network | | |
| definition 1 | WATS | Wide Area Telephone Service | | |
| definition 2 | WATS | Wide Area Telephone Service | INWARD: An arrangement whereby a customer, by paying a charge, can authorize a telephone company to 800 number route calls in to the customer from calling lines in prescribed areas without the callers being required to pay for their calls. OUTWARD: An arrangement whereby payment by the customer of a monthly fee enables the customer to make an unlimited number of long distance calls to stations in prescribed areas up to a preset time limit. | |
| definition 2 | | WIRE CENTER | A building in which one or more central offices, used for the provision of Telephone Exchange Services, are located. SEE ALSO: Serving Wire Center | SWC |
| definition 2 | WFM | Work Force Manager | An information system which automates many routine clerical and administrative tasks typical in a field service organization, such as work order assignment, jeopardy monitoring, reporting, and workload balancing. | |
| definition 2 | WO | WORK ORDER | The collection of information which describes a customer's requested service, features, and feature parameters to the translations group. | |
| definition 2 | WOC | WORK ORDER COMPOSER | The MCI WorldCom IS Local Service application which interfaces between Activation Manager (or WOE) and ASAP in the end-to-end processing of switch translations. The WOC receives WO and service/feature data from upstream applications, develops and appends switch specific data necessary to the process the work order, then formats and passes the data to ASAP for processing. | |

| SOURCE | ACRONYM | TERM | DEFINITION/DESCRIPTION | SEE ALSO |
|---|---|---|---|---|
| definition 2 | WOE | WORK ORDER ENTRY | The MCI WorldCom IS Local Service application used by the Translation Engineer to manually enter work order data to the WOC for translations processing. WOE is an interim application until AM is capable of passing all work order and service/feature data directly to WOC. | |
| definition 1 | WWW | World Wide Web | | |
| definition 1 | WWW-SSL | World Wide Web interface with Secure Sockets Layer | | |
| definition 2 | | X.25 | Protocol for connecting computers to packet switched networks, similar to SDLC and HDLC. (1) An International Consultative Committee for Telephone and Telegraph (CCITT) standard that defines the interface between data terminal equipment (DTE) and data circuit terminating equipment (DCE) for workstations operating in packet switch mode across public data networks. X.25 is used generically to describe packet-switching networks, but this usage is misleading. The CCITT recommendation defines the interface only; it does not specify how the network should operate internally nor how it should be managed. X.25 is not a uniform, constant standard; it has many variations, none of which is guaranteed to operate with any other X.25 setup. X.25 has been a standard of the CCITT since 1976. (2) A standard protocol suite for packet-switched networks, approved by the (CCITT) and the International Organization for Standardization (ISO). X.25 defines standard physical layer, link layer and network layers (layers 1 through 3 of the open systems interconnection model (OSI)). It was developed to describe how data passes into and out of public data communications networks. X.25 is an international narrowband (under 56 Kbps) packet-switching standard. X.25 is a forerunner of frame relay and asynchronous transfer mode (ATM). | |
| definition 2 | | ZONING | The sectioning off and defining areas in the central office, especially denoting lines versus outside plant, in order to achieve a short jumper or short distance between two termination points. | |
| definition 2 | CS-X | | ITU standards based signaling similar to AIN. | |
| definition 2 | ATX | | The Carrier Identification Code for AT&T. | |

Note: definition 1 designates acronyms or terms as used by a first telecommunications service provider's personnel and definition 2 designates acronyms or terms as used by a second telecommunications service provider's personnel.

What is claimed is:

1. An interface to a local number portability (LNP) network, comprising:
   a communications link;
   an engine interface, wherein said engine interface comprises a service order administration (SOA) engine interface that routes one of LNP transactions and LNP messages received from said GUI to destinations including regional SOA subsystems;
   a graphical user interface (GUI) coupled to said engine interface via said communications link;
   said engine interface for transmitting data from said LNP network to said GUI via said communications link and transmitting data received from said GUI to said LNP network;
   said GUI comprising means for providing screen displays to a user for performing LNP network maintenance functions including at least one of maintaining a service provider (SP); maintaining a numbering plan area-telephone number exchange (NPA-NXX), and maintaining local routing number (LRN); and
   said GUI comprising means for providing screen displays to a user for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV.

2. The interface to a LNP network of claim 1, wherein said GUI screen display for maintaining a service provider comprises:
   a maintain SP screen display for modifying or querying SP information, including,
   fields for inputting query or modification information including a SP identification, region and contact information,
   means for submitting said query or modification information to said engine interface,
   means for displaying query results received from said engine interface in response to said query or modification information, and
   means for clearing input query or modification information; and
   a list SP screen display, including,
   a date and time of query or modification indicator,
   means for listing SP information, and
   means for printing listed SP information.

3. The interface to a LNP network of claim 1, wherein said GUI screen display for maintaining a NPA-NXX comprises:
   a maintain NPA-NXX screen display for creating, deleting or querying a NPA-NXX, including,
   fields for inputting query criteria including a query source, a query region, a SP identification, and a NPA-NXX range including a NPA-NXX start and a NPA-NXX end,
   means for submitting said query criteria to said engine interface,
   means for displaying query results received from said engine interface in response to said query criteria and including a date and time of query indicator,
   means for printing said query results,
   means for clearing input query criteria,
   means for indicating a row count of said query results,
   means for deleting a selected NPA-NXX from displayed query results, and
   means for creating a NPA-NXX and which generates a create NPA-NXX screen display upon a user selecting said means for creating a NPA-NXX,
   wherein said create NPA-NXX screen display, includes,
   fields for inputting NPA-NXX information including a NPA-NXX, an effective date of creation, and a NPA-NXX region,
   means for submitting said NPA-NXX information to said engine interface,
   means for clearing input NPA-NXX information, and
   means for cancelling said creating of said NPA-NXX.

4. The interface to a LNP network of claim 1, wherein said GUI screen display for maintaining a LRN comprises:
   a maintain LRN screen display for creating, deleting, modifying or querying a LRN, including,
   fields for inputting query criteria including a query source, a query region, a SP identification, and a LRN range including a LRN start and a LRN end,
   means for submitting said query criteria to said engine interface,
   means for displaying query results received from said engine interface in response to said query criteria and including a date and time of query indicator,
   means for printing said query results,
   means for clearing input query criteria,
   means for indicating a row count of said query results,
   means for deleting a selected LRN from displayed query results,
   means for modifying a selected LRN from displayed query results,
   means for creating a LRN and which generates a create LRN screen display upon a user selecting said means for creating a LRN,
   wherein said create LRN screen display, includes,
   fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN),
   means for submitting said LRN information to said engine interface,
   means for clearing input LRN information, and
   means for cancelling said creating of said LRN.

5. The interface to a LNP network of claim 1, wherein said GUI screen display for creating as a gaining SV comprises:
   a create as gaining screen display for creating a gaining SV, including,
   fields for inputting create as gaining information including a SV region, a telephone number (TN) range including a TN start and a TN end,
   a create as gaining form including fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN,
   an additional information form including fields for inputting custom local area signaling services (CLASS) information, line information database (LIDB) information, caller identification with name (CNAM)

information, and inter-switch voice mail (ISVM) information for a destination point code (DPC) and a subsystem number (SSN), an end user location and type, and a means for pre-populating said DPC and SSN fields based on the LRN if manually entered, means for submitting said create as gaining information and information input in said create as gaining and additional forms to said engine interface, and means for clearing input create as gaining information and information input in said create as gaining and additional information forms.

6. The interface to a LNP network of claim 1, wherein said GUI screen display for creating as a losing SV comprises:

a create as losing screen display for creating a losing SV, including, fields for inputting create as losing information including a SV region, a telephone number (TN) range including a TN start and a TN end, new SP information, a customer name, a due date, a LNP type, an old SP authorization indication, a status change cause, a work order number, a service order number, and remarks, means for submitting said create as losing information to said engine interface, and means for clearing input create as losing information.

7. The interface to a LNP network of claim 1, wherein said GUI screen display for activating a SV comprises:

an activate SV screen display for activating a SV including fields for inputting activate information including. a SV region and identification, and a telephone number (TN) range including a TN start and a TN end, means for submitting said activate information to said engine interface, and means for clearing input activate information.

8. The interface to a LNP network of claim 1, wherein said GUI screen display for modifying a SV comprises:

a modify SV screen display for modifying a SV, including, fields for inputting modify information including a SV region and identification, a telephone number (TN) range including a TN start and a TN end, a subscription version status indication, and means for selecting a modify as new SP and a modify as old SP, wherein if modify as new SP is selected, said modify SV screen display, includes, a modify as new form including modify as new SP information including fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and an additional information form including fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and wherein if modify as old SP is selected, said modify SV screen display includes modify as old SP information including fields for inputting a customer name, an old SP due date, an old SP authorization indication, a work order number, a service order number, remarks, and a status change cause indication;

means for submitting said modify information, said modify as new SP information, said modify as old SP information, and information input in said additional form to said engine interface; and means for clearing input modify information, modify as new SP information, modify as old SP information, and information input in said additional form.

9. The interface to a LNP network of claim 1, wherein said GUI screen display for cancelling a SV comprises:

a cancel SV screen display for cancelling a SV including fields for inputting cancel information including a SV region and identification, and a telephone number (TN) range including a TN start and a TN end, means for submitting said cancel information to said engine interface, and means for clearing input cancel information.

10. The interface to a LNP network of claim 1, wherein said GUI screen display for disconnecting a SV comprises:

a disconnect SV screen display for disconnecting a SV including fields for inputting disconnect information including a SV region and identification, a telephone number (TN) range including a TN start and a TN end, a disconnect date, and an effective release date, means for submitting said disconnect information to said engine interface, and means for clearing input disconnect information.

11. The interface to a LNP network of claim 1, wherein said GUI screen display for acknowledging cancellation of a SV comprises:

a cancel acknowledgment screen display for acknowledging cancellation of a SV including fields for inputting acknowledgment information including a SV region and identification, and a telephone number (TN) range including a TN start and a TN end, means for submitting said acknowledgment information to said engine interface, and means for clearing input acknowledgment information.

12. The interface to a LNP network of claim 1, wherein said GUI screen display for resolving a conflict with a SV comprises:

a resolve conflict screen display for resolving a conflict with a SV including fields for inputting resolve conflict information including a SV region and identification, and a telephone number (TN) range including a TN start and a TN end, means for submitting said resolve conflict information to said engine interface, and means for clearing input resolve conflict information.

13. The interface to a LNP network of claim 1, wherein said GUI screen display for querying a SV comprises:

a query SV screen display for querying a SV, including, a criteria form including fields for inputting query criteria including a query source selection, a telephone number (TN) range including a TN start and a TN end, a LRN, a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface, and a means for clearing input query criteria, a results form for displaying query results received from said engine interface based on said query criteria and including a date and time of query, query results window, a query results row count indicator, a means for refreshing said query results, a means for printing said query results, and a means for providing query results details, wherein said means for providing query results details provides details of a query result selected from said query results window and includes a general information form, a SV history information form, an additional information form, and a partial failure list form.

14. A method for interfacing to a local number portability (LNP) network, comprising:

coupling a graphical user interface (GUI) to an engine interface via a communications link;

transmitting data, via said engine interface, from said LNP network to said GUI via said communications link and transmitting data received from said GUI to said LNP network, wherein said engine interface comprises a service order administration (SOA) engine interface that routes one of LNP transactions and LNP messages received from said GUI to destinations including regional SOA subsystems;

providing screen displays to a user, via said GUI, for performing LNP network maintenance functions including at least one of maintaining a service provider (SP), maintaining a numbering plan area-telephone number exchange (NPA-NXX), and maintaining local routing number (LRN); and providing screen displays to a user, via said GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV.

15. The method of claim 14, wherein said step of providing a screen display for maintaining a service provider comprises:

providing a maintain SP screen display for modifying or querying SP information, including,
providing fields for inputting query or modification information including a SP identification, region and contact information,
providing means for submitting said query or modification information to said engine interface,
providing means for displaying query results received from said engine interface in response to said query or modification information, and
providing means for clearing input query or modification information; and
providing a list SP screen display, including,
providing means for indicating a date and time of query or modification,
providing means for listing SP information, and
providing means for printing listed SP information.

16. The method of claim 14, wherein said step of providing a screen display for maintaining a NPA-NXX comprises:

providing a maintain NPA-NXX screen display for creating, deleting or querying a NPA-NXX, including,
providing fields for inputting query criteria including a query source, a query region, a SP identification, and a NPA-NXX range including a NPA-NXX start and a NPA-NXX end,
providing means for submitting said query criteria to said engine interface,
providing means for displaying query results received from said engine interface in response to said query criteria and including a date and time of query indicator,
providing means for means for printing said query results,
providing means for means for clearing input query criteria,
providing means for means for indicating a row count of said query results,
providing means for means for deleting a selected NPA-NXX from displayed query results, and
providing means for means for creating a NPA-NXX and generating a create NPA-NXX screen display upon a user selecting said means for creating a NPA-NXX,
said step of generating a create NPA-NXX screen display, includes,
providing fields for inputting NPA-NXX information including a NPA-NXX, an effective date of creation, and a NPA-NXX region,
providing means for submitting said NPA-NXX information to said engine interface,
providing means for clearing input NPA-NXX information, and
providing means for cancelling said creating of said NPA-NXX.

17. The method of claim 14, wherein said step of providing a screen display for maintaining a LRN comprises:

providing a maintain LRN screen display for creating, deleting, modifying or querying a LRN, including,
providing fields for inputting query criteria including a query source, a query region, a SP identification, and a LRN range including a LRN start and a LRN end,
providing means for submitting said query criteria to said engine interface,
providing means for displaying query results received from said engine interface in response to said query criteria and including a date and time of query indicator,
providing means for printing said query results,
providing means for clearing input query criteria,
providing means for indicating a row count of said query results,
providing means for deleting a selected LRN from displayed query results,
providing means for modifying a selected LRN from displayed query results,
providing means for creating a LRN and generating a create LRN screen display upon a user selecting said means for creating a LRN,
wherein said step of generating a create LRN screen display, includes,
providing fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN),
providing means for submitting said LRN information to said engine interface, providing means for clearing input LRN information, and providing means for cancelling said creating of said LRN.

18. The method of claim 14, wherein said step of providing a screen display for creating as a gaining SV comprises:

providing a create as gaining screen display for creating a gaining SV, including, providing fields for inputting create as gaining information including a SV region, a telephone number (TN) range including a TN start and a TN end, providing a create as gaining form including providing fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN, providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, providing means for submitting said create as gaining information and information input in said create as gaining and additional forms to said engine interface, and providing means for clearing input create as gaining information and information input in said create as gaining and additional information forms.

19. The method of claim 14, wherein said step of providing a screen display for creating as a losing SV comprises:

providing a create as losing screen display for creating a losing SV, including, providing fields for inputting create as losing information including a SV region, a telephone number (TN) range including a TN start and a TN end, new SP information, a customer name, a due date, a LNP type, an old SP authorization indication, a status change cause, a work order number, a service order number, and remarks, providing means for submitting said create as losing information to said engine interface, and providing means for clearing input create as losing information.

20. The method of claim 14, wherein said step of providing a screen display for activating a SV comprises:

providing an activate SV screen display for activating a SV including providing fields for inputting activate information including a SV region and identification, and a telephone number (TN) range including a TN start and a TN end, providing means for submitting said activate information to said engine interface, and providing means for clearing input activate information.

21. The method of claim 14, wherein said step of providing a screen display for modifying a SV comprises:

providing a modify SV screen display for modifying a SV, including, providing fields for inputting modify information including a SV region and identification, a telephone number (TN) range including a TN start and a TN end, a subscription version status indication, and means for selecting a modify as new SP and a modify as old SP, wherein if modify as new SP is selected, said step of providing a modify SV screen display, includes, providing a modify as new form including modify as new SP information including providing fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and wherein if modify as old SP is selected, said step of providing a modify SV screen display includes modify as old SP information including providing fields for inputting a customer name, an old SP due date, an old SP authorization indication, a work order number, a service order number, remarks, and a status change cause indication;

providing means for submitting said modify information, said modify as new SP information, said modify as old SP information, and information input in said additional form to said engine interface; and providing means for clearing input modify information, modify as new SP information, modify as old SP information, and information input in said additional form.

22. The method of claim 14, wherein said step of providing a screen display for cancelling a SV comprises:

providing a cancel SV screen display for cancelling a SV including providing fields for inputting cancel information including a SV region and identification, and a telephone number (TN) range including a TN start and a TN end, providing means for submitting said cancel information to said engine interface, and providing means for clearing input cancel information.

23. The method of claim 14, wherein said step of providing a screen display for disconnecting a SV comprises:

providing a disconnect SV screen display for disconnecting a SV including providing fields for inputting disconnect information including a SV region and identification, a telephone number (TN) range including a TN start and a TN end, a disconnect date, and an effective release date, providing means for submitting said disconnect information to said engine interface, and providing means for clearing input disconnect information.

24. The method of claim 14, wherein said step of providing a screen display for acknowledging cancellation of a SV comprises:

providing a cancel acknowledgment screen display for acknowledging cancellation of a SV including providing fields for inputting acknowledgment information including a SV region and identification, and a telephone number (TN) range including a TN start and a TN end, providing means for submitting said acknowledgment information to said engine interface, and providing means for clearing input acknowledgment information.

25. The method of claim 14, wherein said step of providing a screen display for resolving a conflict with a SV comprises:

providing a resolve conflict screen display for resolving a conflict with a SV including providing fields for inputting resolve conflict information including a SV region and identification, and a telephone number (TN) range including a TN start and a TN end, providing means for submitting said resolve conflict information to said engine interface, and providing means for clearing input resolve conflict information.

26. The method of claim 14, wherein said step of providing a screen display for querying a SV comprises:

providing a query SV screen display for querying a SV, including, providing a criteria form including providing fields for inputting query criteria including a query source selection, a telephone number (TN) range including a TN start and a TN end, a LRN, a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface, and a means for clearing input query criteria, providing a results form for displaying query results received from said engine interface based on said query criteria and including providing a date and time of query, query results window, a query results row count indicator, a means for refreshing said query results, a means for printing said query results, and a means for providing query results details, wherein said step of providing means for providing query results details provides details of a query result selected from said query results window and includes providing a general information form, a SV history information form, an additional information form, and a partial failure list form.

27. A computer readable medium storing computer instructions for interfacing to a local number portability (LNP) network, by performing the steps of:

coupling a graphical user interface (GUI) to an engine interface via a communications link, wherein said engine interface comprises a service order administration (SOA) engine interface that routes one of LNP transactions and LNP messages received from said GUI to destinations including regional SOA subsystems;

transmitting data, via said engine interface, from said LNP network to said GUI via said communications link and transmitting data received from said GUI to said LNP network;

providing screen displays to a user, via said GUI, for performing LNP network maintenance functions including at least one of maintaining a service provider (SP), maintaining a numbering plan area-telephone number exchange (NPA-NXX), and maintaining local routing number (LRN); and providing screen displays to a user, via said GUI, for performing LNP subscription version (SV) maintenance functions including at least one of creating as a gaining SV, creating as a losing SV, activating a SV, modifying a SV, cancelling a SV, disconnecting a SV, acknowledging cancellation of a SV, resolving a conflict with a SV, and querying a SV.

28. The computer readable medium of claim 27, further storing computer instructions, for performing the step of providing a screen display for maintaining a service provider, comprising:

providing a maintain SP screen display for modifying or querying SP information, including, providing fields for inputting query or modification information including a SP identification, region and contact information, providing means for submitting said query or modification information to said engine interface, providing means for displaying query results received from said engine interface in response to said query or modification information, and providing means for clearing input query or modification information; and providing a list SP screen display, including, providing means for indicating a date and time of query or modification, providing means for listing SP information, and providing means for printing listed SP information.

29. The computer readable medium of claim 27, further storing computer instructions, for performing the step of providing a screen display for maintaining a NPA-NXX, comprising:

providing a maintain NPA-NXX screen display for creating, deleting or querying a NPANXX, including, providing fields for inputting query criteria including a query source, a query region, a SP identification, and a NPA-NXX range including a NPA-NXX start and a NPA-NXX end, providing means for submitting said query criteria to said engine interface, providing means for displaying query results received from said engine interface in response to said query criteria and including a date and time of query indicator, providing means for means for printing said query results, providing means for means for clearing input query criteria, providing means for means for indicating a row count of said query results, providing means for means for deleting a selected NPA-NXX from displayed query results, and providing means for means for creating a NPA-NXX and generating a create NPA-NXX screen display upon a user selecting said means for creating a NPA-NXX, said step of generating a create NPA-NXX screen display, includes, providing fields for inputting NPA-NXX information including a NPA-NXX, an effective date of creation, and a NPA-NXX region, providing means for submitting said NPA-NXX information to said engine interface, providing means for clearing input NPA-NXX information, and providing means for cancelling said creating of said NPA-NXX.

30. The computer readable medium of claim 27, further storing computer instructions, for performing the step of providing a screen display for maintaining a LRN, comprising:

providing a maintain LRN screen display for creating, deleting, modifying or querying a LRN, including, providing fields for inputting query criteria including a query source, a query region, a SP identification, and a LRN range including a LRN start and a LRN end, providing means for submitting said query criteria to said engine interface, providing means for displaying query results received from said engine interface in response to said query criteria and including a date and time of query indicator, providing means for printing said query results, providing means for clearing input query criteria, providing means for indicating a row count of said query results, providing means for deleting a selected LRN from displayed query results, providing means for modifying a selected LRN from displayed query results, providing means for creating a LRN and generating a create LRN screen display upon a user selecting said means for creating a LRN, wherein said step of generating a create LRN screen display, includes, providing fields for inputting LRN information including a LRN, and custom local area signaling services (CLASS) information, line information database (LIDB) information, caller identification with name (CNAM) information, and inter-switch voice mail (ISVM) information for a destination point code (DPC) and a subsystem number (SSN), providing means for submitting said LRN information to said engine interface, providing means for clearing input LRN information, and providing means for cancelling said creating of said LRN.

31. The computer readable medium of claim 27, further storing computer instructions, for performing the step of providing a screen display for creating as a gaining SV, comprising:

providing a create as gaining screen display for creating a gaining SV, including, providing fields for inputting create as gaining information including a SV region, a telephone number (TN) range including a TN start and a TN end, providing a create as gaining form including providing fields for inputting old SP information, a port to original indication, a customer name, a due date, a billing identification, a reserved TN indication, a work order number, a service order number, remarks, an incumbent local exchange carrier (ILEC) NPA-NXX, a network switch common language location identifier (CLLI) indication, and a LRN, providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN-fields based on the LRN if manually entered, providing means for submitting said create as gaining information and information input in said create as gaining and additional forms to said engine interface, and providing means for clearing input create as gaining information and information input in said create as gaining and additional information forms.

32. The computer readable medium of claim 27, further storing computer instructions, for performing the step of providing a screen display for creating as a losing SV, comprising:

providing a create as losing screen display for creating a losing SV, including, providing fields for inputting create as losing information including a SV region, a telephone number (TN) range including a TN start and a TN end, new SP information, a customer name, a due date, a LNP type, an old SP authorization indication, a status change cause, a work order number, a service order number, and remarks, providing means for submitting said create as losing information to said engine interface, and providing means for clearing input create as losing information.

33. The computer readable medium of claim 27, further storing computer instructions, for performing the step of providing a screen display for activating a SV, comprising:

providing an activate SV screen display for activating a SV including providing fields for inputting activate information including a SV region and identification, and a telephone number (TN) range including a TN start and a TN end, providing means for submitting said activate information to said engine interface, and providing means for clearing input activate information.

34. The computer readable medium of claim 27, further storing computer instructions, for performing the step of providing a screen display for modifying a SV, comprising:

providing a modify SV screen display for-modifying a SV, including, providing fields for inputting modify information including a SV region and identification, a telephone number (TN) range including a TN start and a TN end, a subscription version status indication, and means for selecting a modify as new SP and a modify as old SP, wherein if modify as new. SP is selected, said step of providing a modify SV screen display, includes, providing a modify as new form including modify as new SP information including providing fields for inputting a customer name, a due date, a billing identification, a reserved TN indication, a work order number, a service order number, remarks, an incumbent local exchange carrier (ILEC) NPA-NXX, a network switch common language location identifier (CLLI) indication, and a LRN, and providing an additional information form including providing fields for inputting custom local area signaling services (CLASS) information, line information database (LIDB) information, caller identification with name (CNAM) information, and inter-switch voice mail (ISVM) information for a destination point code (DPC) and a subsystem number (SSN), an end user location and type, and a means for pre-populating said DPC and SSN fields based on the LRN if manually entered, and wherein if modify as old SP is selected, said step of providing a modify SV screen display includes modify as old SP information including providing fields for inputting a customer name, an old SP due date, an old SP authorization indication, a work order number, a service order number, remarks, and a status change cause indication;

providing means for submitting said modify information, said modify as new SP information, said modify as old SP information, and information input in said additional form to said engine interface; and providing means for clearing input modify information, modify as new SP information, modify as old SP information, and information input in said additional form.

35. The computer readable medium of claim 27, further storing computer instructions, for performing the step of providing a screen display for cancelling a SV, comprising:

providing a cancel SV screen display for cancelling a SV including providing fields for inputting cancel information including a SV region and identification, and a telephone number (TN) range including a TN start and a TN end, providing means for submitting said cancel information to said engine interface; and providing means for clearing input cancel information.

36. The computer readable medium of claim 27, further storing computer instructions, for performing the step of providing a screen display for disconnecting a SV, comprising:

providing a disconnect SV screen display for disconnecting a SV including providing fields for inputting disconnect information including a SV region and identification, a telephone number (TN) range including a TN start and a TN end, a disconnect date, and an effective release date, providing means for submitting said disconnect information to said engine interface, and providing means for clearing input disconnect information.

37. The computer readable medium of claim 27, further storing computer instructions, for performing the step of providing a screen display for acknowledging cancellation of a SV, comprising:

providing a cancel acknowledgment screen display for acknowledging cancellation of a SV including providing fields for inputting acknowledgment information including a SV region and identification, and a telephone number (TN) range including a TN start and a TN end, providing means for submitting said acknowledgment information to said engine interface, and providing means for clearing input acknowledgment information.

38. The computer readable medium of claim 27, further storing computer instructions, for performing the step of providing a screen display for resolving a conflict with a SV, comprising:

providing a resolve conflict screen display for resolving a conflict with a SV including providing fields for inputting resolve conflict information including a SV region and identification, and a telephone number (TN) range including a TN start and a TN end, providing means for submitting said resolve conflict information to said engine interface, and providing means for clearing input resolve conflict information.

39. The computer readable medium of claim 27, further storing computer instructions, for performing the step of providing a screen display for querying a SV, comprising:

providing a query SV screen display for querying a SV, including, providing a criteria form including providing fields for inputting query criteria including a query source selection, a telephone number (TN) range including a TN start and a TN end, a LRN, a SV identification and region, a LNP type indication, a SV status indication, a old SP authorization indication, a new SP due date range including a new SP due date start and a new SP due date end, a old SP due date range including an old SP due date start and an old SP due date end, an activation date range including an activation date start and an activation date end, a customer name, a work order number, a service order number, a ready to activate indication, a sent to data access point (DAP) indication, a user identification, a means for submitting said query criteria to said engine interface, and a means for clearing input query criteria, providing a results form for displaying query results received from said engine interface based on said query criteria and including providing a date and time of query, query results window, a query results row count indicator, a means for refreshing said query results, a means for printing said query results, and a means for providing query results details, wherein said step of providing means for providing query results details provides details of a query result selected from said query results window and includes providing a general information form, a SV history information form, an additional information form, and a partial failure list form.

* * * * *